US011377102B2

(12) United States Patent
Shashua et al.

(10) Patent No.: US 11,377,102 B2
(45) Date of Patent: Jul. 5, 2022

(54) NAVIGATION BASED ON SENSED LOOKING DIRECTION OF A PEDESTRIAN

(71) Applicant: MOBILEYE VISION TECHNOLOGIES LTD., Jerusalem (IL)

(72) Inventors: Amnon Shashua, Mevaseret Zion (IL); Shai Shalev-Shwartz, Jerusalem (IL); Shaked Shammah, Jerusalem (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 83 days.

(21) Appl. No.: 16/821,840

(22) Filed: Mar. 17, 2020

(65) Prior Publication Data
US 2020/0223451 A1    Jul. 16, 2020

Related U.S. Application Data

(63) Continuation of application No. PCT/US2018/058209, filed on Oct. 30, 2018.
(Continued)

(51) Int. Cl.
*B60W 30/095* (2012.01)
*B60W 30/09* (2012.01)
(Continued)

(52) U.S. Cl.
CPC ........ *B60W 30/0956* (2013.01); *B60W 30/09* (2013.01); *B60W 40/08* (2013.01);
(Continued)

(58) Field of Classification Search
None
See application file for complete search history.

(56) References Cited

U.S. PATENT DOCUMENTS

2017/0057497 A1\* 3/2017 Laur .................. G06K 9/00348
2017/0113702 A1\* 4/2017 Thieberger-Navon ......................
B60W 50/0097
(Continued)

FOREIGN PATENT DOCUMENTS

| KR | 2017-0015214 A | 2/2017 |
| WO | WO 2017/169203 A1 | 10/2017 |
| WO | WO 2016/204507 A1 | 6/2018 |

OTHER PUBLICATIONS

PCT International Search Report and Written Opinion of PCT International Application No. PCT/US2018/058209 dated Oct. 30, 2019 (19 pages).

*Primary Examiner* — Dale W Hilgendorf
*Assistant Examiner* — Alexander C. Bost
(74) *Attorney, Agent, or Firm* — Finnegan, Henderson, Farabow, Garrett & Dunner, LLP

(57) ABSTRACT

The present disclosure relates to systems and methods for host vehicle navigation. Disclosed systems and methods may receive, from a camera, a plurality of images representative of an environment of the host vehicle; analyze the plurality of images to identify at least one pedestrian in the environment of the host vehicle; identify eyes of the at least one pedestrian represented in at least one of the plurality of images; and determine, based on analysis of the at least one of the plurality of images and based on the identification of the eyes of the at least one pedestrian in the at least one of the plurality of images, a looking direction of the at least one pedestrian.

17 Claims, 60 Drawing Sheets

Related U.S. Application Data

(60) Provisional application No. 62/578,837, filed on Oct. 30, 2017.

(51) Int. Cl.
| | | |
|---|---|---|
| *G05D 1/02* | (2020.01) | |
| *G06K 9/00* | (2006.01) | |
| *G01C 21/36* | (2006.01) | |
| *B60W 40/08* | (2012.01) | |
| *B60W 60/00* | (2020.01) | |

(52) U.S. Cl.
CPC .... *B60W 60/0011* (2020.02); *B60W 60/0017* (2020.02); *B60W 60/00274* (2020.02); *G01C 21/3602* (2013.01); *G05D 1/0221* (2013.01); *G05D 1/0246* (2013.01); *G06K 9/00348* (2013.01); *G06K 9/00362* (2013.01); *G06K 9/00369* (2013.01); *G06K 9/00805* (2013.01); *B60W 2040/0818* (2013.01); *G05D 2201/0213* (2013.01)

(56) References Cited

U.S. PATENT DOCUMENTS

| | | | |
|---|---|---|---|
| 2017/0190336 A1* | 7/2017 | Vijayan | B60W 30/18154 |
| 2017/0232915 A1 | 8/2017 | Dufford | |
| 2018/0005527 A1* | 1/2018 | Bostick | G08G 1/0141 |
| 2018/0053412 A1* | 2/2018 | Iagnemma | G05D 1/0088 |
| 2018/0164825 A1* | 6/2018 | Matus | G08G 1/096725 |
| 2018/0174460 A1* | 6/2018 | Jung | B60Q 1/085 |
| 2018/0326982 A1* | 11/2018 | Paris | G08G 1/166 |
| 2018/0329418 A1* | 11/2018 | Baalke | G05D 1/0246 |
| 2019/0184893 A1* | 6/2019 | Sorokin | B60Q 1/503 |
| 2020/0202142 A1* | 6/2020 | To | G05D 1/0088 |
| 2020/0290643 A1* | 9/2020 | Ueda | B60W 30/18163 |

\* cited by examiner

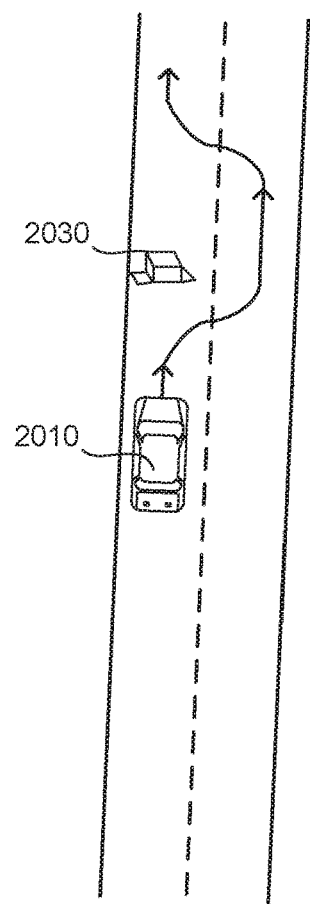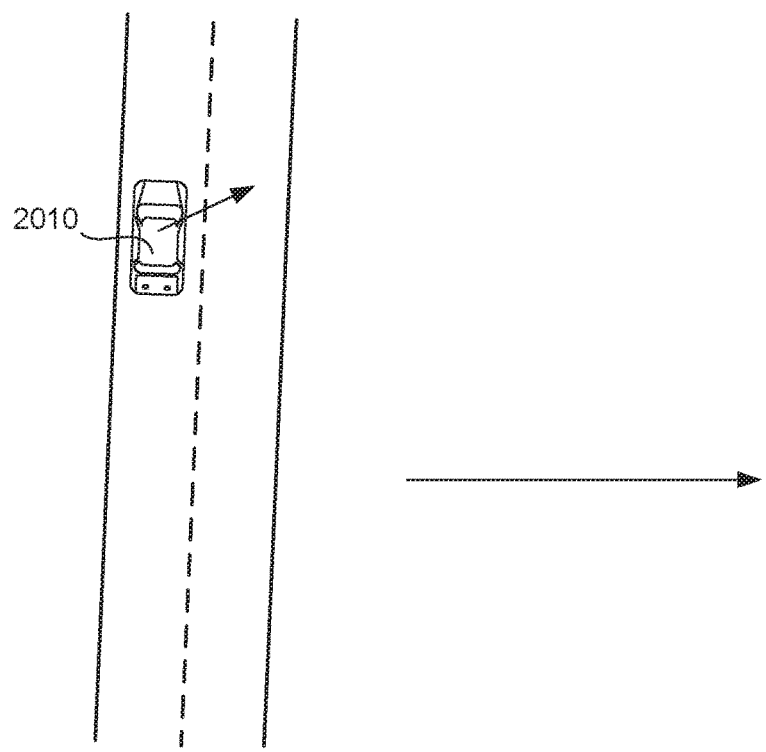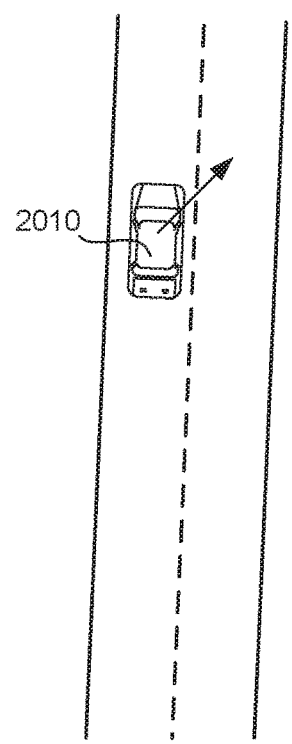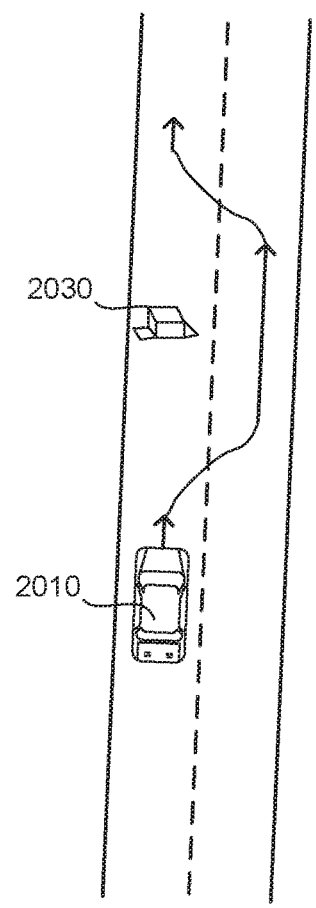
FIG. 20C
FIG. 20D

NAVIGATION BASED ON SENSED LOOKING DIRECTION OF A PEDESTRIAN

CROSS REFERENCE TO RELATED APPLICATION

This application is a continuation of PCT International Application No. PCT/US2018/058209, filed Oct. 30, 2018, which claims the benefit of priority of U.S. Provisional Patent Application No. 62/578,837, filed on Oct. 30, 2017. All of the foregoing applications are incorporated herein by reference in its entirety.

BACKGROUND

Technical Field

The present disclosure relates generally to autonomous vehicle navigation. Additionally, this disclosure relates to systems and methods for navigating using reinforcement learning techniques.

Background Information

As technology continues to advance, the goal of a fully autonomous vehicle that is capable of navigating on roadways is on the horizon. Autonomous vehicles may need to consider a variety of factors and make appropriate decisions based on those factors to safely and accurately reach an intended destination. For example, an autonomous vehicle may need to process and interpret visual information (e.g., information captured from a camera), information from radar or lidar, and may also use information obtained from other sources (e.g., from a GPS device, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, travel from one road to another road at appropriate intersections or interchanges, and respond to any other situation that occurs or develops during the vehicle's operation.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems may provide a navigational response based on, for example, an analysis of images captured by one or more of the cameras. The navigational response may also take into account other data including, for example, global positioning system (GPS) data, sensor data (e.g., from an accelerometer, a speed sensor, a suspension sensor, etc.), and/or other map data.

In one embodiment, a navigation system for a host vehicle may comprise at least one processing device. The at least one processing device may be programmed to receive, from a camera, a plurality of images representative of an environment of the host vehicle. The at least one processing device may be further programed to analyze the plurality of images to identify a navigational state associated with the host vehicle; obtain, from at least one host vehicle component associated with an interior of the host vehicle, an indicator of an activity of an occupant of the host vehicle; determine a navigational action for execution by the host vehicle in response to the identified navigational state and the indicator of the activity of the occupant of the host vehicle; and cause at least one adjustment of a navigational actuator of the host vehicle in response to the determined navigational action for the host vehicle.

In one embodiment, an autonomous vehicle may comprise a frame; a body attached to the frame; a camera associated with an exterior of the host vehicle; at least one vehicle component associated with an interior of the vehicle; and at least one processing device. The at least one processing device may be programmed to receive, from the camera, a plurality of images representative of an environment of the vehicle. The at least one processing device may be further programed to analyze the plurality of images to identify a navigational state associated with the vehicle; obtain, from the at least one vehicle component, an indicator of an activity of an occupant of the vehicle; determine a navigational action for execution by the vehicle in response to the identified navigational state and the indicator of the activity of the occupant of the vehicle; and cause at least one adjustment of a navigational actuator of the vehicle in response to the determined navigational action for the vehicle.

In one embodiment, a method for navigating a host vehicle may comprise receiving, from a camera, a plurality of images representative of an environment of the host vehicle; analyzing the plurality of images to identify a navigational state associated with the host vehicle; obtaining, from at least one host vehicle component associated with an interior of the host vehicle, an indicator of an activity of an occupant of the host vehicle; determining a navigational action for execution by the host vehicle in response to the identified navigational state and the indicator of the activity of the occupant of the host vehicle; and causing at least one adjustment of a navigational actuator of the host vehicle in response to the determined navigational action for the host vehicle.

In one embodiment, a navigation system may comprise at least one processing device. The least one processing device may be programmed to receive, from a camera, a plurality of images representative of an environment of the host vehicle. The at least one processing device may be further programed to analyze the plurality of images to identify at least one pedestrian in the environment of the host vehicle; cause at least one adjustment of a navigational system of the host vehicle to signal to the pedestrian a navigational intent of the host vehicle; analyze the plurality of images to detect a potential reaction of the pedestrian to the at least one adjustment of the navigational system of the host vehicle; determine a navigational action for the host vehicle based on a detected potential reaction of the pedestrian; and cause at least one adjustment of a navigational actuator of the host vehicle in response to the determined navigational action for the host vehicle.

In one embodiment, an autonomous vehicle may comprise a frame; a body attached to the frame; a camera; and at least one processing device. The at least one processing device may be programmed to receive, from the camera, a plurality of images representative of an environment of the vehicle. The at least one processing device may be further programed to analyze the plurality of images to identify at least one pedestrian in the environment of the vehicle; cause at least one adjustment of a navigational system of the vehicle to signal to the pedestrian a navigational intent of the vehicle; analyze the plurality of images to detect a potential reaction of the pedestrian to the at least one adjustment of the navigational system of the vehicle; determine a navigational action for the vehicle based on a detected potential reaction of the pedestrian; and cause at least one adjustment of a navigational actuator of the vehicle in response to the determined navigational action for the host vehicle.

In one embodiment, a method for navigating a host vehicle may comprise receiving, from a camera, a plurality of images representative of an environment of the host vehicle; analyzing the plurality of images to identify at least one pedestrian in the environment of the host vehicle; causing at least one adjustment of a navigational system of the host vehicle to signal to the pedestrian a navigational intent of the host vehicle; analyzing the plurality of images to detect a potential reaction of the pedestrian to the at least one adjustment of the navigational system of the host vehicle; determining a navigational action for the host vehicle based on a detected potential reaction of the pedestrian; and causing at least one adjustment of a navigational actuator of the host vehicle in response to the determined navigational action for the host vehicle.

In one embodiment, a navigation system may comprise at least one processing device. The at least one processing device may be programmed to receive, from a camera, a plurality of images representative of an environment of the host vehicle. The at least one processing device may be further programed to analyze the plurality of images to identify at least one pedestrian in the environment of the host vehicle; identify eyes of the at least one pedestrian represented in at least one of the plurality of images; determine, based on analysis of the at least one of the plurality of images and based on the identification of the eyes of the at least one pedestrian in the at least one of the plurality of images, a looking direction of the at least one pedestrian; if the at least one pedestrian is determined to be looking in a direction of the host vehicle, determine a first navigational action for the host vehicle; if the at least one pedestrian is determined to be looking in a direction other than toward the host vehicle, determine a second navigational action for the host vehicle different from the first navigational action and more conservative than the first navigational action in at least one respect; and cause control of at least one navigational actuator of the host vehicle in accordance with the determined first or second navigational action for the host vehicle.

In one embodiment, an autonomous vehicle may comprise a frame; a body attached to the frame; a camera; and at least one processing device. The at least one processing device may be programmed to receive, from the camera, a plurality of images representative of an environment of the vehicle. The at least one processing device may be further programed to analyze the plurality of images to identify at least one pedestrian in the environment of the vehicle; identify eyes of the at least one pedestrian represented in at least one of the plurality of images; determine, based on analysis of the at least one of the plurality of images and based on the identification of the eyes of the at least one pedestrian in the at least one of the plurality of images, a looking direction of the at least one pedestrian; if the at least one pedestrian is determined to be looking in a direction of the vehicle, determine a first navigational action for the vehicle; if the at least one pedestrian is determined to be looking in a direction other than toward the vehicle, determine a second navigational action for the vehicle different from the first navigational action and more conservative than the first navigational action in at least one respect; and cause control of at least one navigational actuator of the vehicle in accordance with the determined first or second navigational action for the vehicle.

In one embodiment, a method for navigating a host vehicle may comprise from a camera, a plurality of images representative of an environment of the host vehicle; analyzing the plurality of images to identify at least one pedestrian in the environment of the host vehicle; identifying eyes of the at least one pedestrian represented in at least one of the plurality of images; determining, based on analysis of the at least one of the plurality of images and based on the identification of the eyes of the at least one pedestrian in the at least one of the plurality of images, a looking direction of the at least one pedestrian; if the at least one pedestrian is determined to be looking in a direction of the host vehicle, determining a first navigational action for the host vehicle; if the at least one pedestrian is determined to be looking in a direction other than toward the host vehicle, determining a second navigational action for the host vehicle different from the first navigational action and more conservative than the first navigational action in at least one respect; and causing control of at least one navigational actuator of the host vehicle in accordance with the determined first or second navigational action for the host vehicle.

In one embodiment, a navigation system for a host vehicle system may comprise at least one processing device. The at least one processing device may be programmed to receive, from a camera, a plurality of images representative of an environment of the host vehicle. The at least one processing device may be further programed to analyze at least one of the plurality of images to identify at least one pedestrian in the environment of the host vehicle; determine based on an analysis of at least one of the plurality of images, a facing direction of the pedestrian; if the pedestrian is determined to be facing in a direction that intersects with an anticipated travel direction of the host vehicle, determine a first navigational action for the host vehicle; if the pedestrian is determined to be facing in a direction that does not intersect with an anticipated travel direction of the host vehicle, determine a second navigational action for the host vehicle different from the first navigational action; and cause control of at least one navigational actuator of the host vehicle in accordance with the determined first or second navigational action for the host vehicle.

In one embodiment, an autonomous vehicle may comprise a frame, a body attached to the frame, a camera, and at least one processing device. The at least one processing device may be programmed to receive, from a camera, a plurality of images representative of an environment of the host vehicle. The at least one processing device may be further programed to analyze at least one of the plurality of images to identify at least one pedestrian in the environment of the host vehicle; determine based on an analysis of at least one of the plurality of images, a facing direction of the pedestrian; if the pedestrian is determined to be facing in a direction that intersects with an anticipated travel direction of the host vehicle, determine a first navigational action for the host vehicle; if the pedestrian is determined to be facing in a direction that does not intersect with an anticipated travel direction of the host vehicle, determine a second navigational action for the host vehicle different from the first navigational action; and cause control of at least one navigational actuator of the host vehicle in accordance with the determined first or second navigational action for the host vehicle.

In one embodiment, a method for navigating a host vehicle may comprise receiving, from a camera, a plurality of images representative of an environment of the host vehicle; analyzing at least one of the plurality of images to identify at least one pedestrian in the environment of the host vehicle; determining based on an analysis of at least one of the plurality of images, a facing direction of the pedestrian; if the pedestrian is determined to be facing in a direction that intersects with an anticipated travel direction of the host vehicle, determining a first navigational action for the host vehicle; if the pedestrian is determined to be facing in a direction that does not intersect with an anticipated travel direction of the host vehicle, determining a second navigational action for the host vehicle different from the first navigational action; and causing control of at least one navigational actuator of the host vehicle in accordance with the determined first or second navigational action for the host vehicle.

In one embodiment, a navigation system for a host vehicle system may comprise at least one processing device. The at least one processing device may be programmed to receive, from a camera, a plurality of images representative of an environment of the host vehicle. The at least one processing device may be further programed to analyze at least one of the plurality of images to identify at least one pedestrian in the environment of the host vehicle; determine based on an analysis of at least one of the plurality of images, a moving direction of the pedestrian; if the pedestrian is determined to be moving in a direction that intersects with an anticipated travel direction of the host vehicle, determine a first navigational action for the host vehicle; if the pedestrian is determined to be moving in a direction that does not intersect with an anticipated travel direction of the host vehicle, determine a second navigational action for the host vehicle different from the first navigational action; and cause control of at least one navigational actuator of the host vehicle in accordance with the determined first or second navigational action for the host vehicle.

In one embodiment, an autonomous vehicle may comprise a frame, a body attached to the frame, a camera, and at least one processing device. The at least one processing device may be programmed to receive, from a camera, a plurality of images representative of an environment of the host vehicle. The at least one processing device may be further programed to analyze at least one of the plurality of images to identify at least one pedestrian in the environment of the host vehicle; determine based on an analysis of at least one of the plurality of images, a moving direction of the pedestrian; if the pedestrian is determined to be moving in a direction that intersects with an anticipated travel direction of the host vehicle, determine a first navigational action for the host vehicle; if the pedestrian is determined to be moving in a direction that does not intersect with an anticipated travel direction of the host vehicle, determine a second navigational action for the host vehicle different from the first navigational action; and cause control of at least one navigational actuator of the host vehicle in accordance with the determined first or second navigational action for the host vehicle.

In one embodiment, a method for navigating a host vehicle may comprise receiving, from a camera, a plurality of images representative of an environment of the host vehicle; analyzing at least one of the plurality of images to identify at least one pedestrian in the environment of the host vehicle; determining based on an analysis of at least one of the plurality of images, a moving direction of the pedestrian; if the pedestrian is determined to be moving in a direction that intersects with an anticipated travel direction of the host vehicle, determining a first navigational action for the host vehicle; if the pedestrian is determined to be moving in a direction that does not intersect with an anticipated travel direction of the host vehicle, determining a second navigational action for the host vehicle different from the first navigational action; and causing control of at least one navigational actuator of the host vehicle in accordance with the determined first or second navigational action for the host vehicle.

In one embodiment, a navigation system for a host vehicle, the navigation system may comprise at least one processing device. The at least one processing device may be programmed to receive, from a camera, a plurality of images representative of an environment of the host vehicle. The at least one processing device may be further programed to analyze at least one of the plurality of images to identify a crosswalk in the environment of the host vehicle; analyze the at least one of the plurality of images to determine whether a pedestrian is in a vicinity of the identified crosswalk; determine a navigational action based on identification of the crosswalk in the environment of the host vehicle and based on the determination that the pedestrian is in the vicinity of the identified crosswalk, wherein the navigational action includes at least one change relative to a current navigational state of the host vehicle; and cause at least one adjustment of a navigational actuator of the host vehicle in response to the determined navigational action for the host vehicle.

In one embodiment, a method for navigating a host vehicle may comprise receiving, from a camera, a plurality of images representative of an environment of the host vehicle. The method may further comprise analyzing at least one of the plurality of images to identify a crosswalk in the environment of the host vehicle; analyzing the at least one of the plurality of images to determine whether a pedestrian is in a vicinity of the identified crosswalk; determining a navigational action based on identification of the crosswalk in the environment of the host vehicle and based on the determination that the pedestrian is in the vicinity of the identified crosswalk, wherein the navigational action includes at least one change relative to a current navigational state of the host vehicle; and causing least one adjustment of a navigational actuator of the host vehicle in response to the determined navigational action for the host vehicle.

In one embodiment, a vehicle may comprise a frame, a body attached to the frame, a camera, and at least one processing device. The at least one processing device may be programmed to receive, from the camera, a plurality of images representative of an environment of the vehicle. The at least one processing device may be further programmed to: analyze at least one of the plurality of images to identify a crosswalk in the environment of the vehicle; analyze the at least one of the plurality of images to determine whether a pedestrian is in a vicinity of the identified crosswalk; determine a navigational action based on identification of the crosswalk in the environment of the vehicle and based on the determination that the pedestrian is in the vicinity of the identified crosswalk, wherein the navigational action includes at least one change relative to a current navigational state of the vehicle; and cause at least one adjustment of a navigational actuator of the vehicle in response to the determined navigational action for the vehicle.

In one embodiment, a navigation system for a host vehicle may comprise at least one processing device. The at least one processing device may be programmed to receive, from a camera, a plurality of images representative of an environment of the host vehicle. The at least one processing device may be further programmed to analyze at least one of the plurality of images to identify a sensed number of pedestrians in the environment of the host vehicle; determine a first navigational action for the host vehicle that is less conservative in at least one respect than a second navigational action for the host vehicle, wherein the second navigational action is based on a number of pedestrians in the environment of the host vehicle that is greater than the sensed number of pedestrians; and cause the host vehicle to proceed in accordance with the determined first navigational action for the host vehicle.

In one embodiment, a method for navigating a host vehicle may comprise receiving, from a camera, a plurality of images representative of an environment of the host vehicle. The method may further comprise analyzing at least one of the plurality of images to identify a sensed number of pedestrians in the environment of the host vehicle; determining a first navigational action for the host vehicle that is less conservative in at least one respect than a second navigational action for the host vehicle, wherein the second navigational action is based on a number of pedestrians in the environment of the host vehicle that is greater than the sensed number of pedestrians; and causing the host vehicle to proceed in accordance with the determined first navigational action for the host vehicle.

In one embodiment, a vehicle may comprise a frame, a body attached to the frame, a camera, and at least one processing device. The at least one processing device may be programmed to receive, from the camera, a plurality of images representative of an environment of the host vehicle. The at least one processing device may be further programmed to: analyze at least one of the plurality of images to identify a sensed number of pedestrians in the environment of the host vehicle; determine a first navigational action for the host vehicle that is less conservative in at least one respect than a second navigational action for the host vehicle, wherein the second navigational action is based on a number of pedestrians in the environment of the host vehicle that is greater than the sensed number of pedestrians; and cause the host vehicle to proceed in accordance with the determined first navigational action for the host vehicle.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 20C provides a diagram of a swerve parameter adjustment based on an activity of an occupant of a host vehicle.

FIG. 20D provides a diagram of an example application of the swerving parameter adjustment of FIG. 20C.

DETAILED DESCRIPTION

Figure 1:
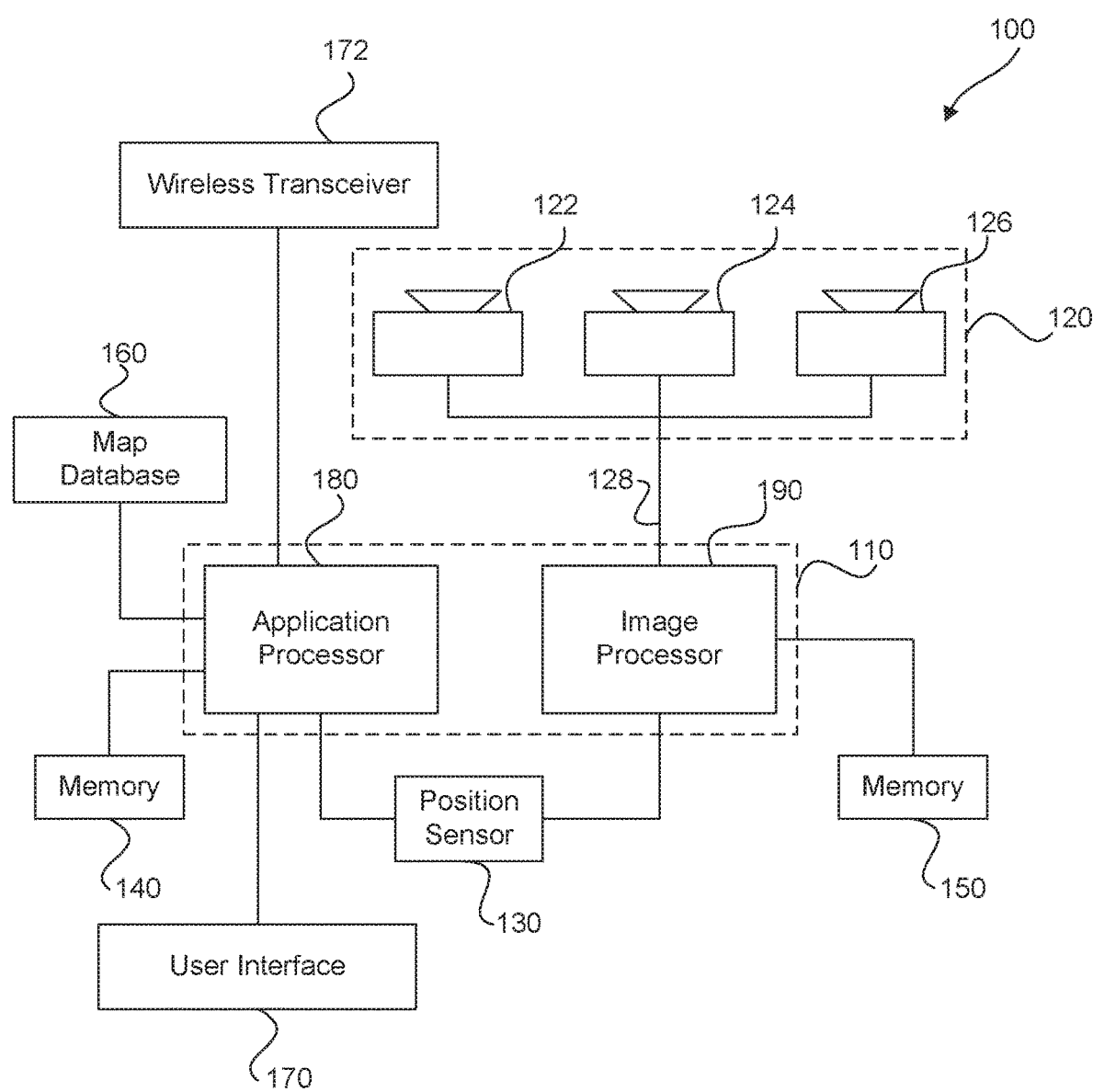
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration/deceleration of the vehicle. To be autonomous, a vehicle need not be fully automatic (e.g., fully operational without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects to the driver (e.g., braking or braking under certain circumstances). In some cases, autonomous vehicles may handle some or all aspects of braking, speed control, and/or steering of the vehicle.

As human drivers typically rely on visual cues and observations in order to control a vehicle, transportation infrastructures are built accordingly, with lane markings, traffic signs, and traffic lights designed to provide visual information to drivers. In view of these design characteristics of transportation infrastructures, an autonomous vehicle may include a camera and a processing unit that analyzes visual information captured from the environment of the vehicle. The visual information may include, for example, images representing components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while it is traveling, and the vehicle (as well as other vehicles) may use the information to localize itself on the model. Some vehicles can also be capable of communication among them, sharing information, altering the peer vehicle of hazards or changes in the vehicles' surroundings, etc.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras, CCDs, or any other type of image sensor), such as image capture device 122, image capture device 124, and image capture device 126. System 100 may also include a data interface 128 communicatively connecting processing unit 110 to image acquisition unit 120. For example, data interface 128 may include any wired and/or wireless link or links for transmitting image data acquired by image acquisition unit 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.). Such transmissions can include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 180 and image processor 190 may include various types of hardware-based processing devices. For example, either or both of applications processor 180 and image processor 190 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 MHz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third-generation processor and is six times more powerful that the EyeQ2®, may be used in the disclosed embodiments. In other examples, the EyeQ4® and/or the the EyeQ5® may be used in the disclosed embodiments. Of course, any newer or future EyeQ processing devices may also be used together with the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware-based components of a host vehicle.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software, as well as a trained system, such as a neural network, or a deep neural network, for example. The memory units may include random access memory, read only memory, flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a speedometer) for measuring a speed of vehicle 200. System 100 may also include one or more accelerometers (either single axis or multi-axis) for measuring accelerations of vehicle 200 along one or more axes.

The memory units 140, 150 may include a database, or data organized in any other form, that indication a location of known landmarks. Sensory information (such as images, radar signal, depth information from lidar or stereo processing of two or more images) of the environment may be processed together with position information, such as a GPS coordinate, vehicle's ego motion, etc. to determine a current location of the vehicle relative to the known landmarks and refine the vehicle location. Certain aspects of this technology are included in a localization technology known as REM™ which is being marketed by the assignee of the present application.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.). In some cases, map database 160 may store a sparse data model including polynomial representations of certain road features (e.g., lane markings) or target trajectories for the host vehicle. Map database 160 may also include stored representations of various recognized landmarks that may be used to determine or update a known position of the host vehicle with respect to a target trajectory. The landmark representations may include data fields such as landmark type, landmark location, among other potential identifiers.

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

One or more cameras (e.g., image capture devices 122, 124, and 126) may be part of a sensing block included on a vehicle. Various other sensors may be included in the sensing block, and any or all of the sensors may be relied upon to develop a sensed navigational state of the vehicle. In addition to cameras (forward, sideward, rearward, etc.), other sensors such as RADAR, LIDAR, and acoustic sensors may be included in the sensing block. Additionally, the sensing block may include one or more components configured to communicate and transmit/receive information relating to the environment of the vehicle. For example, such components may include wireless transceivers (RF, etc.) that may receive from a source remotely located with respect to the host vehicle sensor-based information or any other type of information relating to the environment of the host vehicle. Such information may include sensor output information, or related information, received from vehicle systems other than the host vehicle. In some embodiments, such information may include information received from a remote computing device, a centralized server, etc. Furthermore, the cameras may take on many different configurations: single camera units, multiple cameras, camera clusters, long FOV, short FOV, wide angle, fisheye, etc.

Figure 2A:
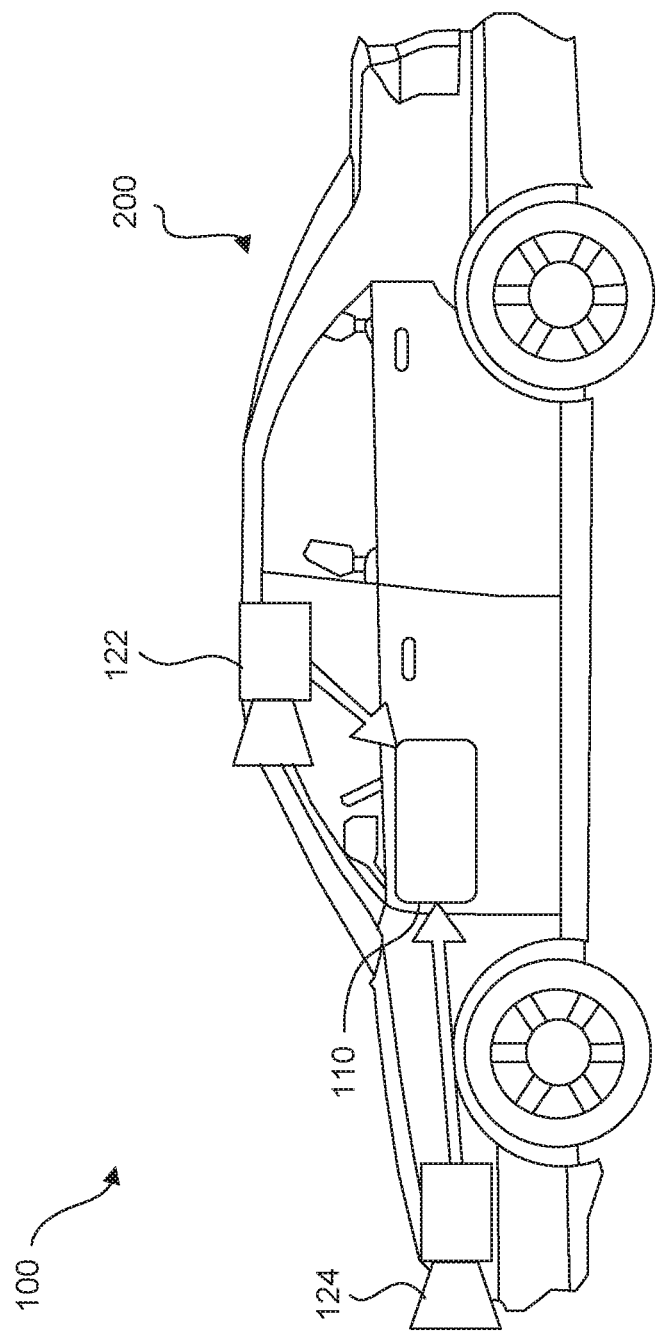
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light fixtures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead transmit data, such as captured images and/or limited location information related to a route.

Other privacy levels are contemplated as well. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

Figure 2B:
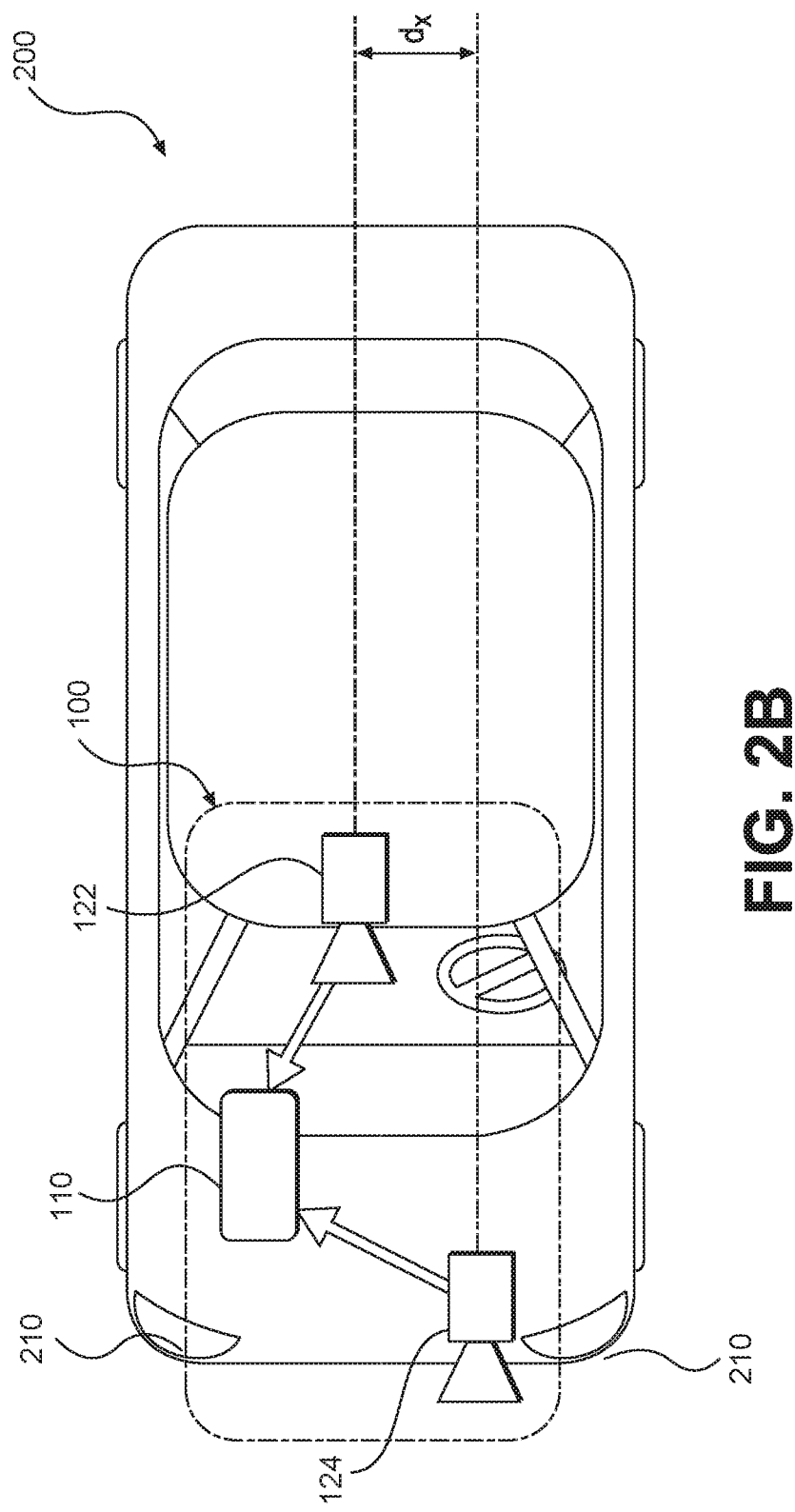
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
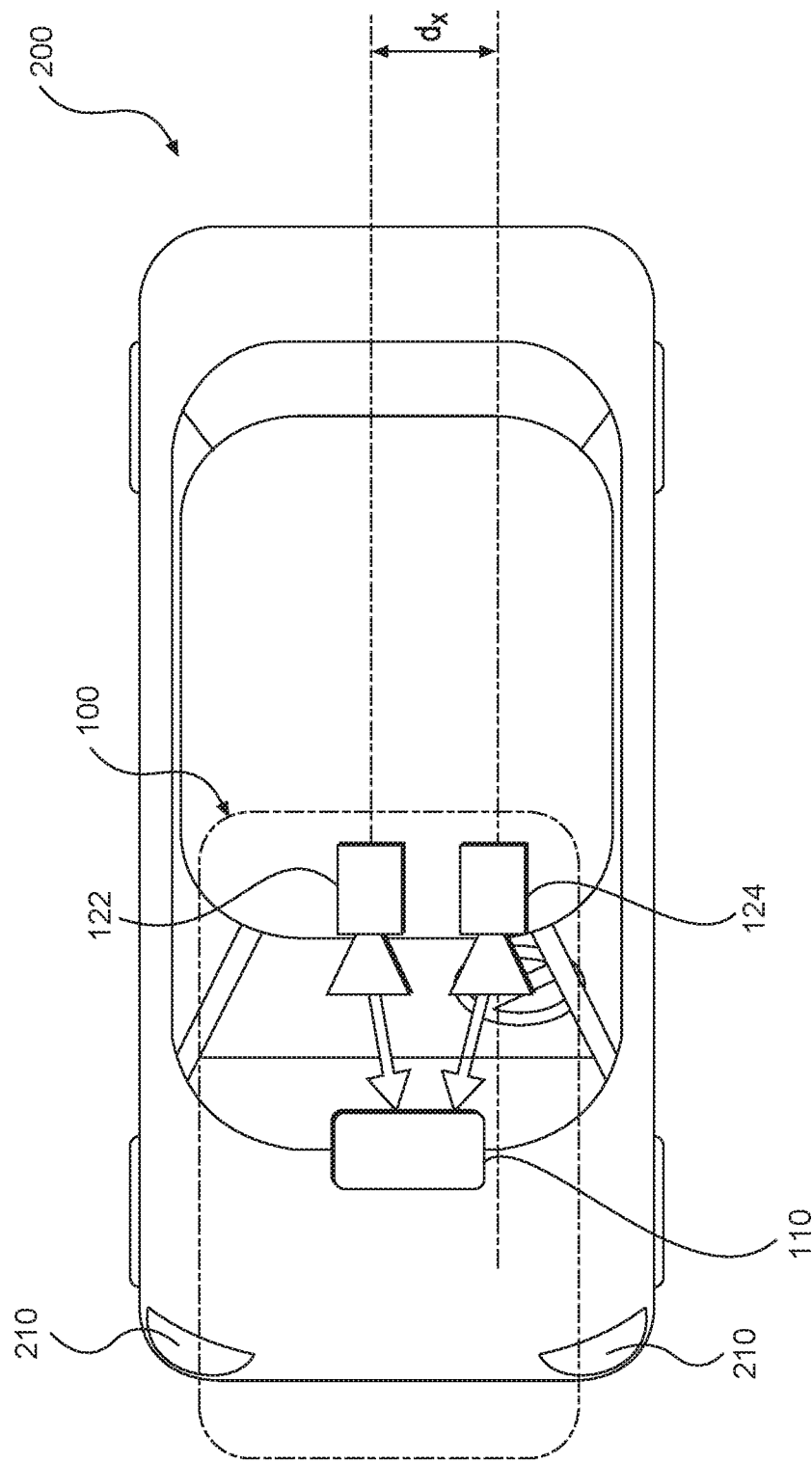
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
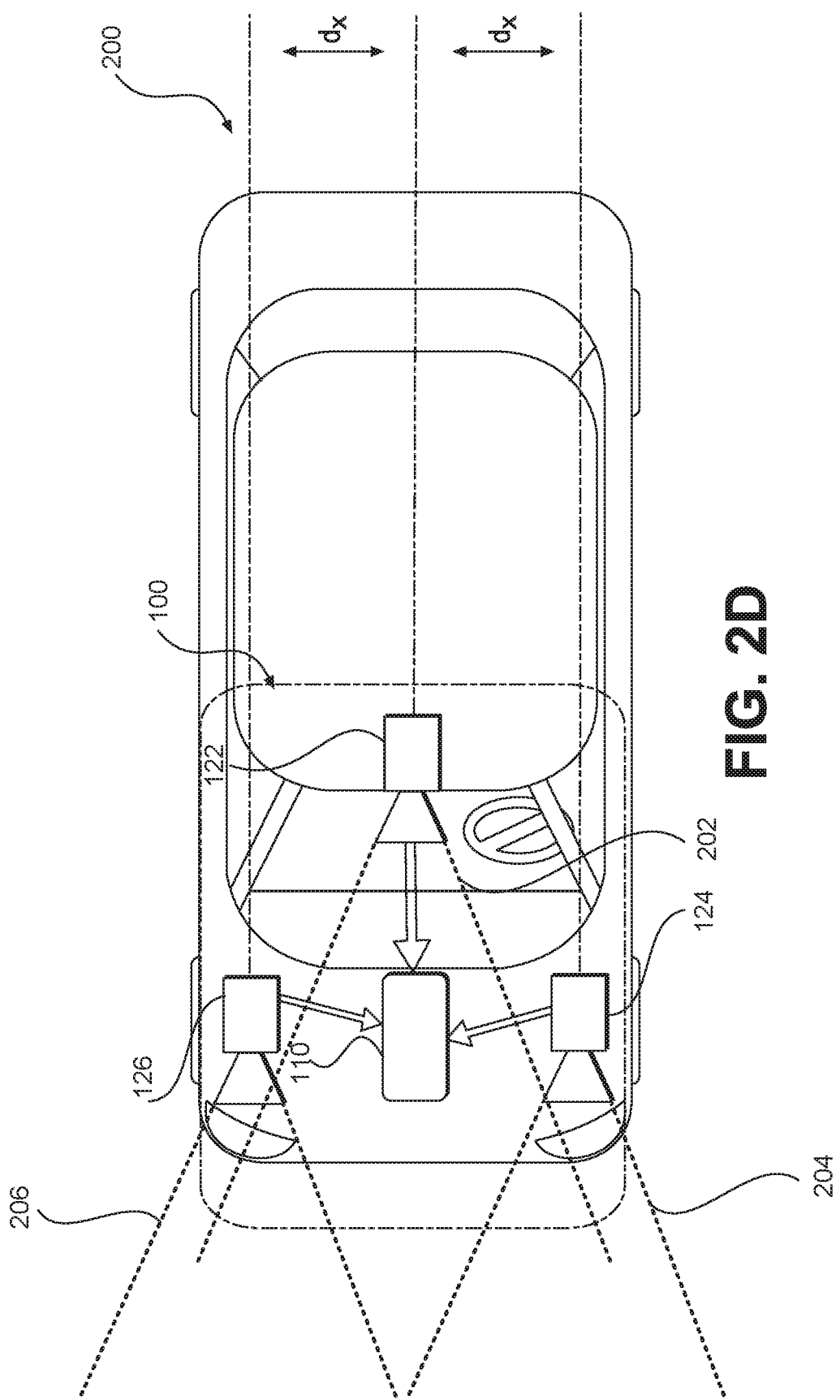
FIG. 2D is a diagrammatic top view representation of yet another embodiment of a vehicle including a system consistent with the disclosed embodiments.
Figure 2E:
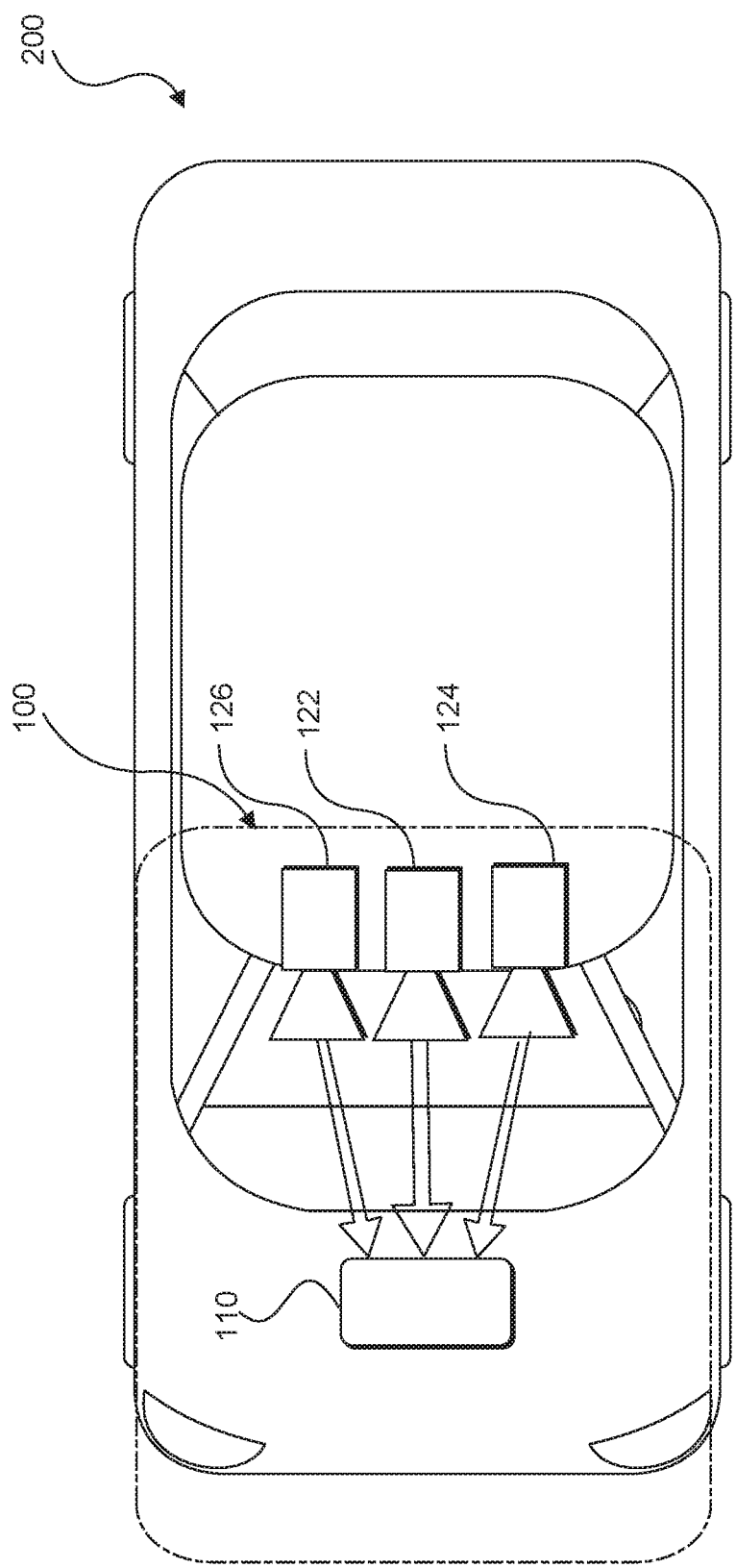
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2 M pixel image capture device with an aspect ratio of about 2:1 (e.g., H×V=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126) disclosed herein may constitute a high-resolution imager and may have a resolution greater than 5 M pixel, 7 M pixel, 10 M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280×960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
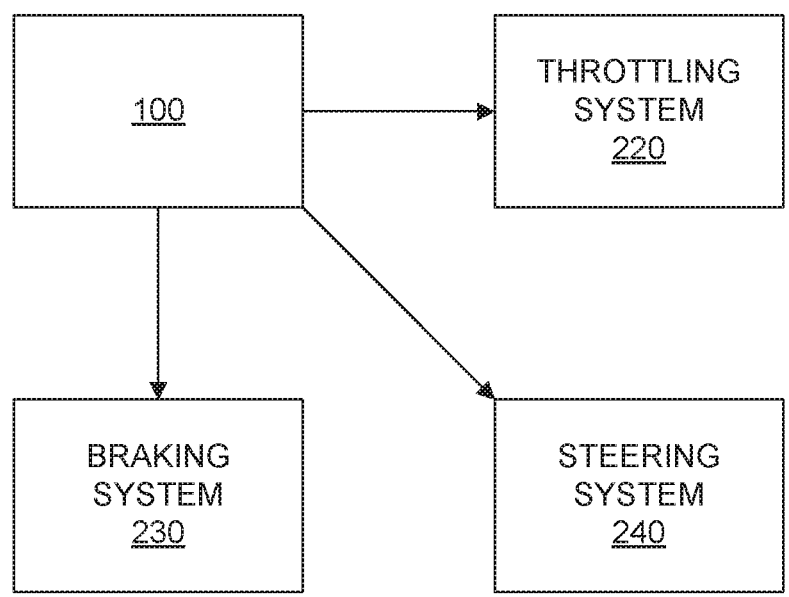
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
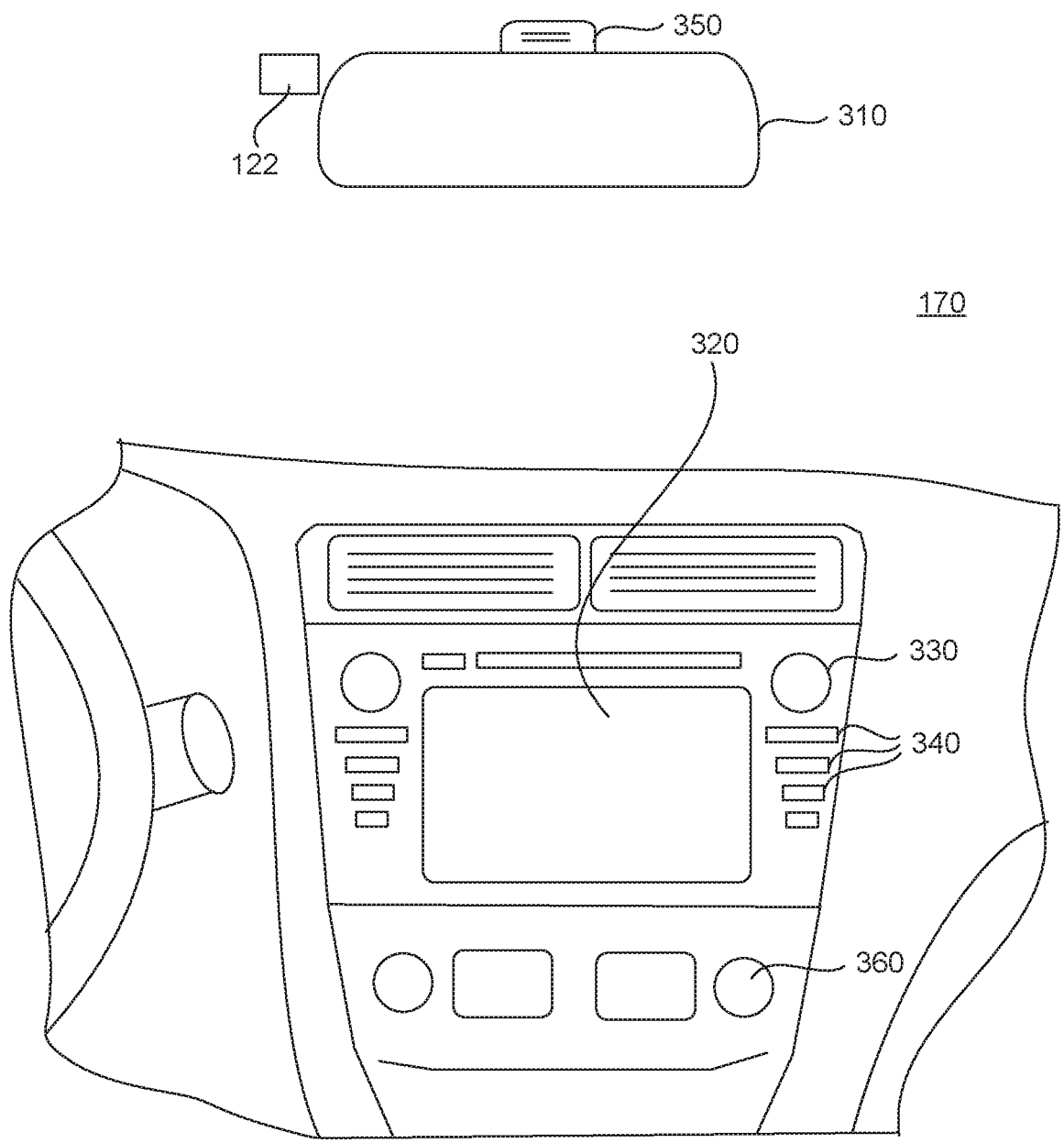
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
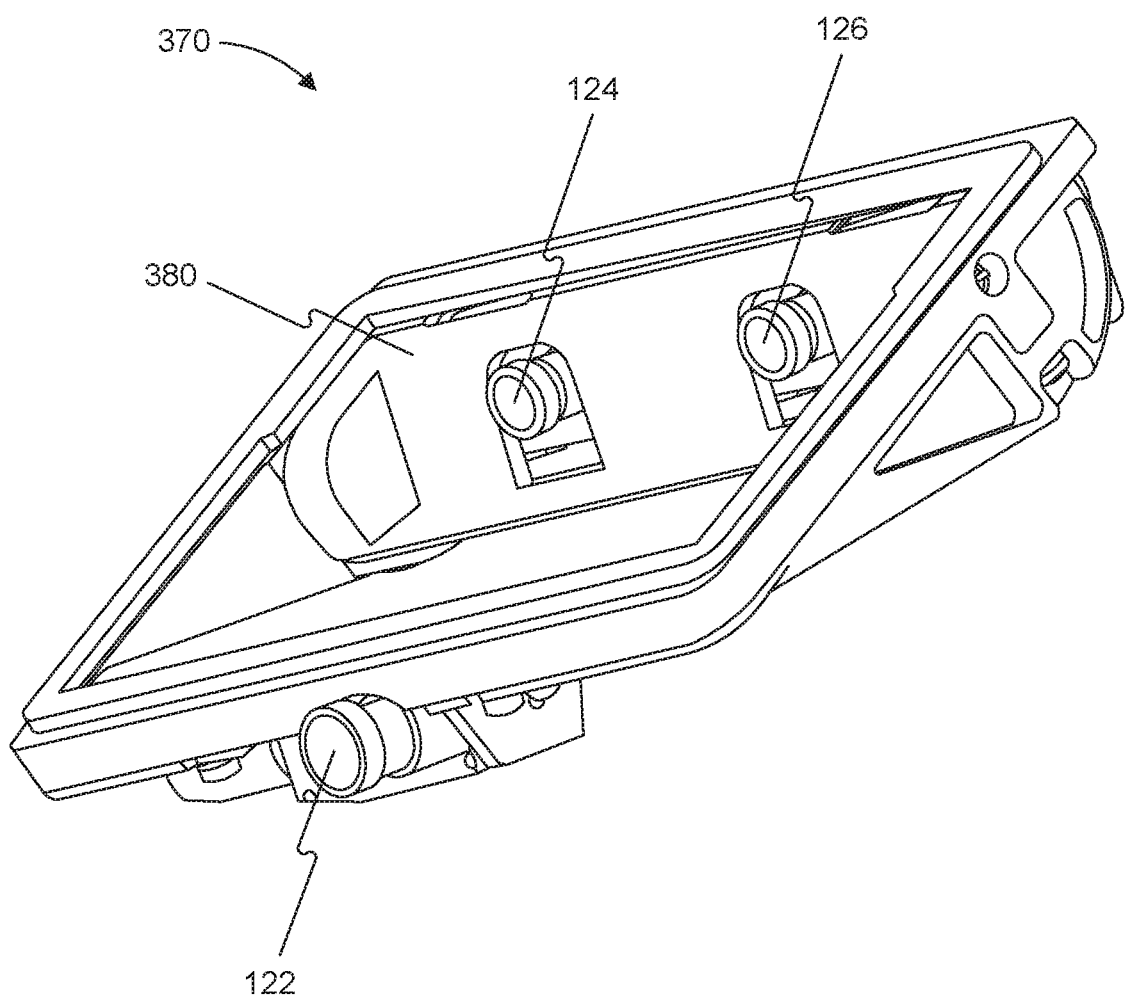
FIG. 3B is an illustration of an example of a camera mount that is configured to be positioned behind a rearview mirror and against a vehicle windshield consistent with the disclosed embodiments.
Figure 3C:
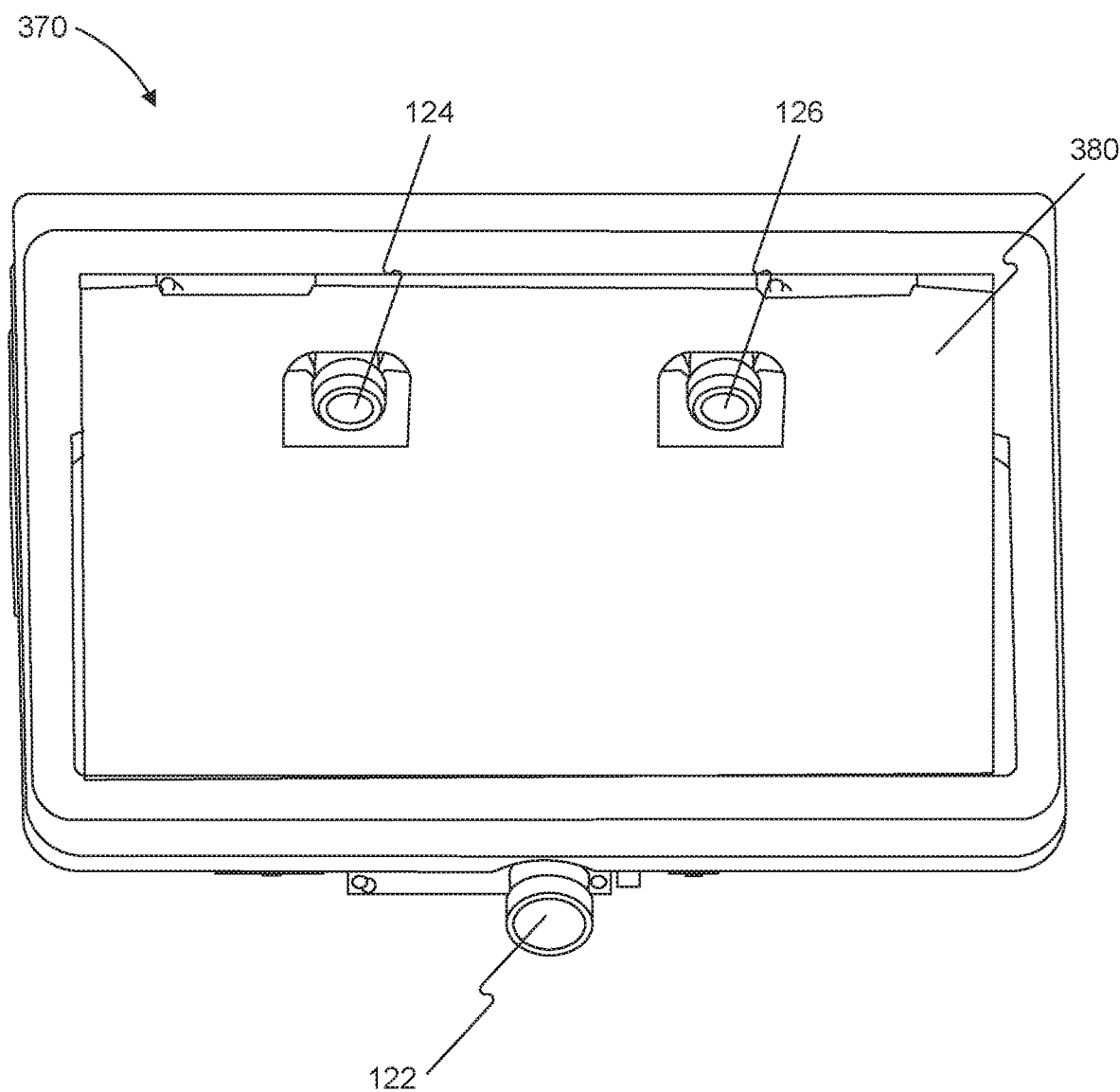
FIG. 3C is an illustration of the camera mount shown in FIG. 3B from a different perspective consistent with the disclosed embodiments.
Figure 3D:
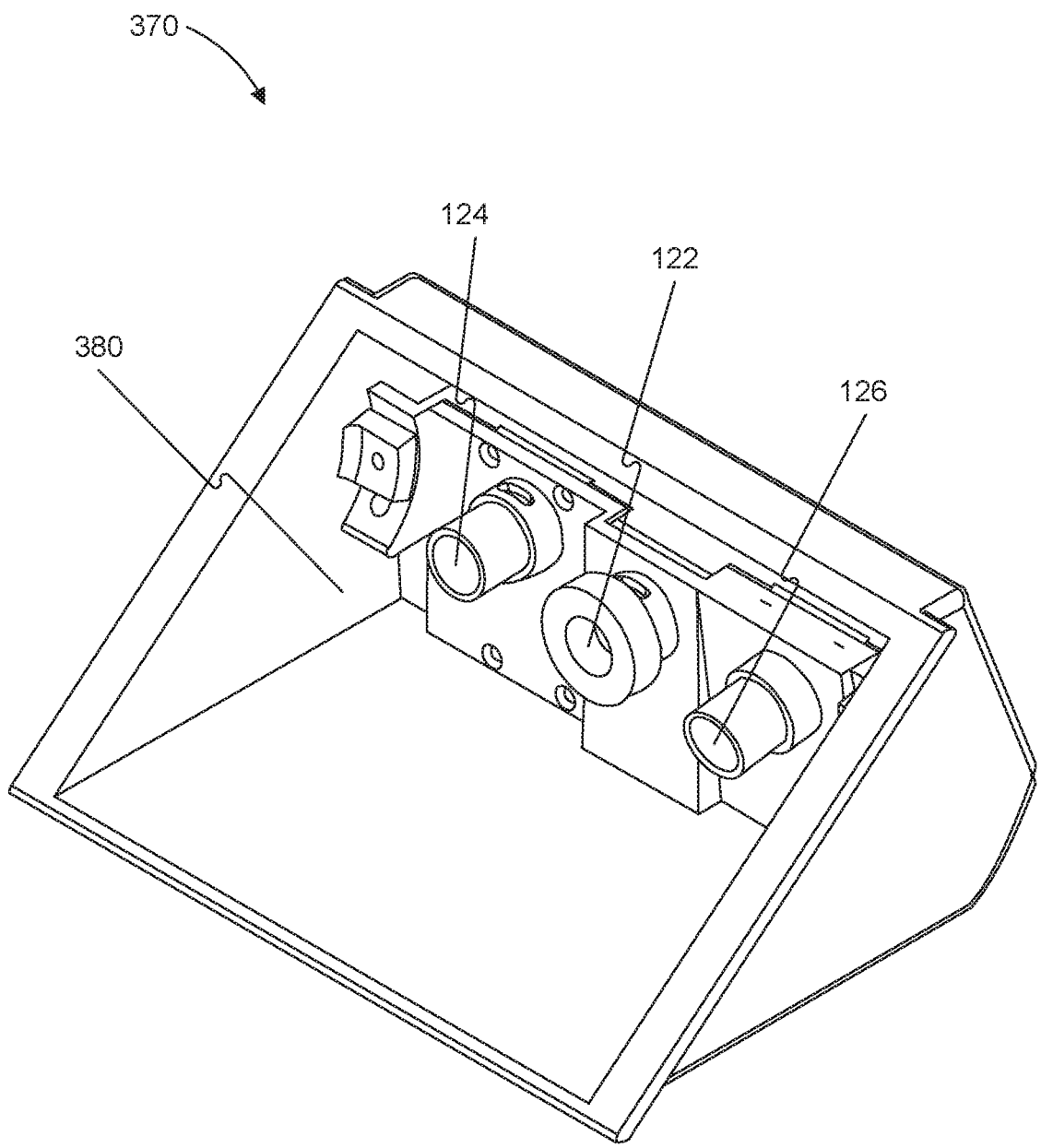
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). Other camera configurations are consistent with the disclosed embodiments, and the configurations disclosed herein are examples. For example, system 100 may include a configuration of any number of cameras (e.g., one, two, three, four, five, six, seven, eight, etc.) Furthermore, system 100 may include "clusters" of cameras. For example, a cluster of cameras (including any appropriate number of cameras, e.g., one, four, eight, etc.) may be forward-facing relative to a vehicle, or may be facing any other direction (e.g., reward-facing, side-facing, at an angle, etc.) Accordingly, system 100 may include multiple clusters of cameras, with each cluster oriented in a particular direction to capture images from a particular region of a vehicle's environment.

The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, as discussed above, one or more of image capture devices 122-126 may be mounted behind glare shield 380 that is flush with the windshield of vehicle 200. Such shielding may act to minimize the impact of any reflections from inside the car on image capture devices 122-126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122-126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from the main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion-based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system). Furthermore, in some embodiments, redundancy and validation of received data may be supplemented based on information received from one or more sensors (e.g., radar, lidar, acoustic sensors, information received from one or more transceivers outside of a vehicle, etc.).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
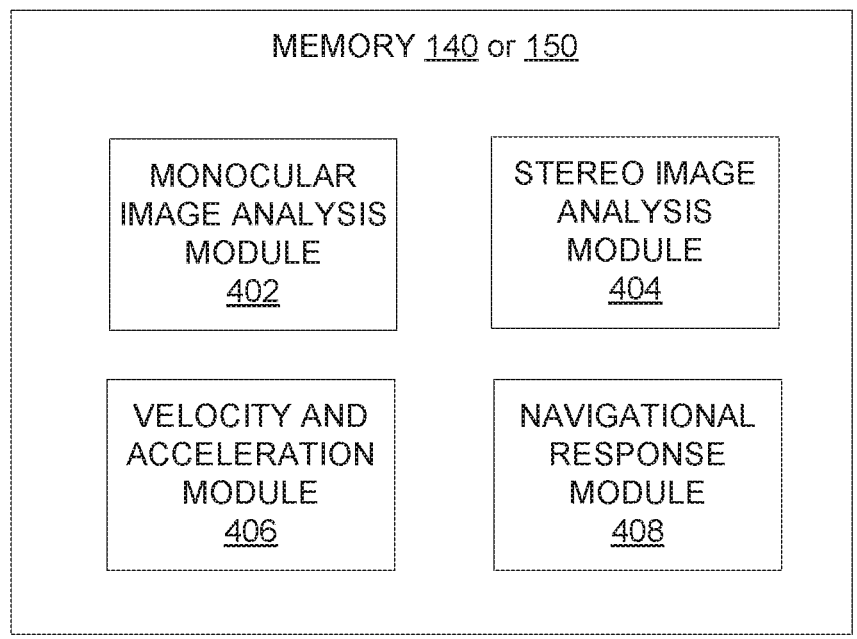
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, applications processor 180 and/or image processor 190 may execute the instructions stored in any of modules 402-408 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar, lidar, etc.) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with determining a navigational response.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408. Furthermore, in some embodiments, stereo image analysis module 404 may implement techniques associated with a trained system (such as a neural network or a deep neural network) or an untrained system.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Furthermore, any of the modules (e.g., modules 402, 404, and 406) disclosed herein may implement techniques associated with a trained system (such as a neural network or a deep neural network) or an untrained system.

Figure 5A:
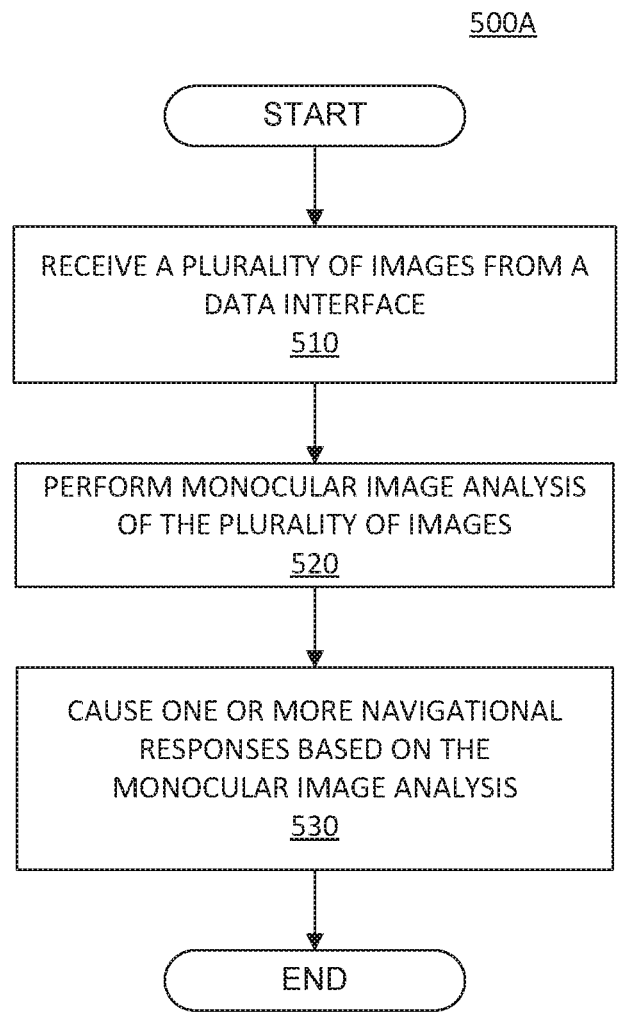
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
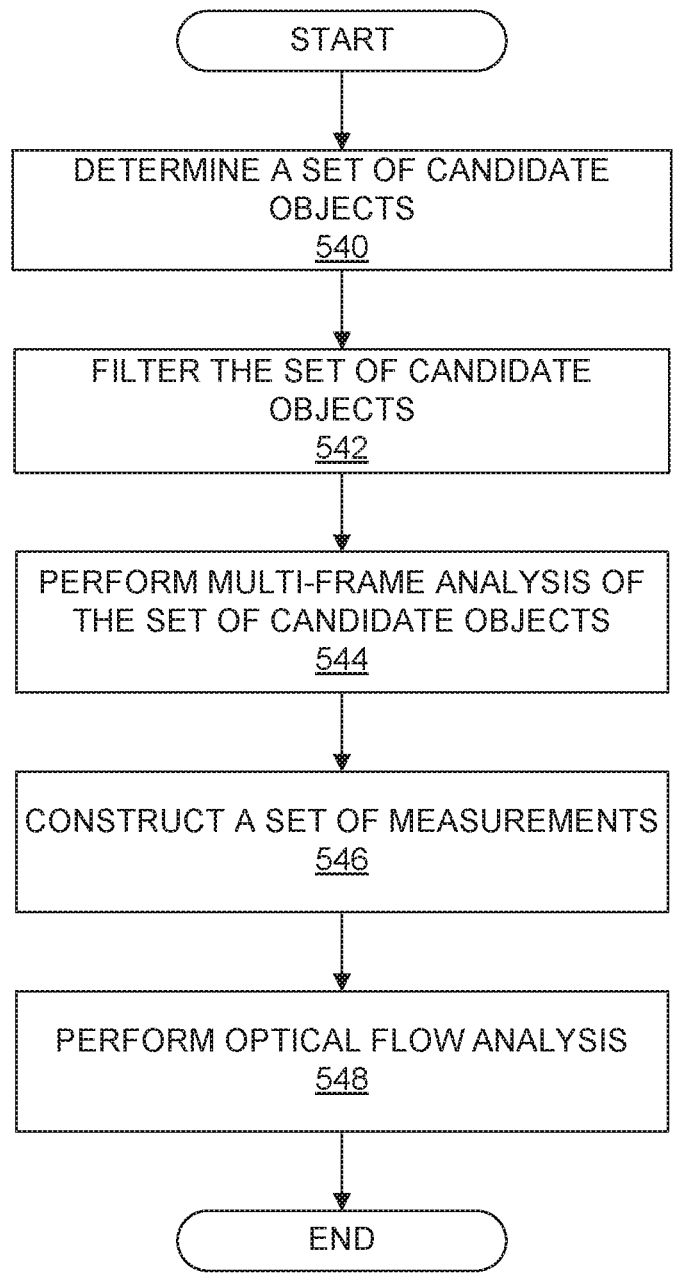
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
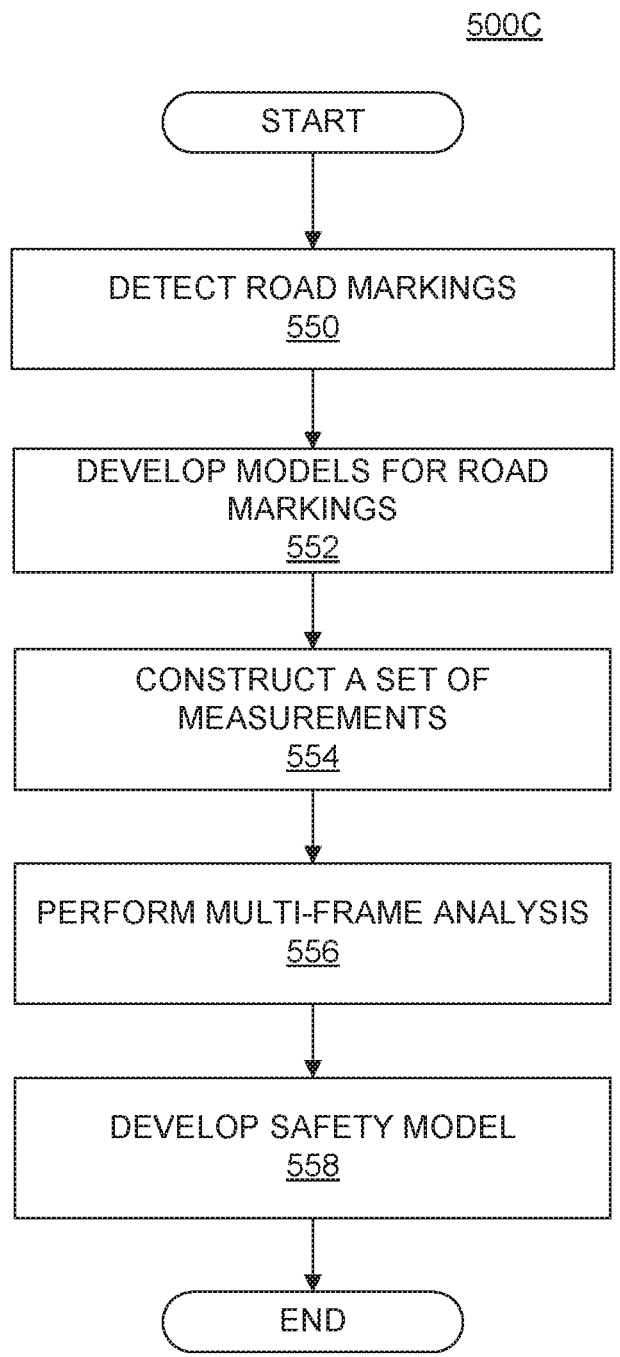
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550-556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
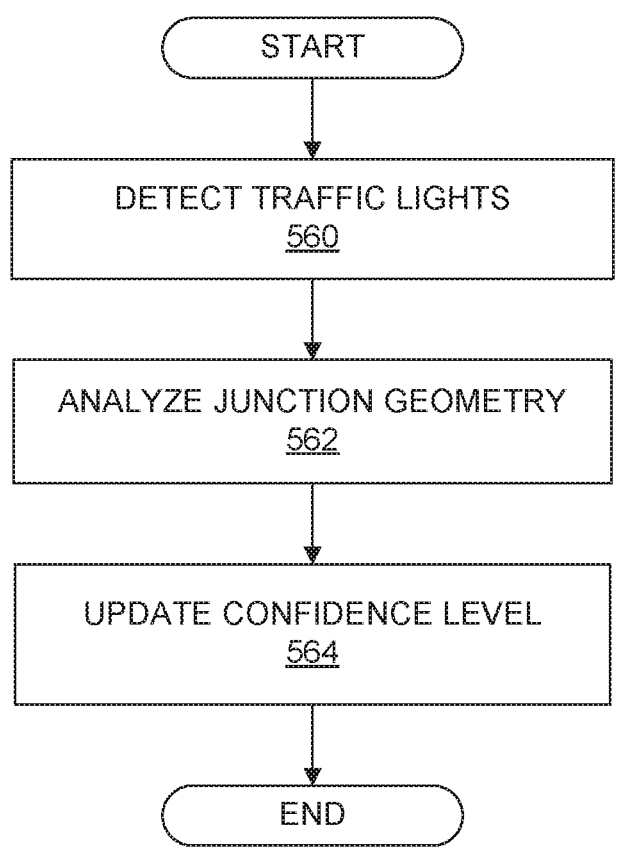
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560-564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
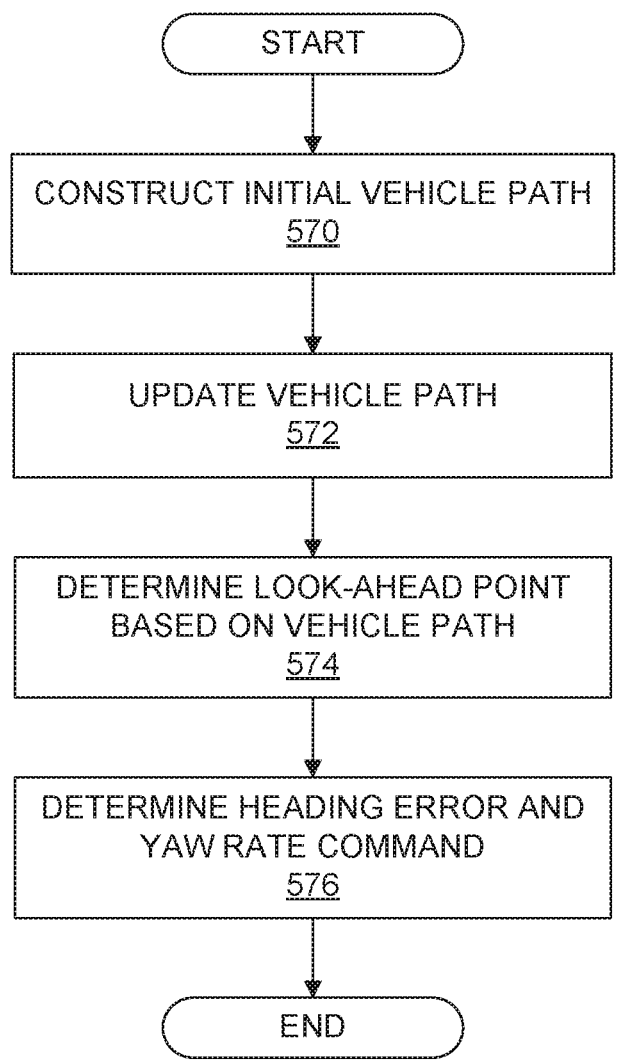
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
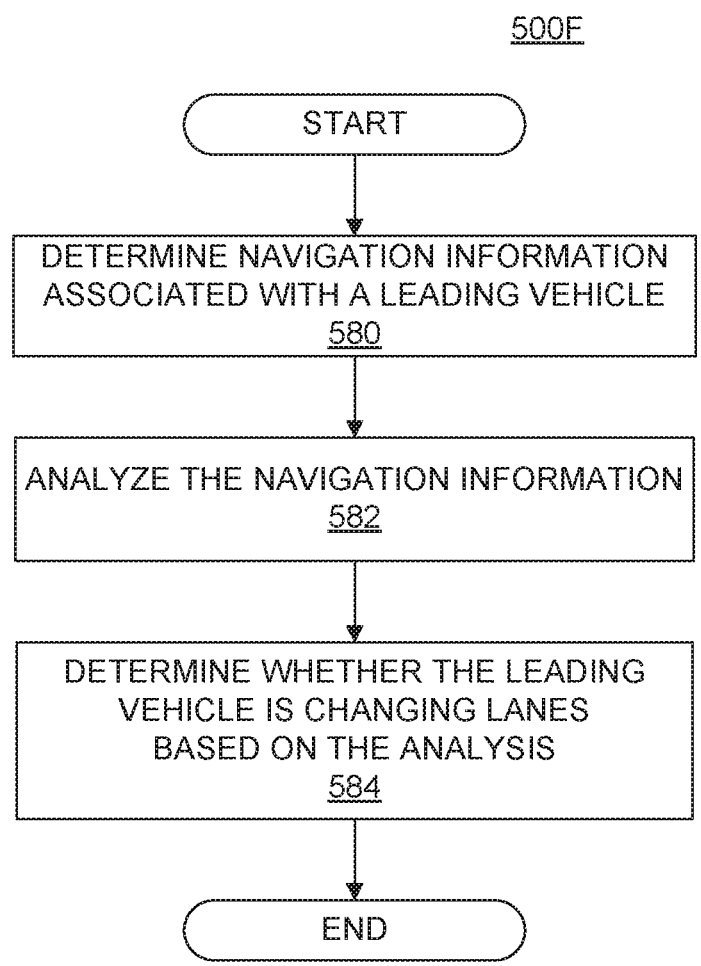
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2+\delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights. Furthermore, in some embodiments, the analysis may make use of trained system (e.g., a machine learning or deep learning system), which may, for example, estimate a future path ahead of a current location of a vehicle based on an image captured at the current location.

Figure 6:
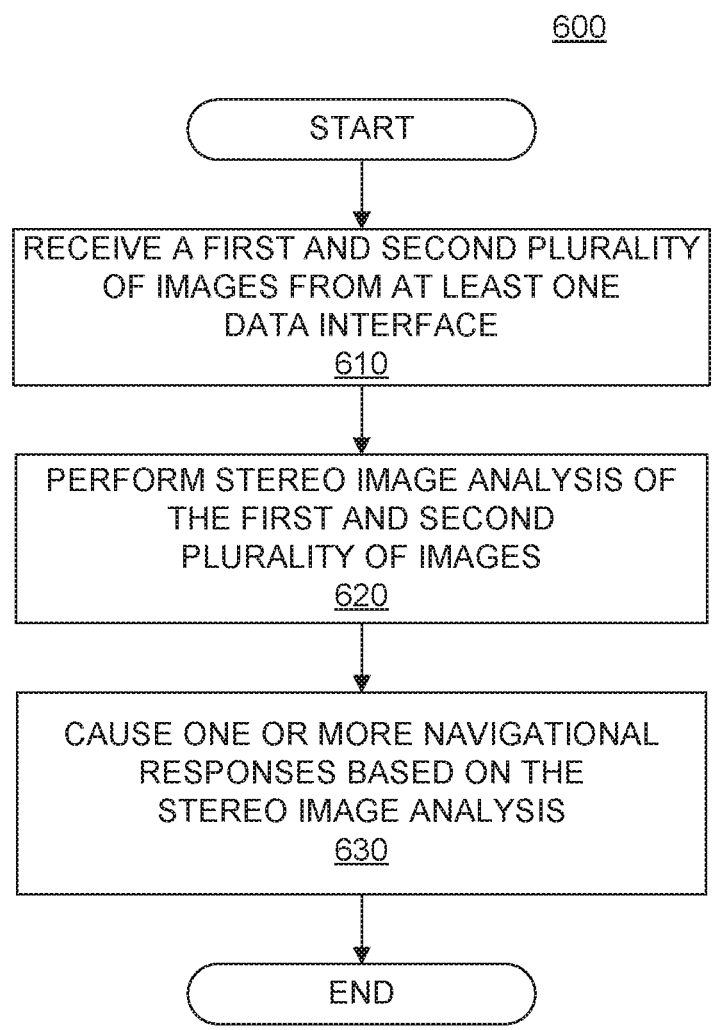
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing in the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
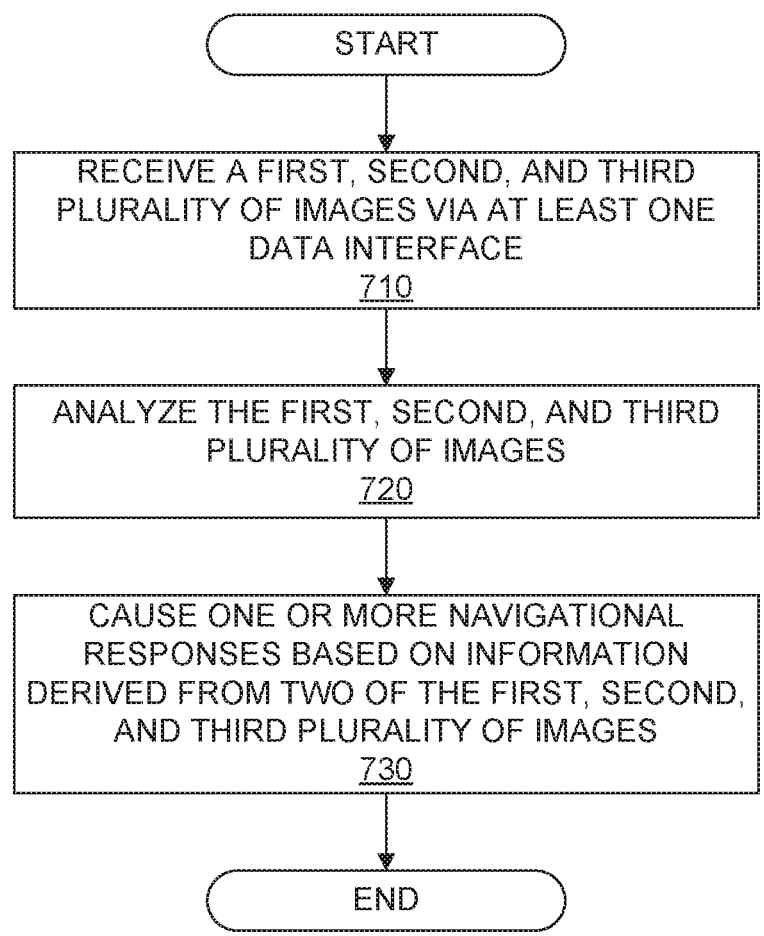
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126— including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Reinforcement Learning and Trained Navigational Systems

Figure 8:
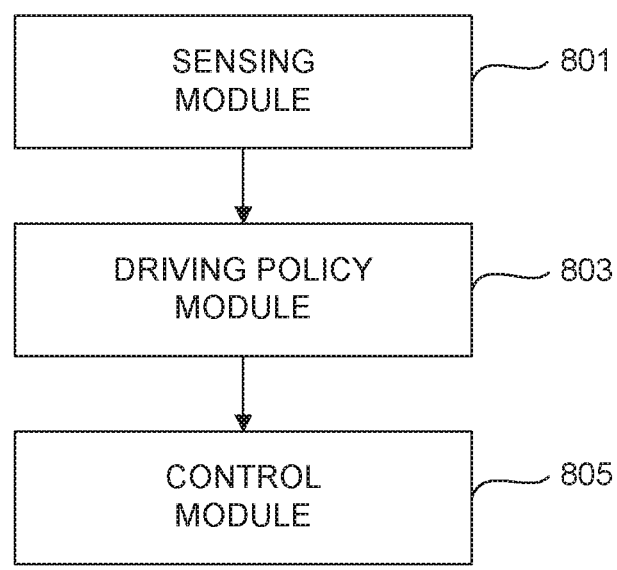
FIG. 8 is a block diagram representation of modules that may be implemented by one or more specifically programmed processing devices of a navigation system for an autonomous vehicle consistent with the disclosed embodiments.

The sections that follow discuss autonomous driving along with systems and methods for accomplishing autonomous control of a vehicle, whether that control is fully autonomous (a self-driving vehicle) or partially autonomous (e.g., one or more driver assist systems or functions). As shown in FIG. 8, the autonomous driving task can be partitioned into three main modules, including a sensing module 801, a driving policy module 803, and a control module 805. In some embodiments, modules 801, 803, and 805 may be stored in memory unit 140 and/or memory unit 150 of system 100, or modules 801, 803, and 805 (or portions thereof) may be stored remotely from system 100 (e.g., stored in a server accessible to system 100 via, for example, wireless transceiver 172). Furthermore, any of the modules (e.g., modules 801, 803, and 805) disclosed herein may implement techniques associated with a trained system (such as a neural network or a deep neural network) or an untrained system.

Sensing module 801, which may be implemented using processing unit 110, may handle various tasks relating to sensing of a navigational state in an environment of a host vehicle. Such tasks may rely upon input from various sensors and sensing systems associated with the host vehicle. These inputs may include images or image streams from one or more onboard cameras, GPS position information, accelerometer outputs, user feedback, or user inputs to one or more user interface devices, radar, lidar, etc. Sensing, which may include data from cameras and/or any other available sensors, along with map information, may be collected, analyzed, and formulated into a "sensed state," describing information extracted from a scene in the environment of the host vehicle. The sensed state may include sensed information relating to target vehicles, lane markings, pedestrians, traffic lights, road geometry, lane shape, obstacles, distances to other objects/vehicles, relative velocities, relative accelerations, among any other potential sensed information. Supervised machine learning may be implemented in order to produce a sensing state output based on sensed data provided to sensing module 801. The output of the sensing module may represent a sensed navigational "state" of the host vehicle, which may be passed to driving policy module 803.

While a sensed state may be developed based on image data received from one or more cameras or image sensors associated with a host vehicle, a sensed state for use in navigation may be developed using any suitable sensor or combination of sensors. In some embodiments, the sensed state may be developed without reliance upon captured image data. In fact, any of the navigational principles described herein may be applicable to sensed states developed based on captured image data as well as sensed states developed using other non-image based sensors. The sensed state may also be determined via sources external to the host vehicle. For example, a sensed state may be developed in full or in part based on information received from sources remote from the host vehicle (e.g., based on sensor information, processed state information, etc. shared from other vehicles, shared from a central server, or from any other source of information relevant to a navigational state of the host vehicle.)

Driving policy module 803, which is discussed in more detail below and which may be implemented using processing unit 110, may implement a desired driving policy in order to decide on one or more navigational actions for the host vehicle to take in response to the sensed navigational state. If there are no other agents (e.g., target vehicles or pedestrians) present in the environment of the host vehicle, the sensed state input to driving policy module 803 may be handled in a relatively straightforward manner. The task becomes more complex when the sensed state requires negotiation with one or more other agents. The technology used to generate the output of driving policy module 803 may include reinforcement learning (discussed in more detail below). The output of driving policy module 803 may include at least one navigational action for the host vehicle and may include a desired acceleration (which may translate to an updated speed for the host vehicle), a desired yaw rate for the host vehicle, a desired trajectory, among other potential desired navigational actions.

Based on the output from the driving policy module 803, control module 805, which may also be implemented using processing unit 110, may develop control instructions for one or more actuators or controlled devices associated with the host vehicle. Such actuators and devices may include an accelerator, one or more steering controls, a brake, a signal transmitter, a display, or any other actuator or device that may be controlled as part of a navigation operation associated with a host vehicle. Aspects of control theory may be used to generate the output of control module 805. Control module 805 may be responsible for developing and outputting instructions to controllable components of the host vehicle in order to implement the desired navigational goals or requirements of driving policy module 803.

Returning to driving policy module 803, in some embodiments, a trained system trained through reinforcement learning may be used to implement driving policy module 803. In other embodiments, driving policy module 803 may be implemented without a machine learning approach, by using specified algorithms to "manually" address the various scenarios that may arise during autonomous navigation. Such an approach, however, while viable, may result in a driving policy that is too simplistic and may lack the flexibility of a trained system based on machine learning. A trained system, for example, may be better equipped to handle complex navigational states and may better determine whether a taxi is parking or is stopping to pick up or drop off a passenger; determine whether a pedestrian intends to cross the street ahead of the host vehicle; balance unexpected behavior of other drivers with defensiveness; negotiate in dense traffic involving target vehicles and/or pedestrians; decide when to suspend certain navigational rules or augment other rules; anticipate unsensed, but anticipated conditions (e.g., whether a pedestrian will emerge from behind a car or obstacle); etc. A trained system based on reinforcement learning may also be better equipped to address a state space that is continuous and high-dimensional along with an action space that is continuous.

Training of the system using reinforcement learning may involve learning a driving policy in order to map from sensed states to navigational actions. A driving policy is a function $\pi: S \to A$, where S is a set of states and $A \subset R^2$ is the action space (e.g., desired speed, acceleration, yaw commands, etc.). The state space is $S = S_s \times S_p$, where $S_s$ is the sensing state and $S_p$ is additional information on the state saved by the policy. Working in discrete time intervals, at time t, the current state $s_t \in S$ may be observed, and the policy may be applied to obtain a desired action, $\alpha_t = \pi(s_t)$.

The system may be trained through exposure to various navigational states, having the system apply the policy, providing a reward (based on a reward function designed to reward desirable navigational behavior). Based on the reward feedback, the system may "learn" the policy and becomes trained in producing desirable navigational actions. For example, the learning system may observe the current state $s_t \in S$ and decide on an action $\alpha_t \in A$ based on a policy $\pi$: $S \to \mathbb{D}(A)$. Based on the decided action (and implementation of the action), the environment moves to the next state $s_{t+1} \in S$ for observation by the learning system. For each action developed in response to the observed state, the feedback to the learning system is a reward signal $r_1, r_2, \ldots$.

The goal of Reinforcement Learning (RL) is to find a policy $\pi$. It is usually assumed that at time t, there is a reward function $r_t$ which measures the instantaneous quality of being at state $s_t$ and taking action $\alpha_t$. However, taking the action $\alpha_t$ at time t affects the environment and therefore affects the value of the future states. As a result, when deciding on what action to take, not only should the current reward be taken into account, but future rewards should also be considered. In some instances the system should take a certain action, even though it is associated with a reward lower than another available option, when the system determines that in the future a greater reward may be realized if the lower reward option is taken now. To formalize this, observe that a policy, $\pi$, and an initial state, s, induces a distribution over $\mathbb{R}^T$, where the probability of a vector $(r_1, \ldots, r_T)$ is the probability of observing the rewards $r_1, \ldots, r_T$, if the agent starts at state $s_0 = s$ and from there on follows the policy $\pi$. The value of the initial state s may be defined as:

$$V^\pi(s) = \mathbb{E}\left[\sum_{t=1}^{T} r_t \mid s_0 = s, \forall t \geq 1, a_t = \pi(s_t)\right].$$

Instead of restricting the time horizon to T, the future rewards may be discounted to define, for some fixed $\gamma \in (0, 1)$:

$$V^\pi(s) = \mathbb{E}\left[\sum_{t=1}^{\infty} \gamma^t r_t \mid s_0 = s, \forall t \geq 1, a_t = \pi(s_t)\right].$$

In any case, the optimal policy is the solution of $$\operatorname*{argmax}_{\pi} \mathbb{E}[V^\pi(s)]$$

where the expectation is over the initial state, s.

There are several possible methodologies for training the driving policy system. For example, an imitation approach (e.g., behavior cloning) may be used in which the system learns from state/action pairs where the actions are those that would be chosen by a good agent (e.g., a human) in response to a particular observed state. Suppose a human driver is observed. Through this observation, many examples of the form $(s_t, a_t)$, where $s_t$ is the state and $a_t$ is the action of the human driver could be obtained, observed, and used as a basis for training the driving policy system. For example, supervised learning can be used to learn a policy π such that $\pi(s_t) \approx \alpha_t$. There are many potential advantages of this approach. First, there is no requirement to define a reward function. Second, the learning is supervised and happens offline (there is no need to apply the agent in the learning process). A disadvantage of this method is that different human drivers, and even the same human drivers, are not deterministic in their policy choices. Hence, learning a function for which $\|\pi(s_t)-\alpha_t\|$ is very small is often infeasible. And, even small errors may accumulate over time to yield large errors.

Another technique that may be employed is policy-based learning. Here, the policy may be expressed in parametric form and directly optimized using a suitable optimization technique (e.g., stochastic gradient descent). The approach is to directly solve the problem given in $$\arg\max_{\pi} E[V^{\pi}(s)].$$

There are of course many ways to solve the problem. One advantage of this approach is that it tackles the problem directly, and therefore often leads to good practical results. One potential disadvantage is that it often requires an "on-policy" training, namely, the learning of π is an iterative process, where at iteration j we have a non-perfect policy, $\pi_j$, and to construct the next policy $\pi_j$, we must interact with the environment while acting based on $\pi_j$.

The system may also be trained through value-based learning (learning Q or V functions). Suppose a good approximation can be learned to the optimal value function V*. An optimal policy may be constructed (e.g., by relying on the Bellman equation). Some versions of value-based learning can be implemented offline (called "off-policy" training). Some disadvantages of the value-based approach may result from its strong dependence on Markovian assumptions and required approximation of a complicated function (it may be more difficult to approximate the value function than to approximate the policy directly).

Another technique may include model-based learning and planning (learning the probability of state transitions and solving the optimization problem of finding the optimal V). Combinations of these techniques may also be used to train the learning system. In this approach, the dynamics of the process may be learned, namely, the function that takes ($s_t$, $\alpha_t$) and yields a distribution over the next state $s_{t+1}$. Once this function is learned, the optimization problem may be solved to find the policy π whose value is optimal. This is called "planning". One advantage of this approach may be that the learning part is supervised and can be applied offline by observing triplets ($s_t$, $\alpha_t$, $s_{t+1}$). One disadvantage of this approach, similar to the "imitation" approach, may be that small errors in the learning process can accumulate and to yield inadequately performing policies.

Another approach for training driving policy module 803 may include decomposing the driving policy function into semantically meaningful components. This allows implementation of parts of the policy manually, which may ensure the safety of the policy, and implementation of other parts of the policy using reinforcement learning techniques, which may enable adaptivity to many scenarios, a human-like balance between defensive/aggressive behavior, and a human-like negotiation with other drivers. From the technical perspective, a reinforcement learning approach may combine several methodologies and offer a tractable training procedure, where most of the training can be performed using either recorded data or a self-constructed simulator.

In some embodiments, training of driving policy module 803 may rely upon an "options" mechanism. To illustrate, consider a simple scenario of a driving policy for a two-lane highway. In a direct RL approach, a policy π that maps the state into $A \subset \mathbb{R}^2$, where the first component of π (s) is the desired acceleration command and the second component of π (s) is the yaw rate. In a modified approach, the following policies can be constructed:

Automatic Cruise Control (ACC) policy, $o_{ACC}$: S→A: this policy always outputs a yaw rate of 0 and only changes the speed so as to implement smooth and accident-free driving.

ACC+Left policy, $o_L$: S→A: the longitudinal command of this policy is the same as the ACC command. The yaw rate is a straightforward implementation of centering the vehicle toward the middle of the left lane, while ensuring a safe lateral movement (e.g., don't move left if there's a car on the left side).

ACC+Right policy, $o_R$: S→A: Same as $o_L$, but the vehicle may be centered toward the middle of the right lane.

These policies may be referred to as "options". Relying on these "options", a policy can be learned that selects options, $\pi_o$: S→O, where O is the set of available options. In one case, O={$o_{ACC}$: $o_L$: $o_R$}. The option-selector policy, $\pi_o$, defines an actual policy, π: S→A, by setting, for every s, $\pi(s) = o_{\pi_o(s)}(s)$.

Figure 9:
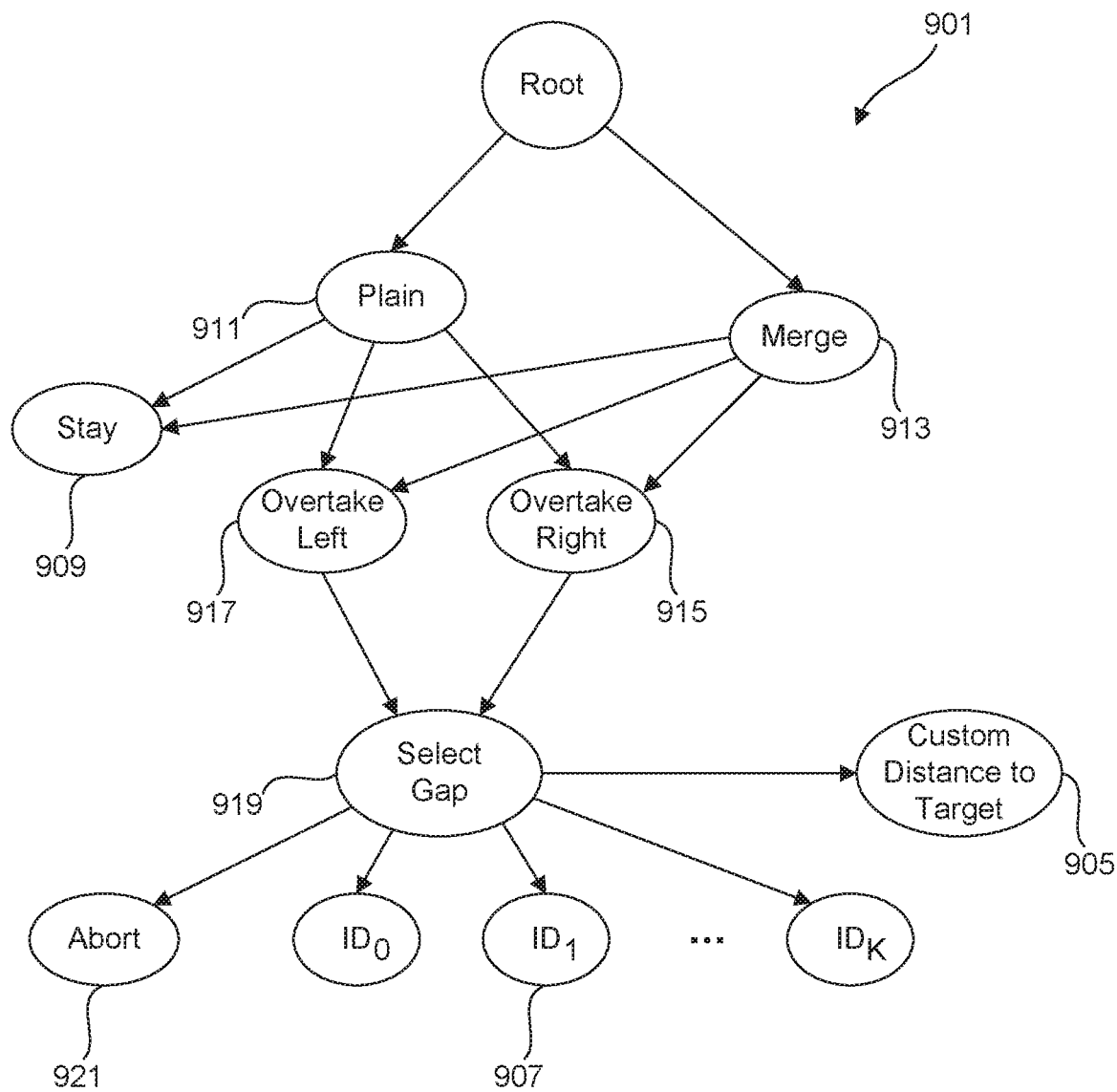
FIG. 9 is a navigation options graph consistent with the disclosed embodiments.
Figure 10:
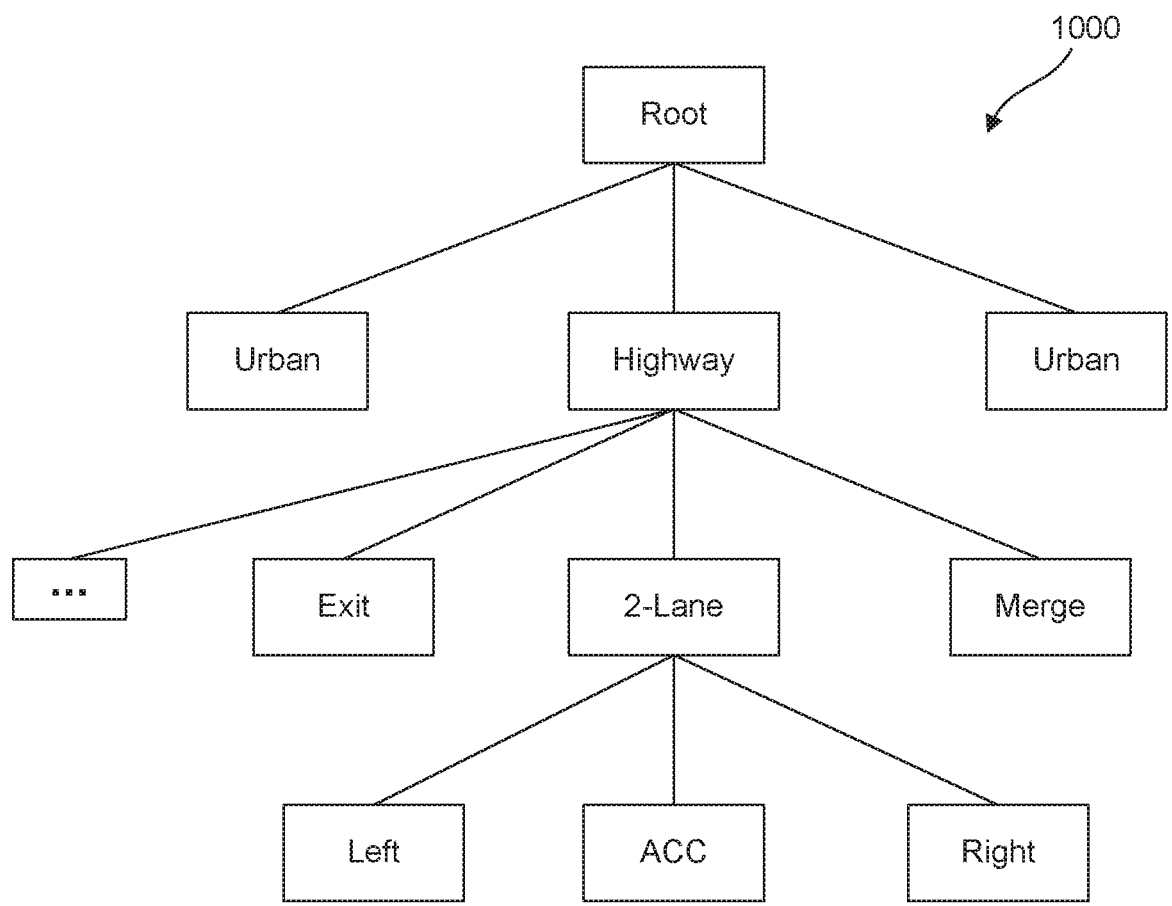
FIG. 10 is a navigation options graph consistent with the disclosed embodiments.

In practice, the policy function may be decomposed into an options graph 901, as shown in FIG. 9. Another example options graph 1000 is shown in FIG. 10. The options graph can represent a hierarchical set of decisions organized as a Directed Acyclic Graph (DAG). There is a special node called the root node 903 of the graph. This node has no incoming nodes. The decision process traverses through the graph, starting from the root node, until it reaches a "leaf" node, which refers to a node that has no outgoing decision lines. As shown in FIG. 9, leaf nodes may include nodes 905, 907, and 909, for example. Upon encountering a leaf node, driving policy module 803 may output the acceleration and steering commands associated with a desired navigational action associated with the leaf node.

Internal nodes, such as nodes 911, 913, and 915, for example, may result in implementation of a policy that chooses a child among its available options. The set of available children of an internal node include all of the nodes associated with a particular internal node via decision lines. For example, internal node 913 designated as "Merge" in FIG. 9 includes three children nodes 909, 915, and 917 ("Stay," "Overtake Right," and "Overtake Left," respectively) each joined to node 913 by a decision line.

Flexibility of the decision-making system may be gained by enabling nodes to adjust their position in the hierarchy of the options graph. For example, any of the nodes may be allowed to declare themselves as "critical." Each node may implement a function "is critical," that outputs "True" if the node is in a critical section of its policy implementation. For example, a node that is responsible for a take-over, may declare itself as critical while in the middle of a maneuver. This may impose constraints on the set of available children of a node u, which may include all nodes v which are children of node u and for which there exists a path from v to a leaf node that goes through all nodes designated as critical. Such an approach may allow, on one hand, declaration of the desired path on the graph at each time step, while on the other hand, stability of a policy may be preserved, especially while critical portions of the policy are being implemented.

By defining an options graph, the problem of learning the driving policy π: S→A may be decomposed into a problem of defining a policy for each node of the graph, where the policy at internal nodes should choose from among available children nodes. For some of the nodes, the respective policy may be implemented manually (e.g., through if-then type algorithms specifying a set of actions in response to an observed state) while for others the policies may be implemented using a trained system built through reinforcement learning. The choice between manual or trained/learned approaches may depend on safety aspects associated with the task and on its relative simplicity. The option graphs may be constructed in a manner such that some of the nodes are straightforward to implement, while other nodes may rely on trained models. Such an approach can ensure safe operation of the system.

The following discussion provides further details regarding the role of the options graph of FIG. 9 within driving policy module 803. As discussed above, the input to the driving policy module is a "sensed state," which summarizes the environment map, for example, as obtained from available sensors. The output of driving policy module 803 is a set of desires (optionally, together with a set of hard constraints) that define a trajectory as a solution of an optimization problem.

As described above, the options graph represents a hierarchical set of decisions organized as a DAG. There is a special node called the "root" of the graph. The root node is the only node that has no incoming edges (e.g., decision lines). The decision process traverses the graph, starting from the root node, until it reaches a "leaf" node, namely, a node that has no outgoing edges. Each internal node should implement a policy that picks a child among its available children. Every leaf node should implement a policy that, based on the entire path from the root to the leaf, defines a set of Desires (e.g., a set of navigational goals for the host vehicle). The set of Desires, together with a set of hard constraints that are defined directly based on the sensed state, establish an optimization problem whose solution is the trajectory for the vehicle. The hard constraints may be employed to further increase the safety of the system, and the Desires can be used to provide driving comfort and human-like driving behavior of the system. The trajectory provided as a solution to the optimization problem, in turn, defines the commands that should be provided to the steering, braking, and/or engine actuators in order to accomplish the trajectory.

Returning to FIG. 9, options graph 901 represents an options graph for a two-lane highway, including with merging lanes (meaning that at some points, a third lane is merged into either the right or the left lane of the highway). The root node 903 first decides if the host vehicle is in a plain road scenario or approaching a merge scenario. This is an example of a decision that can be implemented based on the sensing state. Plain road node 911 includes three child nodes: stay node 909, overtake left node 917, and overtake right node 915. Stay refers to a situation in which the host vehicle would like to keep driving in the same lane. The stay node is a leaf node (no outgoing edges/lines). Therefore, it the stay node defines a set of Desires. The first Desire it defines may include the desired lateral position—e.g., as close as possible to the center of the current lane of travel. There may also be a desire to navigate smoothly (e.g., within predefined or allowable acceleration maximums) The stay node may also define how the host vehicle is to react to other vehicles. For example, the stay node may review sensed target vehicles and assign each a semantic meaning, which can be translated into components of the trajectory.

Various semantic meanings may be assigned to target vehicles in an environment of the host vehicle. For example, in some embodiments the semantic meaning may include any of the following designations: 1) not relevant: indicating that the sensed vehicle in the scene is currently not relevant; 2) next lane: indicating that the sensed vehicle is in an adjacent lane and an appropriate offset should be maintained relative to this vehicle (the exact offset may be calculated in the optimization problem that constructs the trajectory given the Desires and hard constraints, and can potentially be vehicle dependent—the stay leaf of the options graph sets the target vehicle's semantic type, which defines the Desire relative to the target vehicle); 3) give way: the host vehicle will attempt to give way to the sensed target vehicle by, for example, reducing speed (especially where the host vehicle determines that the target vehicle is likely to cut into the lane of the host vehicle); 4) take way: the host vehicle will attempt to take the right of way by, for example, increasing speed; 5) follow: the host vehicle desires to maintain smooth driving following after this target vehicle; 6) takeover left/right: this means the host vehicle would like to initiate a lane change to the left or right lane. Overtake left node 917 and overtake right node 915 are internal nodes that do not yet define Desires.

The next node in options graph 901 is the select gap node 919. This node may be responsible for selecting a gap between two target vehicles in a particular target lane that host vehicle desires to enter. By choosing a node of the form IDj, for some value of j, the host vehicle arrives at a leaf that designates a Desire for the trajectory optimization problem—e.g., the host vehicle wishes to make a maneuver so as to arrive at the selected gap. Such a maneuver may involve first accelerating/braking in the current lane and then heading to the target lane at an appropriate time to enter the selected gap. If the select gap node 919 cannot find an appropriate gap, it moves to the abort node 921, which defines a desire to move back to the center of the current lane and cancel the takeover.

Figure 11A:
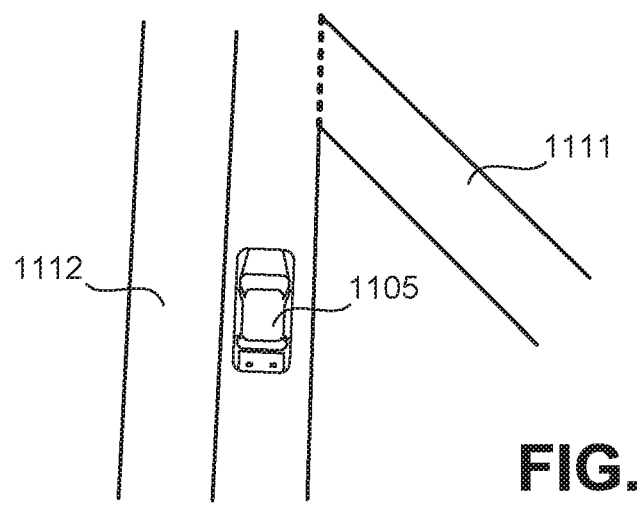
FIGS. 11A, 11B, and 11C provide a schematic representation of navigational options of a host vehicle in a merge zone consistent with the disclosed embodiments.

Returning to merge node 913, when the host vehicle approaches a merge, it has several options that may depend on a particular situation. For example, as shown in FIG. 11A, host vehicle 1105 is traveling along a two-lane road with no other target vehicles detected, either in the primary lanes of the two-lane road or in the merge lane 1111. In this situation, driving policy module 803, upon reaching merge node 913, may select stay node 909. That is, staying within its current lane may be desired where no target vehicles are sensed as merging onto the roadway.

Figure 11B:
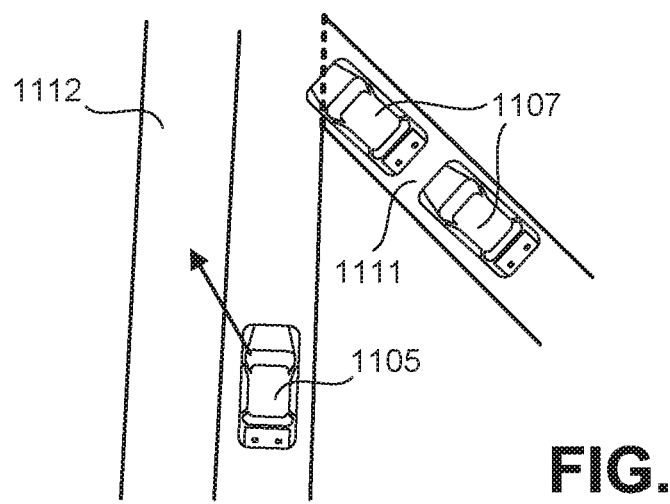

In FIG. 11B, the situation is slightly different. Here, host vehicle 1105 senses one or more target vehicles 1107 entering the main roadway 1112 from merge lane 1111. In this situation, once driving policy module 803 encounters merge node 913, it may choose to initiate an overtake left maneuver in order to avoid the merging situation.

Figure 11C:
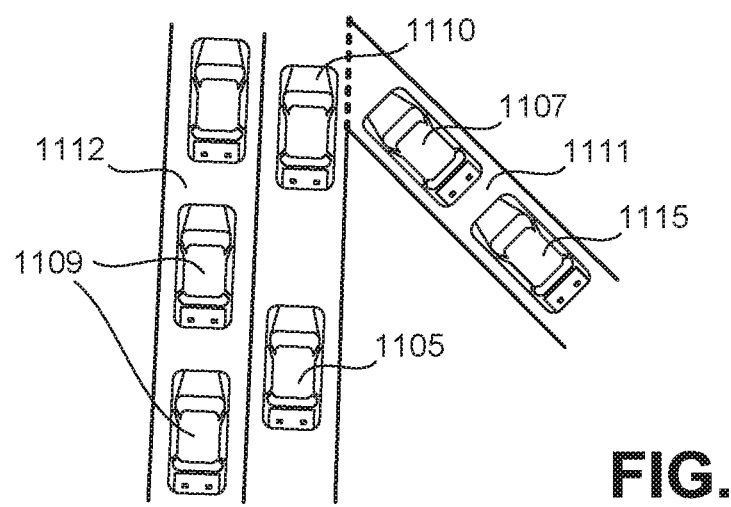

In FIG. 11C, host vehicle 1105 encounters one or more target vehicles 1107 entering main roadway 1112 from merge lane 1111. Host vehicle 1105 also detects target vehicles 1109 traveling in a lane adjacent to the lane of the host vehicle. The host vehicle also detects one or more target vehicles 1110 traveling in the same lane as host vehicle 1105. In this situation, driving policy module 803 may decide to adjust the speed of host vehicle 1105 to give way to target vehicle 1107 and to proceed ahead of target vehicle

1115. This can be accomplished, for example, by progressing to select gap node 919, which, in turn, will select a gap between ID0 (vehicle 1107) and ID1 (vehicle 1115) as the appropriate merging gap. In such a case, the appropriate gap of the merging situation defines the objective for a trajectory planner optimization problem.

As discussed above, nodes of the options graph may declare themselves as "critical," which may ensure that the selected option passes through the critical nodes. Formally, each node may implement a function IsCritical. After performing a forward pass on the options graph, from the root to a leaf, and solving the optimization problem of the trajectory planner, a backward pass may be performed from the leaf back to the root. Along this backward pass, the IsCritical function of all nodes in the pass may be called, and a list of all critical nodes may be saved. In the forward path corresponding to the next time frame, driving policy module 803 may be required to choose a path from the root node to a leaf that goes through all critical nodes.

FIGS. 11A-11C may be used to show a potential benefit of this approach. For example, in a situation where an overtake action is initiated, and driving policy module 803 arrives at the leaf corresponding to IDk, it would be undesirable to choose, for example, the stay node 909 when the host vehicle is in the middle of the takeover maneuver. To avoid such jumpiness, the IDj node can designate itself as critical. During the maneuver, the success of the trajectory planner can be monitored, and function IsCritical will return a "True" value if the overtake maneuver progresses as intended. This approach may ensure that in the next time frame, the takeover maneuver will be continued (rather than jumping to another, potentially inconsistent maneuver prior to completion of the initially selected maneuver). If, on the other hand, monitoring of the maneuver indicates that the selected maneuver is not progressing as intended, or if the maneuver has become unnecessary or impossible, the function IsCritical can return a "False" value. This can allow the select gap node to select a different gap in the next time frame, or to abort the overtake maneuver altogether. This approach may allow, on one hand, declaration of the desired path on the options graph at each time step, while on the other hand, may help to promote stability of the policy while in critical parts of the execution.

Hard constraints, which will be discussed in more detail below, may be differentiated from navigational desires. For example, hard constraints may ensure safe driving by applying an added layer of filtering of a planned navigational action. The implicated hard constraints, which may be programmed and defined manually, rather than through use of a trained system built upon reinforcement learning, can be determined from the sensed state. In some embodiments, however, the trained system may learn the applicable hard constraints to be applied and followed. Such an approach may promote driving policy module 803 arriving at a selected action that is already in compliance with the applicable hard constraints, which may reduce or eliminate selected actions that may require later modification to comply with applicable hard constraints. Nevertheless, as a redundant safety measure, hard constraints may be applied to the output of driving policy module 803 even where driving policy module 803 has been trained to account for predetermined hard constraints.

There are many examples of potential hard constraints. For example, a hard constraint may be defined in conjunction with a guardrail on an edge of a road. In no situation may the host vehicle be allowed to pass the guardrail. Such a rule induces a hard lateral constraint on the trajectory of the host vehicle. Another example of a hard constraint may include a road bump (e.g., a speed control bump), which may induce a hard constraint on the speed of driving before the bump and while traversing the bump. Hard constraints may be considered safety critical and, therefore, may be defined manually rather than relying solely on a trained system learning the constraints during training.

In contrast to hard constraints, the goal of desires may be to enable or achieve comfortable driving. As discussed above, an example of a desire may include a goal of positioning the host vehicle at a lateral position within a lane that corresponds to the center of the host vehicle lane. Another desire may include the ID of a gap to fit into. Note that there is not a requirement for the host vehicle to be exactly in the center of the lane, but instead a desire to be as close as possible to it may ensure that the host vehicle tends to migrate to the center of the lane even in the event of deviations from the center of the lane. Desires may not be safety critical. In some embodiments, desires may require negotiation with other drivers and pedestrians. One approach for constructing the desires may rely on the options graph, and the policy implemented in at least some nodes of the graph may be based on reinforcement learning.

For the nodes of options graph 901 or 1000 implemented as nodes trained based on learning, the training process may include decomposing the problem into a supervised learning phase and a reinforcement learning phase. In the supervised learning phase, a differentiable mapping from $(s_t, \alpha_t)$ to $\hat{s}_{t+1}$ can be learned such that $\hat{s}_{t+1} \approx s_{t+1}$. This may be similar to "model-based" reinforcement learning. However, in the forward loop of the network, $\hat{s}_{t+1}$ may be replaced by the actual value of $s_{t+1}$, therefore eliminating the problem of error accumulation. The role of prediction of $\hat{s}_{t+1}$ is to propagate messages from the future back to past actions. In this sense, the algorithm may be a combination of "model-based" reinforcement learning with "policy-based learning."

An important element that may be provided in some scenarios is a differentiable path from future losses/rewards back to decisions on actions. With the option graph structure, the implementation of options that involve safety constraints are usually not differentiable. To overcome this issue, the choice of a child in a learned policy node may be stochastic. That is, a node may output a probability vector, p, that assigns probabilities used in choosing each of the children of the particular node. Suppose that a node has k children and let $\alpha^{(1)}, \ldots \alpha^{(k)}$ be the actions of the path from each child to a leaf. The resulting predicted action is therefore $\hat{\alpha} = \Sigma_{i=1}^{k} p_i \alpha^{(i)}$, which may result in a differentiable path from the action to p. In practice, an action a may be chosen to be $\alpha^{(i)}$ for i~p, and the difference between $\alpha$ and $\hat{\alpha}$ may be referred to as additive noise.

For the training of $\hat{s}_{t+1}$ given $s_t, \alpha_t$, supervised learning may be used together with real data. For training the policy of nodes simulators can be used. Later, fine tuning of a policy can be accomplished using real data. Two concepts may make the simulation more realistic. First, using imitation, an initial policy can be constructed using the "behavior cloning" paradigm, using large real world data sets. In some cases, the resulting agents may be suitable. In other cases, the resulting agents at least form very good initial policies for the other agents on the roads. Second, using self-play, our own policy may be used to augment the training. For example, given an initial implementation of the other agents (cars/pedestrians) that may be experienced, a policy may be trained based on a simulator. Some of the other agents may be replaced with the new policy, and the process may be repeated. As a result, the policy can continue to improve as it should respond to a larger variety of other agents that have differing levels of sophistication.

Further, in some embodiments, the system may implement a multi-agent approach. For example, the system may take into account data from various sources and/or images capturing from multiple angles. Further, some disclosed embodiments may provide economy of energy, as anticipation of an event which does not directly involve the host vehicle, but which may have an effect on the host vehicle can be considered, or even anticipation of an event that may lead to unpredictable circumstances involving other vehicles may be a consideration (e.g., radar may "see through" the leading vehicle and anticipation of an unavoidable, or even a high likelihood of an event that will affect the host vehicle).

Trained System with Imposed Navigational Constraints

In the context of autonomous driving, a significant concern is how to ensure that a learned policy of a trained navigational network will be safe. In some embodiments, the driving policy system may be trained using constraints, such that the actions selected by the trained system may already account for applicable safety constraints. Additionally, in some embodiments, an extra layer of safety may be provided by passing the selected actions of the trained system through one or more hard constraints implicated by a particular sensed scene in the environment of the host vehicle. Such an approach may ensure that that the actions taken by the host vehicle have been restricted to those confirmed as satisfying applicable safety constraints.

At its core, the navigational system may include a learning algorithm based on a policy function that maps an observed state to one or more desired actions. In some implementations, the learning algorithm is a deep learning algorithm. The desired actions may include at least one action expected to maximize an anticipated reward for a vehicle. While in some cases, the actual action taken by the vehicle may correspond to one of the desired actions, in other cases, the actual action taken may be determined based on the observed state, one or more desired actions, and non-learned, hard constraints (e.g., safety constraints) imposed on the learning navigational engine. These constraints may include no-drive zones surrounding various types of detected objects (e.g., target vehicles, pedestrians, stationary objects on the side of a road or in a roadway, moving objects on the side of a road or in a roadway, guard rails, etc.) In some cases, the size of the zone may vary based on a detected motion (e.g., speed and/or direction) of a detected object. Other constraints may include a maximum speed of travel when passing within an influence zone of a pedestrian, a maximum deceleration (to account for a target vehicle spacing behind the host vehicle), a mandatory stop at a sensed crosswalk or railroad crossing, etc.

Hard constraints used in conjunction with a system trained through machine learning may offer a degree of safety in autonomous driving that may surpass a degree of safety available based on the output of the trained system alone. For example, the machine learning system may be trained using a desired set of constraints as training guidelines and, therefore, the trained system may select an action in response to a sensed navigational state that accounts for and adheres to the limitations of applicable navigational constraints. Still, however, the trained system has some flexibility in selecting navigational actions and, therefore, there may exist at least some situations in which an action selected by the trained system may not strictly adhere to relevant navigational constraints. Therefore, in order to require that a selected action strictly adheres to relevant navigational constraints, the output of the trained system may be combined with, compared to, filtered with, adjusted, modified, etc. using a non-machine learning component outside the learning/trained framework that guarantees strict application of relevant navigational constraints.

The following discussion provides additional details regarding the trained system and the potential benefits (especially from a safety perspective) that may be gleaned from combining a trained system with an algorithmic component outside of the trained/learning framework. As discussed, the reinforcement learning objective by policy may be optimized through stochastic gradient ascent. The objective (e.g., the expected reward) may be defined as $\mathbb{E}_{s\sim p_\alpha} R(\bar{s})$.

Objectives that involve expectation may be used in machine learning scenarios. Such an objective, without being bound by navigational constraints, however, may not return actions strictly bound by those constraints. For example, considering a reward function for which $R(\bar{s})=-r$ for trajectories that represent a rare "corner" event to be avoided (e.g., such as an accident), and $R(\bar{s})\in[-1,1]$ for the rest of the trajectories, one goal for the learning system may be to learn to perform an overtake maneuver. Normally, in an accident free trajectory, $R(\bar{s})$ would reward successful, smooth, takeovers and penalize staying in a lane without completing the takeover—hence the range $[-1, 1]$. If a sequence, $\bar{s}$, represents an accident, the reward, $-r$, should provide a sufficiently high penalty to discourage such an occurrence. The question is what should be the value of r to ensure accident-free driving.

Observe that the effect of an accident on $\mathbb{E}[R(\bar{s})]$ is the additive term $-pr$ where p is the probability mass of trajectories with an accident event. If this term is negligible, i.e., $p \ll 1/r$, then the learning system may prefer a policy that performs an accident (or adopt in general a reckless driving policy) in order to fulfill the takeover maneuver successfully more often than a policy that would be more defensive at the expense of having some takeover maneuvers not complete successfully. In other words, if the probability of accidents is to be at most p, then r must be set such that $r \gg 1/p$. It may be desirable to make p extremely small (e.g., on the order of $p=10^{-9}$). Therefore, r should be large. In policy gradient, the gradient of $\mathbb{E}[R(\bar{s})]$ may be estimated. The following lemma shows that the variance of the random variable $R(\bar{s})$ grows with $pr^2$, which is larger than r for $r \gg 1/p$. Therefore, estimating the objective may be difficult, and estimating its gradient may be even more difficult.

Lemma: Let $\pi_o$ be a policy and let p and r be scalars such that with probability p, $R(\bar{s})=-r$ is obtained, and with probability $1-p$ we have $R(s)\in[-1,1]$ is obtained. Then, $$\mathrm{Var}[R(\bar{s})] \geq pr^2 - (pr+(1-p))^2 = (p-p^2)r^2 - 2p(1-p)r - (1-p)^2 \approx pr^2$$

where the last approximation holds for the case $r \geq 1/p$.

This discussion shows that an objection of the form $E[R(\bar{s})]$ may not ensure functional safety without causing a variance problem. The baseline subtraction method for variance reduction may not offer a sufficient remedy to the problem because the problem would shift from a high variance of $R(\bar{s})$ to an equally high variance of the baseline constants whose estimation would equally suffer numeric instabilities. Moreover, if the probability of an accident is p, then on average at least $1/p$ sequences should be sampled before obtaining an accident event. This implies a lower bound of $1/p$ samples of sequences for a learning algorithm that aims at minimizing $\mathbb{E}[R(\bar{s})]$. The solution to this problem may be found in the architectural design described herein, rather than through numerical conditioning techniques. The approach here is based on the notion that hard constraints should be injected outside of the learning framework. In other words, the policy function may be decomposed into a learnable part and a nonlearnable part. Formally, the policy function may be structured as $\pi_\theta = \pi^{(T)} \circ \pi_\theta^{(D)}$, where $\pi_\theta^{(D)}$ maps the (agnostic) state space into a set of Desires (e.g., desired navigational goals, etc.), while $\pi^{(T)}$ maps the Desires into a trajectory (which may determine how the car should move in a short range). The function $\pi_\theta^{(D)}$ is responsible for the comfort of driving and for making strategic decisions such as which other cars should be over-taken or given way and what is the desired position of the host vehicle within its lane, etc. The mapping from sensed navigational state to Desires is a policy $\pi_\theta^{(D)}$ that may be learned from experience by maximizing an expected reward. The desires produced by $\pi_\theta^{(D)}$ may be translated into a cost function over driving trajectories. The function $\pi^{(T)}$, not a learned function, may be implemented by finding a trajectory that minimizes the cost subject to hard constraints on functional safety. This decomposition may ensure functional safety while at the same time providing for comfortable driving.

Figure 11D:
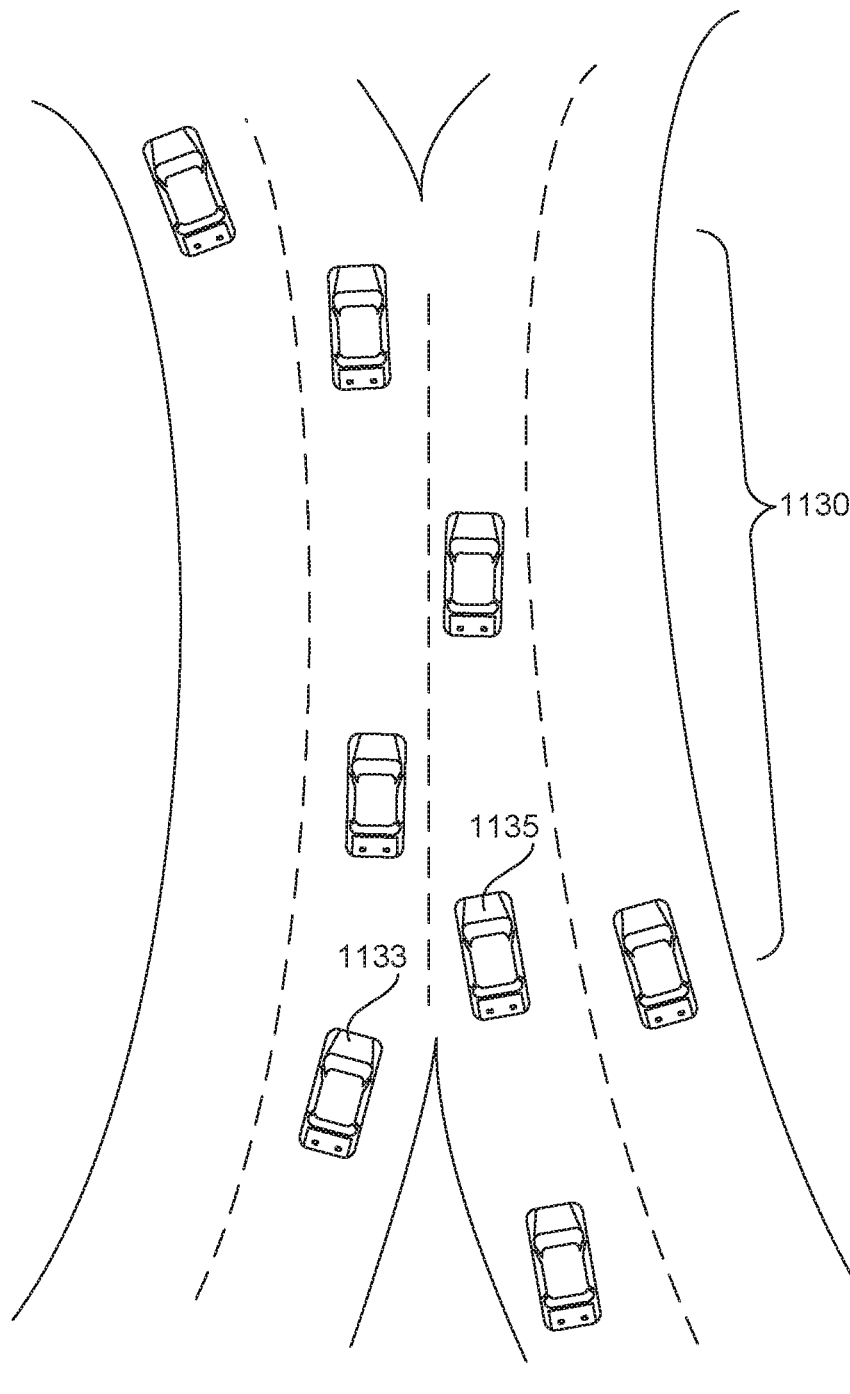
FIG. 11D provide a diagrammatic depiction of a double merge scenario.

A double merge navigational situation, as depicted in FIG. 11D, provides an example further illustrating these concepts. In a double merge, vehicles approach the merge area 1130 from both left and right sides. And, from each side, a vehicle, such as vehicle 1133 or vehicle 1135, can decide whether to merge into lanes on the other side of merge area 1130. Successfully executing a double merge in busy traffic may require significant negotiation skills and experience and may be difficult to execute in a heuristic or brute force approach by enumerating all possible trajectories that could be taken by all agents in the scene. In this double merge example, a set of Desires, $\mathcal{D}$, appropriate for the double merge maneuver may be defined. $\mathcal{D}$ may be the Cartesian product of the following sets: $\mathcal{D} = [0, v_{max}] \times L \times \{g, t, o\}^n$, where $[0, v_{max}]$ is the desired target speed of the host vehicle, $L = \{1, 1.5, 2, 2.5, 3, 3.5, 4\}$ is the desired lateral position in lane units where whole numbers designate a lane center and fractional numbers designate lane boundaries, and $\{g, t, \mathbf{0}\}$ are classification labels assigned to each of the n other vehicles. The other vehicles may be assigned "g" if the host vehicle is to give way to the other vehicle, "t" if the host vehicle is to take way relative to the other vehicle, or "o" if the host vehicle is to maintain an offset distance relative to the other vehicle.

Below is a description of how a set of Desires, $(v, t, c_1, \ldots, c_n) \in \mathcal{D}$, may be translated into a cost function over driving trajectories. A driving trajectory may be represented by $(x_1, y_1), \ldots, (x_k, y_k)$, where $(x_i, y_i)$ is the (lateral, longitudinal) location of the host vehicle (in ego-centric units) at time $\tau \cdot i$. In some experiments, $\tau = 0.1$ sec and $k = 10$. Of course, other values may be selected as well. The cost assigned to a trajectory may include a weighted sum of individual costs assigned to the desired speed, lateral position, and the label assigned to each of the other n vehicles.

Given a desired speed $v \in [0, v_{max}]$, the cost of a trajectory associated with speed is $\Sigma_{i=2}^{k}(v - \|(x_i, y_i) - (x_{i-1}, y_{i-1})\|/\tau)^2$.

Given desired lateral position, $l \in L$, the cost associated with desired lateral position is $\Sigma_{i=1}^{k} \text{dist}(x_i, y_i, l)$ where dist(x, y, l) is the distance from the point (x, y) to the lane position l. Regarding the cost due to other vehicles, for any other vehicle $(x'_1, y'_1), \ldots, (x'_k, y'_k)$ may represent the other vehicle in egocentric units of the host vehicle, and i may be the earliest point for which there exists j such that the distance between $(x_i, y_i)$ and $(x'_j, y'_j)$ is small. If there is no such point, then i can be set as $i = \infty$. If another car is classified as "give-way", it may be desirable that $\tau i > \tau j + 0.5$, meaning that the host vehicle will arrive to the trajectory intersection point at least 0.5 seconds after the other vehicle will arrive at the same point. A possible formula for translating the above constraint into a cost is $[r(j-i)+0.5]_+$.

Likewise, if another car is classified as "take-way", it may be desirable that $\tau j \geq \tau i + 0.5$, which may be translated to the cost $[\tau(i-j)+0.5]_+$. If another car is classified as "offset", it may be desirable that $i = \infty$, meaning that the trajectory of the host vehicle and the trajectory of the offset car do not intersect. This condition can be translated to a cost by penalizing with respect to the distance between trajectories.

Assigning a weight to each of these costs may provide a single objective function for the trajectory planner, $\pi^{(T)}$. A cost that encourages smooth driving may be added to the objective. And, to ensure functional safety of the trajectory, hard constraints can be added to the objective. For example, $(x_i, y_i)$ may be prohibited from being off the roadway, and $(x_i, y_i)$ may be forbidden from being close to $(x'_j, y'_j)$ for any trajectory point $(x'_j, y'_j)$ of any other vehicle if $|i-j|$ is small.

To summarize, the policy, $\pi_\theta$, can be decomposed into a mapping from the agnostic state to a set of Desires and a mapping from the Desires to an actual trajectory. The latter mapping is not based on learning and may be implemented by solving an optimization problem whose cost depends on the Desires and whose hard constraints may guarantee functional safety of the policy.

The following discussion describes mapping from the agnostic state to the set of Desires. As described above, to be compliant with functional safety, a system reliant upon reinforcement learning alone may suffer a high and unwieldy variance on the reward $R(\bar{s})$. This result may be avoided by decomposing the problem into a mapping from (agnostic) state space to a set of Desires using policy gradient iterations followed by a mapping to an actual trajectory which does not involve a system trained based on machine learning.

For various reasons, the decision making may be further decomposed into semantically meaningful components. For example, the size of $\mathcal{D}$ might be large and even continuous. In the double-merge scenario described above with respect to FIG. 11D, $\mathcal{D} = [0, v_{max}] \times L \times \{g, t, o\}^n$. Additionally, the gradient estimator may involve the term $\Sigma_{t=1}^{T} \nabla_\theta \pi_\theta(\alpha_t | s_t)$. In such an expression, the variance may grow with the time horizon T. In some cases, the value of T may be roughly 250 which may be high enough to create significant variance. Supposing a sampling rate is in the range of 10 Hz and the merge area 1130 is 100 meters, preparation for the merge may begin approximately 300 meters before the merge area. If the host vehicle travels at 16 meters per second (about 60 km per hour), then the value of T for an episode may be roughly 250.

Figure 11E:
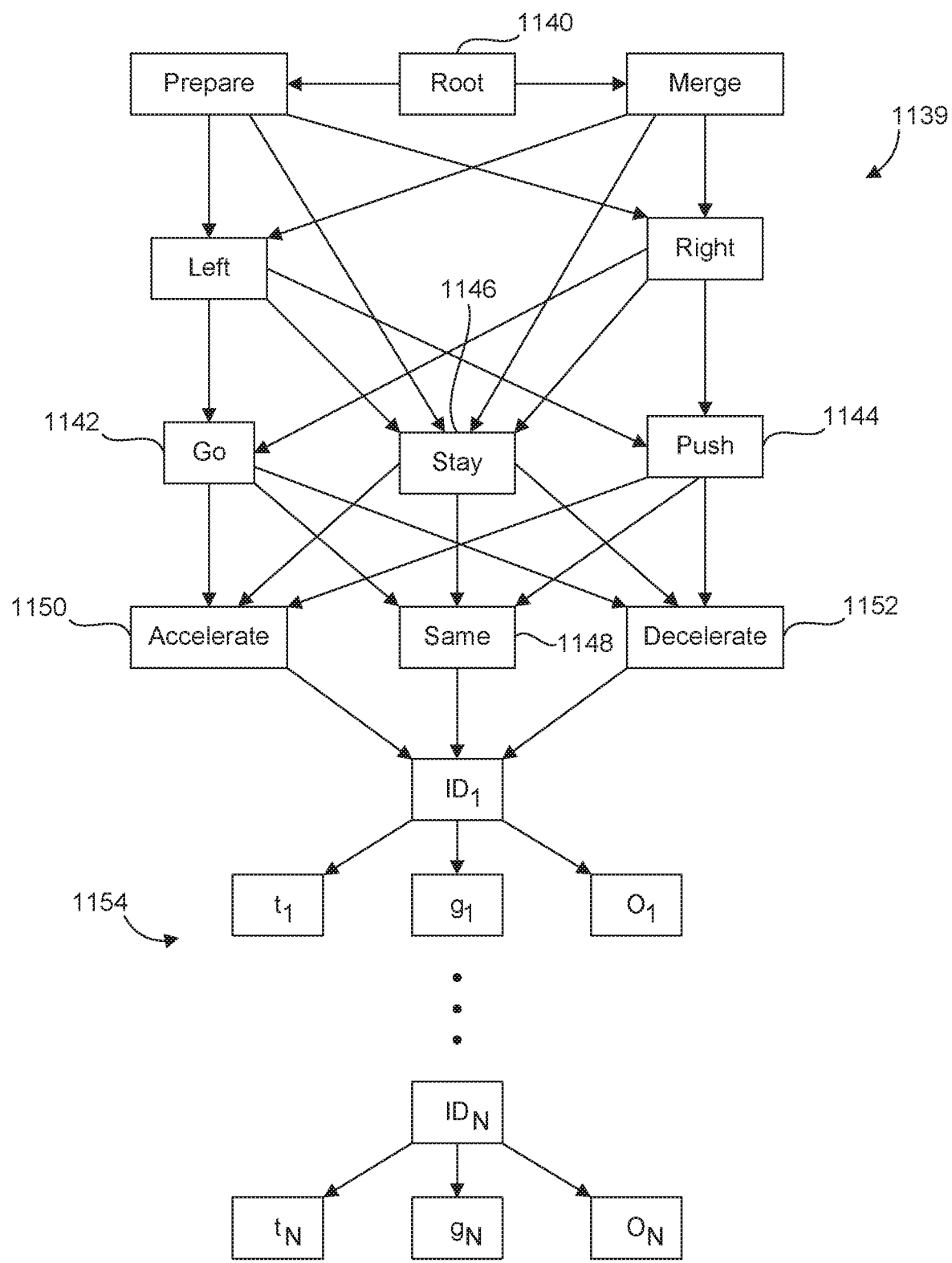
FIG. 11E provides an options graph potentially useful in a double merge scenario.

Returning to the concept of an options graph, an options graph that may be representative of the double merge scenario depicted in FIG. 11D is shown in FIG. 11E. As previously discussed, an options graph may represent a hierarchical set of decisions organized as a Directed Acyclic Graph (DAG). There may be a special node in the graph called the "root" node 1140, which may be the only node that has no incoming edges (e.g., decision lines). The decision process may traverse the graph, starting from the root node, until it reaches a "leaf" node, namely, a node that has no outgoing edges. Each internal node may implement a policy function that chooses a child from among its available children. There may be a predefined mapping from the set of traversals over the options graph to the set of desires, $\mathcal{D}$. In other words, a traversal on the options graph may be automatically translated into a desire in $\mathcal{D}$. Given a node, v, in the graph, a parameter vector $\theta_v$ may specify the policy of choosing a child of v. If $\theta$ is the concatenation of all the $\theta_v$, then $\pi_\theta^{(\mathcal{D})}$ may be defined by traversing from the root of the graph to a leaf, while at each node v using the policy defined by $\theta_v$, to choose a child node.

In the double merge options graph 1139 of FIG. 11E, root node 1140 may first decide if the host vehicle is within the merging area (e.g., area 1130 of FIG. 11D) or if the host vehicle instead is approaching the merging area and needs to prepare for a possible merge. In both cases, the host vehicle may need to decide whether to change lanes (e.g., to the left or to the right side) or whether to stay in the current lane. If the host vehicle has decided to change lanes, the host vehicle may need to decide whether conditions are suitable to go on and perform the lane change maneuver (e.g., at "go" node 1142). If it is not possible to change lanes, the host vehicle may attempt to "push" toward the desired lane (e.g., at node 1144 as part of a negotiation with vehicles in the desired lane) by aiming at being on the lane mark. Alternatively, the host vehicle may opt to "stay" in the same lane (e.g., at node 1146). Such a process may determine the lateral position for the host vehicle in a natural way. For example, This may enable determination of the desired lateral position in a natural way. For example, if the host vehicle changes lanes from lane 2 to lane 3, the "go" node may set the desired lateral position to 3, the "stay" node may set the desired lateral position to 2, and the "push" node may set the desired lateral position to 2.5. Next, the host vehicle may decide whether to maintain the "same" speed (node 1148), "accelerate" (node 1150), or "decelerate" (node 1152). Next, the host vehicle may enter a "chain like" structure 1154 that goes over the other vehicles and sets their semantic meaning to a value in the set {g, t, o}. This process may set the desires relative to the other vehicles. The parameters of all nodes in this chain may be shared (similar to Recurrent Neural Networks).

A potential benefit of the options is the interpretability of the results. Another potential benefit is that the decomposable structure of the set $\mathcal{D}$ can be relied upon and, therefore, the policy at each node may be chosen from among a small number of possibilities. Additionally, the structure may allow for a reduction in the variance of the policy gradient estimator.

As discussed above, the length of an episode in the double merge scenario may be roughly T=250 steps. Such a value (or any other suitable value depending on a particular navigational scenario) may provide enough time to see the consequences of the host vehicle actions (e.g., if the host vehicle decided to change lanes as a preparation for the merge, the host vehicle will see the benefit only after a successful completion of the merge). On the other hand, due to the dynamic of driving, the host vehicle must make decisions at a fast enough frequency (e.g., 10 Hz in the case described above).

The options graph may enable a decrease in the effective value of Tin at least two ways. First, given higher level decisions, a reward can be defined for lower level decisions while taking into account shorter episodes. For example, when the host vehicle has already chosen a "lane change" and the "go" node, a policy can be learned for assigning semantic meaning to vehicles by looking at episodes of 2-3 seconds (meaning that T becomes 20-30 instead of 250). Second, for high level decisions (such as whether to change lanes or to stay in the same lane), the host vehicle may not need to make decisions every 0.1 seconds. Instead, the host vehicle may be able to either make decisions at a lower frequency (e.g., every second), or implement an "option termination" function, and then the gradient may be calculated only after every termination of the option. In both cases, the effective value of T may be an order of magnitude smaller than its original value. All in all, the estimator at every node may depend on a value of T which is an order of magnitude smaller than the original 250 steps, which may immediately transfer to a smaller variance.

As discussed above, hard constraints may promote safer driving, and there may be several different types of constraints. For example, static hard constraints may be defined directly from the sensing state. These may include speed bumps, speed limits, road curvature, junctions, etc., within the environment of the host vehicle that may implicate one or more constraints on vehicle speed, heading, acceleration, breaking (deceleration), etc. Static hard constraints may also include semantic free space where the host vehicle is prohibited from going outside of the free space and from navigating too close to physical barriers, for example. Static hard constraints may also limit (e.g., prohibit) maneuvers that do not comply with various aspects of a kinematic motion of the vehicle, for example, a static hard constraint can be used to prohibit maneuvers that might lead to the host vehicle overturning, sliding, or otherwise losing control.

Hard constraints may also be associated with vehicles. For example, a constraint may be employed requiring that a vehicle maintain a longitudinal distance to other vehicles of at least one meter and a lateral distance from other vehicles of at least 0.5 meters. Constraints may also be applied such that the host vehicle will avoid maintaining a collision course with one or more other vehicles. For example, a time t may be a measure of time based on a particular scene. The predicted trajectories of the host vehicle and one or more other vehicles may be considered from a current time to time T. Where the two trajectories intersect, $(t_i^a, t_i^l)$ may represent the time of arrival and the leaving time of vehicle i to the intersection point. That is, each car will arrive at point when a first part of the car passes the intersection point, and a certain amount of time will be required before the last part of the car passes through the intersection point. This amount of time separates the arrival time from the leaving time. Assuming that $t_1^a < t_2^a$ (i.e., that the arrival time of vehicle 1 is less than the arrival time of vehicle 2), then we will want to ensure that vehicle 1 has left the intersection point prior to vehicle 2 arriving. Otherwise, a collision would result. Thus, a hard constraint may be implemented such that $t_1^l > t_2^a$. Moreover, to ensure that vehicle 1 and vehicle 2 do not miss one another by a minimal amount, an added margin of safety may be obtained by including a buffer time into the constraint (e.g., 0.5 seconds or another suitable value). A hard constraint relating to predicted intersection trajectories of two vehicles may be expressed as $t_1^l > t_2^a + 0.5$.

The amount of time $\tau$ over which the trajectories of the host vehicle and one or more other vehicles are tracked may vary. In junction scenarios, however, where speeds may be lower, $\tau$ may be longer, and $\tau$ may be defined such that a host vehicle will enter and leave the junction in less than $\tau$ seconds.

Applying hard constraints to vehicle trajectories, of course, requires that the trajectories of those vehicles be predicted. For the host vehicle, trajectory prediction may be relatively straightforward, as the host vehicle generally already understands and, indeed, is planning an intended trajectory at any given time. Relative to other vehicles, predicting their trajectories can be less straightforward. For other vehicles, the baseline calculation for determining predicted trajectories may rely on the current speed and heading of the other vehicles, as determined, for example, based on analysis of an image stream captured by one or more cameras and/or other sensors (radar, lidar, acoustic, etc.) aboard the host vehicle.

There can be some exceptions, however, that can simplify the problem or at least provide added confidence in a trajectory predicted for another vehicle. For example, with respect to structured roads in which there is an indication of lanes and where give-way rules may exist, the trajectories of other vehicles can be based, at least in part, upon the position of the other vehicles relative to the lanes and based upon applicable give-way rules. Thus, in some situations, when there are observed lane structures, it may be assumed that next-lane vehicles will respect lane boundaries. That is, the host vehicle may assume that a next-lane vehicle will stay in its lane unless there is observed evidence (e.g., a signal light, strong lateral movement, movement across a lane boundary) indicating that the next-lane vehicle will cut into the lane of the host vehicle.

Other situations may also provide clues regarding the expected trajectories of other vehicles. For example, at stop signs, traffic lights, roundabouts, etc., where the host vehicle may have the right of way, it may be assumed that other vehicles will respect that right of way. Thus, unless there is observed evidence of a rule break, other vehicles may be assumed to proceed along a trajectory that respects the rights of way possessed by the host vehicle.

Hard constraints may also be applied with respect to pedestrians in an environment of the host vehicle. For example, a buffer distance may be established with respect to pedestrians such that the host vehicle is prohibited from navigating any closer than the prescribed buffer distance relative to any observed pedestrian. The pedestrian buffer distance may be any suitable distance. In some embodiments, the buffer distance may be at least one meter relative to an observed pedestrian.

Similar to the situation with vehicles, hard constraints may also be applied with respect to relative motion between pedestrians and the host vehicle. For example, the trajectory of a pedestrian (based on a heading direction and speed) may be monitored relative to the projected trajectory of the host vehicle. Given a particular pedestrian trajectory, with every point p on the trajectory, t(p) may represent the time required for the pedestrian to reach point p. To maintain the required buffer distance of at least 1 meter from the pedestrian, either t(p) must be larger than the time the host vehicle will reach point p (with sufficient difference in time such that the host vehicle passes in front of the pedestrian by a distance of at least one meter) or that t(p) must be less than the time the host vehicle will reach point p (e.g., if the host vehicle brakes to give way to the pedestrian). Still, in the latter example, the hard constraint may require that the host vehicle arrive at point p at a sufficient time later than the pedestrian such that the host vehicle can pass behind the pedestrian and maintain the required buffer distance of at least one meter. Of course, there may be exceptions to the pedestrian hard constraint. For example, where the host vehicle has the right of way or where speeds are very slow, and there is no observed evidence that the pedestrian will decline to give way to the host vehicle or will otherwise navigate toward the host vehicle, the pedestrian hard constraint may be relaxed (e.g., to a smaller buffer of at least 0.75 meters or 0.50 meters).

In some examples, constraints may be relaxed where it is determined that not all can be met. For example, in situations where a road is too narrow to leave desired spacing (e.g., 0.5 meters) from both curbs or from a curb and a parked vehicle, one or more the constraints may be relaxed if there are mitigating circumstances. For example, if there are no pedestrians (or other objects) on the sidewalk one can proceed slowly at 0.1 meters from a curb. In some embodiments, constraints may be relaxed if doing so will improve the user experience. For example, in order to avoid a pothole, constraints may be relaxed to allow a vehicle to navigate closers to the edges of the lane, a curb, or a pedestrian more than might ordinarily be permitted. Furthermore, when determining which constrains to relax, in some embodiments, the one or more constraints chosen to relax are those deemed to have the least available negative impact to safety. For example, a constraint relating to how close the vehicle may travel to the curb or to a concrete barrier may be relaxed before relaxing one dealing with proximity to other vehicles. In some embodiments, pedestrian constraints may be the last to be relaxed, or may never be relaxed in some situations.

Figure 12:
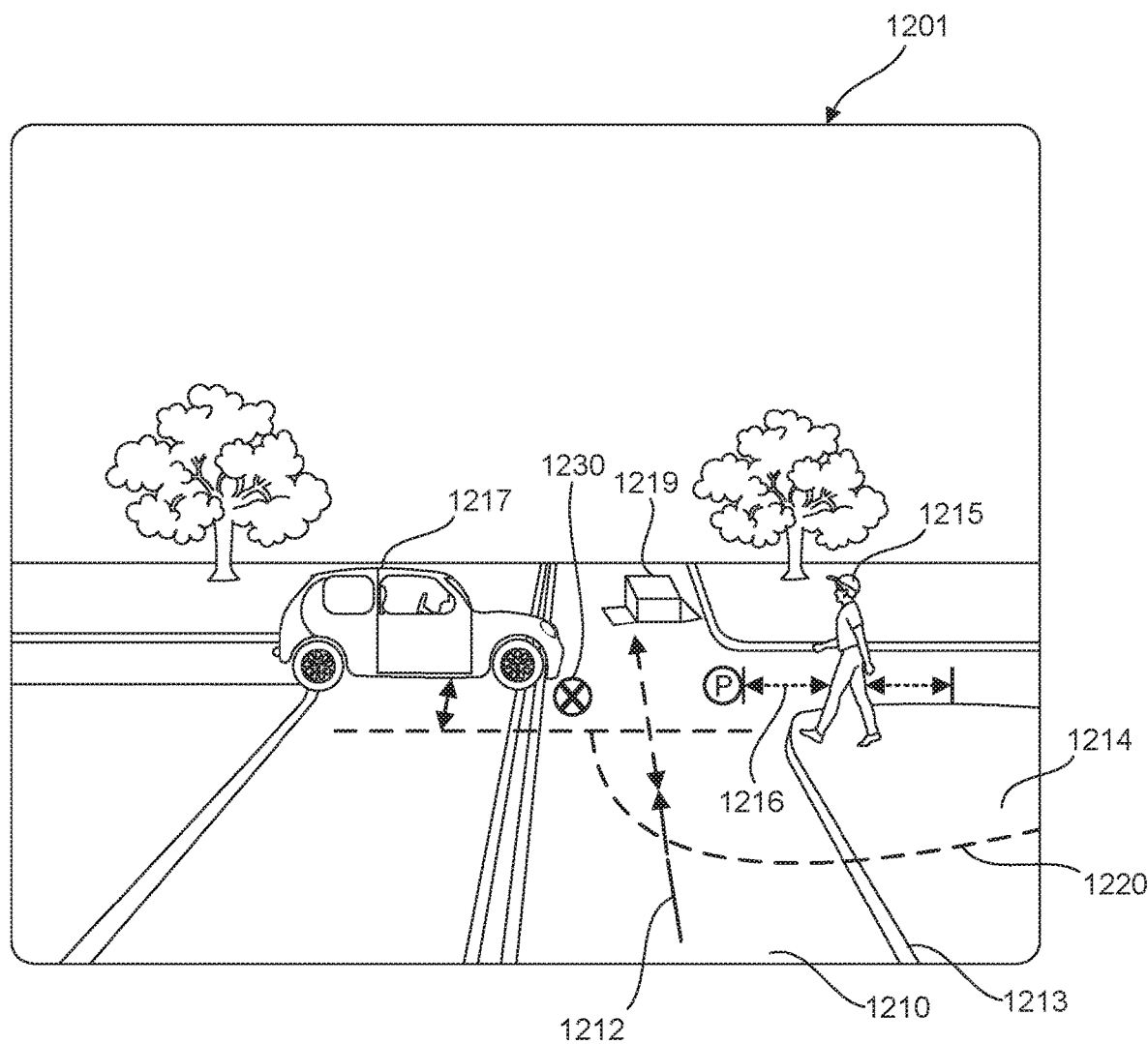
FIG. 12 provides a diagram of a representative image captured of an environment of a host vehicle, along with potential navigational constraints consistent with the disclosed embodiments.

FIG. 12 shows an example of a scene that may be captured and analyzed during navigation of a host vehicle. For example, a host vehicle may include a navigation system (e.g., system 100), as described above, that may receive from a camera (e.g., at least one of image capture device 122, image capture device 124, and image capture device 126) associated with the host vehicle a plurality of images representative of an environment of the host vehicle. The scene shown in FIG. 12 is an example of one of the images that may be captured at time t from an environment of a host vehicle traveling in lane 1210 along a predicted trajectory 1212. The navigation system may include at least one processing device (e.g., including any of the EyeQ processors or other devices described above) that are specifically programmed to receive the plurality of images and analyze the images to determine an action in response to the scene. Specifically, the at least one processing device may implement sensing module 801, driving policy module 803, and control module 805, as shown in FIG. 8. Sensing module 801 may be responsible for collecting and outputting the image information collected from the cameras and providing that information, in the form of an identified navigational state, to driving policy module 803, which may constitute a trained navigational system that has been trained through machine learning techniques, such as supervised learning, reinforcement learning, etc. Based on the navigational state information provided to driving policy module 803 by sensing module 801, driving policy module 803 (e.g., by implementing the options graph approach described above) may generate a desired navigational action for execution by the host vehicle in response to the identified navigational state.

In some embodiments, the at least one processing device may translate the desired navigation action directly into navigational commands using, for example, control module 805. In other embodiments, however, hard constraints may be applied such that the desired navigational action provided by the driving policy module 803 is tested against various predetermined navigational constraints that may be implicated by the scene and the desired navigational action. For example, where driving policy module 803 outputs a desired navigational action that would cause the host vehicle to follow trajectory 1212, this navigational action may be tested relative to one or more hard constraints associated with various aspects of the environment of the host vehicle.

For example, a captured image 1201 may reveal a curb 1213, a pedestrian 1215, a target vehicle 1217, and a stationary object (e.g., an overturned box) present in the scene. Each of these may be associated with one or more hard constraints. For example, curb 1213 may be associated with a static constraint that prohibits the host vehicle from navigating into the curb or past the curb and onto a sidewalk 1214. Curb 1213 may also be associated with a road barrier envelope that defines a distance (e.g., a buffer zone) extending away from (e.g., by 0.1 meters, 0.25 meters, 0.5 meters, 1 meter, etc.) and along the curb, which defines a no-navigate zone for the host vehicle. Of course, static constraints may be associated with other types of roadside boundaries as well (e.g., guard rails, concrete pillars, traffic cones, pylons, or any other type of roadside barrier).

It should be noted that distances and ranging may be determined by any suitable method. For example, in some embodiments, distance information may be provided by onboard radar and/or lidar systems. Alternatively or additionally, distance information may be derived from analysis of one or more images captured from the environment of the host vehicle. For example, numbers of pixels of a recognized object represented in an image may be determined and compared to known field of view and focal length geometries of the image capture devices to determine image scale and distances. Velocities and accelerations may be determined, for example, by observing changes in scale between objects from image to image over known time intervals. This analysis may indicate the direction of movement toward or away from the host vehicle along with how fast the object is pulling away from or coming toward the host vehicle. Crossing velocity may be determined through analysis of the change in an object's X coordinate position from one image to another over known time periods.

Pedestrian 1215 may be associated with a pedestrian envelope that defines a buffer zone 1216. In some cases, an imposed hard constraint may prohibit the host vehicle from navigating within a distance of 1 meter from pedestrian 1215 (in any direction relative to the pedestrian). Pedestrian 1215 may also define the location of a pedestrian influence zone 1220. Such an influence zone may be associated with a constraint that limits the speed of the host vehicle within the influence zone. The influence zone may extend 5 meters, 10 meters, 20 meters, etc., from pedestrian 1215. Each graduation of the influence zone may be associated with a different speed limit. For example, within a zone of 1 meter to five meters from pedestrian 1215, host vehicle may be limited to a first speed (e.g., 10 mph, 20 mph, etc.) that may be less than a speed limit in a pedestrian influence zone extending from 5 meters to 10 meters. Any graduation for the various stages of the influence zone may be used. In some embodiments, the first stage may be narrower than from 1 meter to five meters and may extend only from one meter to two meters. In other embodiments, the first stage of the influence zone may extend from 1 meter (the boundary of the no-navigate zone around a pedestrian) to a distance of at least 10 meters. A second stage, in turn, may extend from 10 meters to at least about 20 meters. The second stage may be associated with a maximum rate of travel for the host vehicle that is greater than the maximum rate of travel associated with the first stage of the pedestrian influence zone.

One or more stationary object constraints may also be implicated by the detected scene in the environment of the host vehicle. For example, in image 1201, the at least one processing device may detect a stationary object, such as box 1219 present in the roadway. Detected stationary objects may include various objects, such as at least one of a tree, a pole, a road sign, or an object in a roadway. One or more predefined navigational constraints may be associated with the detected stationary object. For example, such constraints may include a stationary object envelope, wherein the stationary object envelope defines a buffer zone about the object within which navigation of the host vehicle may be prohibited. At least a portion of the buffer zone may extend a predetermined distance from an edge of the detected stationary object. For example, in the scene represented by image 1201, a buffer zone of at least 0.1 meters, 0.25 meters, 0.5 meters or more may be associated with box 1219 such that the host vehicle will pass to the right or to the left of the box by at least some distance (e.g., the buffer zone distance) in order to avoid a collision with the detected stationary object.

The predefined hard constraints may also include one or more target vehicle constraints. For example, a target vehicle 1217 may be detected in image 1201. To ensure that the host vehicle does not collide with target vehicle 1217, one or more hard constraints may be employed. In some cases, a target vehicle envelope may be associated with a single buffer zone distance. For example, the buffer zone may be defined by a 1 meter distance surrounding the target vehicle in all directions. The buffer zone may define a region extending from the target vehicle by at least one meter into which the host vehicle is prohibited from navigating.

The envelope surrounding target vehicle 1217 need not be defined by a fixed buffer distance, however. In some cases the predefined hard constraints associate with target vehicles (or any other movable objects detected in the environment of the host vehicle) may depend on the orientation of the host vehicle relative to the detected target vehicle. For example, in some cases, a longitudinal buffer zone distance (e.g., one extending from the target vehicle toward the front or rear of the host vehicle—such as in the case that the host vehicle is driving toward the target vehicle) may be at least one meter. A lateral buffer zone distance (e.g., one extending from the target vehicle toward either side of the host vehicle—such as when the host vehicle is traveling in a same or opposite direction as the target vehicle such that a side of the host vehicle will pass adjacent to a side of the target vehicle) may be at least 0.5 meters.

As described above, other constraints may also be implicated by detection of a target vehicle or a pedestrian in the environment of the host vehicle. For example, the predicted trajectories of the host vehicle and target vehicle 1217 may be considered and where the two trajectories intersect (e.g., at intersection point 1230), a hard constraint may require $t_1^l > t_2^\alpha$ or $t_1^l > t_2^\alpha + 0.5$ where the host vehicle is vehicle 1, and target vehicle 1217 is vehicle 2. Similarly, the trajectory of pedestrian 1215 (based on a heading direction and speed) may be monitored relative to the projected trajectory of the host vehicle. Given a particular pedestrian trajectory, with every point p on the trajectory, t(p) will represent the time required for the pedestrian to reach point p (i.e., point 1231 in FIG. 12). To maintain the required buffer distance of at least 1 meter from the pedestrian, either t(p) must be larger than the time the host vehicle will reach point p (with sufficient difference in time such that the host vehicle passes in front of the pedestrian by a distance of at least one meter) or that t(p) must be less than the time the host vehicle will reach point p (e.g., if the host vehicle brakes to give way to the pedestrian). Still, in the latter example, the hard constraint will require that the host vehicle arrive at point p at a sufficient time later than the pedestrian such that the host vehicle can pass behind the pedestrian and maintain the required buffer distance of at least one meter.

Other hard constraints may also be employed. For example, a maximum deceleration rate of the host vehicle may be employed in at least some cases. Such a maximum deceleration rate may be determined based on a detected distance to a target vehicle following the host vehicle (e.g., using images collected from a rearward facing camera). The hard constraints may include a mandatory stop at a sensed crosswalk or a railroad crossing or other applicable constraints.

Where analysis of a scene in an environment of the host vehicle indicates that one or more predefined navigational constraints may be implicated, those constraints may be imposed relative to one or more planned navigational actions for the host vehicle. For example, where analysis of a scene results in driving policy module 803 returning a desired navigational action, that desired navigational action may be tested against one or more implicated constraints. If the desired navigational action is determined to violate any aspect of the implicated constraints (e.g., if the desired navigational action would carry the host vehicle within a distance of 0.7 meters of pedestrian 1215 where a predefined hard constraint requires that the host vehicle remain at least 1.0 meters from pedestrian 1215), then at least one modification to the desired navigational action may be made based on the one or more predefined navigational constraints. Adjusting the desired navigational action in this way may provide an actual navigational action for the host vehicle in compliance with the constraints implicated by a particular scene detected in the environment of the host vehicle.

After determination of the actual navigational action for the host vehicle, that navigational action may be implemented by causing at least one adjustment of a navigational actuator of the host vehicle in response to the determined actual navigational action for the host vehicle. Such navigational actuator may include at least one of a steering mechanism, a brake, or an accelerator of the host vehicle.

Prioritized Constraints

As described above, various hard constraints may be employed with a navigational system to ensure safe operation of a host vehicle. The constraints may include a minimum safe driving distance with respect to a pedestrian, a target vehicle, a road barrier, or a detected object, a maximum speed of travel when passing within an influence zone of a detected pedestrian, or a maximum deceleration rate for the host vehicle, among others. These constraints may be imposed with a trained system trained based on machine learning (supervised, reinforcement, or a combination), but they also may be useful with non-trained systems (e.g., those employing algorithms to directly address anticipated situations arising in scenes from a host vehicle environment).

In either case, there may be a hierarchy of constraints. In other words, some navigational constraints may have priority over other constraints. Thus, if a situation arose in which a navigational action was not available that would result in all implicated constraints being satisfied, the navigation system may determine the available navigational action that achieves the highest priority constraints first. For example, the system may cause the vehicle to avoid a pedestrian first even if navigation to avoid the pedestrian would result in a collision with another vehicle or an object detected in a road. In another example, the system may cause the vehicle to ride up on a curb to avoid a pedestrian.

Figure 13:
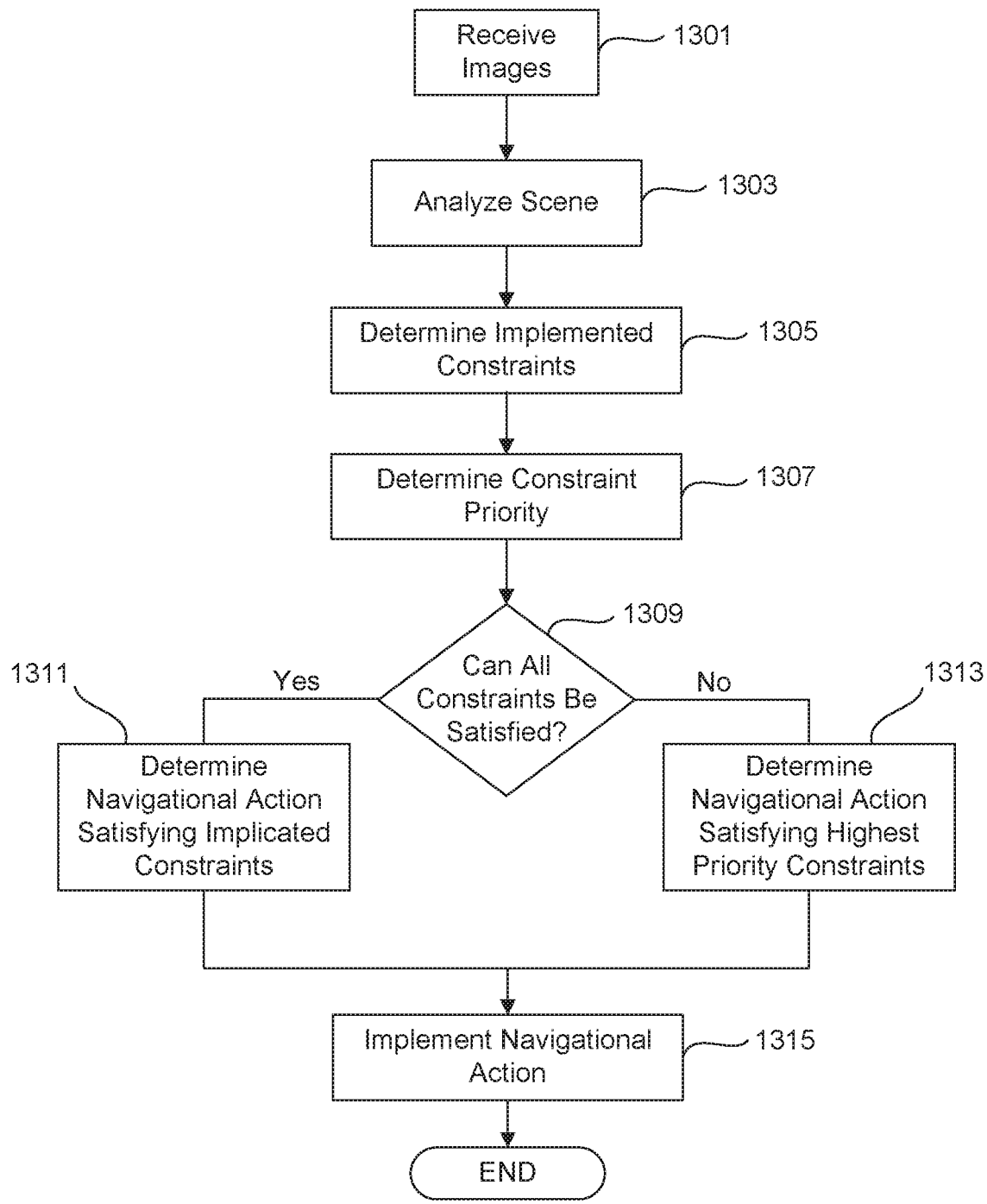
FIG. 13 provides an algorithmic flow chart for navigating a vehicle consistent with the disclosed embodiments.

FIG. 13 provides a flowchart illustrating an algorithm for implementing a hierarchy of implicated constraints determined based on analysis of a scene in an environment of a host vehicle. For example, at step 1301, at least one processing device associated with the navigational system (e.g., an EyeQ processor, etc.) may receive, from a camera mounted on the host vehicle, a plurality of images representative of an environment of the host vehicle. Through analysis of an image or images representative of the scene of the host vehicle environment at step 1303, a navigational state associated with the host vehicle may be identified. For example, a navigational state may indicate that the host vehicle is traveling along a two-lane road 1210, as in FIG. 12, that a target vehicle 1217 is moving through an intersection ahead of the host vehicle, that a pedestrian 1215 is waiting to cross the road on which the host vehicle travels, that an object 1219 is present ahead in the host vehicle lane, among various other attributes of the scene.

At step 1305, one or more navigational constraints implicated by the navigational state of the host vehicle may be determined. For example, the at least one processing device, after analyzing a scene in the environment of the host vehicle represented by one or more captured images may determine one or more navigational constraints implicated by objects, vehicles, pedestrians, etc., recognized through image analysis of the captured images. In some embodiments, the at least one processing device may determine at least a first predefined navigational constraint and a second predefined navigational constraint implicated by the navigational state, and the first predefined navigational constraint may differ from the second predefined navigational constraint. For example, the first navigational constraint may relate to one or more target vehicles detected in the environment of the host vehicle, and the second navigational constraint may relate to a pedestrian detected in the environment of the host vehicle.

At step 1307, the at least one processing device may determine a priority associated with constraints identified in step 1305. In the example described, the second predefined navigational constraint, relating to pedestrians, may have a priority higher than the first predefined navigational constraint, which relates to target vehicles. While priorities associated with navigational constraints may be determined or assigned based on various factors, in some embodiments, the priority of a navigational constraint may be related to its relative importance from a safety perspective. For example, while it may be important that all implemented navigational constraints be followed or satisfied in as many situations as possible, some constraints may be associated with greater safety risks than others and, therefore, may be assigned higher priorities. For example, a navigational constraint requiring that the host vehicle maintain at least a 1 meter spacing from a pedestrian may have a higher priority than a constraint requiring that the host vehicle maintain at least a 1 meter spacing from a target vehicle. This may be because a collision with a pedestrian may have more severe consequences than a collision with another vehicle. Similarly, maintaining a space between the host vehicle and a target vehicle may have a higher priority than a constraint requiring the host vehicle to avoid a box in the road, to drive less than a certain speed over a speed bump, or to expose the host vehicle occupants to no more than a maximum acceleration level.

While driving policy module 803 is designed to maximize safety by satisfying navigational constraints implicated by a particular scene or navigational state, in some situations it may be physically impossible to satisfy every implicated constraint. In such situations, the priority of each implicated constraint may be used to determine which of the implicated constraints should be satisfied first, as shown at step 1309. Continuing with the example above, in a situation where it is not possible satisfy both the pedestrian gap constraint and the target vehicle gap constraint, but rather only one of the constraints can be satisfied, then the higher priority of the pedestrian gap constraint may result in that constraint being satisfied before attempting to maintain a gap to the target vehicle. Thus, in normal situations, the at least one processing device may determine, based on the identified navigational state of the host vehicle, a first navigational action for the host vehicle satisfying both the first predefined navigational constraint and the second predefined navigational constraint where both the first predefined navigational constraint and the second predefined navigational constraint can be satisfied, as shown at step 1311. In other situations, however, where not all the implicated constraints can be satisfied, the at least one processing device may determine, based on the identified navigational state, a second navigational action for the host vehicle satisfying the second predefined navigational constraint (i.e., the higher priority constraint), but not satisfying the first predefined navigational constraint (having a priority lower than the second navigational constraint), where the first predefined navigational constraint and the second predefined navigational constraint cannot both be satisfied, as shown at step 1313.

Next, at step 1315, to implement the determined navigational actions for the host vehicle the at least one processing device can cause at least one adjustment of a navigational actuator of the host vehicle in response to the determined first navigational action or the determined second navigational action for the host vehicle. As in previous example, the navigational actuator may include at least one of a steering mechanism, a brake, or an accelerator.

Constraint Relaxation

As discussed above, navigational constraints may be imposed for safety purposes. The constraints may include a minimum safe driving distance with respect to a pedestrian, a target vehicle, a road barrier, or a detected object, a maximum speed of travel when passing within an influence zone of a detected pedestrian, or a maximum deceleration rate for the host vehicle, among others. These constraints may be imposed in a learning or non-learning navigational system. In certain situations, these constraints may be relaxed. For example, where the host vehicle slows or stops near a pedestrian, then progresses slowly to convey an intention to pass by the pedestrian, a response of the pedestrian can be detected from acquired images. If the response of the pedestrian is to stay still or to stop moving (and/or if eye contact with the pedestrian is sensed), it may be understood that the pedestrian recognizes an intent of the navigational system to pass by the pedestrian. In such situations, the system may relax one or more predefined constraints and implement a less stringent constraint (e.g., allow the vehicle to navigate within 0.5 meters of a pedestrian rather than within a more stringent 1 meter boundary).

Figure 14:
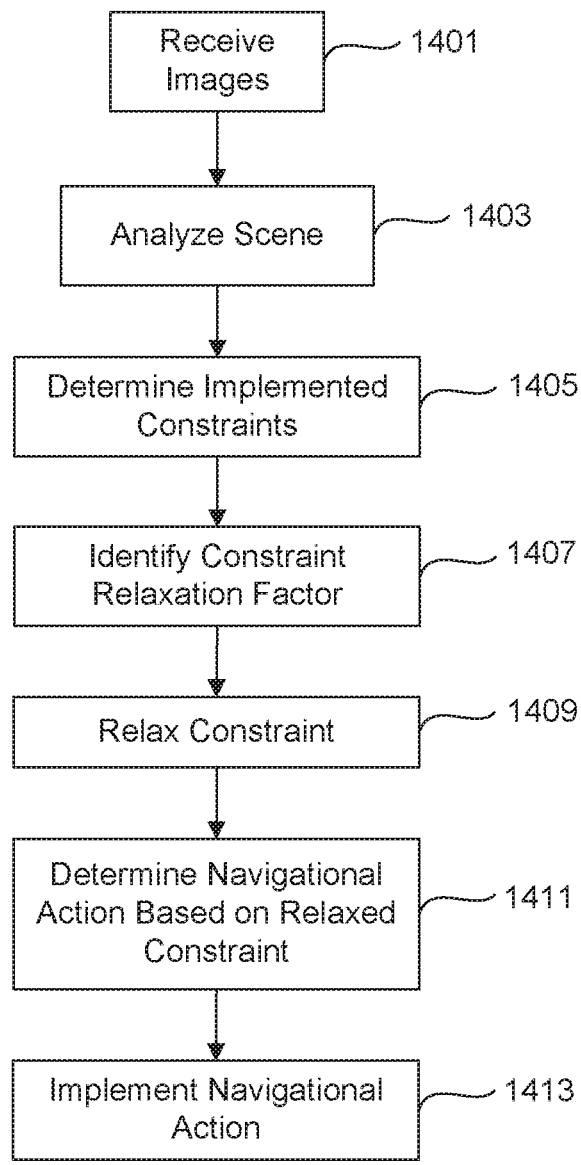
FIG. 14 provides an algorithmic flow chart for navigating a vehicle consistent with the disclosed embodiments.

FIG. 14 provides a flowchart for implementing control of the host vehicle based on relaxation of one or more navigational constraints. At step 1401, the at least one processing device may receive, from a camera associated with the host vehicle, a plurality of images representative of an environment of the host vehicle. Analysis of the images at step 1403 may enable identification of a navigational state associated with the host vehicle. At step 1405, the at least one processor may determine navigational constraints associated with the navigational state of the host vehicle. The navigational constraints may include a first predefined navigational constraint implicated by at least one aspect of the navigational state. At step 1407, analysis of the plurality of images may reveal the presence of at least one navigational constraint relaxation factor.

A navigational constraint relaxation factor may include any suitable indicator that one or more navigational constraints may be suspended, altered, or otherwise relaxed in at least one aspect. In some embodiments, the at least one navigational constraint relaxation factor may include a determination (based on image analysis) that the eyes of a pedestrian are looking in a direction of the host vehicle. In such cases, it may more safely be assumed that the pedestrian is aware of the host vehicle. As a result, a confidence level may be higher that the pedestrian will not engage in unexpected actions that cause the pedestrian to move into a path of the host vehicle. Other constraint relaxation factors may also be used. For example, the at least one navigational constraint relaxation factor may include: a pedestrian determined to be not moving (e.g., one presumed to be less likely of entering a path of the host vehicle); or a pedestrian whose motion is determined to be slowing. The navigational constraint relaxation factor may also include more complicated actions, such as a pedestrian determined to be not moving after the host vehicle has come to a stop and then resumed movement. In such a situation, the pedestrian may be assumed to understand that the host vehicle has a right of way, and the pedestrian coming to a stop may suggest an intent of the pedestrian to give way to the host vehicle. Other situations that may cause one or more constraints to be relaxed include the type of curb stone (e.g., a low curb stone or one with a gradual slope might allow a relaxed distance constraint), lack of pedestrians or other objects on sidewalk, a vehicle with its engine not running may have a relaxed distance, or a a situation in which a pedestrian is facing away and/or is moving away from the area towards which the host vehicle is heading.

Where the presence of a navigational constraint relaxation factor is identified (e.g., at step 1407), a second navigational constraint may be determined or developed in response to detection of the constraint relaxation factor. This second navigational constraint may be different from the first navigational constraint and may include at least one characteristic relaxed with respect to the first navigational constraint. The second navigational constraint may include a newly generated constraint based on the first constraint, where the newly generated constraint includes at least one modification that relaxes the first constraint in at least one respect. Alternatively, the second constraint may constitute a predetermined constraint that is less stringent than the first navigational constraint in at least one respect. In some embodiments, such second constraints may be reserved for usage only for situations where a constraint relaxation factor is identified in an environment of the host vehicle. Whether the second constraint is newly generated or selected from a set of fully or partially available predetermined constraints, application of a second navigational constraint in place of a more stringent first navigational constraint (that may be applied in the absence of detection of relevant navigational constraint relaxation factors) may be referred to as constraint relaxation and may be accomplished in step 1409.

Where at least one constraint relaxation factor is detected at step 1407, and at least one constraint has been relaxed in step 1409, a navigational action for the host vehicle may be determined at step 1411. The navigational action for the host vehicle may be based on the identified navigational state and may satisfy the second navigational constraint. The navigational action may be implemented at step 1413 by causing at least one adjustment of a navigational actuator of the host vehicle in response to the determined navigational action.

As discussed above, the usage of navigational constraints and relaxed navigational constraints may be employed with navigational systems that are trained (e.g., through machine learning) or untrained (e.g., systems programmed to respond with predetermined actions in response to specific navigational states). Where trained navigational systems are used, the availability of relaxed navigational constraints for certain navigational situations may represent a mode switching from a trained system response to an untrained system response. For example, a trained navigational network may determine an original navigational action for the host vehicle, based on the first navigational constraint. The action taken by the vehicle, however, may be one that is different from the navigational action satisfying the first navigational constraint. Rather, the action taken may satisfy the more relaxed second navigational constraint and may be an action developed by a non-trained system (e.g., as a response to detection of a particular condition in the environment of the host vehicle, such as the presence of a navigational constraint relaxation factor).

There are many examples of navigational constraints that may be relaxed in response to detection in the environment of the host vehicle of a constraint relaxation factor. For example, where a predefined navigational constraint includes a buffer zone associated with a detected pedestrian, and at least a portion of the buffer zone extends a distance from the detected pedestrian, a relaxed navigational constraint (either newly developed, called up from memory from a predetermined set, or generated as a relaxed version of a preexisting constraint) may include a different or modified buffer zone. For example, the different or modified buffer zone may have a distance relative to the pedestrian that is less than the original or unmodified buffer zone relative to the detected pedestrian. As a result, in view of the relaxed constraint, the host vehicle may be permitted to navigate closer to a detected pedestrian, where an appropriate constraint relaxation factor is detected in the environment of the host vehicle.

A relaxed characteristic of a navigational constraint may include a reduced width in a buffer zone associated with at least one pedestrian, as noted above. The relaxed characteristic, however, may also include a reduced width in a buffer zone associated with a target vehicle, a detected object, a roadside barrier, or any other object detected in the environment of the host vehicle.

The at least one relaxed characteristic may also include other types of modifications in navigational constraint characteristics. For example, the relaxed characteristic may include an increase in speed associated with at least one predefined navigational constraint. The relaxed characteristic may also include an increase in a maximum allowable deceleration/acceleration associated with at least one predefined navigational constraint.

While constraints may be relaxed in certain situations, as described above, in other situations, navigational constraints may be augmented. For example, in some situations, a navigational system may determine that conditions warrant augmentation of a normal set of navigational constraints. Such augmentation may include adding new constraints to a predefined set of constraints or adjusting one or more aspects of a predefined constraint. The addition or adjustment may result in more conservative navigation relative the predefined set of constraints applicable under normal driving conditions. Conditions that may warrant constraint augmentation may include sensor failure, adverse environmental conditions (rain, snow, fog, or other conditions associated with reduced visibility or reduced vehicle traction), etc.

Figure 15:
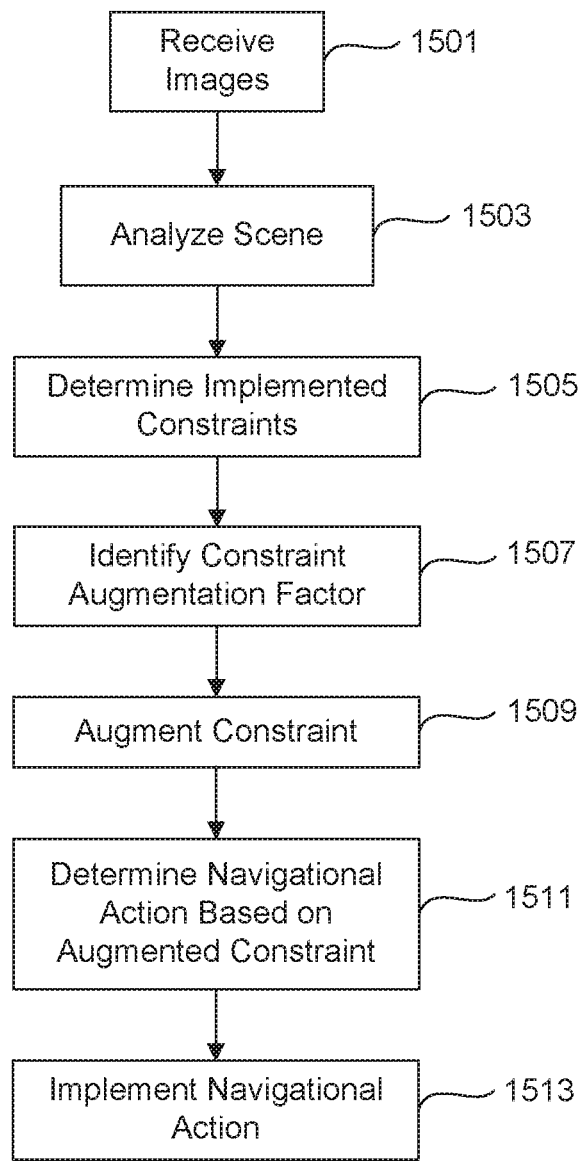
FIG. 15 provides an algorithmic flow chart for navigating a vehicle consistent with the disclosed embodiments.

FIG. 15 provides a flowchart for implementing control of the host vehicle based on augmentation of one or more navigational constraints. At step 1501, the at least one processing device may receive, from a camera associated with the host vehicle, a plurality of images representative of an environment of the host vehicle. Analysis of the images at step 1503 may enable identification of a navigational state associated with the host vehicle. At step 1505, the at least one processor may determine navigational constraints associated with the navigational state of the host vehicle. The navigational constraints may include a first predefined navigational constraint implicated by at least one aspect of the navigational state. At step 1507, analysis of the plurality of images may reveal the presence of at least one navigational constraint augmentation factor.

An implicated navigational constraint may include any of the navigational constraints discussed above (e.g., with respect to FIG. 12) or any other suitable navigational constraints. A navigational constraint augmentation factor may include any indicator that one or more navigational constraints may be supplemented/augmented in at least one aspect. Supplementation or augmentation of navigational constraints may be performed on a per set basis (e.g., by adding new navigational constraints to a predetermined set of constraints) or may be performed on a per constraint basis (e.g., modifying a particular constraint such that the modified constraint is more restrictive than the original, or adding a new constraint that corresponds to a predetermined constraint, wherein the new constraint is more restrictive than the corresponding constraint in at least one aspect). Additionally, or alternatively, supplementation or augmentation of navigational constraints may refer selection from among a set of predetermined constraints based on a hierarchy. For example, a set of augmented constraints may be available for selection based on whether a navigational augmentation factor is detected in the environment of or relative to the host vehicle. Under normal conditions where no augmentation factor is detected, then the implicated navigational constraints may be drawn from constraints applicable to normal conditions. On the other hand, where one or more constraint augmentation factors are detected, the implicated constraints may be drawn from augmented constraints either generated or predefined relative to the one or more augmentation factors. The augmented constraints may be more restrictive in at least one aspect than corresponding constraints applicable under normal conditions.

In some embodiments, the at least one navigational constraint augmentation factor may include a detection (e.g., based on image analysis) of the presence of ice, snow, or water on a surface of a road in the environment of the host vehicle. Such a determination may be based, for example, upon detection of: areas of reflectance higher than expected for dry roadways (e.g., indicative of ice or water on the roadway); white regions on the road indicating the presence of snow; shadows on the roadway consistent with the presence of longitudinal trenches (e.g., tire tracks in snow) on the roadway; water droplets or ice/snow particles on a windshield of the host vehicle; or any other suitable indicator of the presence of water or ice/snow on a surface of a road.

The at least one navigational constraint augmentation factor may also include detection of particulates on an outer surface of a windshield of the host vehicle. Such particulates may impair image quality of one or more image capture devices associated with the host vehicle. While described with respect to a windshield of the host vehicle, which is relevant for cameras mounted behind the windshield of the host vehicle, detection of particulates on other surfaces (e.g., a lens or lens cover of a camera, headlight lens, rear windshield, a tail light lens, or any other surface of the host vehicle visible to an image capture device (or detected by a sensor) associated with the host vehicle may also indicate the presence of a navigational constraint augmentation factor.

The navigational constraint augmentation factor may also be detected as an attribute of one or more image acquisition devices. For example, a detected decrease in image quality of one or more images captured by an image capture device (e.g., a camera) associated with the host vehicle may also constitute a navigational constraint augmentation factor. A decline in image quality may be associated with a hardware failure or partial hardware failure associated with the image capture device or an assembly associated with the image capture device. Such a decline in image quality may also be caused by environmental conditions. For example, the presence of smoke, fog, rain, snow, etc., in the air surrounding the host vehicle may also contribute to reduced image quality relative to the road, pedestrians, target vehicles, etc., that may be present in an environment of the host vehicle.

The navigational constraint augmentation factor may also relate to other aspects of the host vehicle. For example, in some situations, the navigational constraint augmentation factor may include a detected failure or partial failure of a system or sensor associate with the host vehicle. Such an augmentation factor may include, for example, detection of failure or partial failure of a speed sensor, GPS receiver, accelerometer, camera, radar, lidar, brakes, tires, or any other system associated with the host vehicle that may impact the ability of the host vehicle to navigate relative to navigational constraints associated with a navigational state of the host vehicle.

Where the presence of a navigational constraint augmentation factor is identified (e.g., at step 1507), a second navigational constraint may be determined or developed in response to detection of the constraint augmentation factor. This second navigational constraint may be different from the first navigational constraint and may include at least one characteristic augmented with respect to the first navigational constraint. The second navigational constraint may be more restrictive than the first navigational constraint, because detection of a constraint augmentation factor in the environment of the host vehicle or associated with the host vehicle may suggest that the host vehicle may have at least one navigational capability reduced with respect to normal operating conditions. Such reduced capabilities may include lowered road traction (e.g., ice, snow, or water on a roadway; reduced tire pressure; etc.); impaired vision (e.g., rain, snow, dust, smoke, fog etc. that reduces captured image quality); impaired detection capability (e.g., sensor failure or partial failure, reduced sensor performance, etc.), or any other reduction in capability of the host vehicle to navigate in response to a detected navigational state.

Where at least one constraint augmentation factor is detected at step 1507, and at least one constraint has been augmented in step 1509, a navigational action for the host vehicle may be determined at step 1511. The navigational action for the host vehicle may be based on the identified navigational state and may satisfy the second navigational (i.e., augmented) constraint. The navigational action may be implemented at step 1513 by causing at least one adjustment of a navigational actuator of the host vehicle in response to the determined navigational action.

As discussed, the usage of navigational constraints and augmented navigational constraints may be employed with navigational systems that are trained (e.g., through machine learning) or untrained (e.g., systems programmed to respond with predetermined actions in response to specific navigational states). Where trained navigational systems are used, the availability of augmented navigational constraints for certain navigational situations may represent a mode switching from a trained system response to an untrained system response. For example, a trained navigational network may determine an original navigational action for the host vehicle, based on the first navigational constraint. The action taken by the vehicle, however, may be one that is different from the navigational action satisfying the first navigational constraint. Rather, the action taken may satisfy the augmented second navigational constraint and may be an action developed by a non-trained system (e.g., as a response to detection of a particular condition in the environment of the host vehicle, such as the presence of a navigational constraint augmented factor).

There are many examples of navigational constraints that may be generated, supplemented, or augmented in response to detection in the environment of the host vehicle of a constraint augmentation factor. For example, where a predefined navigational constraint includes a buffer zone associated with a detected pedestrian, object, vehicle, etc., and at least a portion of the buffer zone extends a distance from the detected pedestrian/object/vehicle, an augmented navigational constraint (either newly developed, called up from memory from a predetermined set, or generated as an augmented version of a preexisting constraint) may include a different or modified buffer zone. For example, the different or modified buffer zone may have a distance relative to the pedestrian/object/vehicle that is greater than the original or unmodified buffer zone relative to the detected pedestrian/object/vehicle. As a result, in view of the augmented constraint, the host vehicle may be forced to navigate further from the detected pedestrian/object/vehicle, where an appropriate constraint augmentation factor is detected in the environment of the host vehicle or relative to the host vehicle.

The at least one augmented characteristic may also include other types of modifications in navigational constraint characteristics. For example, the augmented characteristic may include a decrease in speed associated with at least one predefined navigational constraint. The augmented characteristic may also include a decrease in a maximum allowable deceleration/acceleration associated with at least one predefined navigational constraint.

Navigation Based on Long Range Planning

In some embodiments, the disclosed navigational system can respond not only to a detected navigational state in an environment of the host vehicle, but may also determine one or more navigational actions based on long range planning. For example, the system may consider the potential impact on future navigational states of one or more navigational actions available as options for navigating with respect to a detected navigational state. Considering the effects of available actions on future states may enable the navigational system to determine navigational actions based not just upon a currently detected navigational state, but also based upon long range planning. Navigation using long range planning techniques may be especially applicable where one or more reward functions are employed by the navigation system as a technique for selecting navigational actions from among available options. Potential rewards may be analyzed with respect to the available navigational actions that may be taken in response to a detected, current navigational state of the host vehicle. Further, however, the potential rewards may also be analyzed relative to actions that may be taken in response to future navigational states projected to result from the available actions to a current navigational state. As a result, the disclosed navigational system may, in some cases, select a navigational action in response to a detected navigational state even where the selected navigational action may not yield the highest reward from among the available actions that may be taken in response to the current navigational state. This may be especially true where the system determines that the selected action may result in a future navigational state giving rise to one or more potential navigational actions offering higher rewards than the selected action or, in some cases, any of the actions available relative to a current navigational state. The principle may be expressed more simply as taking a less favorable action now in order to produce higher reward options in the future. Thus, the disclosed navigational system capable of long range planning may choose a suboptimal short term action where long term prediction indicates that a short term loss in reward may result in long term reward gains.

In general, autonomous driving applications may involve a series of planning problems, where the navigational system may decide on immediate actions in order to optimize a longer term objective. For example, when a vehicle is confronted with a merge situation at a roundabout, the navigational system may decide on an immediate acceleration or braking command in order to initiate navigation into the roundabout. While the immediate action to the detected navigational state at the roundabout may involve an acceleration or braking command responsive to the detected state, the long term objective is a successful merge, and the long term effect of the selected command is the success/failure of the merge. The planning problem may be addressed by decomposing the problem into two phases. First, supervised learning may be applied for predicting the near future based on the present (assuming the predictor will be differentiable with respect to the representation of the present). Second, a full trajectory of the agent may be modeled using a recurrent neural network, where unexplained factors are modeled as (additive) input nodes. This may allow solutions to the long-term planning problem to be determined using supervised learning techniques and direct optimization over the recurrent neural network. Such an approach may also enable the learning of robust policies by incorporating adversarial elements to the environment.

Two of the most fundamental elements of autonomous driving systems are sensing and planning. Sensing deals with finding a compact representation of the present state of the environment, while planning deals with deciding on what actions to take so as to optimize future objectives. Supervised machine learning techniques are useful for solving sensing problems. Machine learning algorithmic frameworks may also be used for the planning part, especially reinforcement learning (RL) frameworks, such as those described above.

RL may be performed in a sequence of consecutive rounds. At round t, the planner (a.k.a. the agent or driving policy module 803) may observe a state, $s_t \in S$, which represents the agent as well as the environment. It then should decide on an action $\alpha_t \in A$. After performing the action, the agent receives an immediate reward, $r_t \in \mathbb{R}$, and is moved to a new state, $s_{t+1}$. As an example, the host vehicle may include an adaptive cruise control (ACC) system, in which the vehicle should autonomously implement acceleration/braking so as to keep an adequate distance to a preceding vehicle while maintaining smooth driving. The state can be modeled as a pair, $s_t = (x_t, v_t) \in \mathbb{R}^2$, where $x_t$ is the distance to the preceding vehicle and $v_t$ is the velocity of the host vehicle relative to the velocity of the preceding vehicle. The action $\alpha_t \in \mathbb{R}$ will be the acceleration command (where the host vehicle slows down if $\alpha_t < 0$). The reward can be a function that depends on $|\alpha_t|$ (reflecting the smoothness of driving) and on $s_t$ (reflecting that the host vehicle maintains a safe distance from the preceding vehicle). The goal of the planner is to maximize the cumulative reward (maybe up to a time horizon or a discounted sum of future rewards). To do so, the planner may rely on a policy, $\pi: S \rightarrow A$, which maps a state into an action.

Supervised Learning (SL) can be viewed as a special case of RL, in which $s_t$ is sampled from some distribution over S, and the reward function may have the form $r_t = -\ell(\alpha_t, y_t)$, where $\ell$ is a loss function, and the learner observes the value of $y_t$ which is the (possibly noisy) value of the optimal action to take when viewing the state $s_t$. There may be several differences between a general RL model and a specific case of SL, and these differences can make the general RL problem more challenging.

In some SL situations, the actions (or predictions) taken by the learner may have no effect on the environment. In other words, $s_{t+1}$ and $\alpha_t$ are independent. This can have two important implications. First, in SL, a sample $(s_1, y_1), \ldots, (s_m, y_m)$ can be collected in advance, and only then can the search begin for a policy (or predictor) that will have good accuracy relative to the sample. In contrast, in RL, the state $s_{t+1}$ usually depends on the action taken (and also on the previous state), which in turn depends on the policy used to generate the action. This ties the data generation process to the policy learning process. Second, because actions do not affect the environment in SL, the contribution of the choice of $\alpha_t$ to the performance of $\pi$ is local. Specifically, $\alpha_t$ only affects the value of the immediate reward. In contrast, in RL, actions that are taken at round t might have a long-term effect on the reward values in future rounds.

In SL, the knowledge of the "correct" answer, $y_t$, together with the shape of the reward, $r_t = -\ell(\alpha_t, y_t)$ may provide full knowledge of the reward for all possible choices of $\alpha_t$, which may enable calculation of the derivative of the reward with respect to $\alpha_t$. In contrast, in RL, a "one-shot" value of the reward may be all that can be observed for a specific choice of action taken. This may be referred to as a "bandit" feedback. This is one of the most significant reasons for the need of "exploration" as a part of long term navigational planning, because in RL-based systems, if only "bandit" feedback is available, the system may not always know if the action taken was the best action to take.

Many RL algorithms rely, at least in part, on the mathematically elegant model of a Markov Decision Process (MDP). The Markovian assumption is that the distribution of $s_{t+1}$ is fully determined given $s_t$ and $\alpha_t$. This yields a closed form expression for the cumulative reward of a given policy in terms of the stationary distribution over states of the MDP. The stationary distribution of a policy can be expressed as a solution to a linear programming problem. This yields two families of algorithms: 1) optimization with respect to the primal problem, which may be referred to as policy search, and 2) optimization with respect to a dual problem, whose variables are called the value function, $V^\pi$. The value function determines the expected cumulative reward if the MDP begins from the initial state, s, and from there actions are chosen according to $\pi$. A related quantity is the state-action value function, $Q^\pi(s, \alpha)$, which determines the cumulative reward assuming a start from state, s, an immediately chosen action $\alpha$, and from there on actions chosen according to $\pi$. The Q function may give rise to a characterization of the optimal policy (using the Bellman's equation). In particular, the Q function may show that the optimal policy is a deterministic function from S to A (in fact, it may be characterized as a "greedy" policy with respect to the optimal Q function).

One potential advantage of the MDP model is that it allows coupling of the future into the present using the Q function. For example, given that a host vehicle is now in state, s, the value of $Q^\pi(s, \alpha)$ may indicate the effect of performing action a on the future. Therefore, the Q function may provide a local measure of the quality of an action a, thus making the RL problem more similar to a SL scenario.

Many RL algorithms approximate the V function or the Q function in one way or another. Value iteration algorithms, e.g., the Q learning algorithm, may rely on the fact that the V and Q functions of the optimal policy may be fixed points of some operators derived from Bellman's equation. Actor-critic policy iteration algorithms aim to learn a policy in an iterative way, where at iteration t, the "critic" estimates $Q^{\pi^t}$ and based on this estimate, the "actor" improves the policy.

Despite the mathematical elegancy of MDPs and the convenience of switching to the Q function representation, this approach may have several limitations. For example, an approximate notion of a Markovian behaving state may be all that can be found in some cases. Furthermore, the transition of states may depend not only on the agent's action, but also on actions of other players in the environment. For example, in the ACC example mentioned above, while the dynamic of the autonomous vehicle may be Markovian, the next state may depend on the behavior of the driver of the other car, which is not necessarily Markovian. One possible solution to this problem is to use partially observed MDPs, in which it is assumed that there is a Markovian state, but an observation that is distributed according to the hidden state is what can be seen.

A more direct approach may consider game theoretical generalizations of MDPs (e.g., the Stochastic Games framework). Indeed, algorithms for MDPs may be generalized to multi-agents games (e.g., minimax-Q learning or Nash-Q learning). Other approaches may include explicit modeling of the other players and vanishing regret learning algorithms. Learning in a multi-agent setting may be more complex than in a single agent setting.

A second limitation of the Q function representation may arise by departing from a tabular setting. The tabular setting is when the number of states and actions is small, and therefore, Q can be expressed as a table with |S| rows and |A| columns. However, if the natural representation of S and A includes Euclidean spaces, and the state and action spaces are discretized, the number of states/actions may be exponential in the dimension. In such cases, it may not be practical to employ a tabular setting. Instead, the Q function may be approximated by some function from a parametric hypothesis class (e.g., neural networks of a certain architecture). For example, a deep-Q-network (DQN) learning algorithm may be used. In DQN, the state space can be continuous, but the action space may remain a small discrete set. There may be approaches for dealing with continuous action spaces, but they may rely on approximating the Q function. In any case, the Q function may be complicated and sensitive to noise, and, therefore, may be challenging to learn.

A different approach may be to address the RL problem using a recurrent neural network (RNN). In some cases, RNN may be combined with the notions of multi-agents games and robustness to adversarial environments from game theory. Further, this approach may be one that does not explicitly rely on any Markovian assumption.

The following describes in more detail an approach for navigation by planning based on prediction. In this approach, it may be assumed that the state space, S, is a subset of $\mathbb{R}_d$, and the action space, A, is a subset of $\mathbb{R}^k$. This may be a natural representation in many applications. As noted above, there may be two key differences between RL and SL: (1) because past actions affect future rewards, information from the future may need to be propagated back to the past; and (2) the "bandit" nature of rewards can blur the dependence between (state, action) and reward, which can complicate the learning process.

As a first step in the approach, an observation may be made that there are interesting problems in which the bandit nature of rewards is not an issue. For example, reward value (as will be discussed in more detail below) for the ACC application may be differentiable with respect to the current state and action. In fact, even if the reward is given in a "bandit" manner, the problem of learning a differentiable function, $\hat{r}(s, \alpha)$, such that $\hat{r}(s_t, \alpha_t) \approx r_t$, may be a relatively straightforward SL problem (e.g., a one dimensional regression problem). Therefore, the first step of the approach may be to either define the reward as a function, $\hat{r}(s, \alpha)$, which is differentiable with respect to s and a, or to use a regression learning algorithm in order to learn a differentiable function, $\hat{r}$, that minimizes at least some regression loss over a sample with instance vector being $(s_t, \alpha_t) \in \mathbb{R}^d \times \mathbb{R}^k$ and target scalar being $r_t$. In some situations, in order to create a training set, elements of exploration may be used.

To address the connection between past and future, a similar idea may be used. For example, suppose a differentiable function $\hat{N}(s, \alpha)$ can be learned such that $\hat{N}(s_t, \alpha_t) \approx s_{t+1}$. Learning such a function may be characterized as an SL problem. $\hat{N}$ may be viewed as a predictor for the near future. Next, a policy that maps from S to A may be described using a parametric function $\pi_\theta: S \rightarrow A$. Expressing $\pi_\theta$ as a neural network, may enable expression of an episode of running the agent for T rounds using a recurrent neural network (RNN), where the next state is defined as $s_{t+1} = \hat{N}(s_t, \alpha_t) + v_t$. Here, $v_t \in \mathbb{R}$ may be defined by the environment and may express unpredictable aspects of the near future. The fact that $s_{t+1}$ depends on $s_t$ and $\alpha_t$ in a differentiable manner may enable a connection between future reward values and past actions. A parameter vector of the policy function, $\pi_\theta$, may be learned by back-propagation over the resulting RNN. Note that explicit probabilistic assumptions need not be imposed on $v_t$. In particular, there need not be a requirement for a Markovian relation. Instead, the recurrent network may be relied upon to propagate "enough" information between past and future. Intuitively, $\hat{N}(s_t, \alpha_t)$ may describe the predictable part of the near future, while $v_t$ may express the unpredictable aspects, which may arise due to the behavior of other players in the environment. The learning system should learn a policy that will be robust to the behavior of other players. If $\|v_t\|$ is large, the connection between past actions and future reward values may be too noisy for learning a meaningful policy. Explicitly expressing the dynamic of the system in a transparent way may enable incorporation of prior knowledge more easily. For example, prior knowledge may simplify the problem of defining $\hat{N}$.

As discussed above, the learning system may benefit from robustness relative to an adversarial environment, such as the environment of a host vehicle, which may include multiple other drivers that may act in unexpected way. In a model that does not impose probabilistic assumptions on $v_t$, environments may be considered in which $v_t$ is chosen in an adversarial manner. In some cases, restrictions may be placed on $\mu_t$, otherwise the adversary can make the planning problem difficult or even impossible. One natural restriction may be to require that $\|\mu_t\|$ is bounded by a constant.

Robustness against adversarial environments may be useful in autonomous driving applications. Choosing $\mu_t$ in an adversarial way may even speed up the learning process, as it can focus the learning system toward a robust optimal policy. A simple game may be used to illustrate this concept. The state is $s_t \in \mathbb{R}$ the action is $\alpha_t \in \mathbb{R}$, and the immediate loss function is $0.1|\alpha_t|+[|s_t|-2]_+$, where $[x]_+ = \max\{x, 0\}$ is the ReLU (rectified linear unit) function. The next state is $s_{t+1} = s_t + \alpha_t + v_t$, where $v_t \in [-0.5, 0.5]$ is chosen for the environment in an adversarial manner. Here, the optimal policy may be written as a two layer network with ReLU: $\alpha_t = -[s_t - 1.5]_+ + [-s_t - 1.5]_+$. Observe that when $|s_t| \in (1.5, 2]$, the optimal action may have a larger immediate loss than the action $\alpha = 0$. Therefore, the system may plan for the future and may not rely solely on the immediate loss. Observe that the derivative of the loss with respect to $\alpha_t$ is $0.1 \operatorname{sign}(\alpha_t)$, and the derivative with respect to $s_t$ is $1[|s_t|>2]\operatorname{sign}(s_t)$. In a situation in which $s_t \in (1.5, 2]$, the adversarial choice of $v_t$ would be to set $v_t = 0.5$ and, therefore, there may be a non-zero loss on round $t+1$, whenever $\alpha_t > 1.5 - s_t$. In such cases, the derivative of the loss may back-propagate directly to $\alpha_t$. Thus, the adversarial choice of $v_t$ may help the navigational system obtain a non-zero back-propagation message in cases for which the choice of $\alpha_t$ is sub-optimal. Such a relationship may aid the navigational system in selecting present actions based on an expectation that such a present action (even if that action would result in a suboptimal reward or even a loss) will provide opportunities in the future for more optimal actions that result in higher rewards.

Such an approach may be applied to virtually any navigational situation that may arise. The following describes the approach applied to one example: adaptive cruise control (ACC). In the ACC problem, the host vehicle may attempt to maintain an adequate distance to a target vehicle ahead (e.g., 1.5 seconds to the target car). Another goal may be to drive as smooth as possible while maintaining the desired gap. A model representing this situation may be defined as follows. The state space is $\mathbb{R}^3$, and the action space is $\mathbb{R}$. The first coordinate of the state is the speed of the target car, the second coordinate is the speed of the host vehicle, and the last coordinate is the distance between the host vehicle and target vehicle (e.g., location of the host vehicle minus the location of the target along the road curve). The action to be taken by the host vehicle is the acceleration, and may be denoted by $a_t$. The quantity $\tau$ may denote the difference in time between consecutive rounds. While $\tau$ may be set to any suitable quantity, in one example, $\tau$ may be 0.1 seconds. Position, $S_t$, may be denoted as $S_t = (V_t^{target}, V_t^{host}, X_t)$, and the (unknown) acceleration of the target vehicle may be denoted as $\alpha_t^{target}$.

The full dynamics of the system can be described by:

$$V_t^{target} = [V_{t-1}^{target} + \tau \alpha_{t-1}^{target}]_+$$

$$V_t^{host} = [V_{t-1}^{host} + \tau a_{t-1}]_+$$

$$X_t = [X_{t-1} + \tau(V_{t-1}^{target} - V_{t-1}^{host})]_+$$

This can be described as a sum of two vectors:

$$s_t = ([s_{t-1}[0] + \tau a_{t-1}^{target}]_+, [s_{t-1}[1] + \tau a_{t-1}]_+,$$

$$[s_{t-1}[2] + \tau(s_{t-1}[0] - s_{t-1}[1])]_+)$$

-continued $$= \frac{([s_{t-1}[0] \cdot [s_{t-1}[1] + \tau a_{t-1}]_+, [s_{t-1}[2] + \tau(s_{t-1}[0] - s_{t-1}[1])]_+) +}{\bar{N}(s_{t-1}, a_t)}$$

$$\frac{([s_{t-1}[0] + \tau a_{t-1}^{target}]_+, [s_{t-1}[0], 0, 0)}{v_t}$$

The first vector is the predictable part, and the second vector is the unpredictable part. The reward on round t is defined as follows:

$$-r_t = 0.1|\alpha_t| + [|x_t/x_t^*-1|-0.3]_+ \text{ where } x_t^* = \max\{1, 1.5 v_t^{host}\}$$

The first term may result in a penalty for non-zero accelerations, thus encouraging smooth driving. The second term depends on the ratio between the distance to the target car, $x_t$, and the desired distance, $x_t^*$, which is defined as the maximum between a distance of 1 meter and break distance of 1.5 seconds. In some cases, this ratio may be exactly 1, but as long as this ratio is within [0.7, 1.3], the policy may forego any penalties, which may allow the host vehicle some slack in navigation—a characteristic that may be important in achieving a smooth drive.

Implementing the approach outlined above, the navigation system of the host vehicle (e.g., through operation of driving policy module 803 within processing unit 110 of the navigation system) may select an action in response to an observed state. The selected action may be based on analysis not only of rewards associated with the responsive actions available relative to a sensed navigational state, but may also be based on consideration and analysis of future states, potential actions in response to the futures states, and rewards associated with the potential actions.

Figure 16:
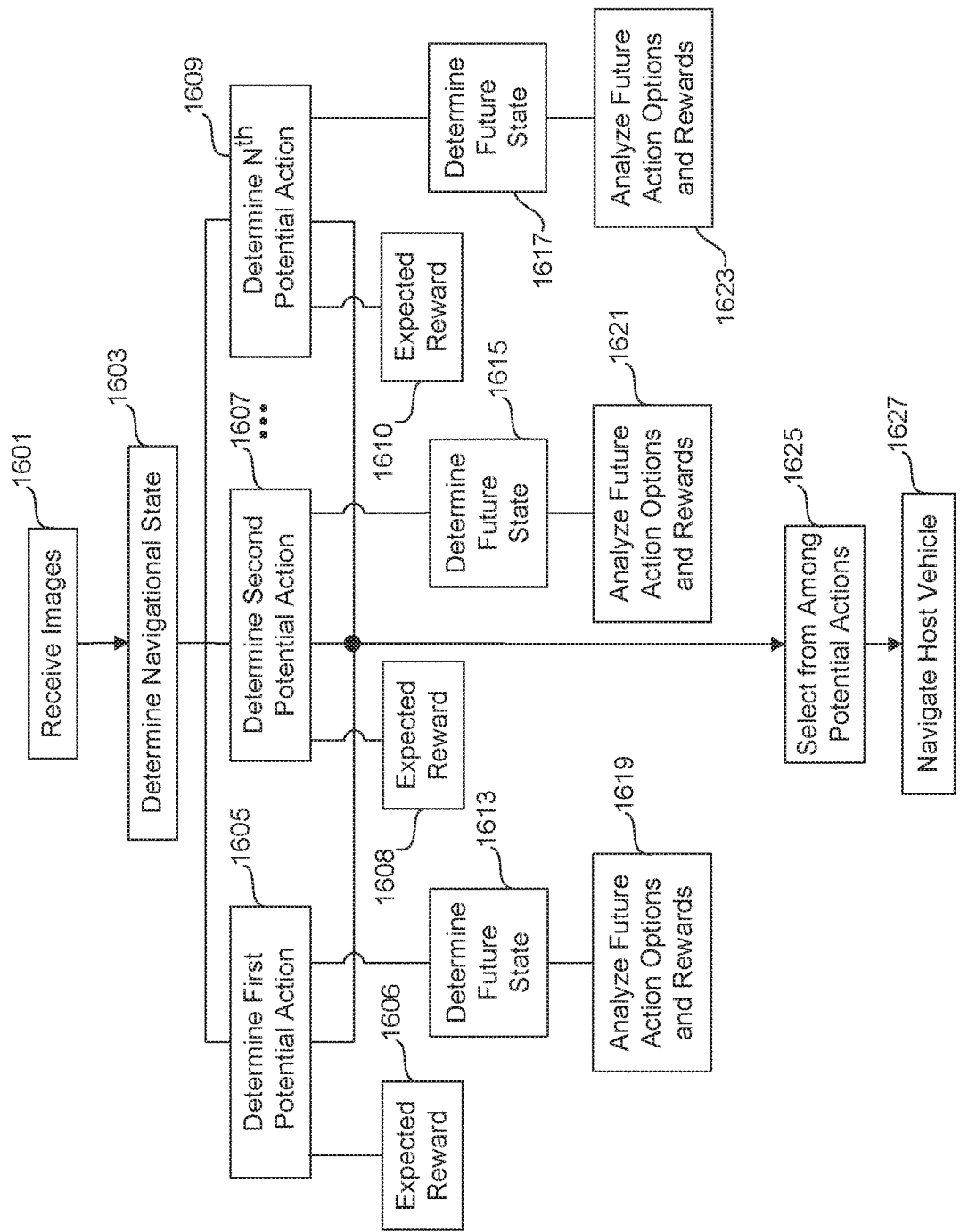
FIG. 16 provides an algorithmic flow chart for navigating a vehicle consistent with the disclosed embodiments.

FIG. 16 illustrates an algorithmic approach to navigation based on detection and long range planning. For example, at step 1601, the at least one processing device 110 of the navigation system for the host vehicle may receive a plurality of images. These images may capture scenes representative of an environment of the host vehicle and may be supplied by any of the image capture devices (e.g., cameras, sensors, etc.) described above. Analysis of one or more of these images at step 1603 may enable the at least one processing device 110 to identify a present navigational state associated with the host vehicle (as described above).

At steps 1605, 1607, and 1609, various potential navigational actions responsive to the sensed navigational state may be determined. These potential navigational actions (e.g., a first navigational action through an $N^{th}$ available navigational action) may be determined based on the sensed state and the long range goals of the navigational system (e.g., to complete a merge, follow a lead vehicle smoothly, pass a target vehicle, avoid an object in the roadway, slow for a detected stop sign, avoid a target vehicle cutting in, or any other navigational action that may advance the navigational goals of the system).

For each of the determined potential navigational actions, the system may determine an expected reward. The expected reward may be determined according to any of the techniques described above and may include analysis of a particular potential action relative to one or more reward functions. Expected rewards 1606, 1608, and 1610 may be determined for each of the potential navigational actions (e.g., the first, second, and $N^{th}$) determined in steps 1605, 1607, and 1609, respectively.

In some cases, the navigational system of the host vehicle may select from among the available potential actions based on values associated with expected rewards 1606, 1608, and 1610 (or any other type of indicator of an expected reward). For example, in some situations, the action that yields the highest expected reward may be selected.

In other cases, especially where the navigation system engages in long range planning to determine navigational actions for the host vehicle, the system may not choose the potential action that yields the highest expected reward. Rather, the system may look to the future to analyze whether there may be opportunities for realizing higher rewards later if lower reward actions are selected in response to a current navigational state. For example, for any or all of the potential actions determined at steps 1605, 1607, and 1609, a future state may be determined. Each future state, determined at steps 1613, 1615, and 1617, may represent a future navigational state expected to result based on the current navigational state as modified by a respective potential action (e.g., the potential actions determined at steps 1605, 1607, and 1609).

For each of the future states predicted at steps 1613, 1615, and 1617, one or more future actions (as navigational options available in response to determined future state) may be determined and evaluated. At steps 1619, 1621, and 1623, for example, values or any other type of indicator of expected rewards associated with one or more of the future actions may be developed (e.g., based on one or more reward functions). The expected rewards associated with the one or more future actions may be evaluated by comparing values of reward functions associated with each future action or by comparing any other indicators associated with the expected rewards.

At step 1625, the navigational system for the host vehicle may select a navigational action for the host vehicle based on a comparison of expected rewards, not just based on the potential actions identified relative to a current navigational state (e.g., at steps 1605, 1607, and 1609), but also based on expected rewards determined as a result of potential future actions available in response to predicted future states (e.g., determined at steps 1613, 1615, and 1617). The selection at step 1625 may be based on the options and rewards analysis performed at steps 1619, 1621, and 1623.

The selection of a navigational action at step 1625 may be based on a comparison of expected rewards associated with future action options only. In such a case, the navigational system may select an action to the current state based solely on a comparison of expected rewards resulting from actions to potential future navigational states. For example, the system may select the potential action identified at step 1605, 1607, or 1609 that is associated with a highest future reward value as determined through analysis at steps 1619, 1621, and 1623.

The selection of a navigational action at step 1625 may also be based on comparison of current action options only (as noted above). In this situation, the navigational system may select the potential action identified at step 1605, 1607, or 1609 that is associated with a highest expected reward, 1606, 1608, or 1610. Such a selection may be performed with little or no consideration of future navigational states or future expected rewards to navigational actions available in response to expected future navigational states.

On the other hand, in some cases, the selection of a navigational action at step 1625 may be based on a comparison of expected rewards associated with both future action options and with current action options. This, in fact, may be one of the principles of navigation based on long range planning. For example, expected rewards to future actions may be analyzed to determine if any may warrant a selection of a lower reward action in response to the current navigational state in order to achieve a potential higher reward in response to a subsequent navigational action expected to be available in response to future navigational states. As an example, a value or other indicator of an expected reward 1606 may indicate a highest expected reward from among rewards 1606, 1608, and 1610. On the other hand, expected reward 1608 may indicate a lowest expected reward from among rewards 1606, 1608, and 1610. Rather than simply selecting the potential action determined at step 1605 (i.e., the action giving rise to the highest expected reward 1606), analysis of future states, potential future actions, and future rewards may be used in making a navigational action selection at step 1625. In one example, it may be determined that a reward identified at step 1621 (in response to at least one future action to a future state determined at step 1615 based on the second potential action determined at step 1607) may be higher than expected reward 1606. Based on this comparison, the second potential action determined at step 1607 may be selected rather than the first potential action determined at step 1605 despite expected reward 1606 being higher than expected reward 1608. In one example, the potential navigational action determined at step 1605 may include a merge in front of a detected target vehicle, while the potential navigational action determined at step 1607 may include a merge behind the target vehicle. While the expected reward 1606 of merging in front of the target vehicle may be higher than the expected reward 1608 associated with merging behind the target vehicle, it may be determined that merging behind the target vehicle may result in a future state for which there may be action options yielding even higher potential rewards than expected reward 1606, 1608, or other rewards based on available actions in response to a current, sensed navigational state.

Selection from among potential actions at step 1625 may be based on any suitable comparison of expected rewards (or any other metric or indicator of benefits associated with one potential action over another). In some cases, as described above, a second potential action may be selected over a first potential action if the second potential action is projected to provide at least one future action associated with an expected reward higher than a reward associated with the first potential action. In other cases, more complex comparisons may be employed. For example, rewards associated with action options in response to projected future states may be compared to more than one expected reward associated with a determined potential action.

In some scenarios, actions and expected rewards based on projected future states may affect selection of a potential action to a current state if at least one of the future actions is expected to yield a reward higher than any of the rewards expected as a result of the potential actions to a current state (e.g., expected rewards 1606, 1608, 1610, etc.). In some cases, the future action option that yields the highest expected reward (e.g., from among the expected rewards associated with potential actions to a sensed current state as well as from among expected rewards associated with potential future action options relative to potential future navigational states) may be used as a guide for selection of a potential action to a current navigational state. That is, after identifying a future action option yielding the highest expected reward (or a reward above a predetermined threshold, etc.), the potential action that would lead to the future state associated with the identified future action yielding the highest expected reward may be selected at step 1625.

In other cases, selection of available actions may be made based on determined differences between expected rewards. For example, a second potential action determined at step 1607 may be selected if a difference between an expected reward associated with a future action determined at step 1621 and expected reward 1606 is greater than a difference between expected reward 1608 and expected reward 1606 (assuming + sign differences). In another example, a second potential action determined at step 1607 may be selected if a difference between an expected reward associated with a future action determined at step 1621 and an expected reward associated with a future action determined at step 1619 is greater than a difference between expected reward 1608 and expected reward 1606.

Several examples have been described for selecting from among potential actions to a current navigational state. Any other suitable comparison technique or criteria, however, may be used for selecting an available action through long range planning based on action and reward analysis extending to projected future states. Additionally, while FIG. 16 represents two layers in the long range planning analysis (e.g., a first layer considering the rewards resulting from potential actions to a current state, and a second layer considering the rewards resulting from future action options in response to projected future states), analysis based on more layers may be possible. For example, rather than basing the long range planning analysis upon one or two layers, three, four or more layers of analysis could be used in selecting from among available potential actions in response to a current navigational state.

After a selection is made from among potential actions in response to a sensed navigational state, at step 1627, the at least one processor may cause at least one adjustment of a navigational actuator of the host vehicle in response to the selected potential navigational action. The navigational actuator may include any suitable device for controlling at least one aspect of the host vehicle. For example, the navigational actuator may include at least one of a steering mechanism, a brake, or an accelerator.

Navigation Based on Inferred Aggression of Others

Target vehicles may be monitored through analysis of an acquired image stream to determine indicators of driving aggression. Aggression is described herein as a qualitative or quantitative parameter, but other characteristics may be used: perceived level of attention (potential impairment of driver, distracted—cell phone, asleep, etc.). In some cases, a target vehicle may be deemed to have a defensive posture, and in some cases, the target vehicle may be determined to have a more aggressive posture. Navigational actions may be selected or developed based on indicators of aggression. For example, in some cases, the relative velocity, relative acceleration, increases in relative acceleration, following distance, etc., relative to a host vehicle may be tracked to determine if the target vehicle is aggressive or defensive. If the target vehicle is determined to have a level of aggression exceeding a threshold, for example, the host vehicle may be inclined to give way to the target vehicle. A level of aggression of the target vehicle may also be discerned based on a determined behavior of the target vehicle relative to one or more obstacles in a path of or in a vicinity of the target vehicle (e.g., a leading vehicle, obstacle in the road, traffic light, etc.).

As an introduction to this concept, an example experiment will be described with respect to a merger of the host vehicle into a roundabout, in which a navigational goal is to pass through and out of the roundabout. The situation may begin with the host vehicle approaches an entrance of the roundabout and may end with the host vehicle reaches an exit of the roundabout (e.g., the second exit). Success may be measured based on whether the host vehicle maintains a safe distance from all other vehicles at all times, whether the host vehicle finishes the route as quickly as possible, and whether the host vehicle adheres to a smooth acceleration policy. In this illustration, $N_T$ target vehicles may be placed at random on the roundabout. To model a blend of adversarial and typical behavior, with probability p, a target vehicle may be modeled by an "aggressive" driving policy, such that the aggressive target vehicle accelerates when the host vehicle attempts to merge in front of the target vehicle. With probability 1-p, the target vehicle may be modeled by a "defensive" driving policy, such that the target vehicle decelerates and lets the host vehicle merge in. In this experiment, p=0.5, and the navigation system of the host vehicle may be provided with no information about the type of the other drivers. The types of other drivers may be chosen at random at the beginning of the episode.

The navigational state may be represented as the velocity and location of the host vehicle (the agent), and the locations, velocities, and accelerations of the target vehicles. Maintaining target acceleration observations may be important in order to differentiate between aggressive and defensive drivers based on the current state. All target vehicles may move on a one-dimensional curve that outlines the roundabout path. The host vehicle may move on its own one-dimensional curve, which intersects the target vehicles' curve at the merging point, and this point is the origin of both curves. To model reasonable driving, the absolute value of all vehicles' accelerations may be upper bounded by a constant. Velocities may also be passed through a ReLU because driving backward is not allowed. Note that by not allowing driving backwards, long-term planning may become a necessity, as the agent cannot regret on its past actions.

Figure 17A:
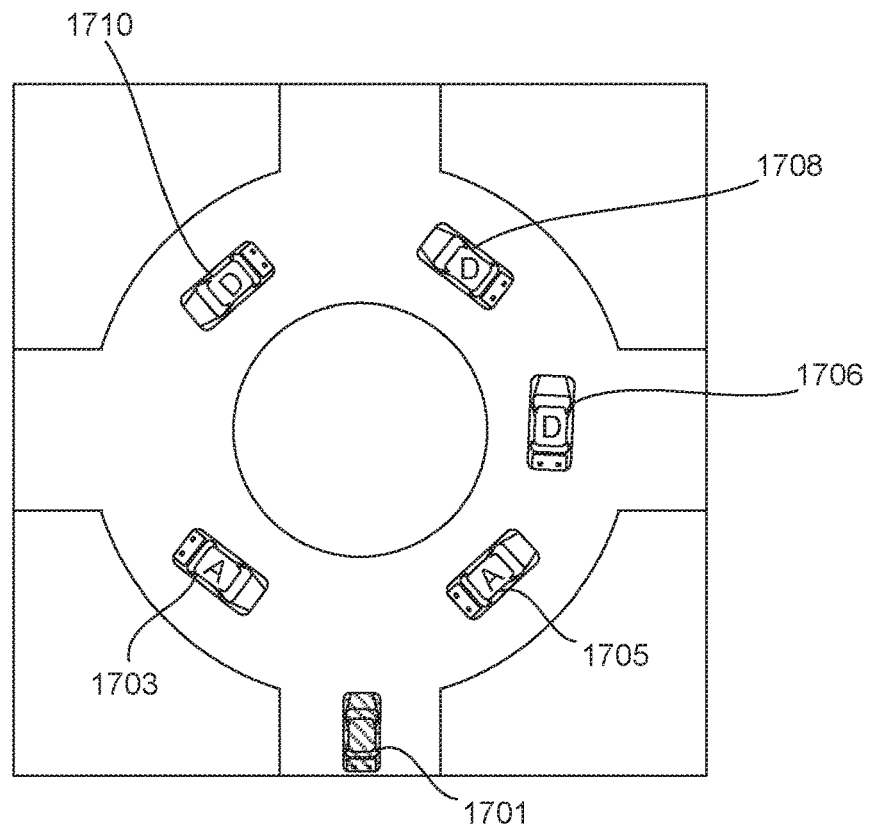
FIGS. 17A and 17B provide a diagrammatic illustration of a host vehicle navigating into a roundabout consistent with the disclosed embodiments.
Figure 17B:
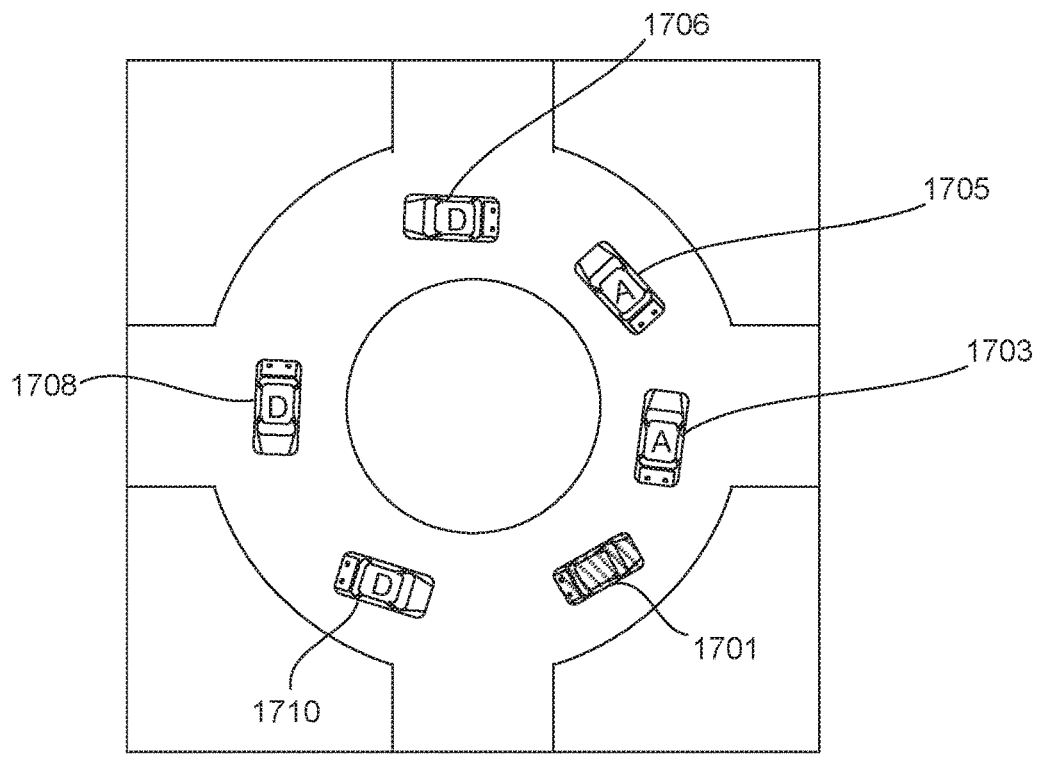

As described above, the next state, $s_{t+1}$, may be decomposed into a sum of a predictable part, $\hat{N}(s_{t+1}, \alpha_t)$, and a non-predictable part, $v_t$. The expression, $\hat{N}(s_t, \alpha_t)$, may represent the dynamics of vehicle locations and velocities (which may be well-defined in a differentiable manner), while $v_t$ may represent the target vehicles' acceleration. It may be verified that $\hat{N}(s_t, \alpha_t)$ can be expressed as a combination of ReLU functions over an affine transformation, hence it is differentiable with respect to $s_t$ and $\alpha_t$. The vector $v_t$ may be defined by a simulator in a non-differentiable manner, and may implement aggressive behavior for some targets and defensive behavior for other targets. Two frames from such a simulator are shown in FIGS. 17A and 17B. In this example experiment, a host vehicle 1701 learned to slowdown as it approached the entrance of the roundabout. It also learned to give way to aggressive vehicles (e.g., vehicles 1703 and 1705), and to safely continue when merging in front of defensive vehicles (e.g., vehicles 1706, 1708, and 1710). In the example represented by FIGS. 17A and 17B, the navigation system of host vehicle 1701 is not provided with the type of target vehicles. Rather, whether a particular vehicle is determined to be aggressive or defensive is determined through inference based on observed position and acceleration, for example, of the target vehicles. In FIG. 17A, based on position, velocity, and/or relative acceleration, host vehicle 1701 may determine that vehicle 1703 has an aggressive tendency and, therefore, host vehicle 1701 may stop and wait for target vehicle 1703 to pass rather than attempting to merge in front of target vehicle 1703. In FIG. 17B, however, target vehicle 1701 recognized that the target vehicle 1710 traveling behind vehicle 1703 exhibited defensive tendencies (again, based on observed position, velocity, and/or relative acceleration of vehicle 1710) and, therefore, completed a successful merge in front of target vehicle 1710 and behind target vehicle 1703.

Figure 18:
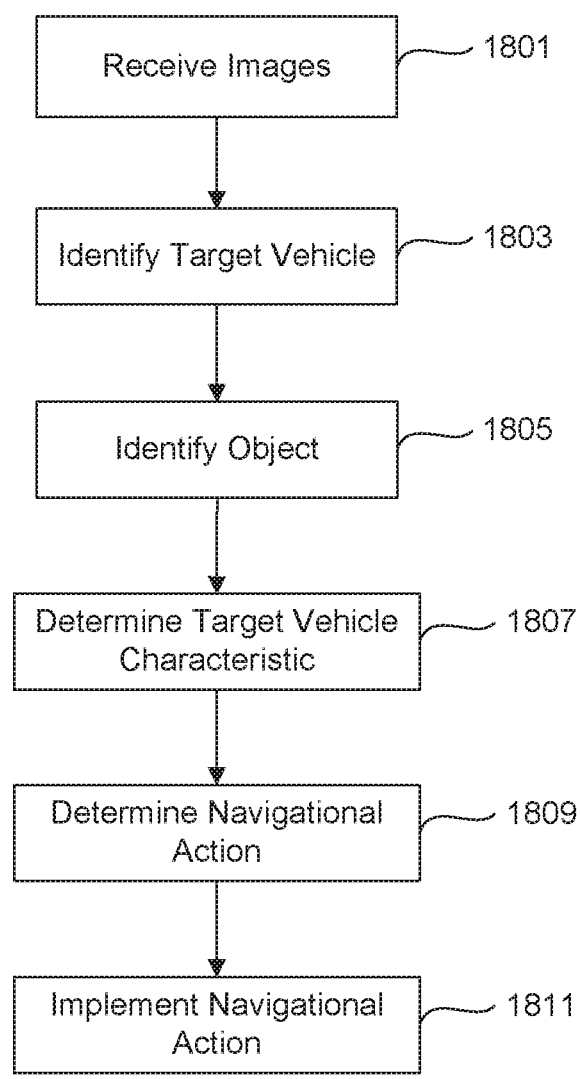
FIG. 18 provides an algorithmic flow chart for navigating a vehicle consistent with the disclosed embodiments.

FIG. 18 provides a flowchart representing an example algorithm for navigating a host vehicle based on predicted aggression of other vehicles. In the example of FIG. 18, a level of aggression associated with at least one target vehicle may be inferred based on observed behavior of the target vehicle relative to an object in the environment of the target vehicle. For example, at step 1801, at least one processing device (e.g., processing device 110) of the host vehicle navigation system may receive, from a camera associated with the host vehicle, a plurality of images representative of an environment of the host vehicle. At step 1803, analysis of one or more of the received images may enable the at least one processor to identify a target vehicle (e.g., vehicle 1703) in the environment of the host vehicle 1701. At step 1805, analysis of one or more of the received images may enable the at least one processing device to identify in the environment of the host vehicle at least one obstacle to the target vehicle. The object may include debris in a roadway, a stoplight/traffic light, a pedestrian, another vehicle (e.g., a vehicle traveling ahead of the target vehicle, a parked vehicle, etc.), a box in the roadway, a road barrier, a curb, or any other type of object that may be encountered in an environment of the host vehicle. At step 1807, analysis of one or more of the received images may enable the at least one processing device to determine at least one navigational characteristic of the target vehicle relative to the at least one identified obstacle to the target vehicle.

Various navigational characteristics may be used to infer a level of aggression of a detected target vehicle in order to develop an appropriate navigational response to the target vehicle. For example, such navigational characteristics may include a relative acceleration between the target vehicle and the at least one identified obstacle, a distance of the target vehicle from the obstacle (e.g., a following distance of the target vehicle behind another vehicle), and/or a relative velocity between the target vehicle and the obstacle, etc.

In some embodiments, the navigational characteristics of the target vehicles may be determined based on outputs from sensors associated with the host vehicle (e.g., radar, speed sensors, GPS, etc.). In some cases, however, the navigational characteristics of the target vehicles may be determined partially or fully based on analysis of images of an environment of the host vehicle. For example, image analysis techniques described above and in, for example, U.S. Pat. No. 9,168,868, which is incorporated herein by reference, may be used to recognize target vehicles within an environment of the host vehicle. And, monitoring a location of a target vehicle in the captured images over time and/or monitoring locations in the captured images of one or more features associated with the target vehicle (e.g., tail lights, head lights, bumper, wheels, etc.) may enable a determination of relative distances, velocities, and/or accelerations between the target vehicles and the host vehicle or between the target vehicles and one or more other objects in an environment of the host vehicle.

An aggression level of an identified target vehicle may be inferred from any suitable observed navigational characteristic of the target vehicle or any combination of observed navigational characteristics. For example, a determination of aggressiveness may be made based on any observed characteristic and one or more predetermined threshold levels or any other suitable qualitative or quantitative analysis. In some embodiments, a target vehicle may be deemed as aggressive if the target vehicle is observed to be following the host vehicle or another vehicle at a distance less than a predetermined aggressive distance threshold. On the other hand, a target vehicle observed to be following the host vehicle or another vehicle at a distance greater than a predetermined defensive distance threshold may be deemed defensive. The predetermined aggressive distance threshold need not be the same as the predetermined defensive distance threshold. Additionally, either or both of the predetermined aggressive distance threshold and the predetermined defensive distance threshold may include a range of values, rather than a bright line value. Further, neither of the predetermined aggressive distance threshold nor the predetermined defensive distance threshold must be fixed. Rather these values, or ranges of values, may shift over time, and different thresholds/ranges of threshold values may be applied based on observed characteristics of a target vehicle. For example, the thresholds applied may depend on one or more other characteristics of the target vehicle. Higher observed relative velocities and/or accelerations may warrant application of larger threshold values/ranges. Conversely, lower relative velocities and/or accelerations, including zero relative velocities and/or accelerations, may warrant application of smaller distance threshold values/ranges in making the aggressive/defensive inference.

The aggressive/defensive inference may also be based on relative velocity and/or relative acceleration thresholds. A target vehicle may be deemed aggressive if its observed relative velocity and/or its relative acceleration with respect to another vehicle exceeds a predetermined level or range. A target vehicle may be deemed defensive if its observed relative velocity and/or its relative acceleration with respect to another vehicle falls below a predetermined level or range.

While the aggressive/defensive determination may be made based on any observed navigational characteristic alone, the determination may also depend on any combination of observed characteristics. For example, as noted above, in some cases, a target vehicle may be deemed aggressive based solely on an observation that it is following another vehicle at a distance below a certain threshold or range. In other cases, however, the target vehicle may be deemed aggressive if it both follows another vehicle at less than a predetermined amount (which may be the same as or different than the threshold applied where the determination is based on distance alone) and has a relative velocity and/or a relative acceleration of greater than a predetermined amount or range. Similarly, a target vehicle may be deemed defensive based solely on an observation that it is following another vehicle at a distance greater than a certain threshold or range. In other cases, however, the target vehicle may be deemed defensive if it both follows another vehicle at greater than a predetermined amount (which may be the same as or different than the threshold applied where the determination is based on distance alone) and has a relative velocity and/or a relative acceleration of less than a predetermined amount or range. System 100 may make an aggressive/defensive if, for example, a vehicle exceeds 0.5 G acceleration or deceleration (e.g., jerk 5 m/s3), a vehicle has a lateral acceleration of 0.5 G in a lane change or on a curve, a vehicle causes another vehicle to do any of the above, a vehicle changes lanes and causes another vehicle to give way by more than 0.3 G deceleration or jerk of 3 m/s3, and/or a vehicle changes two lanes without stopping.

It should be understood that references to a quantity exceeding a range may indicate that the quantity either exceeds all values associated with the range or falls within the range. Similarly, references to a quantity falling below a range may indicate that the quantity either falls below all values associated with the range or falls within the range. Additionally, while the examples described for making an aggressive/defensive inference are described with respect to distance, relative acceleration, and relative velocity, any other suitable quantities may be used. For example, a time to collision may calculation may be used or any indirect indicator of distance, acceleration, and/or velocity of the target vehicle. It should also be noted that while the examples above focus on target vehicles relative to other vehicles, the aggressive/defensive inference may be made by observing the navigational characteristics of a target vehicle relative to any other type of obstacle (e.g., a pedestrian, road barrier, traffic light, debris, etc.).

Returning to the example shown in FIGS. 17A and 17B, as host vehicle 1701 approaches the roundabout, the navigation system, including its at least one processing device, may receive a stream of images from a camera associated with the host vehicle. Based on analysis of one or more of the received images, any of target vehicles 1703, 1705, 1706, 1708, and 1710 may be identified. Further, the navigation system may analyze the navigational characteristics of one or more of the identified target vehicles. The navigation system may recognize that the gap between target vehicles 1703 and 1705 represents the first opportunity for a potential merge into the roundabout. The navigation system may analyze target vehicle 1703 to determine indicators of aggression associated with target vehicle 1703. If target vehicle 1703 is deemed aggressive, then the host vehicle navigation system may choose to give way to vehicle 1703 rather than merging in front of vehicle 1703. On the other hand, if target vehicle 1703 is deemed defensive, then the host vehicle navigation system may attempt to complete a merge action ahead of vehicle 1703.

As host vehicle 1701 approaches the roundabout, the at least one processing device of the navigation system may analyze the captured images to determine navigational characteristics associated with target vehicle 1703. For example, based on the images, it may be determined that vehicle 1703 is following vehicle 1705 at a distance that provides a sufficient gap for the host vehicle 1701 to safely enter. Indeed, it may be determined that vehicle 1703 is following vehicle 1705 by a distance that exceeds an aggressive distance threshold, and therefore, based on this information, the host vehicle navigation system may be inclined to identify target vehicle 1703 as defensive. In some situations, however, more than one navigational characteristic of a target vehicle may be analyzed in making the aggressive/defensive determination, as discussed above. Furthering the analysis, the host vehicle navigation system may determine that, while target vehicle 1703 is following at a non-aggressive distance behind target vehicle 1705, vehicle 1703 has a relative velocity and/or a relative acceleration with respect to vehicle 1705 that exceeds one or more thresholds associated with aggressive behavior. Indeed, host vehicle 1701 may determine that target vehicle 1703 is accelerating relative to vehicle 1705 and closing the gap that exists between vehicles 1703 and 1705. Based on further analysis of the relative velocity, acceleration, and distance (and even a rate that the gap between vehicles 1703 and 1705 is closing), host vehicle 1701 may determine that target vehicle 1703 is behaving aggressively. Thus, while there may be a sufficient gap into which host vehicle may safely navigate, host vehicle 1701 may expect that a merge in front of target vehicle 1703 would result in an aggressively navigating vehicle directly behind the host vehicle. Further, target vehicle 1703 may be expected, based on the observed behavior through image analysis or other sensor output, that target vehicle 1703 would continue accelerating toward host vehicle 1701 or continuing toward host vehicle 1701 at a non-zero relative velocity if host vehicle 1701 was to merge in front of vehicle 1703. Such a situation may be undesirable from a safety perspective and may also result in discomfort to passengers of the host vehicle. For such reasons, host vehicle 1701 may choose to give way to vehicle 1703, as shown in FIG. 17B, and merge into the roundabout behind vehicle 1703 and in front of vehicle 1710, deemed defensive based on analysis of one or more of its navigational characteristics.

Returning to FIG. 18, at step 1809, the at least one processing device of the navigation system of the host vehicle may determine, based on the identified at least one navigational characteristic of the target vehicle relative to the identified obstacle, a navigational action for the host vehicle (e.g., merge in front of vehicle 1710 and behind vehicle 1703). To implement the navigational action (at step 1811), the at least one processing device may cause at least one adjustment of a navigational actuator of the host vehicle in response to the determined navigational action. For example, a brake may be applied in order to give way to vehicle 1703 in FIG. 17A, and an accelerator may be applied along with steering of the wheels of the host vehicle in order to cause the host vehicle to enter the roundabout behind vehicle 1703, as shown if FIG. 17B.

As described in the examples above, navigation of the host vehicle may be based on the navigational characteristics of a target vehicle relative to another vehicle or object. Additionally, navigation of the host vehicle may be based on navigational characteristics of the target vehicle alone without a particular reference to another vehicle or object. For example, at step 1807 of FIG. 18, analysis of a plurality of images captured from an environment of a host vehicle may enable determination of at least one navigational characteristic of an identified target vehicle indicative of a level of aggression associated with the target vehicle. The navigational characteristic may include a velocity, acceleration, etc. that need not be referenced with respect to another object or target vehicle in order to make an aggressive/defensive determination. For example, observed accelerations and/or velocities associated with a target vehicle that exceed a predetermined threshold or fall within or exceed a range of values may indicate aggressive behavior. Conversely, observed accelerations and/or velocities associated with a target vehicle that fall below a predetermined threshold or fall within or exceed a range of values may indicate defensive behavior.

Of course, in some instances the observed navigational characteristic (e.g., a location, distance, acceleration, etc.) may be referenced relative to the host vehicle in order to make the aggressive/defensive determination. For example, an observed navigational characteristic of the target vehicle indicative of a level of aggression associated with the target vehicle may include an increase in relative acceleration between the target vehicle and the host vehicle, a following distance of the target vehicle behind the host vehicle, a relative velocity between the target vehicle and the host vehicle, etc.

Navigation in Response to Activity of an Occupant

Disclosed systems and methods may allow for navigating a host vehicle based on the detected activity of an occupant.

Navigating based on the activity of occupants may allow for providing a smoother ride to improve users' experiences while also allowing for a more efficient navigation. For example, when an occupant is determined to be drinking a beverage, the host vehicle may navigate with a greater constraint on acceleration in order to improve the occupant's experience and prevent spills. This constraint may be dynamically increased when the occupant is finished with the beverage, increasing overall navigational efficiency as well as improving the occupant's experience.

Figure 19:
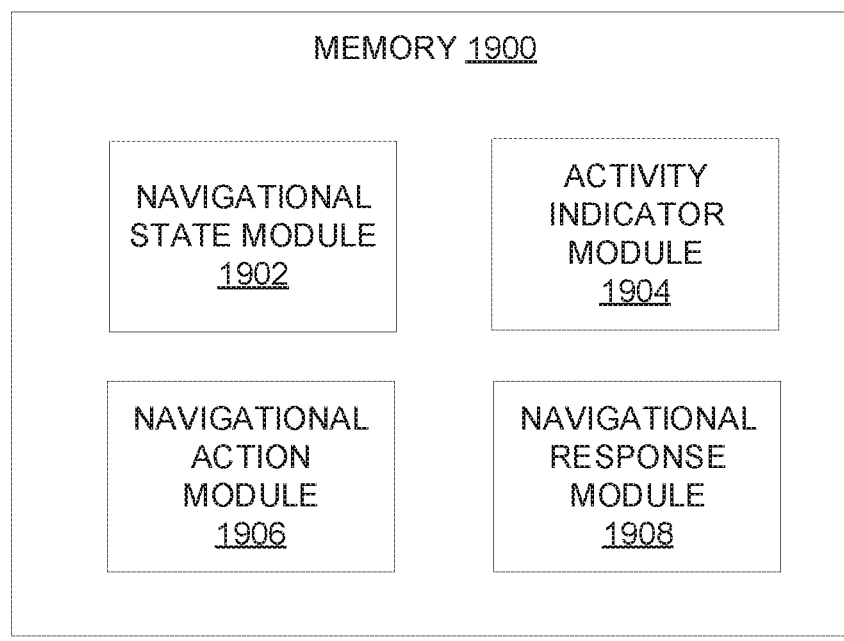
FIG. 19 is an exemplary block diagram of a memory configured to store instructions for performing one or more operations consistent with the disclosed embodiments.

FIG. 19 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

In one embodiment, navigational state module 1902 may store instructions (such as computer vision software) which, when executed by processing unit 110, receives, from a camera, a plurality of images representative of an environment of the host vehicle. The camera may include at least one of image capture device 122, image capture device 124, and image capture device 126, as described above. In some embodiments, processing unit 110 may combine information from a set of images with additional sensory information (e.g., information from radar, lidar, etc.) to perform the image analysis.

Navigational state module 1902 may further store instructions which, when executed by processing unit 110, performs image analysis of at least one of the plurality of images to identify a navigational state associated with the host vehicle. In some embodiments, the image analysis may include a monocular image analysis as described in connection with FIGS. 5A-5D above, in which case navigational state module 1902 may include instructions for detecting a set of features within the images, such as lane markings, landmarks, vehicles pedestrians, and other navigational features. Alternatively and/or additionally, in some embodiments, navigational state module 1902 may include a stereo image analysis as described in connection with FIG. 6 above, in which case pedestrian identification module 1902 may include instructions for detecting a set of features within a first set of images (e.g., acquired by image capture device 124) and a second set of images (e.g., acquired by image capture device 126), e.g., for determining an optical flow used for object detection, for determining a speed and/or heading of the host vehicle, or the like. Navigational state module 1902 may optionally use input from one or more additional sensors (such as a speedometer, accelerometer, compass, or the like) to determine the navigational state associated with the host vehicle.

Activity indicator module 1904 may store instructions (such as computer vision software) which, when executed by processing unit 110, obtains, from at least one host vehicle component associated with an interior of the host vehicle, an indicator of an activity of an occupant of the host vehicle. The at least one component may comprise a camera associated with the interior of the host vehicle, a microphone associated with the interior of the host vehicle, an eye tracking system of the host vehicle, an infotainment system of the host vehicle, or the like.

For example, activity indicator module 1904 may perform image analysis on captured images of the occupant in order to identify or categorize an activity of the occupant. Similarly, activity indicator module 1904 may categorize audio captured by the microphone in order to categorize an activity of the occupant. For example, softer music may be associated with sleeping while louder music may be associated with passengers who are awake. In another example, activity indicator module 1904 may associate the occupant's voice with an activity of conversing and silence with other activities such as reading. In yet another example, activity indicator module 1904 may associate a looking direction of the occupant's eyes out the window with an activity of looking out the window, a looking direction of the occupant's eyes towards a book, tablet, or the like with an activity of reading, and other looking directions with other activities. In another example, activity indicator module 1904 may associate interactions with an infotainment system as associated with an activity of listening to music, navigating, or the like. Any of the indicators described above may be combined. For example, a combination of soft music from the microphone and a classification of eyes being closed in captured images may result in a determination that the occupant is sleeping. In another example, a combination of a looking direction out the window with silence may result in a determination that the occupant is looking out the window. In any of the embodiments described above, the activity may include drinking, eating, reading, sleeping, looking out of windows, or the like.

In one embodiment, navigational action module 1906 may store software executable by processing unit 110 to determine a navigational action for the host vehicle in response to the identified navigational state and the indicator of the activity of the occupant of the host vehicle. For example, the navigational action may comprise slowing the host vehicle, accelerating the host vehicle, moving into a different lane, moving around an obstacle or pedestrian, or the like. In some embodiments, the indicator detected by activity indicator module 1904 may impose additional constraints (e.g., beyond default safety and/or comfort constraints) on the determined navigational action. For example, the activity may be associated with an allowable acceleration level, an allowable turning angle, or the like. In one example, reading and/or drinking may have a lower allowable acceleration than sleeping, while sleeping may have a lower allowable acceleration than looking out a window. In another example, drinking may have a lower allowable turning angle than sleeping, while sleeping may have a lower allowable turning angle than reading.

In some embodiments, activity indicator module 1904 may access a plurality of activity indicators that are defined and stored in, for example, memory 140 and/or 150, or in a remote server. In addition, the storage location (e.g., memory 140 and/or 150 may store an activity navigational constraint associated with each one of a plurality of activity indicators. When the activity indicators identify that a behavior or state of an occupant of the vehicle match one of the plurality of activity indicators, navigational action module 1906 may implement the activity navigational constraint associated with the detected activity indicator.

In some embodiments, navigational action module 1906 may conclude that a hard safety constraint or other sensed condition in the environment of the host vehicle renders compliance with the activity constraint impossible or unlikely. For example, the sudden appearance of an animal or pedestrian into the path of the host vehicle may require moving around the animal or pedestrian at a sharper angle than otherwise allowable based on the detected activity of the occupant. In another example, sudden braking or deceleration of a vehicle ahead of the host vehicle may require faster deceleration than otherwise allowable based on the detected activity of the occupant. In such embodiments, navigational action module 1906 may provide an alert, whether comprising a visual alert and/or an audio alert, to occupants of the host vehicle. For example, the alert may indicate that sharp braking, acceleration, turning, or the like is required. The alert may also include a short description of the sensed conditions resulting in the sharper response, such as "An animal is in the road!" or "The vehicle ahead is braking!"

Based on the determined navigational action, navigational response module 1908 may transmit electronic signals to cause control of at least one navigational actuator of the host vehicle in accordance with the determined first or second navigational action for the host vehicle. The navigational actuator may include at least one of a steering mechanism, a brake or an accelerator. In some embodiments, navigational response module 1908 may transmit one or more signals to one or more of throttling system 220, braking system 230, and steering system 240 of vehicle 200 to trigger the determined navigational action, for example, turning the steering wheel of vehicle 200 to achieve a rotation of a predetermined angle.

Furthermore, any of the modules (e.g., modules 1902, 1904, 1906, and 1908) disclosed herein may implement techniques associated with a trained system (such as a neural network or a deep neural network) or an untrained system/ Such as a system that may be configured to use computer vision algorithms to detect and/or label objects in an environment from which sensory information was captured and processed. In one embodiment, navigational state module 1902 and/or other image processing modules may be configured to use a combination of a trained and untrained system.

Figure 20A:
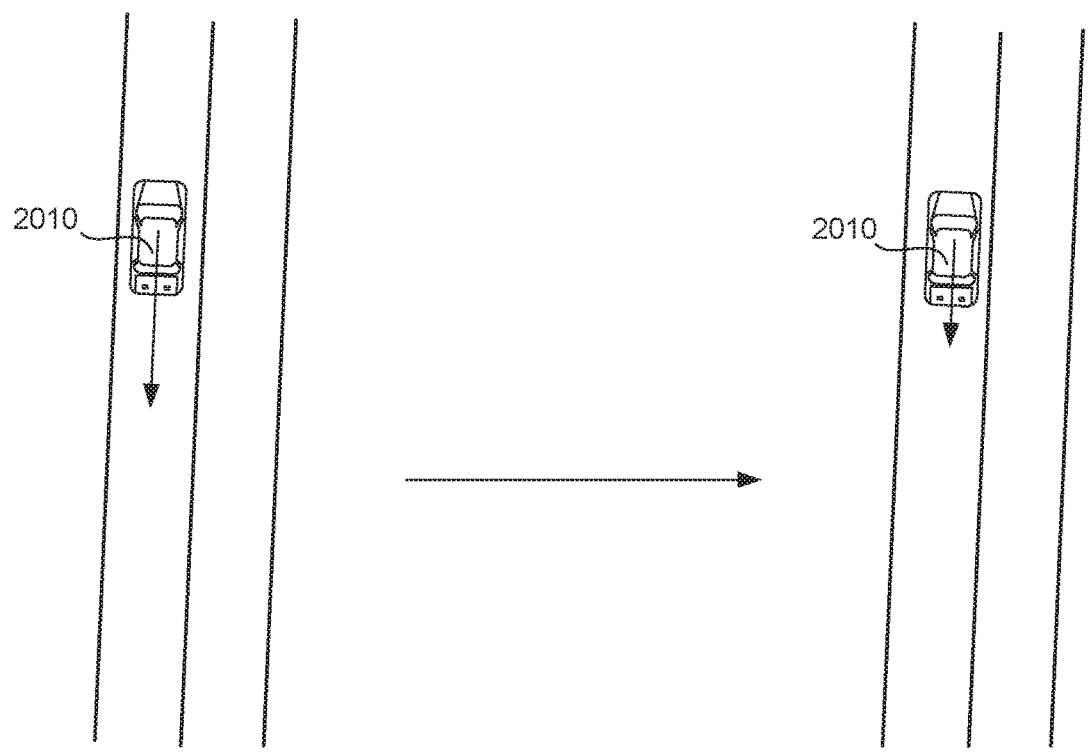
FIG. 20A provides a diagram of a maximal acceleration adjustment based on an activity of an occupant of a host vehicle.
Figure 20B:
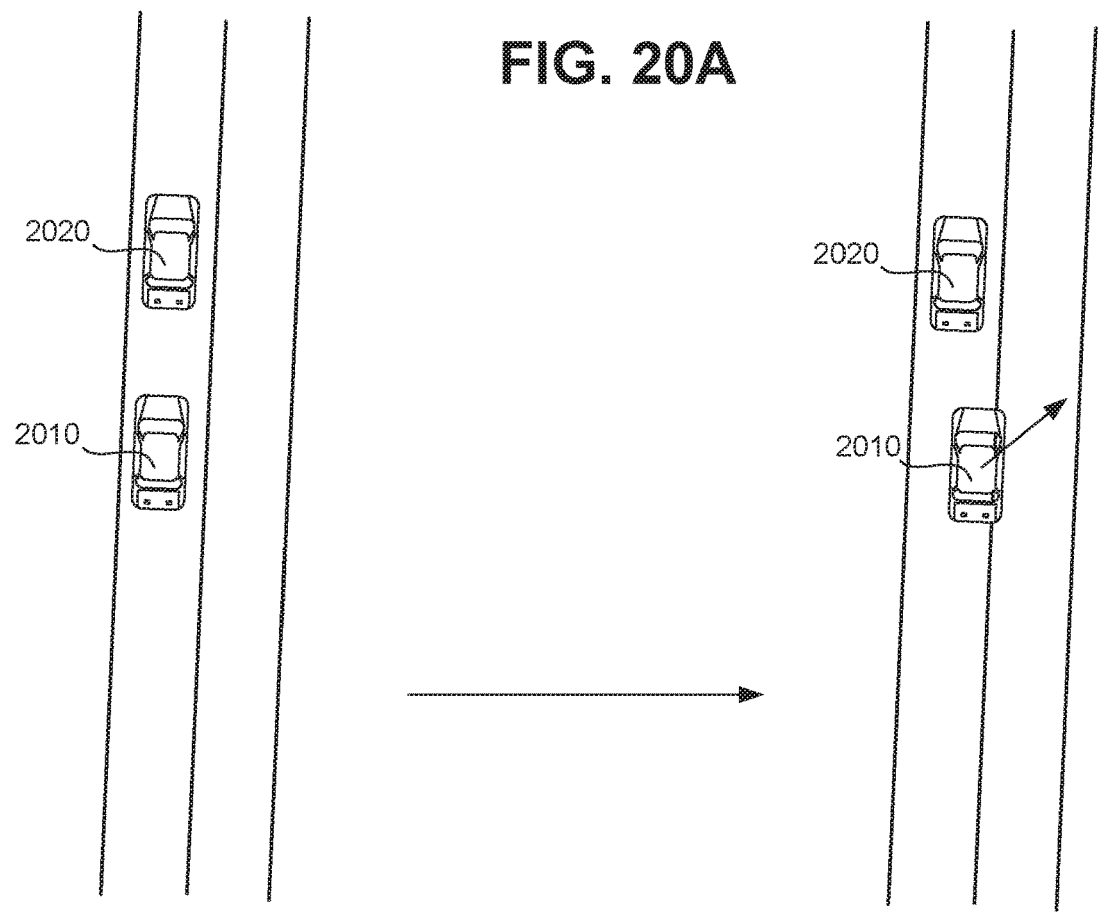
FIG. 20B provides a diagram of an example application of the maximal acceleration adjustment of FIG. 20A.

FIG. 20A shows an example of an acceleration constraint imposed by an activity of an occupant of host vehicle 2010 (which may comprise vehicle 200). As depicted in FIG. 20A, an allowable acceleration of host vehicle 2010 is lessened, e.g., on account of an activity of an occupant thereof (such as drinking, reading, or the like). As shown in FIG. 20B, host vehicle 2010 may thus determine a navigational action of changing lanes rather than leading vehicle 2020 to avoid having to violate the lessened allowable acceleration. Additional or alternative navigational actions may include slowing host vehicle 2010 and/or increasing a following distance between host vehicle 2010 and leading vehicle 2020. It will be appreciated that the next action for the vehicle may be selected as part of a long term strategy. For example, the vehicle may plan to exit a highway. The actual exit may be located a distance (e.g., 1 km) ahead of the vehicle's current location. The next action selected by the vehicle may be computed or determined based on a predefined driving policy, such as the examples discussed previously. The activity constraint may be implemented as part of the policy or may be otherwise associated with the policy and may have an effect over the outcome of the policy. For example, when an activity constraint is active and is implemented as part of the driving policy, the outcome of the navigational policy may be, for example, different relative to the outcome of the same driving policy when the activity constraint is inactive (e.g., if it is disabled). In one example, the application of the activity constraint may have the effect of causing the vehicle to implement actions which are either less or more aggressive (or less or more relaxed, smooth, etc.) or otherwise different relative to the actions that would have been computed based on a current state of the vehicle at a given point in time. In another example, when the activity constraint is active in the driving policy, the activity constraint may have the effect of causing the vehicle to initiate certain actions earlier or later than the time at which identical or similar actions would have been initiated by the driving policy had the activity constraint been inactive.

FIG. 20C shows an example of a turning angle constraint imposed by an activity of an occupant of host vehicle 2010 (which may comprise vehicle 200). As depicted in FIG. 20C, an allowable turning angle of host vehicle 2010 is lessened, e.g., on account of an activity of an occupant thereof (such as drinking, reading, or the like). As shown in FIG. 20D, host vehicle 2010 may thus determine a navigational action to move around obstacle 2030 along a path with smaller turning angles than usual in order to violate the lessened turning angle.

Figure 20E:
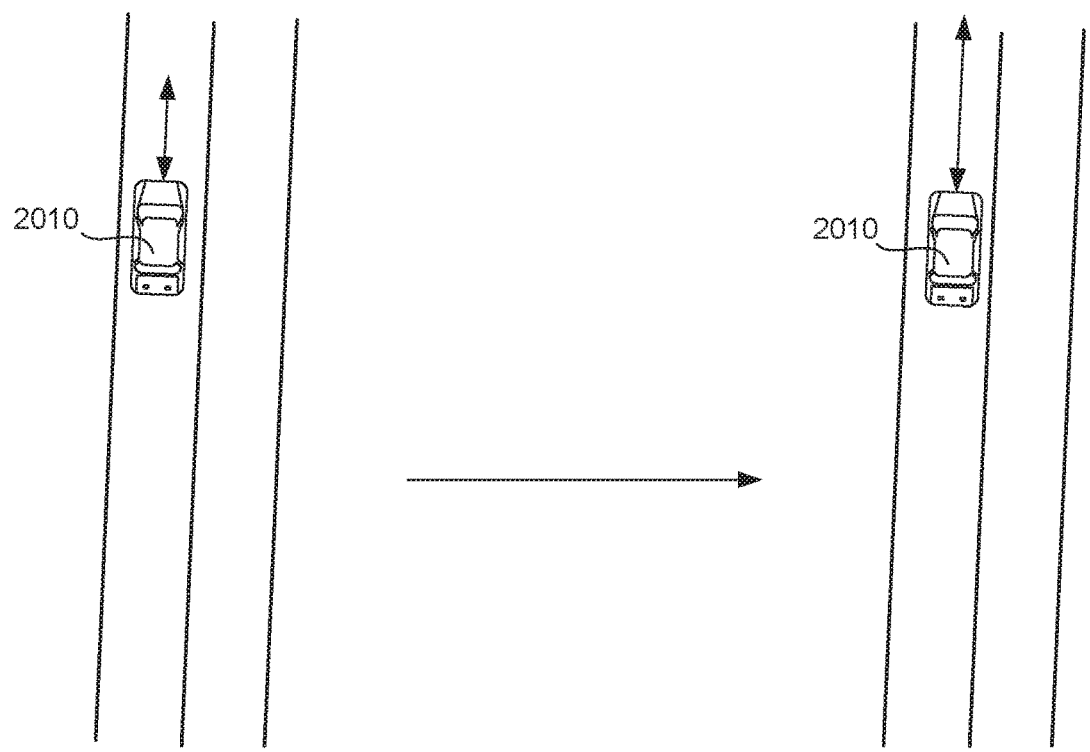
FIG. 20E provides a diagram of a following distance adjustment based on an activity of an occupant of a host vehicle.
Figure 20F:
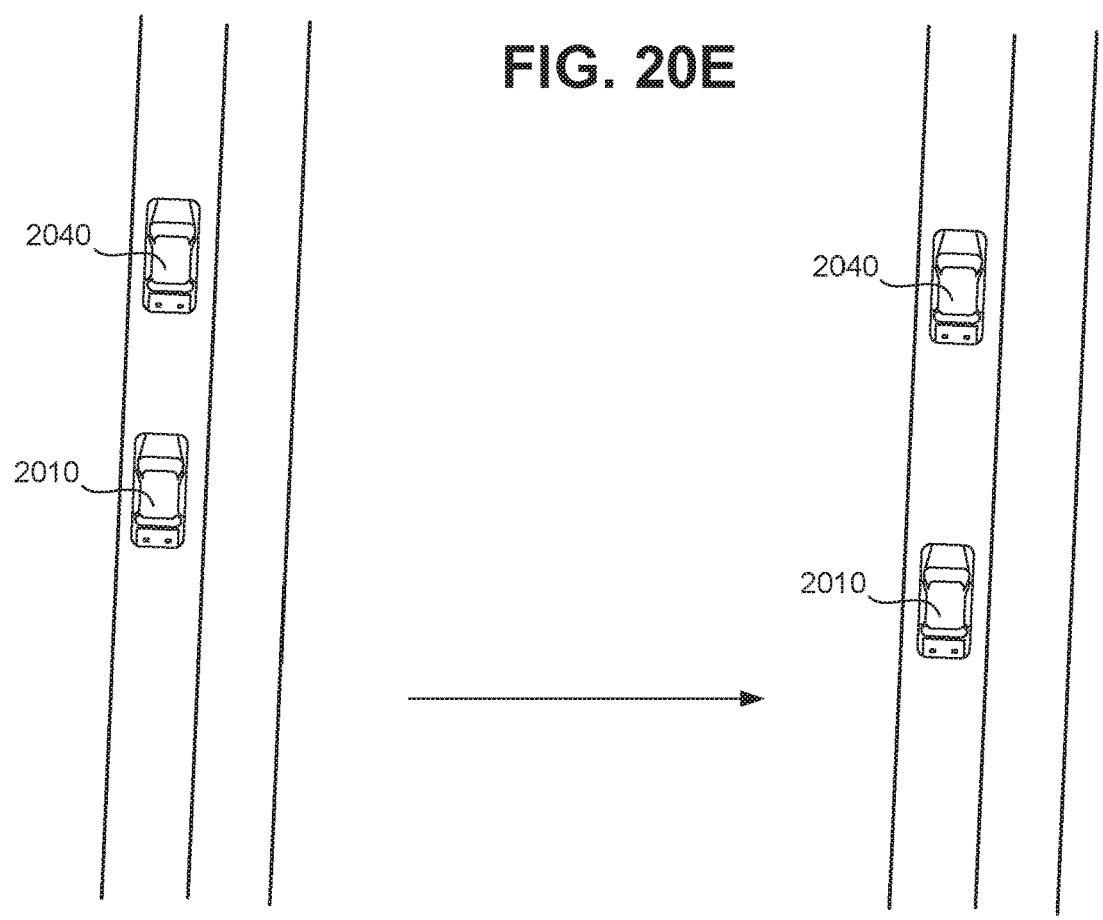
FIG. 20F provides a diagram of an example application of the following distance adjustment of FIG. 20E.

FIG. 20E shows an example of a following distance constraint imposed by an activity of an occupant of host vehicle 2010 (which may comprise vehicle 200). As depicted in FIG. 20E, an allowable following distance of host vehicle 2010 is lessened, e.g., on account of an activity of an occupant thereof (such as drinking, reading, or the like). As shown in FIG. 20F, host vehicle 2010 may thus determine a navigational action to decelerate or brake host vehicle 2010 in order to violate the lessened following distance. Additional or alternative navigational actions may include moving host vehicle 2010 to a different lane of travel in order not to follow vehicle 2040.

Figure 20G:
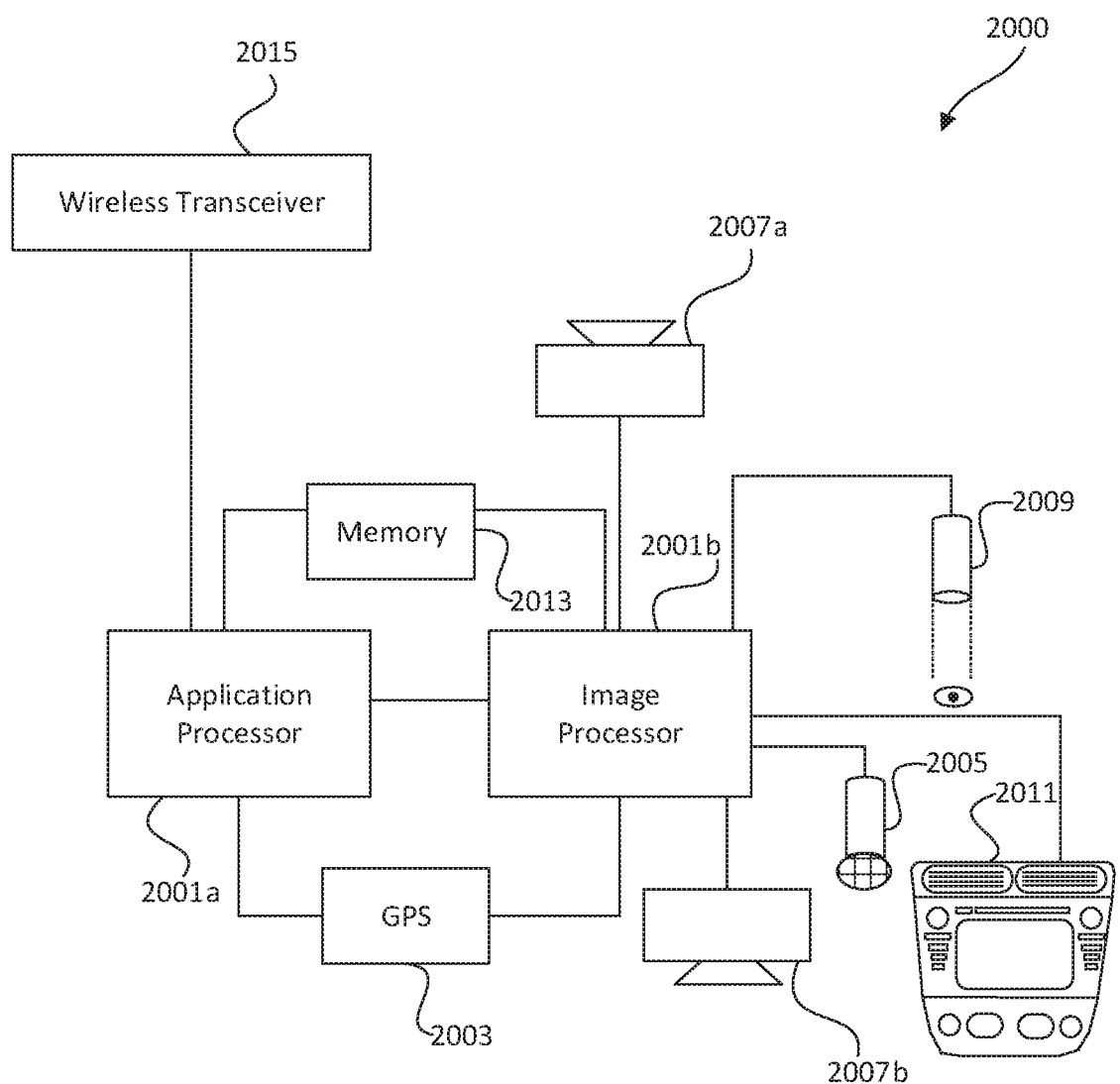
FIG. 20G is a diagrammatic representation of an exemplary system for sensing an indicator of activity of an occupant of a host vehicle consistent with the disclosed embodiments.

FIG. 20G is a block diagram representation of a system 2000 for sensing an activity of an occupant, consistent with the exemplary disclosed embodiments. System 2000 may include various components depending on the requirements of a particular implementation. In some embodiments, system 2000 may include one or more processors, such as an applications processor 2001*a*, an image processor 2001*b*, and/or any other suitable processing device; a GPS 2003; a microphone 2005; one or more image acquisition devices, such as an exterior camera 2007*a*; an interior camera 2007*b*; an eye tracking system 2009 or any other biofeedback device; an infotainment system 2011; one or more memories, such as memory 1913; and a wireless transceiver 2015.

Similar to system 100, both applications processor 2001*a* and image processor 2001*b* may include various types of hardware-based processing devices. For example, either or both of applications processor 2001*a* and image processor 2001*b* may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 2001*a* and/or image processor 2001*b* may include any type of single or multi-core processor, mobile device microcontroller, central processing unit, etc. Various processing devices may be used, including, for example, processors available from manufacturers such as Intel®, AMD®, etc. and may include various architectures (e.g., x86 processor, ARM®, etc.). In some embodiments, as explained above, applications processor 2001*a* and/or image processor 2001*b* may include any of the EyeQ series of processor chips available from Mobileye®. Although FIG. 20G depicts two separate processing devices, more or fewer processing devices may be used. For example, in some embodiments, a single processing device may be used to accomplish the tasks of applications processor 2001*a* and image processor 2001*b*. In other embodiments, these tasks may be performed by more than two processing devices.

GPS 2003 may include any type of device suitable for determining a location associated with at least one component of system 2000. Although depicted as a GPS, any other positioning device, such as a WiFi positioning system (WPS), a magnetic position device, or the like may be used in addition to or in lieu of a GPS device.

Microphone 2005 may include any type of device suitable for transforming audio waves into electric (e.g., analog or digital) signals. Microphone 2005 may be placed on the exterior of system 2000 to capture sounds associated with an environment of system 2000 or may be placed in the interior of system 2000 to capture sounds associated with occupants of system 2000.

Camera 2007a may include any type of device suitable for capturing at least one image from an environment. Camera 2007b, similar to camera 2007a, may include any type of device suitable for capturing at least one image from an environment. Camera 2007b may be associated with an interior of system 2000 (e.g., to capture images of occupants thereof) while camera 2007a may be associated with an exterior of system 2000 (e.g., to capture images of an environment thereof). Moreover, although depicted in FIG. 20 as a single camera associated with the interior and a single camera associated with the exterior, any number of image capture devices may be used to acquire images for input to the image processor. Some embodiments may include only a single image capture device for the interior and exterior, respectively, while other embodiments may include two, three, or even four or more image capture devices for the interior and exterior. Some embodiments may include more cameras associated with the exterior than the interior, and other embodiments may include more cameras associated with the interior than the exterior.

Eye tracking system 2009 may include any type of device suitable for tracking eye movements of one or more occupants of system 2000. For example, eye tracking system 2009 may comprise one or more cameras configured to identify pupils, irises, corneas, and other features associated with eyes in captured images and track the identified features across frames. Accordingly, eye tracking system 2009 may include a processing device configured to identify a looking direction of an identified eye across frames. Additionally or alternatively, eye tracking system 2009 may transmit light (e.g., infrared red or the like) for reflection off one or more portions of an eye (such as a cornea or lens). Based on the resulting Purkinje image(s), eye tracking system 2009 may identify a looking direction of an identified eye across frames. Other biofeedback devices may be used. For example, a heart rate monitor may be used to sense the heart rate of an occupant of the vehicle and deduce a state of the occupant from the occupant's heart rate One or more sensors embedded in the car seats may determine how many occupants are in the car and their sitting locations.

Infotainment system 2011 may include any device capable of presenting audio and/or visual information or entertainment to an occupant of system 2000. For example, infotainment system 2011 may include a radio or other stereo system, a display screen (such as a touchscreen or a digital readout), a navigational system (whether audio or visual or both), a climate control system, or any combination thereof. Infotainment system 2011 may send signals to processor 2001a (and/or processor 2001b) indicating when and/or how an occupant is using the system.

Although depicted as including microphone 2005, cameras 2007a and 2007b, eye tracking system 2011, and infotainment system 2011, system 2000 may use more or fewer sensing devices. For example, in some embodiments, system 2000 may use only one or two of microphone 2005, cameras 2007a and 2007b, eye tracking system 2011, and infotainment system 2011, or the like. In other embodiments, system 2000 may include additional sensors such as a compass, an anemometer, a speedometer, an accelerometer, or the like.

Memory 2013 may include software instructions that when executed by a processor (e.g., applications processor 2001a and/or image processor 2001b), may control operation of various aspects of system 2000. These memory units may include various databases and image processing software, as well as a trained system, such as a neural network, or a deep neural network, for example. In another example, memory 2013 may include instructions for performing method 2100 of FIG. 21, described below. Memory 2013 may include random access memory, read only memory, flash memory, disk drives, optical storage, tape storage, removable storage and/or any other types of storage. In some embodiments, memory 2013 may be a single memory. In other embodiments, memory 2013 may comprise a plurality of memories. In some embodiments, memory 2013 may be separate from applications processor 2001a and/or image processor 2001b. In other embodiments, memory 2013 may be integrated, at least in part, into applications processor 2001a and/or image processor 2001b.

Wireless transceiver 2015 may include one or more devices configured to exchange transmissions over an air interface to the one or more computer networks (e.g., cellular, the Internet, etc.) by use of a radio frequency, infrared frequency, magnetic field, or an electric field. Wireless transceiver 2015 may use any known standard to transmit and/or receive data (e.g., Wi-Fi, Bluetooth®, Bluetooth Smart, 802.15.4, ZigBee, etc.). Such transmissions can include communications from the host vehicle to one or more remotely located servers, e.g., one or more servers storing a map database. Such transmissions may also include communications (one-way or two-way) between the host vehicle and one or more target vehicles in an environment of the host vehicle (e.g., to share portions of maps between vehicles), or even a broadcast transmission to unspecified recipients in a vicinity of the transmitting vehicle.

Figure 21:
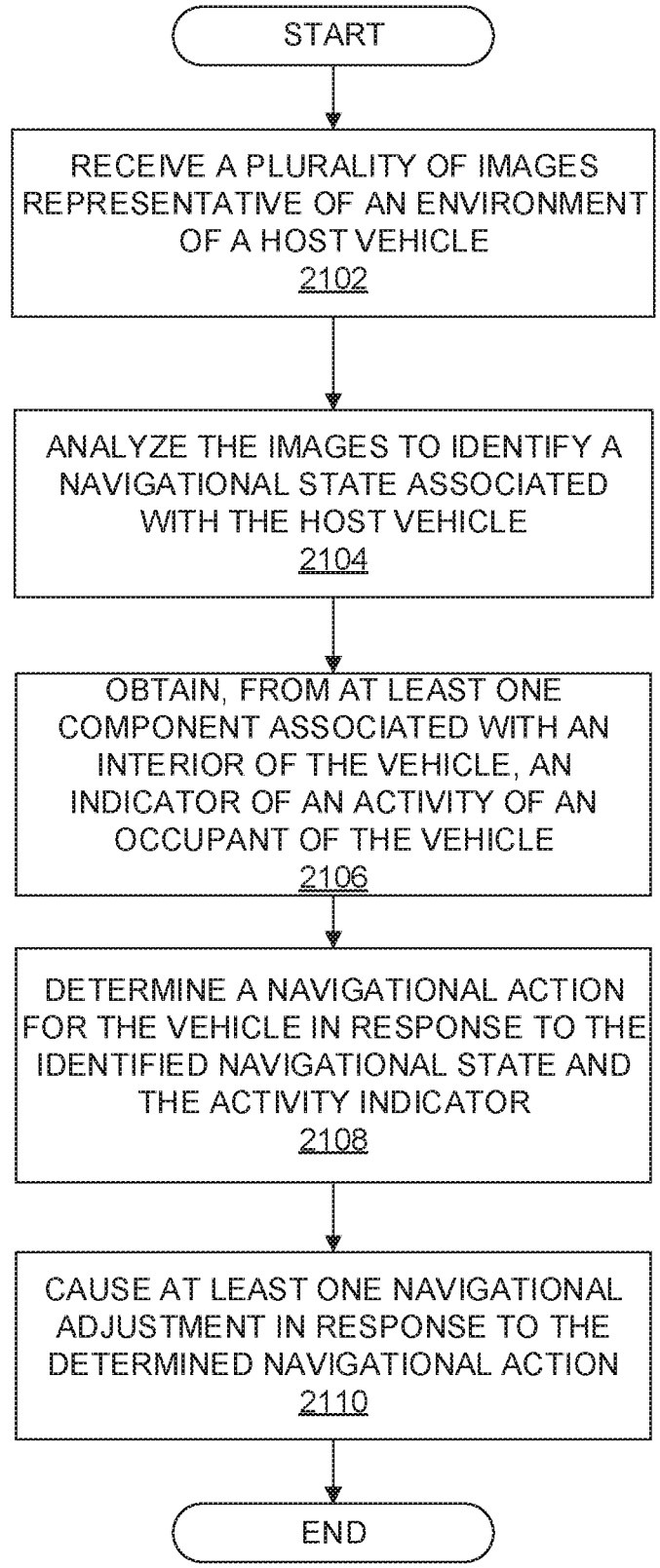
FIG. 21 provides an algorithmic flow chart for navigating a vehicle consistent with the disclosed embodiments.

FIG. 21 is a flowchart showing an exemplary process 2100 for navigating based on an activity indicator of a host vehicle occupant, consistent with disclosed embodiments. At step 2102, processing unit 110 may receive a plurality of images representative of an environment of a host vehicle via data interface 128. For instance, cameras included in image acquisition unit 120 (such as image capture devices 122, 124, and 126 having fields of view 202, 204, and 206) may capture at least one image of an area forward and/or to the side of the host vehicle and transmit them over a digital connection (e.g., USB, wireless, Bluetooth, etc.) to processing unit 110.

At step 2104, processing unit 110 may analyze the plurality of images to identify a navigational state associated with the host vehicle. For example, identifying a navigational state may include detecting one or more attributes of the host vehicle. The attributes may include current and/or historical speed, current and/or historical acceleration, current and/or historical heading, current and/or historical turning angle, or the like. As explained above, "acceleration" may refer to increases, as well as decreases, in speed and/or direction, and "turning angle" may be measured with respect to an axis defined by a tangent to a current lane of travel of the host vehicle at a current location of the host vehicle or with respect to an angle between a current velocity vector of the host vehicle and a curved path defined by the current lane of travel.

At step 2106, processing unit 110 may obtain, from at least one host vehicle component associated with an interior of the host vehicle, an indicator of an activity of an occupant of the host vehicle. The at least one host vehicle component may include a camera including a field of view including an interior of the host vehicle, an infotainment system of the host vehicle (which may include a display screen), a microphone for sensing sounds in an interior of the host vehicle, and/or an eye-tracking system or any other biofeedback device to track body locations or activities. The at least one component may detect the indicator of the activity, which may include at least one of drinking, reading, sleeping, or looking out of windows.

At step 2108, processing unit 110 may determine a navigational action for execution by the host vehicle in response to the identified navigational state and the indicator of the activity of the occupant of the host vehicle. In some embodiments, different activities of the occupant may be associated with different allowable acceleration levels for the navigational action for execution by the host vehicle. For example, drinking a beverage may be associated with a lower allowable acceleration level than sleeping, sleeping may be associated with a lower allowable acceleration level than looking out of a window, and reading may be associated with a lower allowable acceleration level than sleeping. Accordingly, the determined navigational action may incorporate allowable acceleration levels and/or other constraints imposed by the detected activity. If processing unit 110 is unable to comply with one or more of these constraints, processing unit 110 may provide an alert, such as an audio and/or visual alert, to occupants of the host vehicle. Accordingly, processing unit 110 may provide an alert if driving smoothness commensurate with the activity of the occupant of the host vehicle is unlikely in view of one or more sensed conditions in the environment of the host vehicle.

At step 2110, processing unit 110 may cause at least one adjustment of a navigational actuator of the host vehicle in response to the determined navigational action for the host vehicle. The navigational actuator may include at least one of a steering mechanism, a brake, or an accelerator. Processing unit 110 may cause one or more signals to be transmitted to the navigational actuator to trigger a navigational action.

Navigation Based on Detected Response of a Pedestrian to a Navigational Intent

Figure 22:
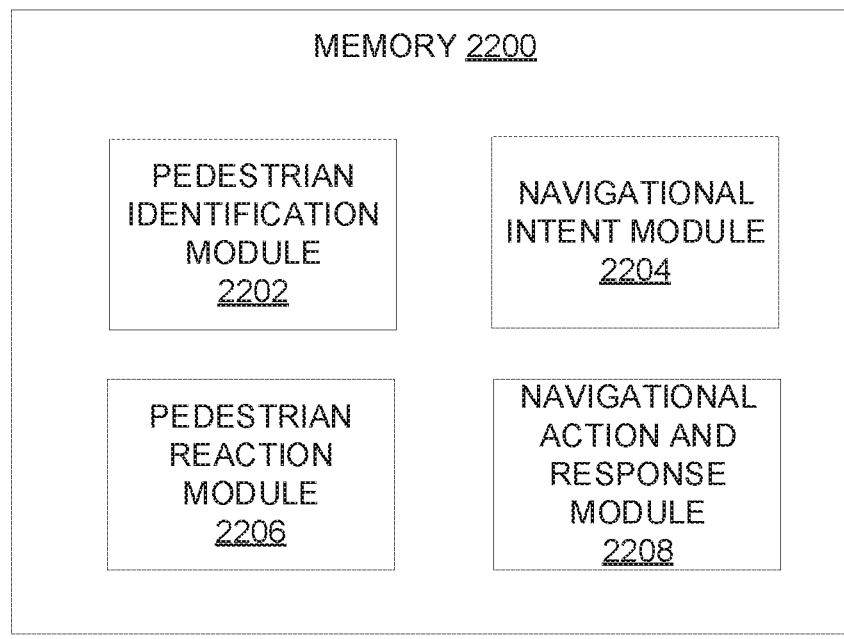
FIG. 22 is an exemplary block diagram of a memory configured to store instructions for performing one or more operations consistent with the disclosed embodiments.

Disclosed systems and methods may allow for navigating a host vehicle based on the detected response of a pedestrian to a signal of navigational intent. Navigating based on pedestrian response may allow for an automated vehicle to negotiate with a pedestrian for a more efficient navigation. Moreover, this negotiation may require a rule-based automation of a subjective process of navigational negotiation between a driver and a pedestrian to allow for the host vehicle to perform actions previously not performable by a computer. For example, the host vehicle may apply brakes and/or flash lights to signal an intent to allow a pedestrian to pass, and then stop if the pedestrian commences or continues movement but accelerate if the pedestrian ceases movement. In another example, the host vehicle may apply an accelerator (or apply light brakes followed by acceleration) to signal an intent to pass the pedestrian, and then continue to pass the pedestrian if the pedestrian slows or ceases movement but apply brakes if the pedestrian continues movement FIG. 22 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

In one embodiment, pedestrian identification module 2202 may store instructions (such as computer vision software) which, when executed by processing unit 110, receives, from a camera, a plurality of images representative of an environment of the host vehicle. The camera may include at least one of image capture device 122, image capture device 124, and image capture device 126, as described above. In some embodiments, processing unit 110 may combine information from a set of images with additional sensory information (e.g., information from radar, lidar, etc.) to perform the image analysis.

Pedestrian identification module 2202 may further store instructions which, when executed by processing unit 110, performs image analysis of at least one of the plurality of images to identify at least one pedestrian in the environment of the host vehicle. In some embodiments, the image analysis may include a monocular image analysis as described in connection with FIGS. 5A-5D above, in which case pedestrian identification module 2804 may include instructions for detecting one or more features within the images, such as anatomical parts, accessories, clothing, crosswalks, canes, strollers, and other features commonly associated with pedestrians. Alternatively and/or additionally, in some embodiments, pedestrian identification module 2804 may include a stereo image analysis as described in connection with FIG. 6 above, in which case pedestrian identification module 2804 may include instructions for detecting one or more features within a first set of images (e.g., acquired by image capture device 124) and a second set of images (e.g., acquired by image capture device 126).

In one embodiment, navigational intent module 2204 store instructions which, when executed by processing unit 110, causes at least one adjustment of a navigational system of the host vehicle to signal to the pedestrian a navigational intent of the host vehicle. For example, the least one adjustment may comprise an application of brakes, an application of an accelerator, a turning of the host vehicle, or other adjustment to a navigational trajectory of the host vehicle. Additionally or alternatively, the at least one adjustment may include issuing a visual alert and/or audible alert to the pedestrian. For example, navigational intent module 2204 may flash lights of the host vehicle and/or display a visual message (such as text and/or graphics) on an external display of the host vehicle visible to the pedestrian.

The at least one adjustment may signal intent to the pedestrian. For example, application of the brakes (and/or a corresponding visual and/or aural message) may signal an intent to give way to the pedestrian. As another example, application of the accelerator or application of the brakes with a subsequent application of the accelerator (and/or a corresponding visual and/or aural message) may signal an intent to pass by the pedestrian.

In one embodiment, pedestrian reaction module 2206 may store instructions (such as computer vision software) which, when executed by processing unit 110, analyzes the plurality of images to detect a potential reaction of the pedestrian to the at least one adjustment of the navigational system of the host vehicle. For example, the potential reaction may include a detected movement of the pedestrian, such as a commencement or continuation of movement, a ceasing of movement of the pedestrian, another visual reaction (such as a "thank you" wave of a hand, a hand gesture, or the like), or the like. In some embodiments, pedestrian reaction module 2206 may additionally or alternatively detect an audible reaction (such as an audible "Thanks!" or other word), e.g., using a microphone associated with an exterior of the host vehicle.

In one embodiment, navigational action and response module 2208 may store software executable by processing unit 110 to determine a navigational action for the host vehicle based on the detected potential reaction of the pedestrian and cause at least one adjustment of a navigational actuator of the host vehicle in response to the determined navigational action for the host vehicle. For example, if the at least one adjustment of the navigational system communicates an intent to pass and the potential reaction includes slowing or stopping of the pedestrian, navigational response module 2208 may determine at least one navigational change to execute passing the pedestrian (e.g., by steering into another lane and/or another part of a lane, by accelerating, or the like). In another example, if the at least one adjustment of the navigational system communicates an intent to pass and the potential reaction includes the pedestrian commencing or continuing movement, navigational response module 2208 may determine at least one navigational change such that the host vehicle does not pass the pedestrian (e.g., by steering back into a current lane of travel, by decelerating and/or braking, or the like). In yet another example, if the at least one adjustment of the navigational system communicates an intent to give way to the pedestrian and the potential reaction includes the pedestrian commencing or continuing movement, navigational response module 2208 may determine at least one navigational change such that the host vehicle gives way to the pedestrian (e.g., by slowing, by stopping, or the like). In yet another example, if the at least one adjustment of the navigational system communicates an intent to give way to the pedestrian and the potential reaction includes slowing or stopping of the pedestrian, navigational response module 2208 may determine at least one navigational change to stop giving way (e.g., by accelerating or the like). Navigational response module 2208 may also determine a navigational action based on sensory input (e.g., information from radar, lidar, cameras, or the like) and inputs from other systems of vehicle 200, such as map data, a predetermined position of vehicle 200, a relative velocity or a relative acceleration between vehicle 200 and one or more detected objects, or the like.

Based on the determined navigational action, processing unit 110 may transmit electronic signals to cause control of at least one navigational actuator of the host vehicle in accordance with the determined first or second navigational action for the host vehicle. The navigational actuator may include at least one of a steering mechanism, a brake or an accelerator. In some embodiments, navigational response module 2208 may transmit one or more signals to one or more of throttling system 220, braking system 230, and steering system 240 of vehicle 200 to trigger the determined navigational action, for example, turning the steering wheel of vehicle 200 to achieve a rotation of a predetermined angle.

Furthermore, any of the modules (e.g., modules 2802, 2804, 2806, and 2808) disclosed herein may implement techniques associated with a trained system (such as a neural network or a deep neural network) or an untrained system. Such as a system that may be configured to use computer vision algorithms to detect and/or label objects in an environment from which sensory information was captured and processed. In one embodiment, image analysis module 2802 and/or other image processing modules may be configured to use a combination of a trained and untrained system.

Figure 23A:
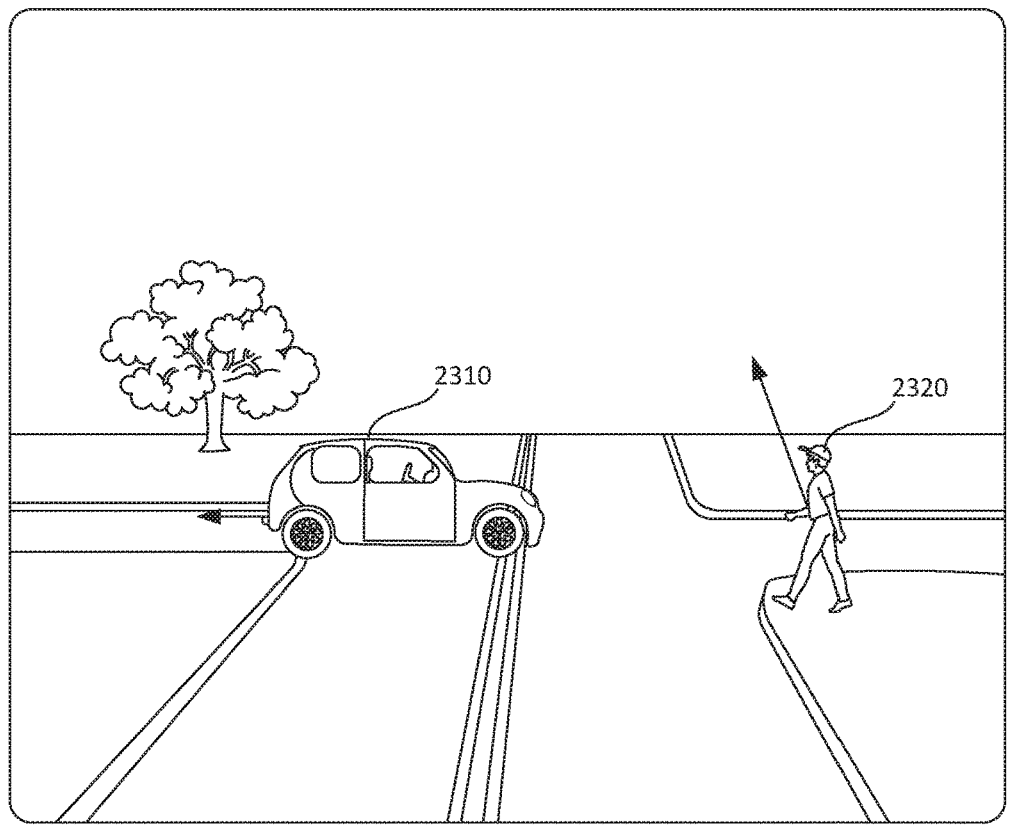
FIGS. 23A and 23B provide a diagram of navigating in response to a pedestrian reaction to a navigational intent from a host vehicle.
Figure 23B:
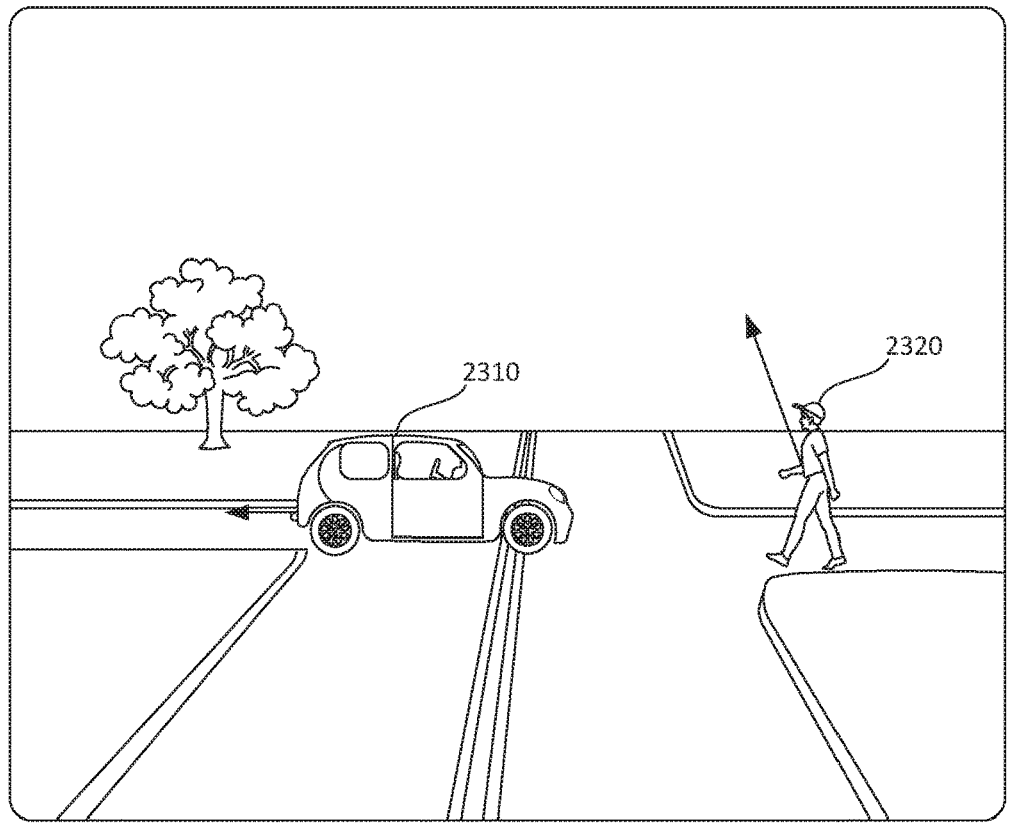

FIGS. 23A and 23B show an example of a scene that may be captured and analyzed during navigation of a host vehicle 2310 (which may comprise host vehicle 200). Specifically, the scene shown in FIGS. 23A and 23B are examples of images that may be captured at time t from an environment of the host vehicle 2610. The navigation system may include at least one processing device that is specifically programmed to receive the plurality of images and analyze the images to determine a navigational action in response to the scene. Specifically, the at least one processing device may implement pedestrian identification module 2202 to identify pedestrian 2320, and navigational intent module 2204 may implement a navigational system adjustment, which is decelerating and/or braking in the example of FIG. 23A, to communicate an intent to give way to pedestrian 2320. Pedestrian reaction module 2206 may determine that pedestrian 2320 has continued movement, as shown in FIG. 23B. Accordingly, navigation action and response module 2208 may then determine a navigation action for host vehicle 2310, which is continuing to decelerate and/or brake in the example of FIG. 23B, to give way to pedestrian 2320.

Figure 23C:
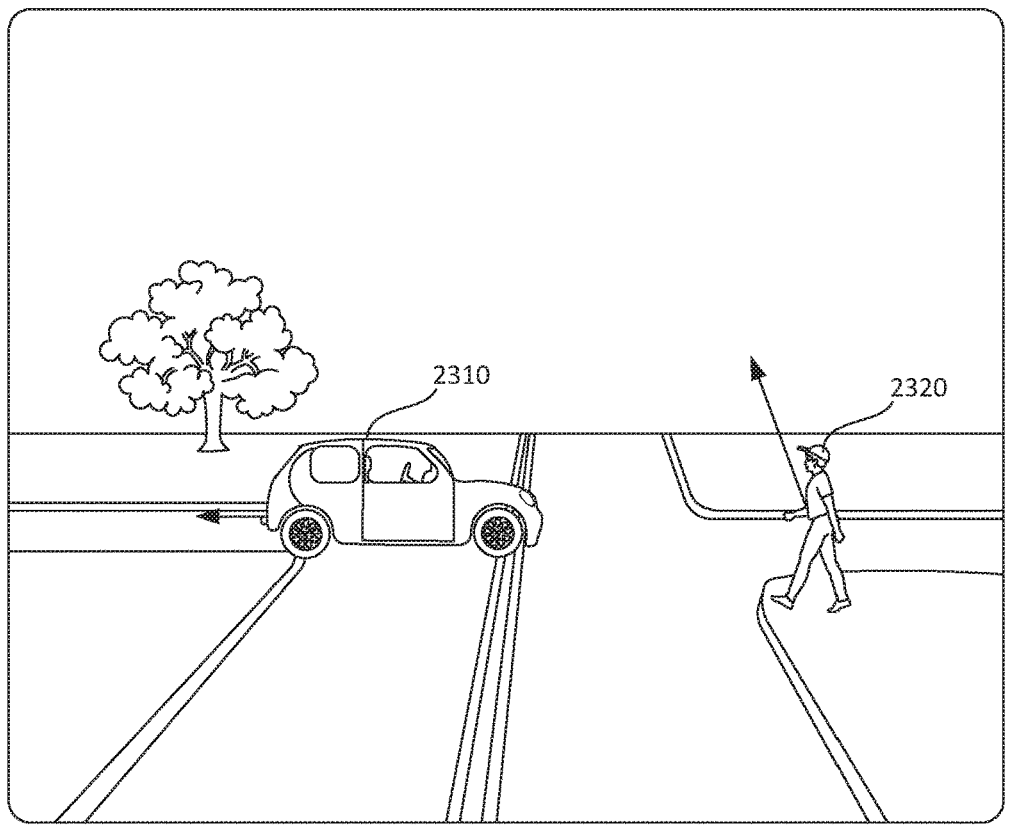
FIGS. 23C and 23D provide a diagram of navigating in response to a pedestrian reaction to a navigational intent from a host vehicle.
Figure 23D:
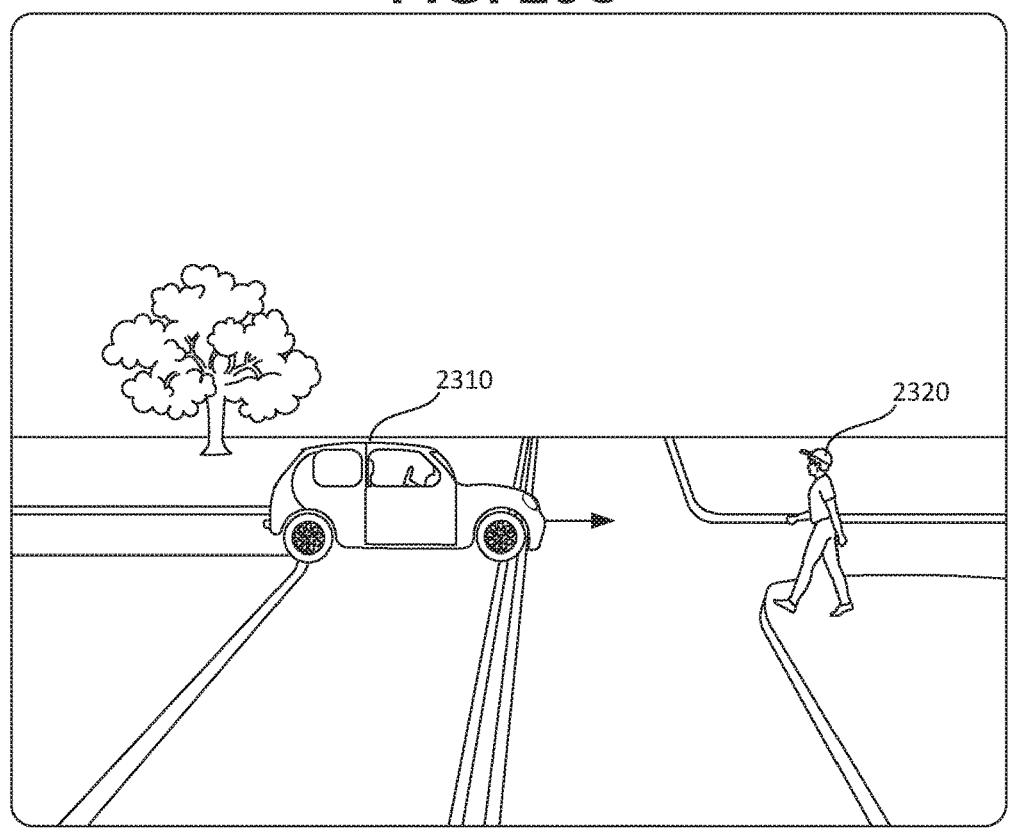

FIGS. 23C and 23D, show an example of a scene that may be captured and analyzed during navigation of a host vehicle 2310 (which may comprise host vehicle 200). FIGS. 23C and 23D are similar to FIGS. 23A and 23B except that pedestrian 2320 has ceased movement in response to the deceleration and/or braking of vehicle 2310, and so navigation action and response module 2208 may then determine a navigation action for host vehicle 2310, such as accelerating, to stop giving way to pedestrian 2320.

Although not depicted in FIGS. 23A-23D, vehicle 2310 may instead communicate an intent to continue driving rather than to give way to pedestrian 2320, as described above. Accordingly, vehicle 2310 may then continue to drive or may instead give way to pedestrian 2320 based on the reaction of pedestrian 2320 to the communication of intent via vehicle 2310. Moreover, although FIGS. 23A-23D all use changes to a navigational trajectory of vehicle 2310 to communicate intent, a visual and/or aural indicator may be used in addition to or in lieu of such navigational changes.

Figure 24:
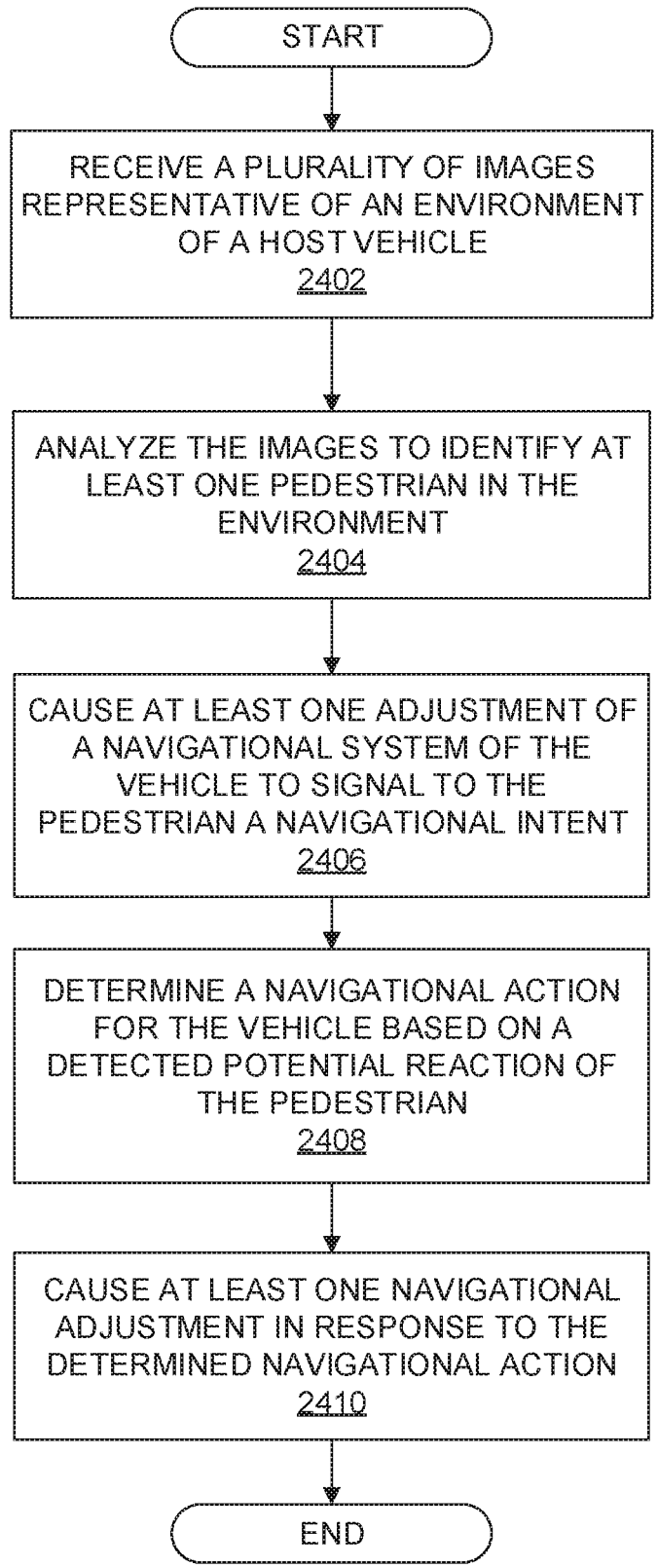
FIG. 24 provides an algorithmic flow chart for navigating a vehicle consistent with the disclosed embodiments.

FIG. 24 is a flowchart showing an exemplary process 2400 for navigating based on a pedestrian response to a signal of navigational intent, consistent with disclosed embodiments. At step 2402, processing unit 110 may receive a plurality of images representative of an environment of a host vehicle via data interface 128. For instance, cameras included in image acquisition unit 120 (such as image capture devices 122, 124, and 126 having fields of view 202, 204, and 206) may capture at least one image of an area forward and/or to the side of the host vehicle and transmit them over a digital connection (e.g., USB, wireless, Bluetooth, etc.) to processing unit 110.

At step 2404, processing unit 110 may analyze the plurality of images to identify at least one pedestrian in the environment of the host vehicle. For example, identifying at least one pedestrian may include detecting one or more attributes or features of a pedestrian. The attributes may include a facial region, a core/body region, or one of more accessories associated with the pedestrian.

At step 2406, processing unit 110 may cause at least one adjustment of a navigational system of the host vehicle to signal to the pedestrian a navigational intent of the host vehicle and analyze the plurality of images to detect a potential reaction of the pedestrian to the at least one adjustment of the navigational system of the host vehicle. In some embodiments, the at least one adjustment of the navigational system of the host vehicle may include an application of brakes of the host vehicle to slow the host vehicle. In such embodiments, the at least one adjustment may further include a subsequent application of an accelerator of the host vehicle to signal an intent of the host vehicle to pass by the pedestrian.

Additionally or alternatively, the at least one adjustment of the navigational system of the host vehicle may include changing a speed of the host vehicle, such as slowing the host vehicle. For example, slowing the host vehicle may signal an intent of the host vehicle to give way to the pedestrian.

Additionally or alternatively, the at least one adjustment of the navigational system of the host vehicle may include issuing a visual alert to the pedestrian. For example, the visual alert may include a light flash and/or information provided to a display visible to the pedestrian. Additionally or alternatively, the at least one adjustment of the navigational system of the host vehicle may include issuing an audible alert to the pedestrian.

In some embodiments, the detected reaction of the pedestrian may be ceasing movement. Alternatively, the detected reaction of the pedestrian may include a detected movement of the pedestrian. Accordingly, the detected reaction may include at least one change in movement of the pedestrian, such as ceasing movement or commencing movement.

At step 2408, processing unit 110 may determine a navigational action for the host vehicle based on the detected potential reaction of the pedestrian. In some embodiments, the determined navigational action may include navigation of the host vehicle past the pedestrian. Alternatively, the determined navigational action may include stopping the host vehicle.

At step 2410, processing unit 110 may cause at least one adjustment of a navigational actuator of the host vehicle in response to the determined navigational action for the host vehicle. The navigational actuator may include at least one of a steering mechanism, a brake, or an accelerator. Processing unit 110 may cause one or more signals to be transmitted to the navigational actuator to trigger a navigational action.

For example, in some embodiments, when the host vehicle is under a navigational constraint that is associated with a presence of a pedestrian in a vicinity of the host vehicle (e.g., when the pedestrian is standing on a sidewalk next to a crosswalk), processing unit 110 may cause the host vehicle to slow or stop and allow the pedestrian to move away from the vehicle. In this example, processing unit 110 may cause a pedestrian negotiation process to be triggered. During the pedestrian negotiation process, processing unit 110 may first apply an initial waiting period during which the host vehicle waits for the pedestrian to move (e.g., to cross the crosswalk or otherwise move). In some embodiments, this waiting period can be limited in time and, after a predetermined time period (e.g., 30 seconds) processing unit 110 may cause a negotiation sequence, such as described above, to occur. Although the negotiation sequence exists outside and alongside the driving policy, the negotiation sequence may be tied to one of its constraints. Such a negotiation sequence may prevent a "deadlock" situation while maintaining safety.

Navigation Based on Sensed Looking Direction of a Pedestrian

Disclosed systems and methods may allow for navigating a host vehicle based on the sensed looking direction of a pedestrian. Navigating based on the sensed looking direction may allow for preemptive motoring of an attribute of a pedestrian and reaction to the sensed facing direction for a more efficient navigation. For example, when the looking direction of the pedestrian is determined to be away from the host vehicle, the host vehicle may navigate more conservatively than it otherwise might navigate if the pedestrian was looking at or in the direction of the host vehicle.

Figure 25:
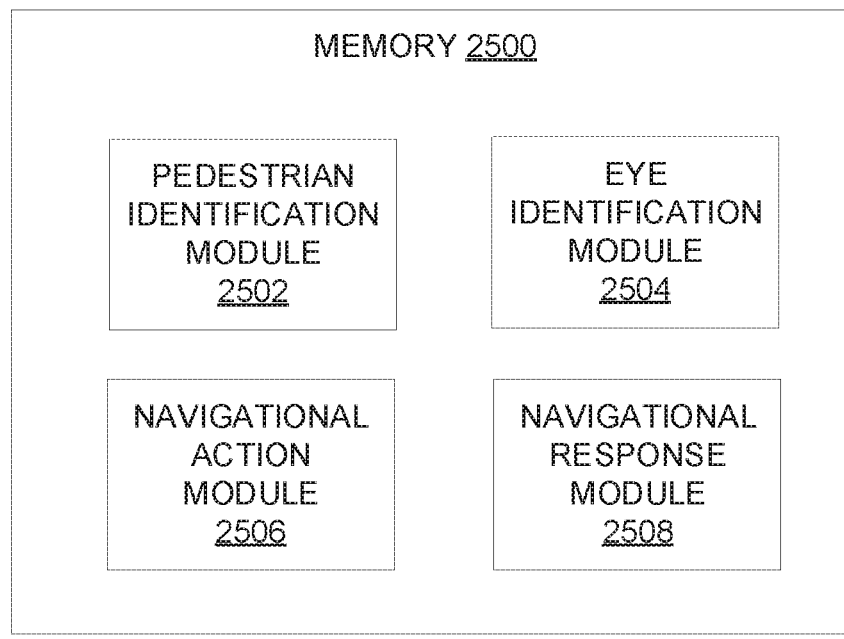
FIG. 25 is an exemplary block diagram of a memory configured to store instructions for performing one or more operations consistent with the disclosed embodiments.

FIG. 25 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

In one embodiment, pedestrian identification module 2502 may store instructions (such as computer vision software) which, when executed by processing unit 110, receives, from a camera, a plurality of images representative of an environment of the host vehicle. The camera may include at least one of image capture device 122, image capture device 124, and image capture device 126, as described above. In some embodiments, processing unit 110 may combine information from a set of images with additional sensory information (e.g., information from radar, lidar, etc.) to perform the image analysis.

In one embodiment, pedestrian identification module 2502 may store instructions which, when executed by processing unit 110, receives, from a camera, a plurality of images representative of an environment of the host vehicle. The camera may include at least one of image capture device 122, image capture device 124, and image capture device 126, as described above. In some embodiments, processing unit 110 may combine information from a set of images with additional sensory information (e.g., information from radar, lidar, etc.) to perform the image analysis.

Pedestrian identification module 2502 may further store instructions which, when executed by processing unit 110, performs image analysis of at least one of the plurality of images to identify at least one pedestrian in the environment of the host vehicle. In some embodiments, the image analysis may include a monocular image analysis as described in connection with FIGS. 5A-5D above, in which case pedestrian identification module 2804 may include instructions for detecting a set of features within the images, such as anatomical parts, accessories, clothing, crosswalks, canes, strollers, and other features commonly associated with pedestrians. Alternatively and/or additionally, in some embodiments, pedestrian identification module 2804 may include a stereo image analysis as described in connection with FIG. 6 above, in which case pedestrian identification module 2804 may include instructions for detecting a set of features within a first set of images (e.g., acquired by image capture device 124) and a second set of images (e.g., acquired by image capture device 126).

In one embodiment, eye identification module 2504 may store instructions (such as computer vision software) which, when executed by processing unit 110, performs image analysis of at least one of the plurality of images to identify eyes of the at least one pedestrian. In some embodiments, the image analysis may comprise applying one or more classifiers (and/or one or more neural networks) to identify one or more bounding boxes including eyes of the at least one pedestrian.

Eye identification module 2504 may further store instructions (such as computer vision software) which, when executed by processing unit 110, determines, based on an analysis of at least one of the plurality of images and based on the identified eyes, a looking direction of the at least one pedestrian. Determining, or sensing, a looking direction, may include identifying one or more features of the identified eyes. The one or more features may include an iris, a cornea, a pupil, a nose, an eyebrow, or any other features associated with or near eyes of the at least one pedestrian. In some embodiments, eye identification module 2504 may determine that the eyes are looking towards a host vehicle when the looking direction intersects the host vehicle. In other embodiments, eye identification module 2504 may calculate a cone including the host vehicle, e.g., at the apex or at another location within the cone and having an axis along an axis of the host vehicle (e.g., from hood to trunk). The cone may have an angle of 90 degrees or less, 45 degrees or less, or the like. Eye identification module 2504 may determine that the eyes are looking towards a host vehicle when the looking direction intersects with a side of the cone at an angle less than a threshold (e.g., less than 90 degrees, less than 45 degrees, or the like). Alternatively, eye identification module 2504 may calculate a cone including the at least one pedestrian, e.g., at the apex or at another location within the cone and having an axis from the at least one pedestrian to the host vehicle. The cone may have an angle of 90 degrees or less, 45 degrees or less, or the like. Eye identification module 2502 may determine that the eyes are looking towards a host vehicle when the looking direction falls within the cone.

In some embodiments, eye identification module 2504 may determine that the eyes are looking away from a host vehicle when the looking direction does not face the host vehicle. Alternatively, eye identification module 2504 may determine that the eyes are looking away from a host vehicle using any of the cones described above. Alternatively, eye identification module 2504 may determine that the eyes are looking away from the host vehicle if pedestrian identification module 2504 identifies a pedestrian for whom eye identification module 2504 cannot identify eyes. For example, the pedestrian may be facing away from the host vehicle such that only the back of the pedestrian's head is visible in the captured images.

In one embodiment, determining the looking direction of the pedestrian may take into account the environment of the host vehicle. For example, if an object (including a second pedestrian) is present in the environment of the host vehicle or the environment of the target pedestrian, the object may be located between the target pedestrian and the host vehicle such that the object obstructs a line of sight from the target pedestrian to the host vehicle. In such a situation, eye identification module 2504 may determine that while the vehicle is geometrically within the line of sight of the pedestrian, due to the obstruction, the pedestrian is not looking in the direction of the vehicle. Thus, in some embodiments, determining the line of sight of a target pedestrian may involve processing of an image of the environment of the host vehicle and/or processing a map which includes information about objects located in a vicinity of the target vehicle, and determining a location of such objects relative to an estimated line of sight of the target pedestrian.

In one embodiment, navigational action module 2806 may store software executable by processing unit 110 to determine a navigational action for the host vehicle, based on the looking direct of the pedestrian relative to the host vehicle. In some embodiments, if the pedestrian is determined to be looking in a direction of the host vehicle, navigational action module 2506 may determine a first navigational action for the host vehicle. In some embodiments, if the pedestrian is determined to be looking in a direction other than toward the host vehicle, navigational action module 2506 may determine a second navigational action for the host vehicle. Navigational action module 2506 may also determine a navigational action based on sensory input (e.g., information from radar, lidar, exterior cameras, or the like) and inputs from other systems of vehicle 200, such as a map data, predetermined position of vehicle 200, a relative velocity or a relative acceleration between vehicle 200 and one or more detected objects, or the like.

In some embodiments, the first navigational action may include slowing or stopping the host vehicle or moving over within a lane of travel in a direction away from the pedestrian. In some embodiments, the second navigational action may be more conservative than the first navigational action in at least on respect. For example, the second navigational action may include a larger pedestrian buffer zone relative to the first navigational action, a host vehicle speed slower than the first navigational action, or the like.

In one example, the resolution of the camera onboard the host vehicle (or any other imaging device and/or other sensors) may be such that the host vehicle should be within a certain distance (e.g., proximity) of the target pedestrian. This may allow the camera (or any other imaging device and/or other sensors) to resolve features of the pedestrian's face and/or body at a sufficient resolution in order to identify the features with sufficient certainty. In such circumstances, the processing device of the host vehicle may control the host vehicle under the assumption that the target pedestrian state should result in a more restrictive state with regard the host vehicle's navigation, e.g., drive more slowly, maintain a greater distance, use alerts to draw the target pedestrian's attention, etc. When the sensing module (e.g., a camera) onboard the host vehicle captures the target pedestrian's finer features, the processing device may compute an action for navigating the host vehicle in accordance with the target pedestrian's looking direction.

Based on the determined navigational action, navigational response module 2508 may transmit electronic signals to cause control of at least one navigational actuator of the host vehicle in accordance with the determined first or second navigational action for the host vehicle. The navigational actuator may include at least one of a steering mechanism, a brake or an accelerator. In some embodiments, navigational response module 2508 may transmit one or more signals to one or more of throttling system 220, braking system 230, and steering system 240 of vehicle 200 to trigger the determined navigational action, for example, turning the steering wheel of vehicle 200 to achieve a rotation of a predetermined angle.

Furthermore, any of the modules (e.g., modules 2502, 2504, 2506, and 2508) disclosed herein may implement techniques associated with a trained system (such as a neural network or a deep neural network) or an untrained system, such as a system that may be configured to use computer vision algorithms to detect and/or label objects in an environment from which sensory information was captured and processed. In one embodiment, pedestrian identification module 2502 and/or other image processing modules may be configured to use a combination of a trained and untrained system.

Figure 26A:
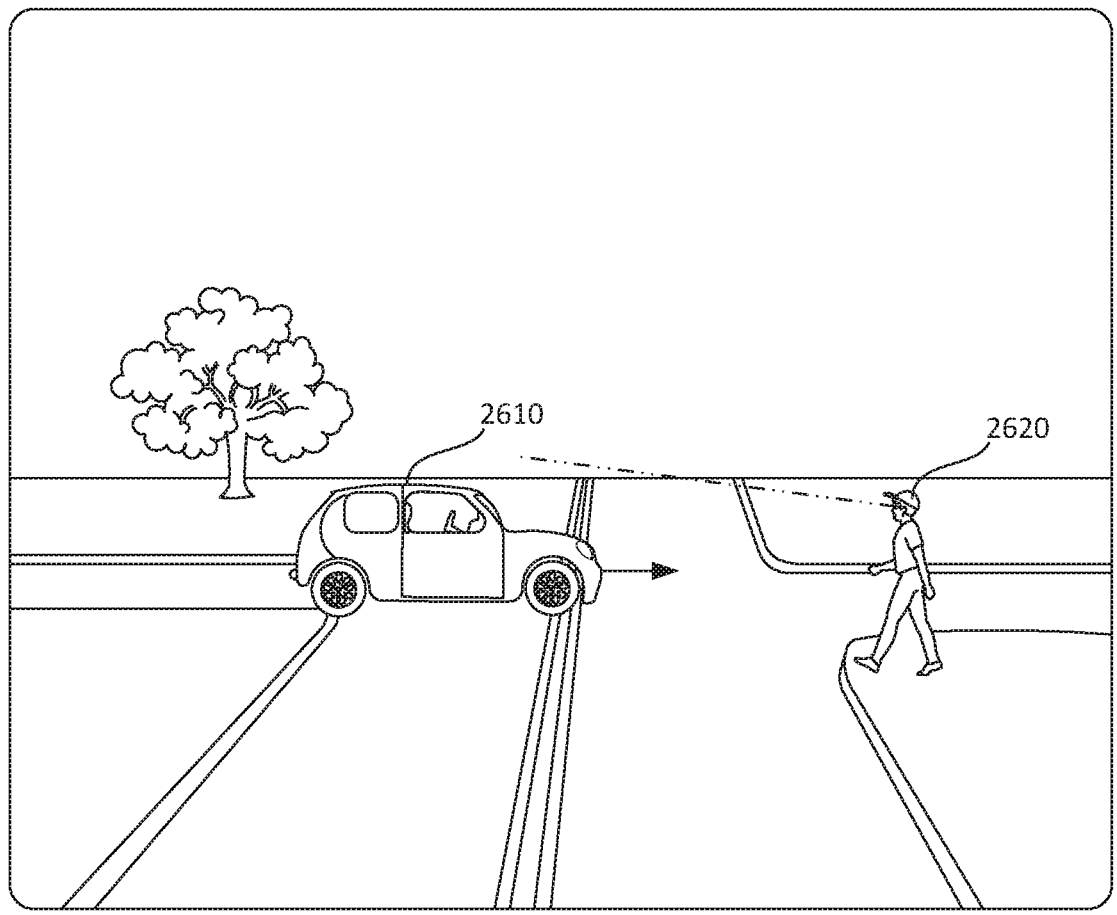
FIG. 26A provides a diagram of a navigational change based on a looking direction of a pedestrian.

FIG. 26A shows an example of a scene that may be captured and analyzed during navigation of a host vehicle 2610 (which may comprise host vehicle 200). Specifically, the scene shown in FIG. 26A is an example of one of the images that may be captured at time t from an environment of the host vehicle 2610. The navigation system may include at least one processing device that is specifically programmed to receive the plurality of images and analyze the images to determine a navigational action in response to the scene. Specifically, the at least one processing device may implement pedestrian identification module 2502 to identify pedestrian 2620, and eye identification module 2504 may identify eyes of pedestrian 2620 and determine that pedestrian 2620 is looking towards host vehicle 2610. As explained above, eye identification module 2504 may make this determination by constructing a cone apexed at host vehicle 2610 or at pedestrian 2620 and determining that the looking direction of pedestrian 2620 intersects the cone at an angle less than a threshold or is within the cone, respectively. It will be appreciated that a cone is used here as an example of a geometric shape that can be used to translate the looking direction of the pedestrian into a geometric shape. It will be further appreciated that other 3-D shapes in real space can be used. Furthermore, 2-D shapes may be used in image space instead of or in combination with the 3-D shapes in real space. For example, a triangle may be used in some embodiments. Navigation action module 2506 may then determine a navigation action for host vehicle, such as deceleration, or braking, or switching lanes. In some embodiments, the host vehicle may switch lanes and/or may decelerate to a stop.

Figure 26B:
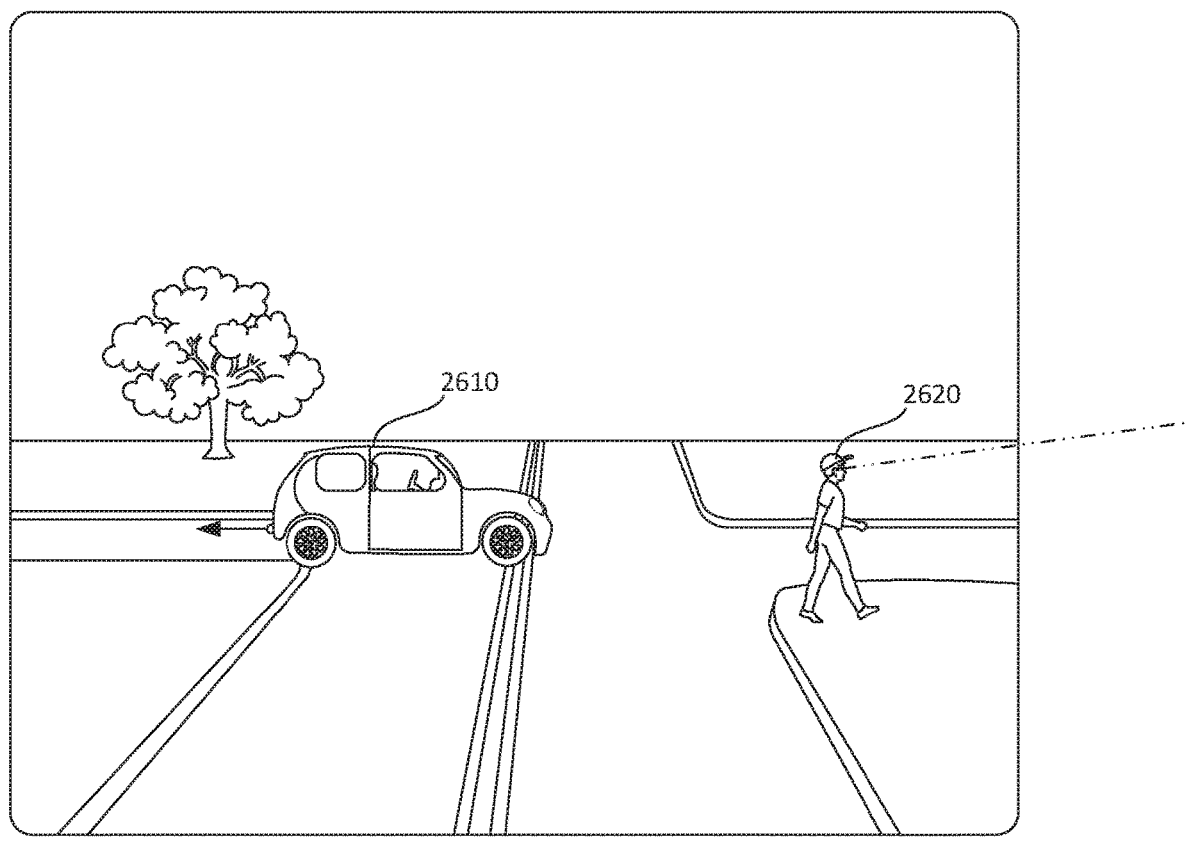
FIG. 26B provides a diagram of another navigational change based on a looking direction of a pedestrian.

FIG. 26B shows an example of a scene that may be captured and analyzed during navigation of a host vehicle 2610 (which may comprise host vehicle 200). FIG. 26B is similar to FIG. 26A except that eye identification module 2504 may identify eyes of pedestrian 2620 and determine that pedestrian 2620 is looking away from host vehicle 2610 (or may determine that pedestrian 2620 is looking away from host vehicle 2610 based on an inability to identify eyes of pedestrian 2620). Accordingly, navigation action module 2506 may then determine a navigation action for host vehicle, such as deceleration, or braking, or switching lanes. The navigation action determined in FIG. 26B may be more conservative than that determined in FIG. 26A. For example, host vehicle 2610 may decelerate at a greater rate, apply brakes at a higher strength, provide greater clearance to pedestrian 2620 (e.g., by switching more than one lane and/or by moving into a location within a lane that is further from pedestrian 2620 than the center of the lane), or the like.

Figure 27:
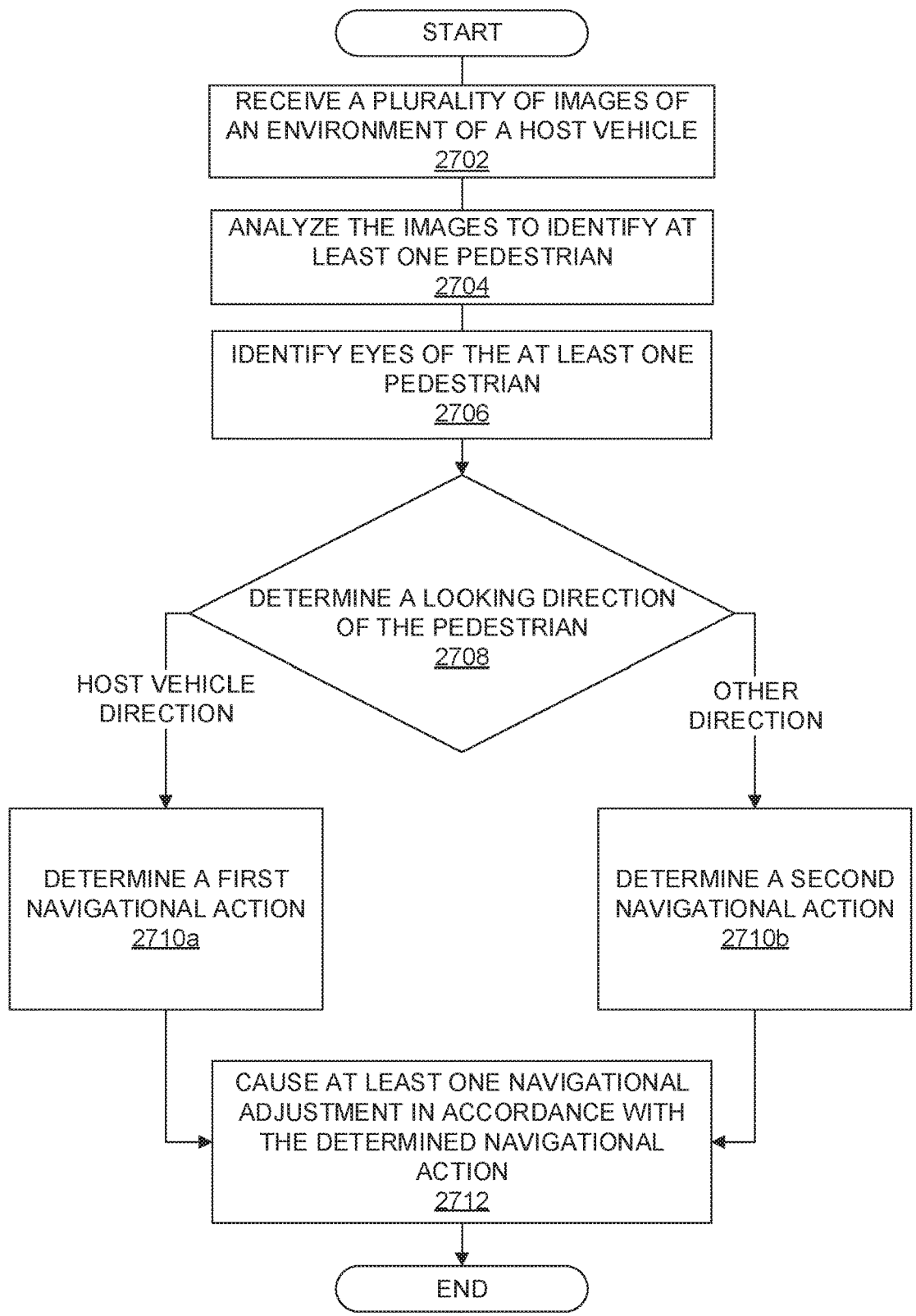
FIG. 27 provides an algorithmic flow chart for navigating a vehicle consistent with the disclosed embodiments.

FIG. 27 is a flowchart showing an exemplary process 2700 for navigating based on a sensed looking direction of a pedestrian, consistent with disclosed embodiments. At step 2702, processing unit 110 may receive a plurality of images representative of an environment of a host vehicle via data interface 128. For instance, cameras included in image acquisition unit 120 (such as image capture devices 122, 124, and 126 having fields of view 202, 204, and 206) may capture at least one image of an area forward and/or to the side of the host vehicle and transmit them over a digital connection (e.g., USB, wireless, Bluetooth, etc.) to processing unit 110.

At step 2704, processing unit 110 may analyze the plurality of images to identify at least one pedestrian in the environment of the host vehicle. For example, identifying at least one pedestrian may include detecting one or more attributes or features of a pedestrian. The attributes may include a facial region, a core/body region, or one or more accessories associated with the pedestrian.

At step 2706, processing unit 110 may identify eyes of the at least one pedestrian represented in at least one of the plurality of images. For example, processing unit 110 may analyze features within the facial region of the at least one identified pedestrian. The features may include identifying at least one of an iris, a cornea, a pupil, a nose, an eyebrow, a hairline, or other features associated with or near an eye.

At step 2708, processing unit 110 may determine, based on analysis of the at least one of the plurality of images and based on the identification of the eyes of the at least one pedestrian in the at least one of the plurality of images, a looking direction of the at least one pedestrian. For example, based on characteristics of features associated with or near the eye, processing unit 110 may determine a looking direction. For example, processing unit 110 may identify a pupil and determine, based on this identification, that the pedestrian is looking towards the host vehicle. Additionally or alternatively, processing unit 110 may identify the back of a head and determine, based on this identification, that the pedestrian is looking away from the host vehicle.

In some embodiments, processing unit 110 may determine the at least one pedestrian to be looking in a direction of the host vehicle if the determined looking direction of the pedestrian falls within a cone intersecting the host vehicle and defined by an angle of 90 degrees or less, 45 degrees or less, or the like.

At step 2710*a*, if the at least one pedestrian is determined to be looking in a direction of the host vehicle, processing unit 110 may determine a first navigational action for the host vehicle. At step 2710*b*, if the at least one pedestrian is determined to be looking in a direction of the host vehicle, processing unit 110 may determine a second navigational action for the host vehicle different from the first navigational action and more conservative than the first navigational action in at least one respect. As used herein, a "more conservative" action may refer to any action for which an associated parameter (e.g., a maximum acceleration, a maximum deceleration, a maximum following distance, a minimum slowing distance, a maximum turning angle, or the like) is smaller than the corresponding parameter for the less conservative action.

In some embodiments, the second navigational action may include a larger pedestrian buffer zone relative to the first navigational action. Additionally or alternatively, the second navigational action may include a host vehicle speed slower than the first navigational action.

At step 2712, processing unit 110 may cause control of at least one navigational actuator of the host vehicle in accordance with the determined first or second navigational action for the host vehicle. The navigational actuator may include at least one of a steering mechanism, a brake, or an accelerator. Processing unit 110 may cause one or more signals to be transmitted to the navigational actuator to trigger a navigational action.

Navigation Based on Sensed Facing Direction of a Pedestrian

Disclosed systems and methods may allow for navigating a host vehicle based on the sensed facing direction of a pedestrian. Navigating based on the sensed facing direction may allow for preemptive motoring of an attribute of a pedestrian and reaction to the sensed facing direction for a more efficient navigation. For example, when the facing direction of the pedestrian is determined to intersect with a planned path of the host vehicle, the host vehicle may navigate more conservatively than it otherwise might navigate without a pedestrian facing a planned path.

Figure 28:
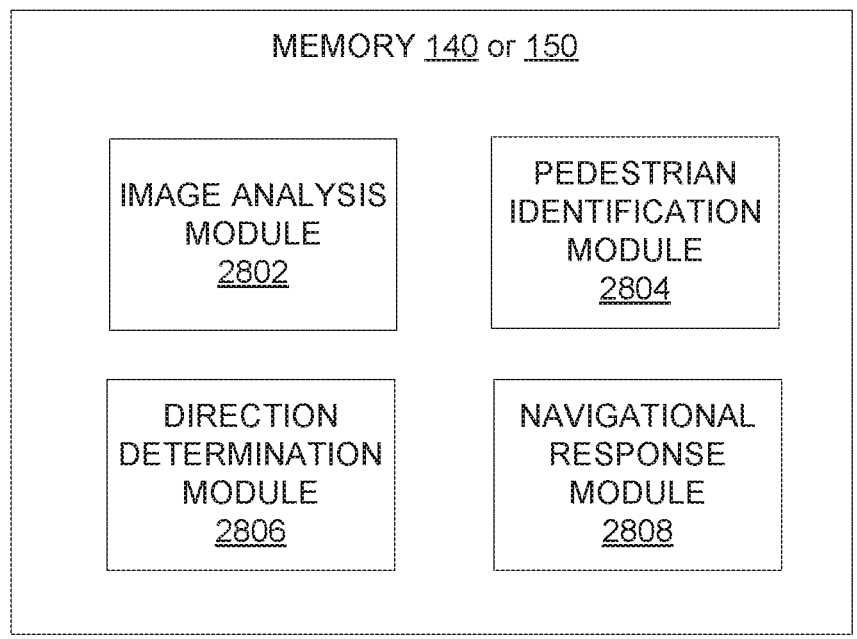
FIG. 28 is an exemplary block diagram of a memory configured to store instructions for performing one or more operations consistent with the disclosed embodiments.

FIG. 28 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 28, memory 140 may store an image analysis module 2802, pedestrian identification module 2804, a direction determination module 2806, and a navigational response module 2808. The disclosed embodiments are not limited to any particular configuration of memory 140. Further, applications processor 180 and/or image processor 190 may execute the instructions stored in any of modules 2802, 2804, 2806, and 2808 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, image analysis module 2802 may store instructions (such as computer vision software) which, when executed by processing unit 110, receives, from a camera, a plurality of images representative of an environment of the host vehicle. The camera may include at least one of image capture device 122, image capture device 124, and image capture device 126, as described above. In some embodiments, processing unit 110 may combine information from a set of images with additional sensory information (e.g., information from radar, lidar, etc.) to perform the image analysis.

Pedestrian identification module 2804 may store instructions which, when executed by processing unit 110, performs image analysis of at least one of the plurality of images to identify at least one pedestrian in the environment of the host vehicle. In some embodiments, the image analysis may include a monocular image analysis as described in connection with FIGS. 5A-5D above, in which case pedestrian identification module 2804 may include instructions for detecting a set of features within the images, such as anatomical parts, accessories, clothing, crosswalks, canes, strollers, and other features commonly associated with pedestrians. Alternatively and/or additionally, in some embodiments, pedestrian identification module 2804 may include a stereo image analysis as described in connection with FIG. 6 above, in which case pedestrian identification module 2804 may include instructions for detecting a set of features within a first set of images (e.g., acquired by image capture device 124) and a second set of images (e.g., acquired by image capture device 126).

In one embodiment, pedestrian identification module 2804 may determine, based on an analysis of at least one of the plurality of images, a facing direction of the pedestrian. Determining, or sensing, a facing direction, may include identifying one or more attributes of the pedestrians. The one or more attributes may include an indication of the facing direction. In some embodiments, pedestrian identification module 2804 may determine that a pedestrian is facing a host vehicle based on an identification of a front view of a face of a pedestrian, a front of a knee of a pedestrian or a chest region of the pedestrian. In other embodiments, pedestrian identification module 2804 may determine that a pedestrian is facing a direction angled relative to the host vehicle based on an identification of at least one of a toe side or heel side of a foot of a pedestrian. Still, in some embodiments, pedestrian identification module 2804 may determine that a pedestrian is facing a direction perpendicular to the host vehicle based on identifying a side view of a face of a pedestrian. In some embodiments, pedestrian identification module 2804 may determine that a pedestrian is facing a direction away from a host vehicle based on identifying one or more of a back region of a pedestrian or an elbow of a pedestrian.

In one embodiment, direction determination module 2806 may store instructions (such as computer vision software) which, when executed by processing unit 110, determine, based on an analysis of at least of the plurality of images and a sensed facing direction, whether the pedestrian is facing a direction that intersects with an anticipated travel direction of the host vehicle. Direction determination module 2806 may compare an anticipated trajectory of the host vehicle based on mechanical and electrical properties of the host vehicle including one or more of a velocity, an acceleration, an identified stop sign, a stop sign, or a speed bump. Direction determination module 2806 may analyze the one or more properties of a planned path of the host vehicle and the direction that a pedestrian is facing to calculate a likelihood that the two will intersect. Direction determination module 2806 may calculate a confidence rating of the intersection, the confidence rating representing a likelihood that the host vehicle and the pedestrians facing direction will intersect. In some embodiments, direction determination module may determine a point along the facing direction that the pedestrian is expected to be located at the time of likely intersection. In some embodiments, direction determination module 2806 may determine a facing direction relative to geographical coordinated and/or cardinal directions. For examiner, direction determination module 2806 may determine that a passenger is facing due west and the host vehicle is headed due north.

In one embodiment, navigational response module 2808 may store software executable by processing unit 110 to determine a navigational action for the host vehicle, based on the sensed facing direction of the pedestrian relative to the host vehicle. In some embodiments, if the pedestrian is determined to be facing in a direction that intersects with an anticipated travel direction of the host vehicle, navigational response module 2808 may determine a first navigational action for the host vehicle. In some embodiments, if the pedestrian is determined to be facing in a direction that does not intersects with an anticipated travel direction of the host vehicle, navigational response module 2808 may determine a second navigational action for the host vehicle. Navigational response module 2808 may also determine a determined navigational action based on sensory input (e.g., information from radar) and inputs from other systems of vehicle 200, such as on data, a predetermined position of vehicle 200, and/or a relative velocity or a relative acceleration between vehicle 200 and one or more objects detected from execution of image analysis module 2802.

In some embodiments, the first navigational action may include slowing or stopping the host vehicle or moving over within a lane of travel in a direction away from the pedestrian. In some embodiments, the second navigational action may be more conservative than the first navigational action in at least on respect. In some embodiments, the second navigational response may include continuing with a current speed and heading.

Based on the determined navigational action, processing unit 110 may transmit electronic signals to cause control of at least one navigational actuator of the host vehicle in accordance with the determined first or second navigational action for the host vehicle. The navigational actuator may include at least one of a steering mechanism, a brake or an accelerator. In some embodiments, navigational response module 2808 may transmit one or more signals to one or more of throttling system 220, braking system 230, and steering system 240 of vehicle 200 to trigger the determined navigational action, for example, turning the steering wheel of vehicle 200 to achieve a rotation of a predetermined angle.

Furthermore, any of the modules (e.g., modules 2802, 2804, 2806, and 2808) disclosed herein may implement techniques associated with a trained system (such as a neural network or a deep neural network) or an untrained system. such as a system that may be configured to use computer vision algorithms to detect and/or label objects in an environment from which sensory information was captured and processed. In one embodiment, image analysis module 2802 and/or other image processing modules may be configured to use a combination of a trained and untrained system.

Figure 29:
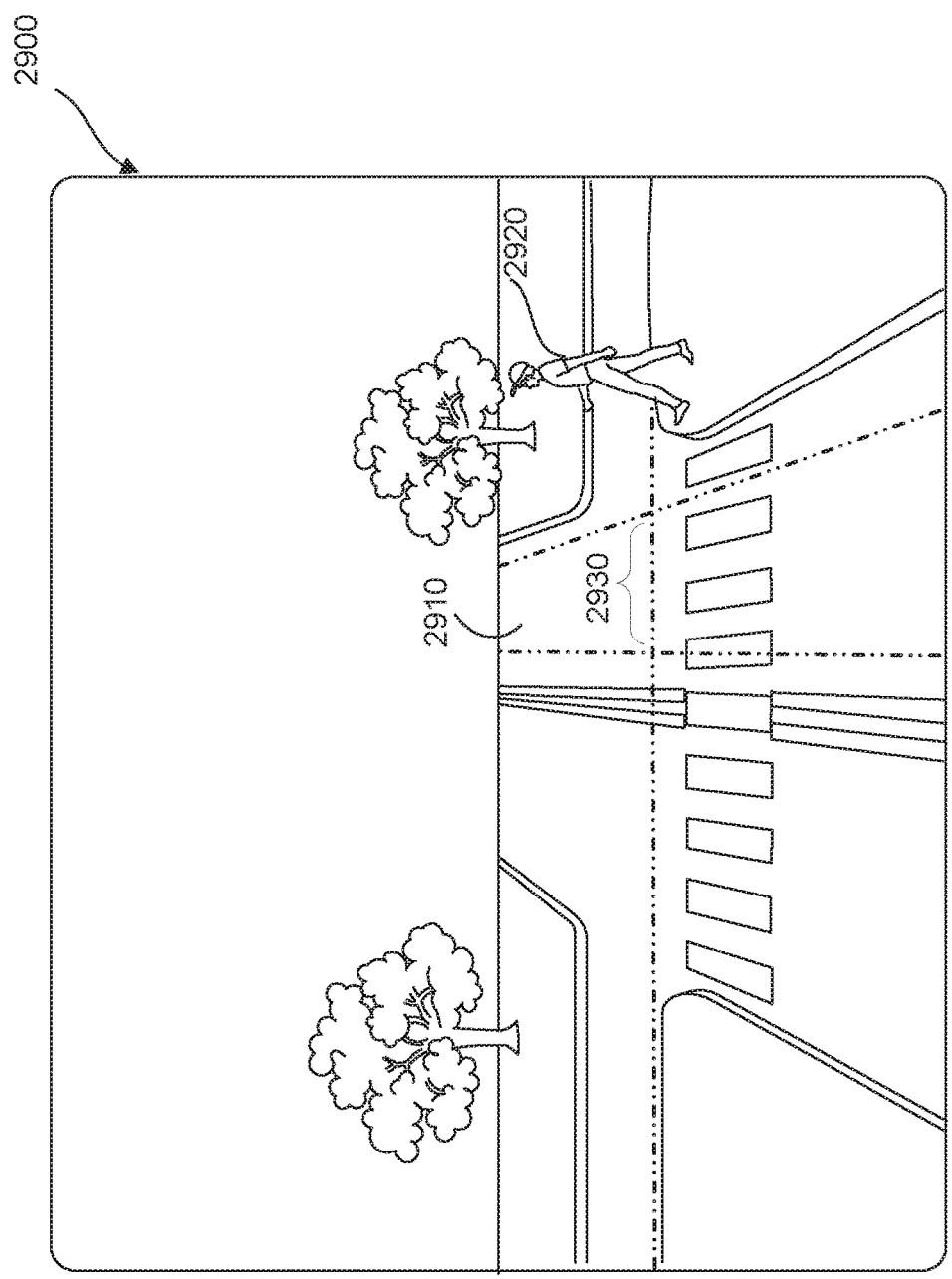
FIG. 29 provides a diagram of a representative image captured of an environment of a host vehicle, for determining a facing direction of a pedestrian.

FIG. 29 shows an example of a scene 2900 that may be captured and analyzed during navigation of a host vehicle 200. Specifically, the scene shown in FIG. 29 is an example of one of the images that may be captured at time t from an environment of the host vehicle traveling in lane along an anticipated travel direction 2910. The navigation system may include at least one processing device that is specifically programmed to receive the plurality of images and analyze the images to determine a navigational action in response to the scene. Specifically, the at least one processing device may implement image analysis module 2802 to analyze the image, pedestrian identification module 2804 may identify pedestrian 2920, and direction determination module 2804 may determine that the pedestrian is facing a direction perpendicular to the anticipated travel direction 2910. Direction determination module 2806 may make this determination by identifying certain facial and/or other attributes associated with pedestrian 2920 such as, a side of footwear or a side profile view of the pedestrian's face. Direction determination module 2806 may also determine that the facing direction and anticipated travel path intersect at region 2930. Navigation response module 2804 may then determine a navigation action for host vehicle, such as deceleration, or braking, or switching lanes and cause signals to be transmitted to a navigational actuator for controlling the vehicle in accordance with the navigational action. In some embodiments, the host vehicle may switch lanes or cause the host vehicle to decelerate to a stop prior to arriving at region 2930.

Figure 30:
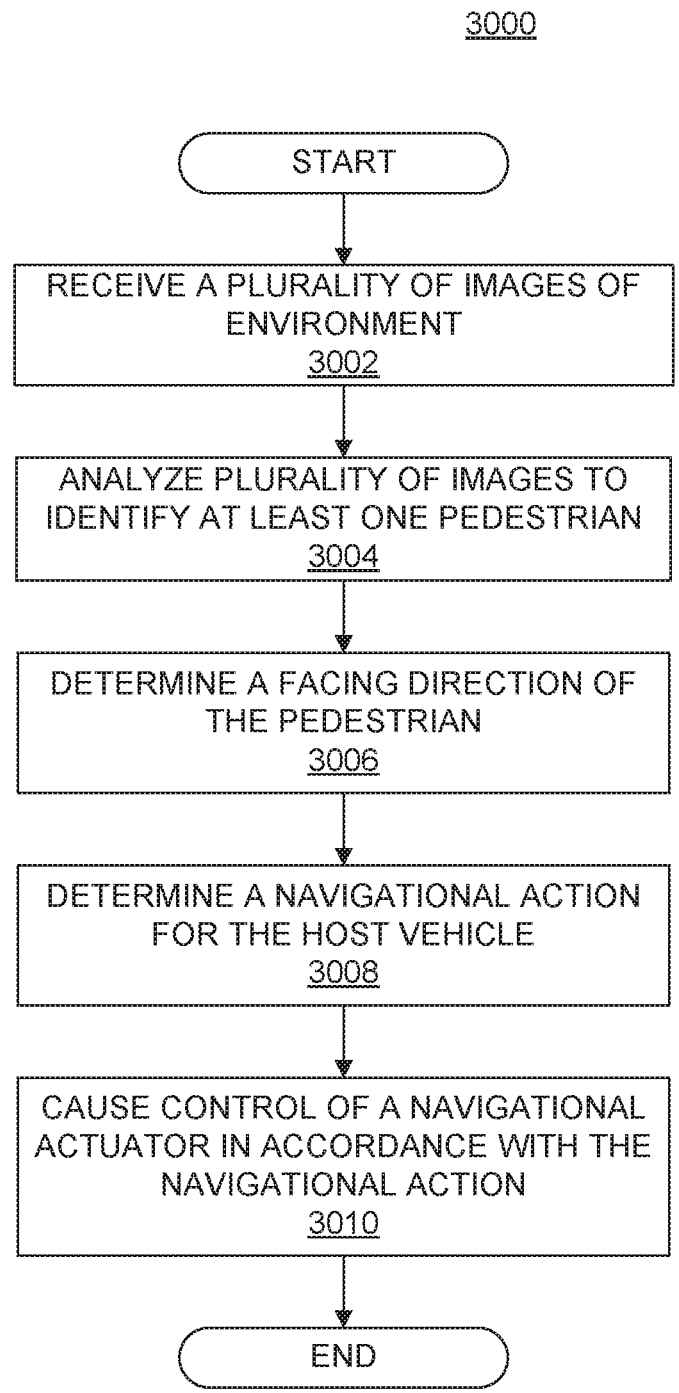
FIG. 30 provides an algorithmic flow chart for navigating a vehicle based on a sensed facing direction of a pedestrian.

FIG. 30 is a flowchart showing an exemplary process 3000 for navigating based on a sensed facing direction of a pedestrian, consistent with disclosed embodiments. At step 3002, processing unit 110 may receive a plurality of images representative of an environment of a host vehicle via data interface 128. For instance, cameras included in image acquisition unit 120 (such as image capture devices 122, 124, and 126 having fields of view 202, 204, and 206) may capture at least one image of an area forward and/or to the side of the host vehicle and transmit them over a digital connection (e.g., USB, wireless, Bluetooth, etc.) to processing unit 110.

At step 3004, processing unit 110 may analyze at least one of the plurality of images to identify at least one pedestrian in the environment of the host vehicle. For example, identifying at least one pedestrian may include detecting one or more attributes of a pedestrian. The attributes may include a facial region, a core/body region, or one or more accessories associated with the pedestrian.

At step 3006, processing unit 110 may determine a facing direction of the pedestrian. For example, processing unit 110 may analyze the attributes of the one or more identified pedestrian. The attribute may include identifying at least one of a toe side or a heel side of a foot of the pedestrian, a face, a knee, an elbow, a back, or a chest. Based on characteristics of the attribute, processing unit 110 may determine a facing direction. For example, processing unit 110 may identify a front of a knee and determine, based on this identification, that the pedestrian is facing the host vehicle.

At step 3008, processing unit 110 may determine a navigational action for the host vehicle based on a determination of whether the pedestrian is facing a direction that intersects with the anticipated travel direction of the host vehicle. If processing unit 110 determined that the pedestrian is facing an intersecting direction, a first navigational action may be triggered. If processing unit 110 determines that the pedestrian is not facing an intersecting direction, a second navigational action may be triggered, the second navigational action being more conservative than the first navigational action in at least one respect. In some embodiments, the first navigational action may include slowing or stopping the host vehicle, or moving over within a lane of travel in a direction away from the pedestrian. A second navigational action may include continuing with the current speed and heading.

At step 3010, processing unit 110 may cause control of at least one navigational actuator of the host vehicle in accordance with the determined first or second navigational action for the host vehicle. The navigational actuator may include at least one of a steering mechanism, a brake or an accelerator. Processing unit 110 may cause one or more signals to be transmitted to the navigational actuator to trigger a navigational action.

Navigation Based on Moving Direction and Speed of a Pedestrian

Disclosed systems and methods may allow for navigating a host vehicle based on the sensed moving direction and speed of a pedestrian. Navigating based on the sensed moving direction and speed may allow for preemptive motoring based on a likelihood that the path of the pedestrian will intersect with an anticipated travel path of the host vehicle. For example, when a pedestrian is determined to be moving in a direction that crosses an anticipated travel direction of the host vehicle, the navigation system may determine a first navigational response. When a pedestrian is determined to be moving in a direction that does not cross an anticipated travel direction of the host vehicle, the navigation system may determine a second navigational response.

Figure 31:
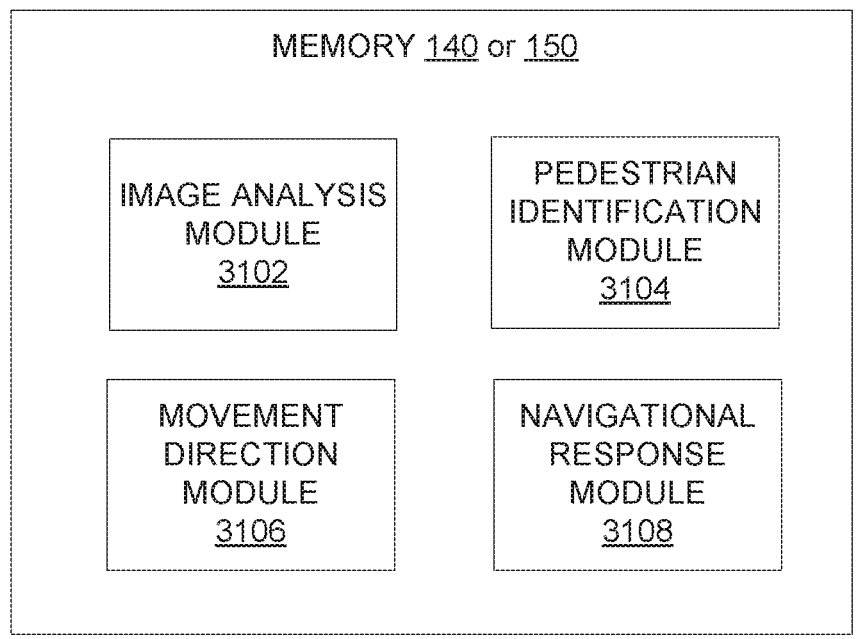
FIG. 31 is an exemplary block diagram of a memory configured to store instructions for performing one or more operations consistent with the disclosed embodiments.

FIG. 31 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 31, memory 140 may store an image analysis module 3102, pedestrian identification module 3104, a movement direction module 3106, and a navigational response module 3108. The disclosed embodiments are not limited to any particular configuration of memory 140. Further, applications processor 180 and/or image processor 190 may execute the instructions stored in any of modules 3102, 3104, 3106, and 308 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, image analysis module 3102 may store instructions (such as computer vision software) which, when executed by processing unit 110, receives, from a camera, a plurality of images representative of an environment of the host vehicle. The camera may include at least one of image capture device 122, image capture device 124, and image capture device 126, as described above. In some embodiments, processing unit 110 may combine information from a set of images with additional sensory information (e.g., information from radar, lidar, etc.) to perform the image analysis.

Pedestrian identification module 3104 may store instructions which, when executed by processing unit 110, performs image analysis of at least one of the plurality of images to identify a pedestrian in the environment of the host vehicle. In some embodiments, the image analysis may include a monocular image analysis as described in connection with FIGS. 5A-5D above, in which case pedestrian identification module 3104 may include instructions for detecting a set of features within the images, such as anatomical parts, crosswalk, trees, mailboxes, and other features commonly associated with pedestrians. Certain features may be identified as point of references for detecting movement or determining a speed of a pedestrian. Alternatively and/or additionally, in some embodiments, pedestrian identification module 2804 may include a stereo image analysis as described in connection with FIG. 6 above, in which case pedestrian identification module 3104 may include instructions for detecting a set of features within a first set of images (e.g., acquired by image capture device 124) and a second set of images (e.g., acquired by image capture device 126).

In one embodiment, moving direction module 3106 may determine, based on an analysis of at least one of the plurality of images, a moving direction of the pedestrian. Determining a moving direction, may include analyzing one or more attributes of the pedestrians. The one or more attributes may include a change in position relative to a point of reference or a plurality of reference points. In some embodiments, moving direction module 3106 may determine that a pedestrian has moved to a location proximal to a street crossing. In other embodiments, moving direction module 3106 may determine that a pedestrian is moving towards a location distal to the host vehicle. Additionally, or alternatively, moving direction module 3106 may determine a that a pedestrian is moving. In some embodiments, moving direction module 3106 may determine a type of movement. The type of movement may include one of running or walking, and/or a pace or speed of movement. The type of movement may be determined based on a detected speed greater than a predetermined threshold and/or one or more indicators of a pedestrian's gait cycle.

In one embodiment, moving direction module 3106 may store instructions (such as computer vision software) which, when executed by processing unit 110, determine if the pedestrian is determined to be moving in a direction that intersects with an anticipated travel direction of the host vehicle. Moving direction module 3106 may compare an anticipated trajectory of the host vehicle based on mechanical and electrical properties of the host vehicle including one or more of a velocity, an acceleration, an identified stop sign, a stop sign, or a speed bump. Moving direction module 3106 may compare the one or more properties of a planned path of the host vehicle with a determined movement and/or speed of the pedestrian to calculate a likelihood that the two will intersect.

In one embodiment, navigational response module 3108 may store software executable by processing unit 110 to determine a navigational action for the host vehicle, based on the determination of the pedestrian is moving in a direction that intersects with an anticipated travel direction of the host vehicle. If navigational response module 3108 determines that the moving direction of the pedestrian intersects with the anticipated travel direction of the host vehicle, navigational response module 3108 may determine a first navigational action for the host vehicle. If navigational response module 3108 determines that the moving direction of the pedestrian does not intersect with the anticipated travel direction of the host vehicle, navigational response module 3108 may determine a second navigational action for the host vehicle. The second navigational action for the host vehicle may be different from the first navigational action. Navigational response module 3108 may also determine a determined navigational action based on sensory input (e.g., information from radar) and inputs from other systems of vehicle, such as on data, a predetermined position of vehicle, and/or a relative velocity or a relative acceleration between the host vehicle and one or more objects detected from execution of image analysis module 3102.

Navigational response module 3108 may store software executable by processing unit 110 to cause control of at least one navigational actuator of the host vehicle in accordance with the determined first or second navigational action for the host vehicle. The at least one navigational actuator may include at least one of a steering mechanism, a brake, or an accelerator. In some embodiments, the first navigational action may include slowing or stopping the host vehicle or moving over within a lane of travel in a direction away from the pedestrian. In some embodiments, the second navigational action may include continuing with a current speed and heading.

Based on the determined navigational action, processing unit 110 may transmit electronic signals to cause control of at least one navigational actuator of the host vehicle in accordance with the determined first or second navigational action for the host vehicle. The navigational actuator may include at least one of a steering mechanism, a brake or an accelerator. In some embodiments, navigational response module 3108 may transmit one or more signals to one or more of throttling system 220, braking system 230, and steering system 240 of vehicle 200 to trigger the determined navigational action, for example, turning the steering wheel of vehicle 200 to achieve a rotation of a predetermined angle.

Furthermore, any of the modules (e.g., modules 3102, 3104, 3106, and 3108) disclosed herein may implement techniques associated with a trained system (such as a neural network or a deep neural network) or an untrained system. such as a system that may be configured to use computer vision algorithms to detect and/or label objects in an environment from which sensory information was captured and processed. In one embodiment, image analysis module 3102 and/or other image processing modules may be configured to use a combination of a trained and untrained system.

Figure 32:
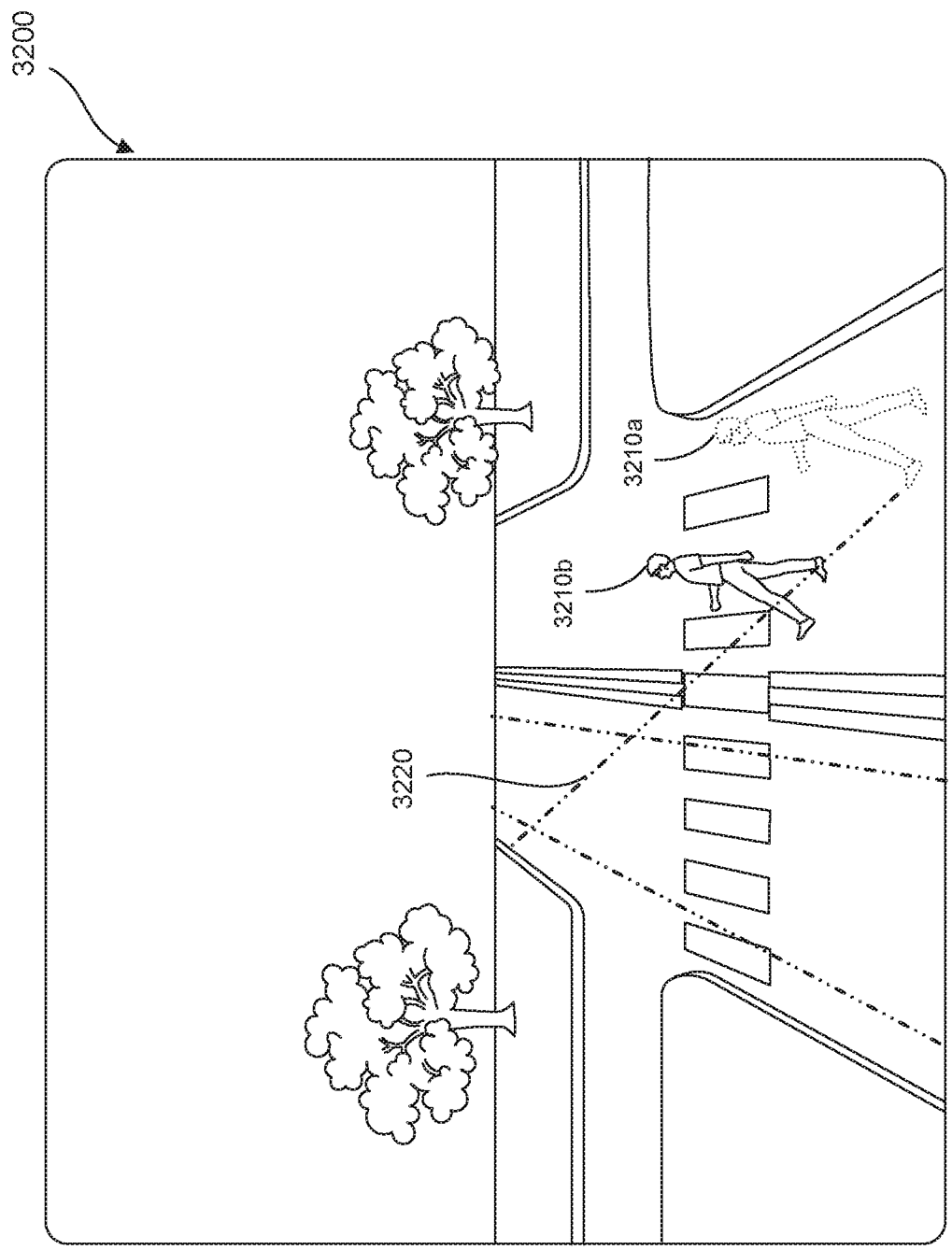
FIG. 32 provides a diagram of a representative image captured of an environment of a host vehicle, for determining a moving direction of a pedestrian.

FIG. 32 shows an example of scene 3200 that may be captured and analyzed during navigation of a host vehicle. Specifically, the scene shown in FIG. 32 is an example of one of the images that may be captured at time t from an environment of the host vehicle traveling in lane along an anticipated travel direction. In some embodiments, the at least one processing device may implement image analysis module 3102 to analyze the image, and pedestrian identification module 3104 may identify a pedestrian 3210*b*. Moving direction module 3106 may determine that the pedestrian 3210*b* was previously identified in a previously captured image as pedestrian 3210*a*. Based on this information, moving direction module 3106 may determine that the pedestrian has moved along a vector from a location associated with pedestrian 3210*a* to a location associated with pedestrian 3210*b*. The vector may be projected to determine whether the moving direction intersects with the anticipated travel direction of the host vehicle. A determination of whether a region of intersection exists may be used to determine a navigational action. For example, region of intersection 3220 may be used to determine a first navigational action for the host vehicle. The first navigational action may include stopping or slowing the host vehicle. Signals may be transmitted to a navigational actuator of the host vehicle to deceleration or brake the host vehicle in accordance with the first navigational action.

In some embodiments, images and/or map data may be processed to rule out the possibility that the pedestrian's progress towards the intersection point with the host vehicle is blocked by an obstruction or an object that is otherwise expected to alter the pedestrian's moving direction. Such embodiments may take into account the presence of such an object in order to reduce false positives.

The navigation system may include at least one processing device that is specifically programmed to receive the plurality of images and analyze the images to determine a navigational action in response to the scene.

Figure 33:
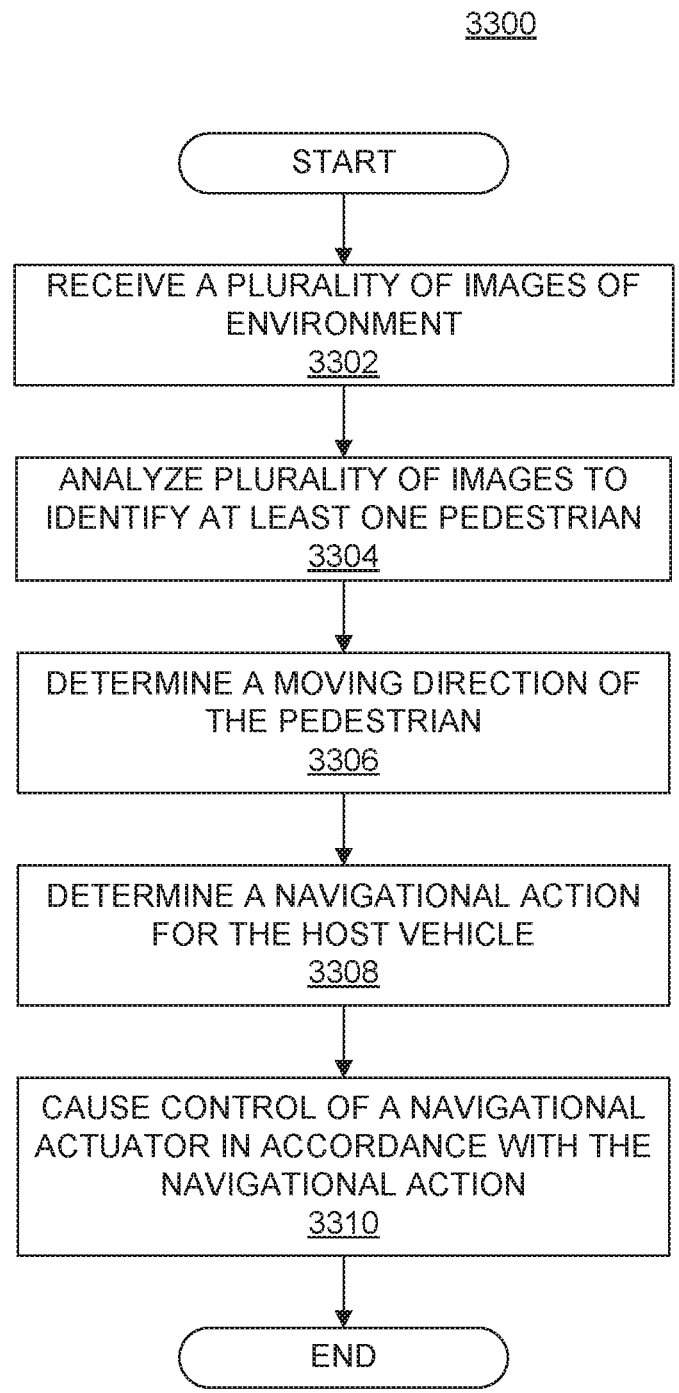
FIG. 33 provides an algorithmic flow chart for navigating a vehicle based on a moving direction of a pedestrian.

FIG. 33 is a flowchart showing an exemplary process 3300 for navigating based on a sensed moving direction of a pedestrian, consistent with disclosed embodiments. At step 3302, processing unit 110 may receive a plurality of images representative of an environment of a host vehicle via data interface 128. For instance, cameras included in image acquisition unit 120 (such as image capture devices 122, 124, and 126 having fields of view 202, 204, and 206) may capture at least one image of an area forward and/or to the side of the host vehicle and transmit them over a digital connection (e.g., USB, wireless, Bluetooth, etc.) to processing unit 110.

At step 3304, processing unit 110 may analyze at least one of the plurality of images to identify at least one pedestrian in the environment of the host vehicle. For example, identifying at least one pedestrian may include detecting one or more attributes of a pedestrian. The attributes may include a relative location of a facial region, a core/body region, or one of more accessories associated with the pedestrian.

At step 3306, processing unit 110 may determine a moving direction of the pedestrian. For example, processing unit 110 may analyze the attributes of the one or more identified pedestrian and compare with a relative location in a previously captured image. The change in relative location may be analyzed to determine a moving direction. In some embodiments, processing unit 110 may determine a speed associated with he determined movement. The speed may be determined based on a change in relative distance over a predetermined time period.

At step 3308, processing unit 110 may determine a navigational action for the host vehicle based on a determination of whether the moving direction intersects with the anticipated travel direction of the host vehicle. If processing unit 110 determines that the moving direction of the pedestrian intersects with an anticipated travel direction for the host vehicle, a first navigational action may be triggered. If processing unit 110 determines that the moving direction of the pedestrian does not intersect with an anticipated travel direction for the host vehicle, a second navigational action may be triggered. the second navigational action being different from the first navigational action in at least one respect. In some embodiments, the first navigational action may include slowing or stopping the host vehicle or moving over within a lane of travel in a direction away from the pedestrian. A second navigational action may include continuing with the current speed and heading.

At step 3310, processing unit 110 may cause control of at least one navigational actuator of the host vehicle in accordance with the determined first or second navigational action for the host vehicle. The navigational actuator may include at least one of a steering mechanism, a brake or an accelerator. Processing unit 110 may cause one or more signals to be transmitted to the navigational actuator to trigger a navigational action.

Navigation Based on a Sensed Pedestrian in Vicinity of a Crosswalk

In some embodiments, a host vehicle may include a navigation system (e.g., system 100), as described above, that may receive from a camera (e.g., image capture device 122, image capture device 124, image capture device 126, or the like) a plurality of images representative of an environment of the host vehicle. The navigation system may analyze one or more of the received images to identify a crosswalk in the environment of the host vehicle. The navigation system may also analyze one or more of the received images to determine whether a pedestrian is in a vicinity of the identified crosswalk. The navigation system may also determine that the pedestrian in the vicinity of the crosswalk has an intention to enter the crosswalk or at least may be likely to enter the crosswalk. Accordingly, the navigation system may navigate the vehicle (e.g., slow the vehicle or change the trajectory of the vehicle) in anticipation that the pedestrian will enter the crosswalk. If the pedestrian has entered the crosswalk, the navigation system may stop the vehicle.

Figure 34:
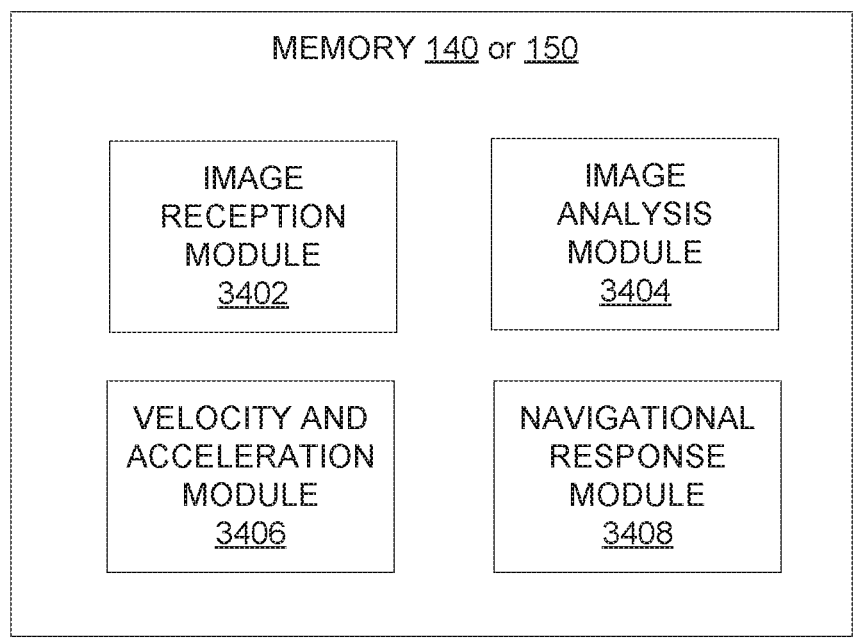
FIG. 34 is an exemplary block diagram of a memory configured to store instructions for performing one or more operations consistent with the disclosed embodiments.

FIG. 34 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 34, memory 140 may store an image reception module 3402, an image analysis module 3404, a velocity and acceleration module 3406, and a navigational response module 3408. The disclosed embodiments are not limited to any particular configuration of memory 140. Further, applications processor 180 and/or image processor 190 may execute the instructions stored in any of modules 3402, 3404, 3406, and 3408 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, image reception module 3402 may store instructions (such as computer vision software) which, when executed by processing unit 110, receives, from a camera, a plurality of images representative of an environment of the host vehicle. The camera may include at least one of image capture device 122, image capture device 124, and image capture device 126, as described above. Alternatively and/or additionally, image reception module 3402 may store instructions which, when executed by processing unit 110, receives images from a camera (e.g., a dedicated crosswalk camera) distinct from image capture device 122, image capture device 124, and image capture device 126.

In one embodiment, image analysis module 3404 may store instructions (such as computer vision software) which, when executed by processing unit 110, performs image analysis of at least one of the plurality of images to identify a crosswalk in the environment of the host vehicle. In some embodiments, processing unit 110 may combine information from a set of images with additional sensory information (e.g., information from radar, lidar, etc.) to perform the image analysis. In other embodiments, processing until may combine the information from a set of images with additional information, such as map data providing the locations of roads and/or particular landmarks (e.g., buildings, etc.) associated with a map.

In some embodiments, image analysis may include a monocular image analysis as described in connection with FIGS. 5A-5D above, in which case image analysis module 3404 may include instructions for detecting a set of features within the images, such as crosswalks, lane markings, vehicles, pedestrians, road signs, highway exit ramps, traffic lights, hazardous objects, and any other feature associated with an environment of a vehicle. Alternatively and/or additionally, in some embodiments, image analysis may include a stereo image analysis as described in connection with FIG. 6 above, in which case image analysis module 3404 may include instructions for detecting a set of features within a first set of images (e.g., acquired by image capture device 124) and a second set of images (e.g., acquired by image capture device 126). Based on the analysis, system 100 (e.g., via processing unit 110) may cause one or more navigational responses in vehicle 200, such as a turn, a lane shift, a change in acceleration, and the like, as discussed below in connection with velocity and acceleration module 3406 and navigational response module 3408. Furthermore, in some embodiments, image analysis module 3404 may implement techniques associated with a trained system (such as a neural network or a deep neural network) or an untrained system, such as a system that may be configured to use computer vision algorithms to detect and/or label objects in an environment from which sensory information was captured and processed. In one embodiment, image analysis module 3404 and/or other image processing modules may be configured to use a combination of a trained and untrained system.

In one embodiment, velocity and acceleration module 3406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 3406 to calculate a target speed for vehicle 200 based on data derived from execution of image analysis module 3404. Such data may include, for example, a target position, velocity, and/or acceleration. Such data may also include, for example, the position and/or speed of vehicle 200 relative to a nearby vehicle, pedestrian, or road object. Such data may further include, for example, position information for vehicle 200 relative to lane markings of the road, such as a crosswalk and the like. In addition, processing unit 110 may calculate a target speed for vehicle 200 based on sensory input (e.g., information from radar and/or lidar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 3408 may store software executable by processing unit 110 to determine a desired navigational response based on data derived from execution of image analysis module 3404. Such data may include, for example, whether a pedestrian is in a vicinity of an identified crosswalk, whether that pedestrian has an intention to enter the crosswalk, or whether that pedestrian has already entered the crosswalk. Additionally, in some embodiments, the navigational response may be based (partially or fully) on map data, a predetermined position of vehicle 200, and/or a relative velocity or a relative acceleration between vehicle 200 and one or more objects detected from execution of image analysis module 3404. Navigational response module 3408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 3408 (e.g., the desired navigational response) as an input to execution of velocity and acceleration module 3406 for calculating a change in speed of vehicle 200.

Furthermore, any of the modules (e.g., modules 3402, 3404, 3406, and 3408) disclosed herein may implement techniques associated with a trained system (such as a neural network or a deep neural network) or an untrained system.

Figure 35:
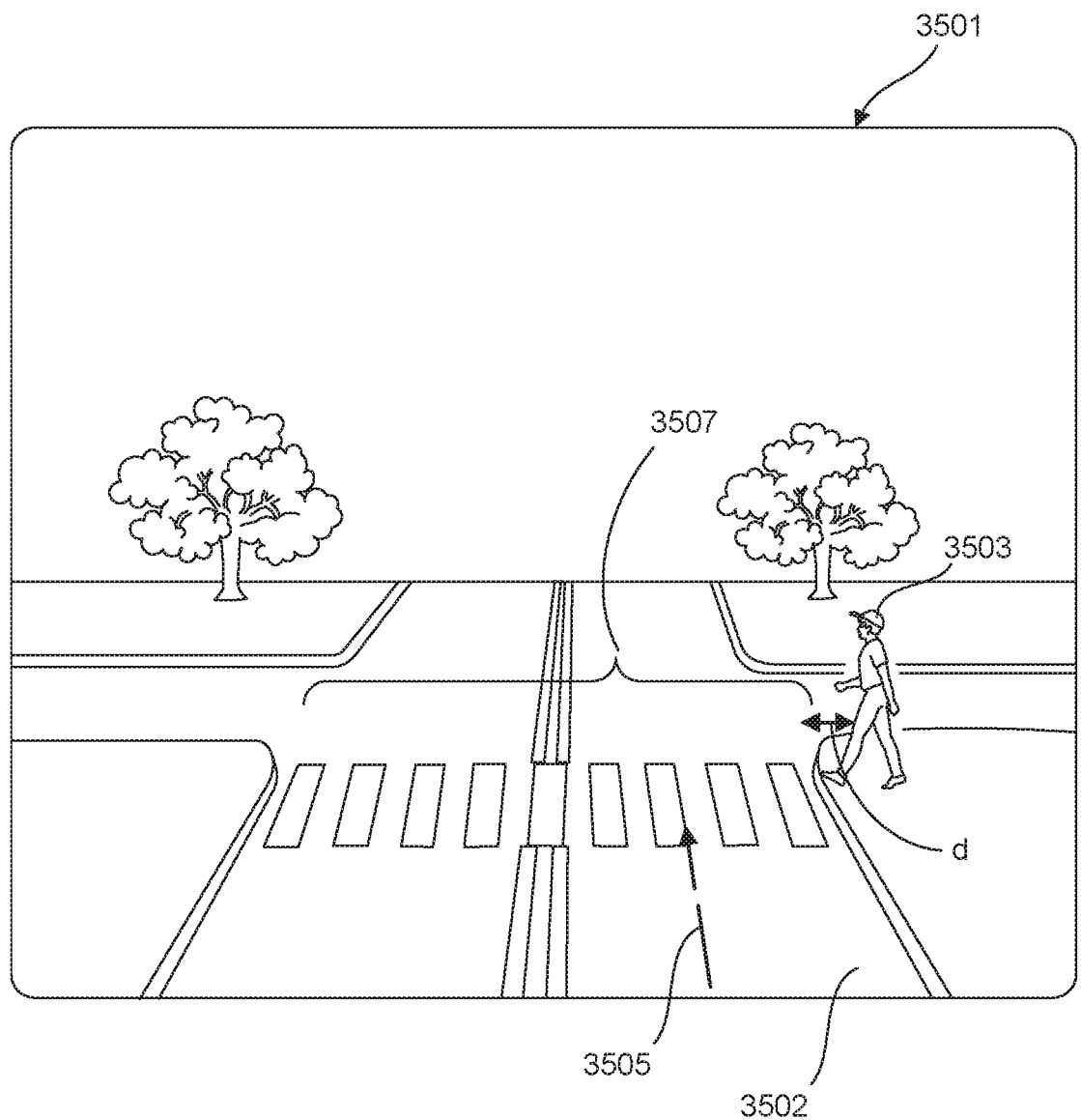
FIG. 35 provides a diagram of a representative image captured of an environment of a host vehicle, along with potential navigational constraints consistent with the disclosed embodiments.

FIG. 35 shows an example of a scene that may be captured and analyzed during navigation of a host vehicle 200. Specifically, the scene shown in FIG. 35 is an example of one of the images that may be captured at time t from an environment of the host vehicle traveling in lane 3502 along a predicted trajectory 3505. The navigation system may include at least one processing device (e.g., including any of the EyeQ processors or other devices described above) that are specifically programmed to receive the plurality of images and analyze the images to determine an action in response to the scene. Specifically, the at least one processing device may implement image reception module 3402, image analysis module 3404, velocity and acceleration module 3406, and navigational response module 3408, as shown and described in connection with FIG. 34.

In some embodiments, the at least one processing device may receive, from a camera (e.g., image capture device 122, image capture device 124, image capture device 126, or another image capturing/sensing device), a plurality of images representative of an environment of the host vehicle. The at least one processing device may analyze at least one of the plurality of images (e.g., image 3501) to identify a crosswalk 3507 in the environment of the host vehicle. The at least one processing device may also analyze the at least one of the plurality of images (e.g., image 3501) to determine whether a pedestrian 3503 is in a vicinity of the identified crosswalk 3507. In some embodiments, the at least one processing device may determine that pedestrian 3503 is in the vicinity of the identified crosswalk 3507 when a distance d between pedestrian 3503 and crosswalk 3507 is below a threshold distance. For example, in some embodiments, pedestrian 3503 is determined to be within the vicinity of crosswalk 3507 when pedestrian 3503 is within 1 meter of an edge of crosswalk 3507. In another example, pedestrian 3503 is determined to be within the vicinity of crosswalk 3507 when pedestrian 3503 is within 2 meters of an edge of crosswalk 3507. In still another example, pedestrian 3503 is determined to be within the vicinity of crosswalk 3507 when pedestrian 3503 is within 5 meters of an edge of crosswalk 3507.

In some embodiments, as depicted in FIG. 35, the distance d between pedestrian 3503 and crosswalk 3507 may be determined based on the shortest distance between the torso of pedestrian 3503 and the edge of crosswalk 3507. Alternatively, the distance between pedestrian 3503 and crosswalk 3507 may be determined based on the shortest distance between any body part of pedestrian 3503 (e.g., the left foot of pedestrian 3503) and the edge of crosswalk 3507. Of course, the distance between pedestrian 3503 and crosswalk 3507 may be determined based on other measurements as well (e.g., the shortest distance between a center of mass of pedestrian 3503 and the edge of crosswalk 3507).

In some embodiments, the at least one processing device may determine a navigational action based on the identification of crosswalk 3507 in the environment of the host vehicle and based on the determination that pedestrian 3503 is in the vicinity of (or has already entered) the identified crosswalk 3507. In some embodiments, the navigational action may include at least one change relative to a current navigational state of the host vehicle. The at least one processing device may then cause at least one adjustment of a navigational actuator of the host vehicle in response to the determined navigational action for the host vehicle. Such a navigational actuator may include at least one of a steering mechanism, a brake, or an accelerator of the host vehicle.

For example, in some embodiments, the determined navigational action may include braking of the host vehicle to slow the host vehicle when the at least one processing device determines that pedestrian 3503 is in a vicinity of crosswalk 3507. In another example, the determined navigational action may include braking of the host vehicle to stop the host vehicle. In still another example, the determined navigational action may include steering the host vehicle away from pedestrian 3503 (e.g., changing trajectory 3505 of the host vehicle).

In some embodiments, the at least one processing device may determine the navigational action based on an anticipation that pedestrian 3503 will enter the identified crosswalk 3507. For example, the at least one processing device may utilize image analysis module 3404 to analyze one or more images leading up to time t to determine a movement associated with pedestrian 3503. If the movement suggests that pedestrian 3503 is moving towards crosswalk 3507, the at least one processing device may determine that pedestrian 3503 is anticipated to enter the identified crosswalk 3507. Accordingly, the at least one processing device may navigate the host vehicle (e.g., slow the host vehicle or change trajectory 3505 of the host vehicle) in anticipation that pedestrian 3503 will enter crosswalk 3507. Otherwise, the at least one processing device may determine that pedestrian 3503 is not anticipated to enter the identified crosswalk 3507.

Figure 36:
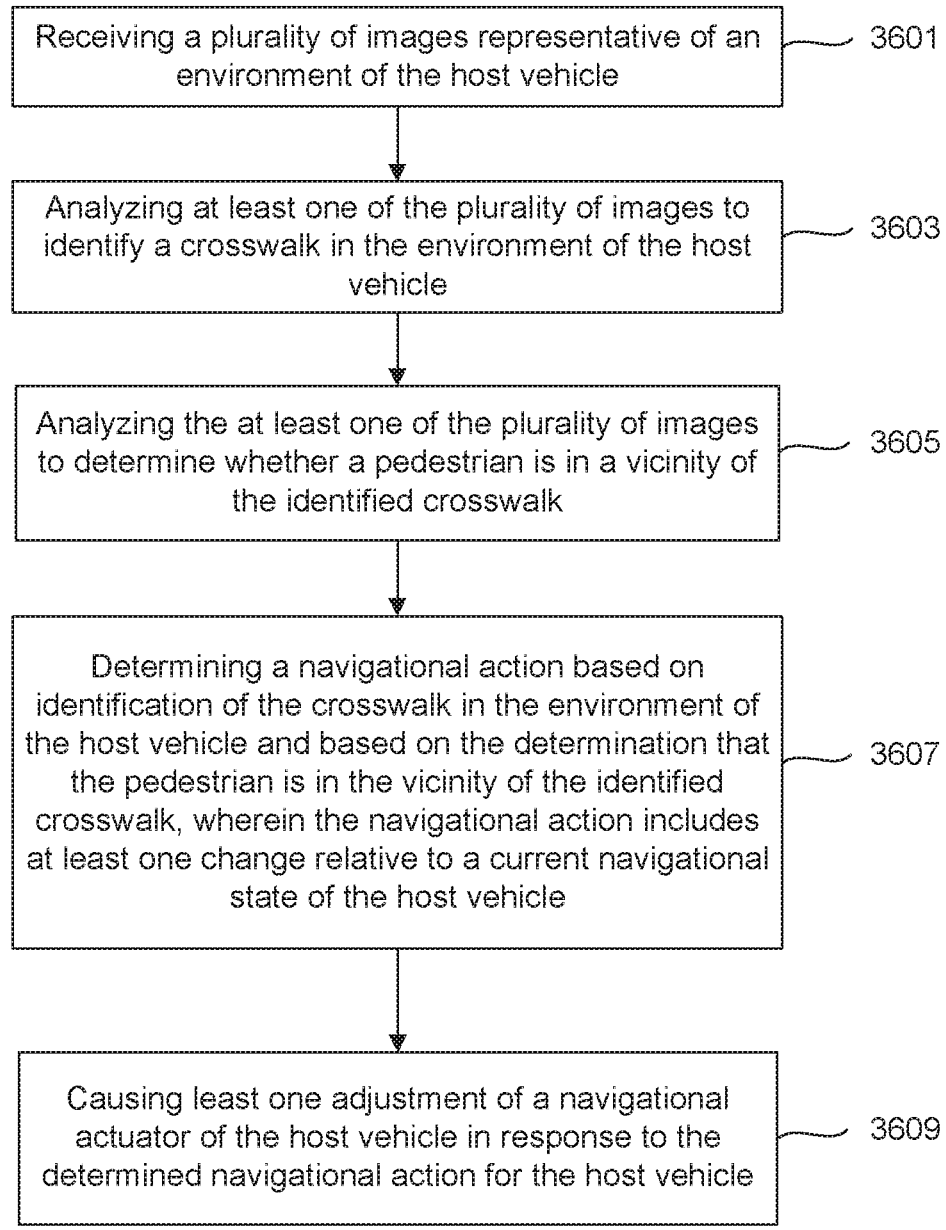
FIG. 36 provides an algorithmic flow chart for navigating a vehicle consistent with the disclosed embodiments.

FIG. 36 is a flowchart showing an exemplary process 3600 for causing one or more navigational responses based on image analysis, consistent with disclosed embodiments. It is to be understood that steps of process 3600 may be performed by one or more processing devices described above. For example, in some embodiments, steps of process 3600 may be performed by at least one of processing unit 110, applications processor 180, image processor 190, or the like.

As shown in FIG. 36, at step 3601, one or more processing devices may receive, from a camera (e.g., image capture device 122, image capture device 124, image capture device 126, or the like), a plurality of images representative of an environment of a host vehicle. At step 3603, the one or more processing devices may analyze at least one of the plurality of images to identify a crosswalk in the environment of the host vehicle. At step 3605, the one or more processing devices may analyze the at least one of the plurality of images to determine whether a pedestrian is in a vicinity of the identified crosswalk. In some embodiments, the one or more processing devices may analyze the images using a monocular image analysis process as described in connection with FIGS. 5A-5D above, wherein the one or more processing devices may detect a set of features within the images, such as crosswalks, lane markings, vehicles, pedestrians, road signs, highway exit ramps, traffic lights, hazardous objects, and any other feature associated with an environment of a vehicle. Alternatively and/or additionally, in some embodiments, the one or more processing devices may analyze the images using a stereo image analysis process as described in connection with FIG. 6 above, wherein the one or more processing devices may detect a set of features within a first set of images (e.g., acquired by image capture device 124) and a second set of images (e.g., acquired by image capture device 126).

At step 3607, the one or more processing devices may determine a navigational action based on identification of the crosswalk in the environment of the host vehicle and based on the determination that the pedestrian is in a vicinity of the identified crosswalk. In some embodiments, the pedestrian may be determined to be in the vicinity of the identified crosswalk when a distance d between the pedestrian and the identified crosswalk is below a threshold distance. For example, in some embodiments, the pedestrian may be determined to be within the vicinity of the crosswalk when the pedestrian is within 1 meter of an edge of the crosswalk. In some embodiments, the pedestrian may be determined to be within the vicinity of the crosswalk when the pedestrian is within 2 meters of an edge of the crosswalk. In some embodiments, the pedestrian may be determined to be within the vicinity of the crosswalk when the pedestrian is within 5 meters of an edge of the crosswalk.

In some embodiments, the navigational action may include at least one change relative to a current navigational state of the host vehicle. For example, in some embodiments, the determined navigational action may include braking of the host vehicle to slow the host vehicle when it is determined that the pedestrian is in the vicinity of the crosswalk. In some embodiments, the determined navigational action may include braking of the host vehicle to stop the host vehicle. In some embodiments, the determined navigational action may include steering the host vehicle away from the pedestrian. In some embodiments, the one or more processing devices may determine the navigational action based on an anticipation that the pedestrian will enter the identified crosswalk.

At step 3609, the one or more processing devices may cause at least one adjustment of a navigational actuator of the host vehicle in response to the determined navigational action for the host vehicle. In some embodiments, the navigational actuator may include at least one of a steering mechanism, a brake, or an accelerator of the host vehicle.

As described in the examples above, navigation of the host vehicle may be based on sensed pedestrian in vicinity of a crosswalk. Accordingly, the navigation system may navigate the host vehicle to avoid hitting pedestrians in vicinity of the crosswalk, effectively improving the safety of the navigation system and the host vehicle.

Navigation Based on Sensed Number of Pedestrians

In some embodiments, a host vehicle may include a navigation system (e.g., system 100), as described above, that may receive from a camera (e.g., image capture device 122, image capture device 124, image capture device 126, or the like) a plurality of images representative of an environment of the host vehicle. The navigation system may analyze one or more of the received images to sense a number of pedestrians in the environment of the host vehicle. If many pedestrians are sensed (e.g., if the number of pedestrians exceeds a threshold), the navigation system may cause the host vehicle to proceed more conservatively than if fewer pedestrians are sensed (e.g., if the number of pedestrians equals or is less than a threshold). In some embodiments, the navigation system may navigate more conservatively in the presence of multiple pedestrians in view of a potential increase in likelihood that one or more of the multiple pedestrians will move into a path of the host vehicle.

Figure 37:
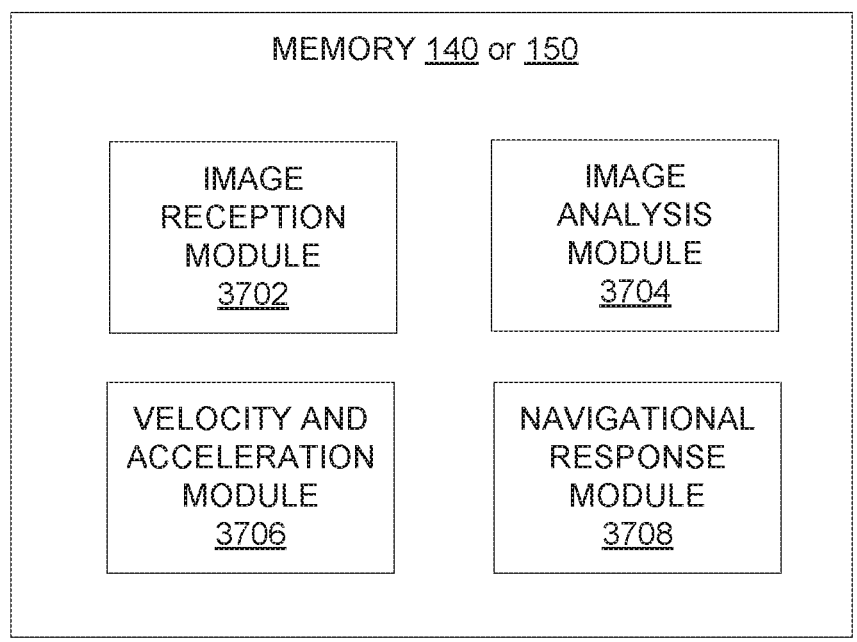
FIG. 37 is an exemplary block diagram of a memory configured to store instructions for performing one or more operations consistent with the disclosed embodiments.

FIG. 37 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 37, memory 140 may store an image reception module 3702, an image analysis module 3704, a velocity and acceleration module 3706, and a navigational response module 3708. The disclosed embodiments are not limited to any particular configuration of memory 140. Further, applications processor 180 and/or image processor 190 may execute the instructions stored in any of modules 3702, 3704, 3706, and 3708 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, image reception module 3702 may store instructions (such as computer vision software) which, when executed by processing unit 110, receives, from a camera, a plurality of images representative of an environment of the host vehicle. The camera may include at least one of image capture device 122, image capture device 124, and image capture device 126, as described above. Alternatively and/or additionally, image reception module 3702 may store instructions which, when executed by processing unit 110, receives images from a camera (e.g., a dedicated pedestrian detection camera) distinct from image capture device 122, image capture device 124, and image capture device 126.

In one embodiment, image analysis module 3704 may store instructions (such as computer vision software) which, when executed by processing unit 110, performs image analysis of at least one of the plurality of images to identify/sense whether there are any pedestrians in the environment of the host vehicle. In some embodiments, processing unit 110 may combine information from a set of images with additional sensory information (e.g., information from radar, lidar, etc.) to perform the image analysis. In some embodiments, image analysis may include a monocular image analysis as described in connection with FIGS. 5A-5D above, in which case image analysis module 3704 may include instructions for detecting a set of features within the images, such as crosswalks, lane markings, vehicles, pedestrians, road signs, highway exit ramps, traffic lights, hazardous objects, and any other feature associated with an environment of a vehicle. Alternatively and/or additionally, in some embodiments, image analysis may include a stereo image analysis as described in connection with FIG. 6 above, in which case image analysis module 3704 may include instructions for detecting a set of features within a first set of images (e.g., acquired by image capture device 124) and a second set of images (e.g., acquired by image capture device 126). Based on the analysis, system 100 (e.g., via processing unit 110) may cause one or more navigational responses in vehicle 200, such as a turn, a lane shift, a change in acceleration, and the like, as discussed below in connection with velocity and acceleration module 3706 and navigational response module 3708. Furthermore, in some embodiments, image analysis module 3704 may implement techniques associated with a trained system (such as a neural network or a deep neural network) or an untrained system, such as a system that may be configured to use computer vision algorithms to detect and/or label objects in an environment from which sensory information was captured and processed. In one embodiment, image analysis module 3704 and/or other image processing modules may be configured to use a combination of a trained and untrained system.

In one embodiment, velocity and acceleration module 3706 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 3706 to calculate a target speed for vehicle 200 based on data derived from execution of image analysis module 3704. Such data may include, for example, a target position, velocity, and/or acceleration. Such data may also include, for example, the position and/or speed of vehicle 200 relative to a nearby vehicle, pedestrian, or road object. Such data may further include, for example, position information for vehicle 200 relative to lane markings of the road, such as a crosswalk and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 3708 may store software executable by processing unit 110 to determine a desired navigational response based on data derived from execution of image analysis module 3704. Such data may include, for example, the sensed number of pedestrians in the environment of the host vehicle. Additionally, in some embodiments, the navigational response may be based (partially or fully) on map data, a predetermined position of vehicle 200, and/or a relative velocity or a relative acceleration between vehicle 200 and one or more objects detected from execution of image analysis module 3704. Navigational response module 3708 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 3708 (e.g., the desired navigational response) as an input to execution of velocity and acceleration module 3706 for calculating a change in speed of vehicle 200.

Furthermore, any of the modules (e.g., modules 3702, 3704, 3706, and 3708) disclosed herein may implement techniques associated with a trained system (such as a neural network or a deep neural network) or an untrained system.

Figure 38A:
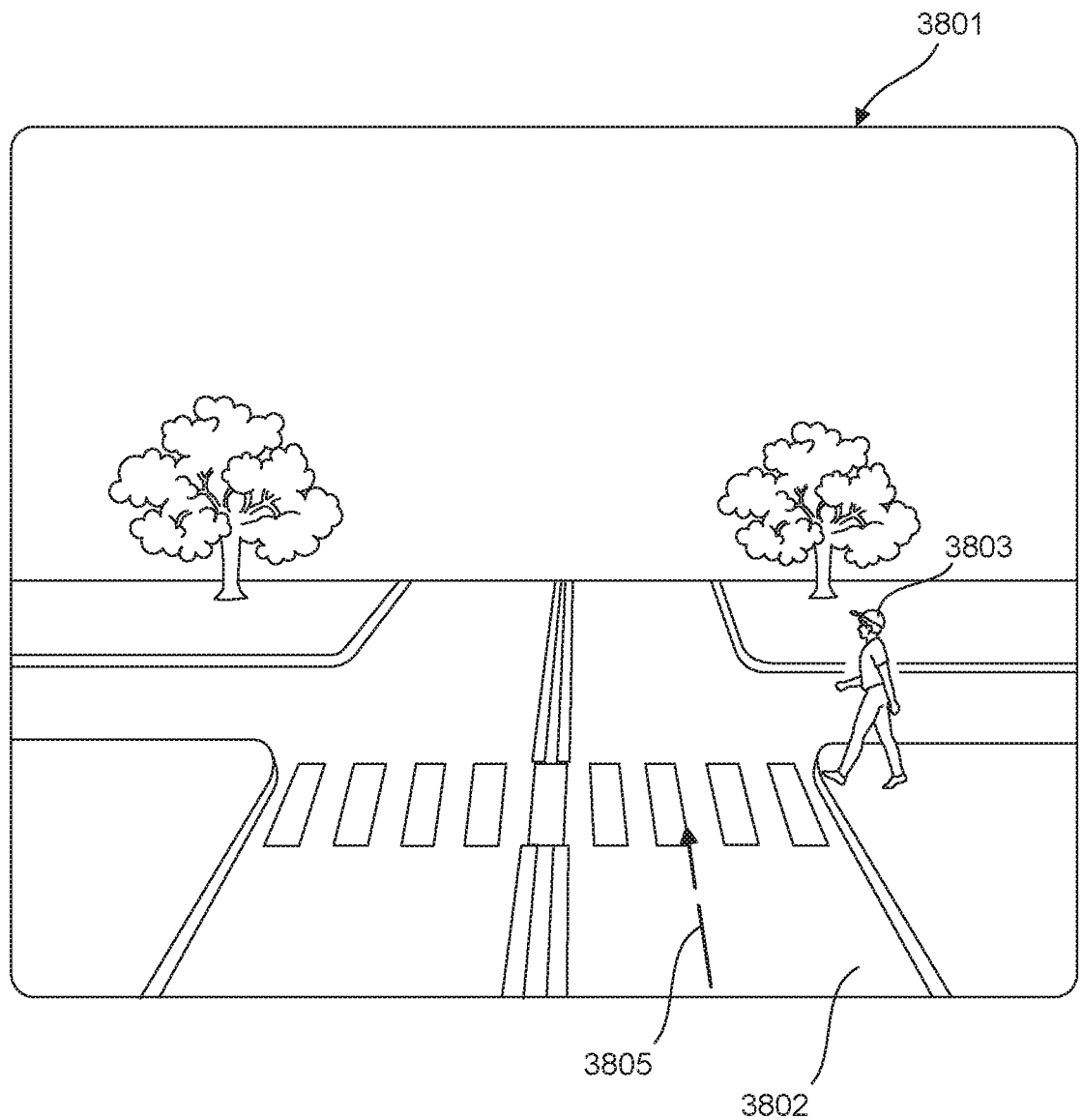
FIG. 38A provides a diagram of a representative image captured of an environment of a host vehicle, along with potential navigational constraints consistent with the disclosed embodiments.

FIG. 38A shows an example of a scene that may be captured and analyzed during navigation of a host vehicle 200. Specifically, the scene shown in FIG. 38A is an example of one of the images that may be captured at time t from an environment of the host vehicle traveling in lane 3802 along a predicted trajectory 3805. The navigation system may include at least one processing device (e.g., including any of the EyeQ processors or other devices described above) that are specifically programmed to receive the plurality of images and analyze the images to determine an action in response to the scene. Specifically, the at least one processing device may implement image reception module 3702, image analysis module 3704, velocity and acceleration module 3706, and navigational response module 3708, as shown and described in connection with FIG. 37.

In some embodiments, the at least one processing device may receive, from a camera (e.g., image capture device 122, image capture device 124, image capture device 126, or another image capturing/sensing device), a plurality of images representative of an environment of the host vehicle. The at least one processing device may analyze at least one of the plurality of images (e.g., image 3801) to identify a sensed number of pedestrians in the environment of the host vehicle. In the example depicted in FIG. 38A, because there is only a single pedestrian 3803, the sensed number of pedestrians may be one.

In some embodiments, the at least one processing device may determine a navigational action based on a comparison between the sensed number of pedestrians (e.g., sensed based on at least one of the images captured at time t from the environment of the host vehicle) and a previously sensed number of pedestrians (e.g., sensed based on at least one of the images captured at a time prior to t). If the previously sensed number of pedestrians is greater than the currently sensed number of pedestrians, the at least one processing device may determine a new navigational action (maybe referred to as a first navigational action) for the host vehicle that is less conservative in at least one respect than an existing navigational action (maybe referred to as a second navigational action) determined based on the previously sensed number of pedestrians.

Figure 38B:
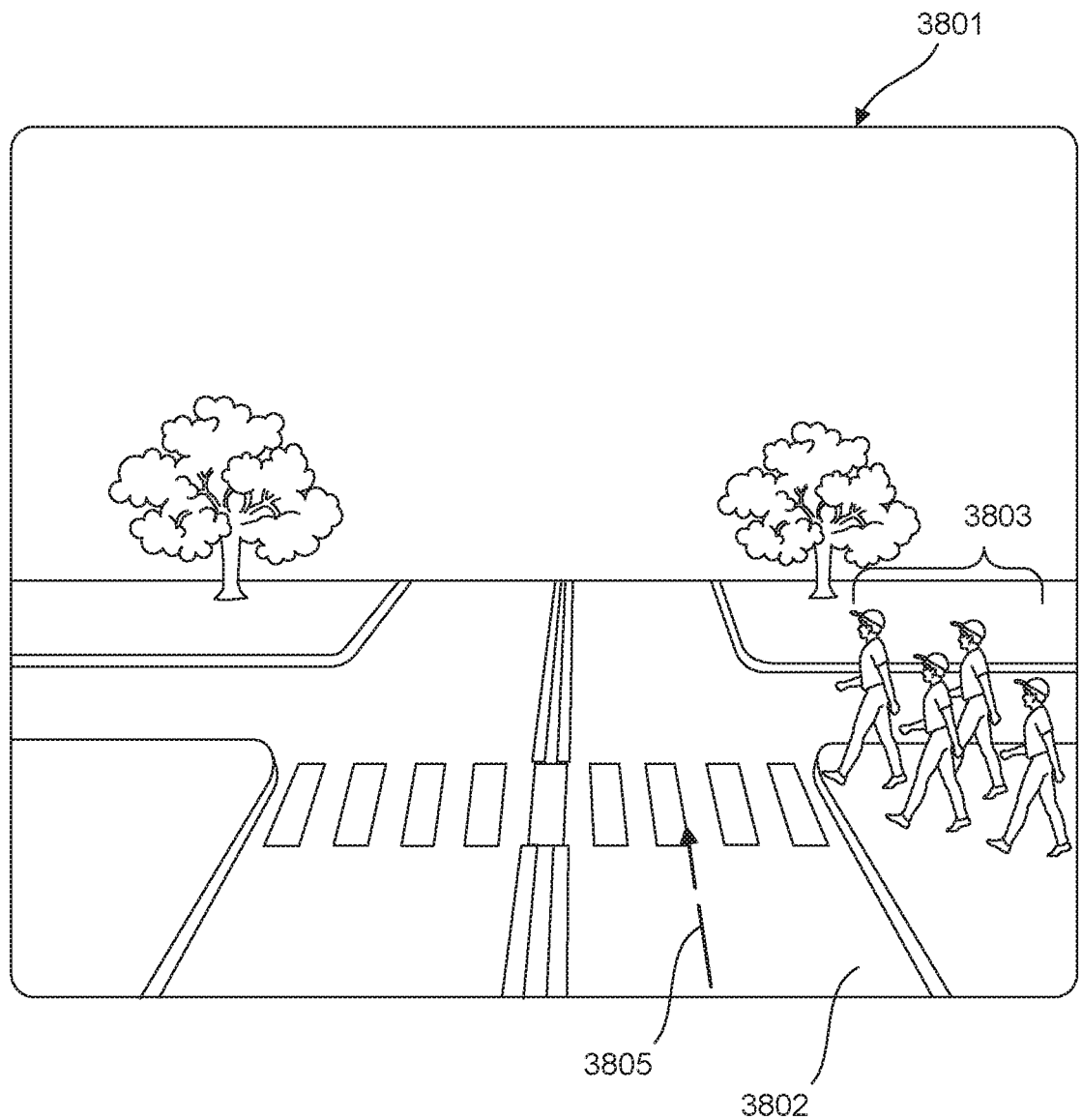
FIG. 38B provides a diagram of a representative image captured of an environment of a host vehicle, along with potential navigational constraints consistent with the disclosed embodiments.

FIG. 38B shows an example of a scene where the number of pedestrians is greater than the sensed number of pedestrians depicted in FIG. 38A. Suppose, for illustrative purposes, that the scene depicted in FIG. 38B was captured and analyzed at a time prior to t, then the previously sensed number of pedestrians would have been four. Accordingly, because the previously sensed number of pedestrians (four, as depicted in FIG. 38B) is greater than the currently sensed number of pedestrians (one, as depicted in FIG. 38A), the at least one processing device may determine that the host vehicle can take a first navigational action that is less conservative in at least one respect than a second navigational action determined based on the previously sensed number of pedestrians.

It is to be understood that the first navigational action may be less conservative than the second navigational action in various manners. For example, the first navigational action may be less conservative than the second navigational action if the first navigational action includes a speed that is faster than a speed associated with the second navigational action. If the second navigational action includes slowing or stopping the host vehicle, for example, the first navigational action may include continuing with a current speed and heading for the host vehicle to be less conservative. In another example, the first navigational action may be less conservative than the second navigational action if the first navigational action eliminates a maneuver that is associated with second navigational action for the purpose of moving the host vehicle in a direction away from the sensed pedestrians. If the second navigational action includes a maneuver to move over within a lane of travel in a direction away from the pedestrian, for example, the first navigational action may eliminate that maneuver to be less conservative. In another example, the first navigational action may be less conservative than the second navigational action if the first navigational action includes a pedestrian offset distance that is less than a pedestrian offset distance associated with the second navigational action so that the host vehicle can navigate through a trajectory that is closer to the sensed pedestrians. In still another example, the first navigational action may be less conservative than the second navigational action if the first navigational action negotiates a turn more aggressively than the second navigational action. Of course, the first navigational action may be less conservative than the second navigational action in other regards not explicitly described in the examples presented above. The first navigational action may also include a combination of the aforementioned less conservative actions.

It is also to be understood that the navigation system may determine that the first navigational action for the host vehicle can be more conservative in at least one respect than the second navigational action for the host vehicle. For example, if the sensed number of pedestrians has increased (e.g., if FIG. 38A was captured at time t and FIG. 38B was captured subsequent to time t), the first navigational action may include slowing the host vehicle. In another example, the first navigational action may include a speed for the host vehicle less than a speed associated with the second navigational action. In still another example, the first navigational action may include moving the host vehicle over in a direction away from the sensed pedestrians. In some embodiments, the first navigational action may include moving the host vehicle over within a lane of travel. Alternatively and/or additionally, the first navigational action may include changing a lane of travel of the host vehicle. Furthermore, in some embodiments, the first navigational action may include a pedestrian offset distance that is greater than a pedestrian offset distance associated with the second navigational action so that the host vehicle can navigate through a trajectory that is farther away from the sensed pedestrians.

In some embodiments, the first navigational action may include at least one change relative to a current navigational state of the host vehicle. The at least one processing device may then cause at least one adjustment of a navigational actuator of the host vehicle in response to the determined navigational action for the host vehicle. Such a navigational actuator may include at least one of a steering mechanism, a brake, or an accelerator of the host vehicle.

Figure 39:
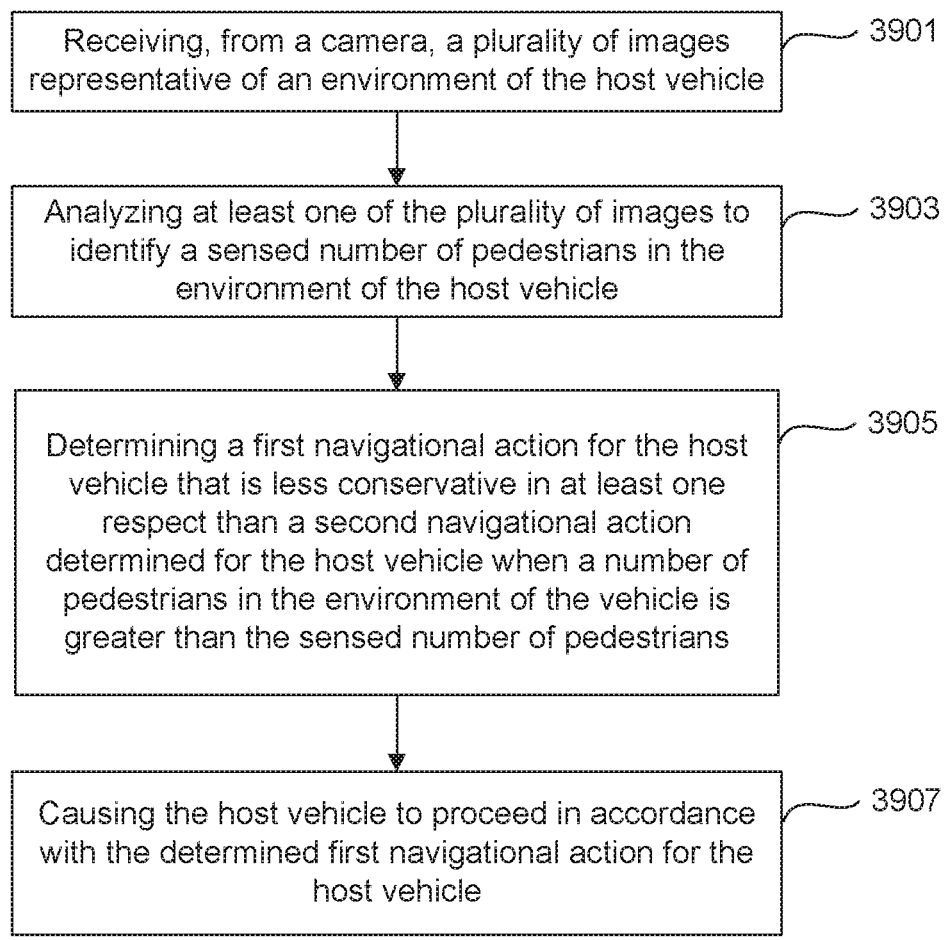
FIG. 39 provides an algorithmic flow chart for navigating a vehicle consistent with the disclosed embodiments.

FIG. 39 is a flowchart showing an exemplary process 3900 for causing one or more navigational responses based on image analysis, consistent with disclosed embodiments. It is to be understood that steps of process 3900 may be performed by one or more processing devices described above. For example, in some embodiments, steps of process 3900 may be performed by at least one of processing unit 110, applications processor 180, image processor 190, or the like.

As shown in FIG. 39, at step 3901, one or more processing devices may receive, from a camera (e.g., image capture device 122, image capture device 124, image capture device 126, or the like), a plurality of images representative of an environment of a host vehicle. At step 3903, the one or more processing devices may analyze at least one of the plurality of images to identify a sensed number of pedestrians in the environment of the host vehicle. In some embodiments, the one or more processing devices may analyze the images using a monocular image analysis process as described in connection with FIGS. 5A-5D above, wherein the one or more processing devices may detect a set of features within the images, such as crosswalks, lane markings, vehicles, pedestrians, road signs, highway exit ramps, traffic lights, hazardous objects, and any other feature associated with an environment of a vehicle. Alternatively and/or additionally, in some embodiments, the one or more processing devices may analyze the images using a stereo image analysis process as described in connection with FIG. 6 above, wherein the one or more processing devices may detect a set of features within a first set of images (e.g., acquired by image capture device 124) and a second set of images (e.g., acquired by image capture device 126).

At step 3905, the one or more processing devices may determine a first navigational action for the host vehicle that is less conservative in at least one respect than a second navigational action for the host vehicle, wherein the second navigational action is based on a number of pedestrians in the environment of the host vehicle that is greater than the sensed number of pedestrians. In some embodiments, step 3905 may be invoked when the sensed number of pedestrians is non-zero.

It is to be understood that the first navigational action may be less conservative than the second navigational action in various manners. For example, the first navigational action may be less conservative than the second navigational action if the first navigational action includes a speed that is faster than a speed associated with the second navigational action. If the second navigational action includes slowing or stopping the host vehicle, for example, the first navigational action may include continuing with a current speed and heading for the host vehicle to be less conservative. In another example, the first navigational action may be less conservative than the second navigational action if the first navigational action eliminates a maneuver that is associated with second navigational action for the purpose of moving the host vehicle in a direction away from the sensed pedestrians. If the second navigational action includes a maneuver to move over within a lane of travel in a direction away from the pedestrian, for example, the first navigational action may eliminate that maneuver to be less conservative. In another example, the first navigational action may be less conservative than the second navigational action if the first navigational action includes a pedestrian offset distance that is less than a pedestrian offset distance associated with the second navigational action so that the host vehicle can navigate through a trajectory that is closer to the sensed pedestrians. In still another example, the first navigational action may be less conservative than the second navigational action if the first navigational action negotiates a turn more aggressively than the second navigational action. Of course, the first navigational action may be less conservative than the second navigational action in other regards not explicitly described in the examples presented above. The first navigational action may also include a combination of the aforementioned less conservative actions.

It is also to be understood that the one or more processing devices may determine that the first navigational action for the host vehicle can be more conservative in at least one respect than the second navigational action for the host vehicle. For example, if the sensed number of pedestrians has increased (e.g., compared to a previously sensed number of pedestrians), the first navigational action may include slowing the host vehicle. In another example, the first navigational action may include a speed for the host vehicle less than a speed associated with the second navigational action. In still another example, the first navigational action may include moving the host vehicle over in a direction away from the sensed pedestrians. In some embodiments, the first navigational action may include moving the host vehicle over within a lane of travel. Alternatively and/or additionally, the first navigational action may include changing a lane of travel of the host vehicle. Furthermore, in some embodiments, the first navigational action may include a pedestrian offset distance that is greater than a pedestrian offset distance associated with the second navigational action so that the host vehicle can navigate through a trajectory that is farther away from the sensed pedestrians.

At step 3907, the one or more processing devices may cause the host vehicle to proceed in accordance with the determined first navigational action for the host vehicle. In some embodiments, the navigational actuator may include at least one of a steering mechanism, a brake, or an accelerator of the host vehicle.

As described in the examples above, navigation of the host vehicle may be based on sensed number of pedestrians. Accordingly, the navigation system may navigate the host vehicle differently in different situations based on the sensed number of pedestrians, effectively improving the safety of the navigation system and the host vehicle.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A navigation system for a host vehicle, the navigation system comprising:
    at least one processing device programmed to:
        receive, from a camera, a plurality of images representative of an environment of the host vehicle;
        analyze the plurality of images to identify at least one pedestrian in the environment of the host vehicle;
        identify eyes of the at least one pedestrian represented in at least one of the plurality of images;
        determine, based on analysis of the at least one of the plurality of images and based on the identification of the eyes of the at least one pedestrian in the at least one of the plurality of images, a looking direction of the at least one pedestrian;
        if the at least one pedestrian is determined to be looking in a direction of the host vehicle, determine a first navigational action for the host vehicle, wherein the at least one pedestrian is determined to be looking in the direction of the host vehicle if the determined looking direction of the at least one pedestrian falls within a cone intersecting the host vehicle and defined by an angle of 90 degrees or less;
        if the at least one pedestrian is determined to be looking in a direction other than toward the host vehicle, determine a second navigational action for the host vehicle different from the first navigational action and more conservative than the first navigational action in at least one respect; and
        cause control of at least one navigational actuator of the host vehicle in accordance with the determined first or second navigational action for the host vehicle.

2. The navigation system of claim 1, wherein determining the looking direction of the at least one pedestrian includes identifying a face of the at least one pedestrian in at least one of the plurality of images.

3. The navigation system of claim 1, wherein the navigational actuator includes at least one of a steering mechanism, a brake, or an accelerator.

4. The navigation system of claim 1, wherein the at least one pedestrian is determined to be looking in a direction of the host vehicle if the determined looking direction of the at least one pedestrian falls within a cone intersecting the host vehicle and defined by an angle of 45 degrees or less.

5. The navigation system of claim 1, wherein the second navigational action includes a larger pedestrian buffer zone relative to the first navigational action.

6. The navigation system of claim 1, wherein the second navigational action includes a host vehicle speed slower than the first navigational action.

7. An autonomous vehicle, the autonomous vehicle comprising:
    a frame;
    a body attached to the frame;
    a camera; and
    at least one processing device programmed to:
        receive, from the camera, a plurality of images representative of an environment of the autonomous vehicle;
        analyze the plurality of images to identify at least one pedestrian in the environment of the autonomous vehicle;
        identify eyes of the at least one pedestrian represented in at least one of the plurality of images;
        determine, based on analysis of the at least one of the plurality of images and based on the identification of the eyes of the at least one pedestrian in the at least one of the plurality of images, a looking direction of the at least one pedestrian;
        if the at least one pedestrian is determined to be looking in a direction of the autonomous vehicle, determine a first navigational action for the autonomous vehicle, wherein the at least one pedestrian is determined to be looking in the direction of the autonomous vehicle if the determined looking direction of the at least one pedestrian falls within a cone intersecting the autonomous vehicle and defined by an angle of 90 degrees or less;
        if the at least one pedestrian is determined to be looking in a direction other than toward the autonomous vehicle, determine a second navigational action for the autonomous vehicle different from the first navigational action and more conservative than the first navigational action in at least one respect; and
        cause control of at least one navigational actuator of the autonomous vehicle in accordance with the determined first or second navigational action for the autonomous vehicle.

8. The autonomous vehicle of claim 7, wherein determining the looking direction of the at least one pedestrian includes identifying a face of the at least one pedestrian in at least one of the plurality of images.

9. The autonomous vehicle of claim 7, wherein the navigational actuator includes at least one of a steering mechanism, a brake, or an accelerator.

10. The autonomous vehicle of claim 7, wherein the at least one pedestrian is determined to be looking in a direction of the autonomous vehicle if the determined looking direction of the at least one pedestrian falls within a cone intersecting the autonomous vehicle and defined by an angle of 45 degrees or less.

11. The autonomous vehicle of claim 7, wherein the second navigational action includes a larger pedestrian buffer zone relative to the first navigational action.

12. The autonomous vehicle of claim 7, wherein the second navigational action includes an autonomous vehicle speed slower than the first navigational action.

13. A method for navigation a host vehicle, the method comprising:
    receiving, from a camera, a plurality of images representative of an environment of the host vehicle;
    analyzing the plurality of images to identify at least one pedestrian in the environment of the host vehicle;

identifying eyes of the at least one pedestrian represented in at least one of the plurality of images;

determining, based on analysis of the at least one of the plurality of images and based on the identification of the eyes of the at least one pedestrian in the at least one of the plurality of images, a looking direction of the at least one pedestrian;

if the at least one pedestrian is determined to be looking in a direction of the host vehicle, determining a first navigational action for the host vehicle, wherein the at least one pedestrian is determined to be looking in the direction of the host vehicle if the determined looking direction of the at least one pedestrian falls within a cone intersecting the host vehicle and defined by an angle of 90 degrees or less;

if the at least one pedestrian is determined to be looking in a direction other than toward the host vehicle, determining a second navigational action for the host vehicle different from the first navigational action and more conservative than the first navigational action in at least one respect; and causing control of at least one navigational actuator of the host vehicle in accordance with the determined first or second navigational action for the host vehicle.

14. The method of claim 13, wherein determining the looking direction of the at least one pedestrian includes identifying a face of the at least one pedestrian in at least one of the plurality of images.

15. The method of claim 13, wherein the at least one pedestrian is determined to be looking in a direction of the host vehicle if the determined looking direction of the at least one pedestrian falls within a cone intersecting the host vehicle and defined by an angle of 45 degrees or less.

16. The method of claim 13, wherein the second navigational action includes a larger pedestrian buffer zone relative to the first navigational action.

17. The method of claim 13, wherein the second navigational action includes a host vehicle speed slower than the first navigational action.

* * * * *